United States Patent
Perlin et al.

(10) Patent No.: US 10,901,545 B2
(45) Date of Patent: *Jan. 26, 2021

(54) SENSOR HAVING A MESH LAYER WITH PROTRUSIONS, AND METHOD

(71) Applicants: Kenneth Perlin, New York, NY (US); Charles Hendee, Brooklyn, NY (US); Alex Grau, Astoria, NY (US); Gerald Seidman, New York, NY (US)

(72) Inventors: Kenneth Perlin, New York, NY (US); Charles Hendee, Brooklyn, NY (US); Alex Grau, Astoria, NY (US); Gerald Seidman, New York, NY (US)

(73) Assignees: NEW YORK UNIVERSITY, New York, NY (US); TACTONIC TECHNOLOGIES, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/383,309

(22) Filed: Dec. 19, 2016

(65) Prior Publication Data

US 2017/0131821 A1 May 11, 2017

Related U.S. Application Data

(63) Continuation of application No. 13/847,236, filed on Mar. 19, 2013, now Pat. No. 9,524,020, which is a
(Continued)

(51) Int. Cl.
*G06F 3/041* (2006.01)
*G06F 3/00* (2006.01)
(Continued)

(52) U.S. Cl.
CPC ............ *G06F 3/0414* (2013.01); *G01L 1/205* (2013.01); *G06F 3/005* (2013.01); *G06F 3/044* (2013.01);
(Continued)

(58) Field of Classification Search
None
See application file for complete search history.

(56) References Cited

U.S. PATENT DOCUMENTS

2003/0079549 A1* 5/2003 Lokhorst ................ G01L 1/205
73/754
2004/0222896 A1* 11/2004 Power ................ G07C 9/00103
340/687
(Continued)

OTHER PUBLICATIONS

Standard Test Methods for Flexural Properties of Unreinforced and Reinforced Plastics and Electrical Insulating Materials; Designation: D 790-03; p. 1-11; ASTM International.*

*Primary Examiner* — Gregory J Toatley, Jr.
*Assistant Examiner* — Terence E Stifter, Jr.
(74) *Attorney, Agent, or Firm* — Ansel M. Schwartz

(57) ABSTRACT

A sensor having a set of grid of bars that are in contact from their bottom at the corners with a set of protrusions that are in contact from above with a plurality of intersections, each having a sensing element, of a grid of wires disposed on a base, and a top surface layer that is disposed atop the grid of bars, so that force imparted from above onto the top surface layer is transmitted to the grid of bars and thence to the protrusions, and thence to the intersections of the grid of wires which are thereby compressed between the base and protrusions; and that the protrusions above thereby focus the imparted force directly onto the intersections. A sensor includes a computer in communication with the grid of wires which causes prompting signals to be sent to the grid of wires and reconstructs a continuous position of force on the surface from interpolation based on data signals received from the grid of wires. A method for sensing.

6 Claims, 78 Drawing Sheets

Related U.S. Application Data continuation-in-part of application No. 13/317,138, filed on Oct. 11, 2011, now Pat. No. 9,411,457.

(60) Provisional application No. 61/686,472, filed on Apr. 5, 2012, provisional application No. 61/404,897, filed on Oct. 12, 2010, provisional application No. 61/462,789, filed on Feb. 8, 2011, provisional application No. 61/572,642, filed on Jul. 19, 2011, provisional application No. 61/572,938, filed on Jul. 25, 2011.

(51) Int. Cl.
*G06F 3/044* (2006.01)
*G06F 3/045* (2006.01)
*G01L 1/20* (2006.01)
*G01L 5/22* (2006.01)

(52) U.S. Cl.
CPC .............. *G06F 3/045* (2013.01); *G01L 5/228* (2013.01); *G06F 2203/04103* (2013.01); *G06F 2203/04112* (2013.01); *G06F 2203/04113* (2013.01)

(56) References Cited

U.S. PATENT DOCUMENTS

| | | | | |
|---|---|---|---|---|
| 2009/0256817 | A1* | 10/2009 | Perlin | G06F 3/0233 345/174 |
| 2010/0315373 | A1* | 12/2010 | Steinhauser | G01L 1/205 345/174 |
| 2012/0017702 | A1* | 1/2012 | Kawabe | G06F 3/0414 73/862.381 |
| 2012/0198945 | A1* | 8/2012 | Yoneyama | B25J 13/083 73/862.042 |
| 2012/0293450 | A1* | 11/2012 | Dietz | G06F 3/0414 345/174 |

* cited by examiner

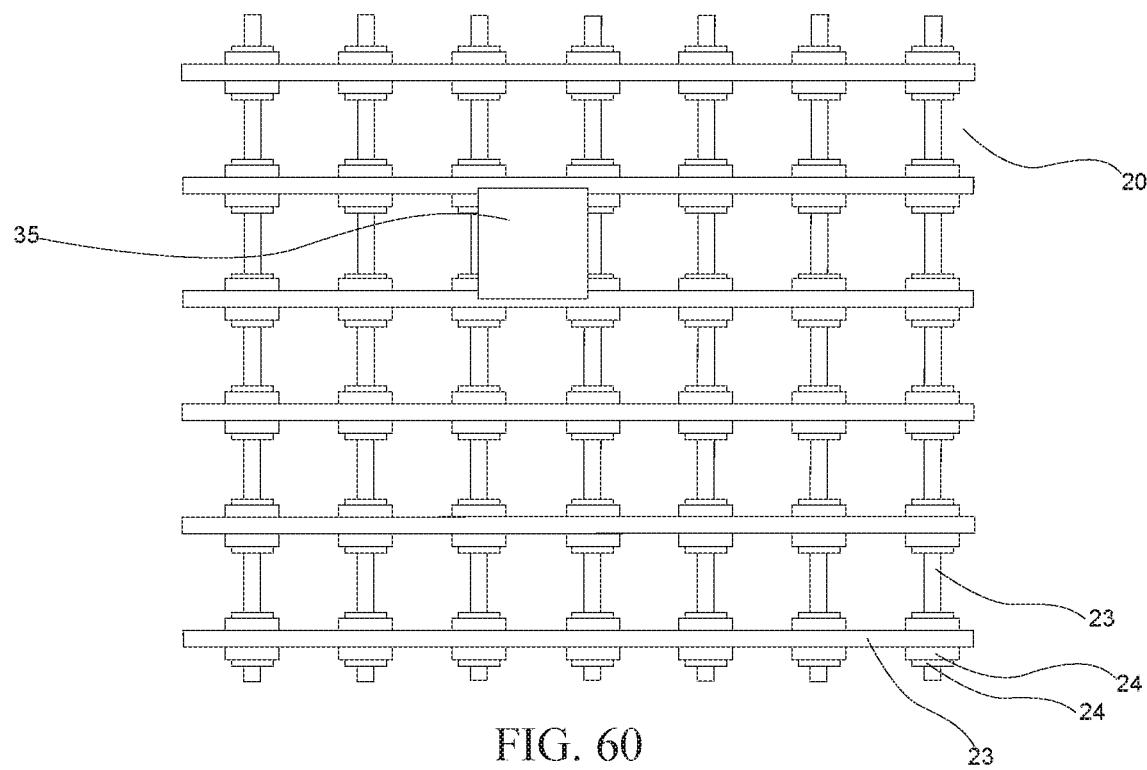
FIG. 60
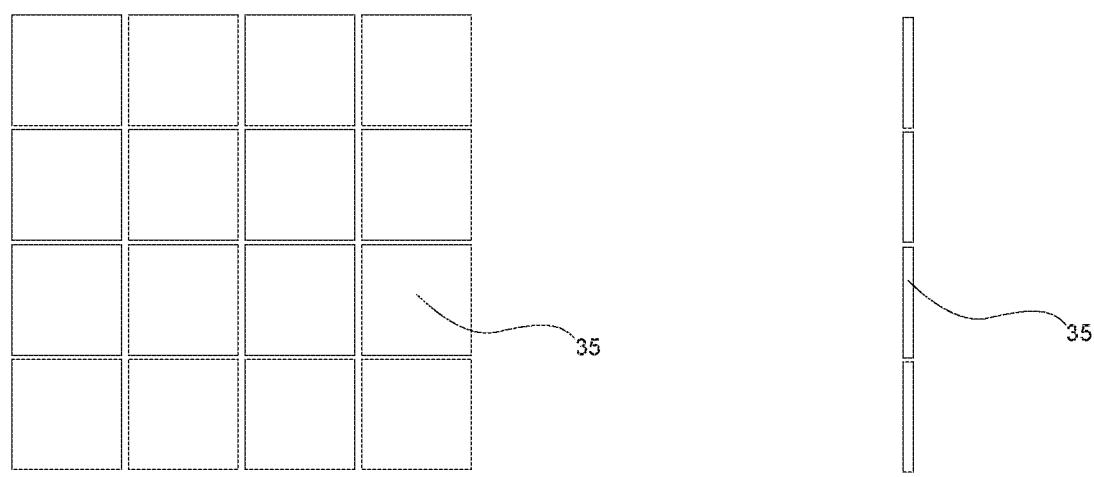
FIG. 61A
FIG. 61B

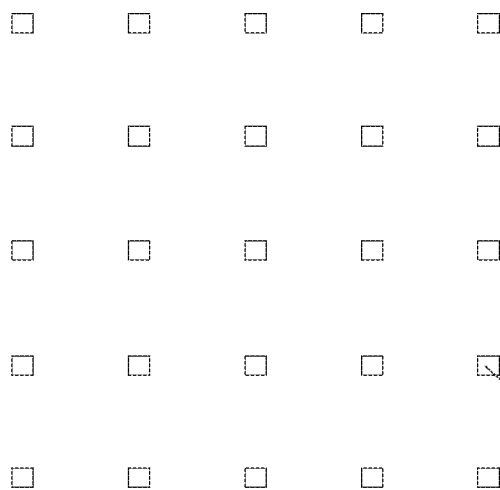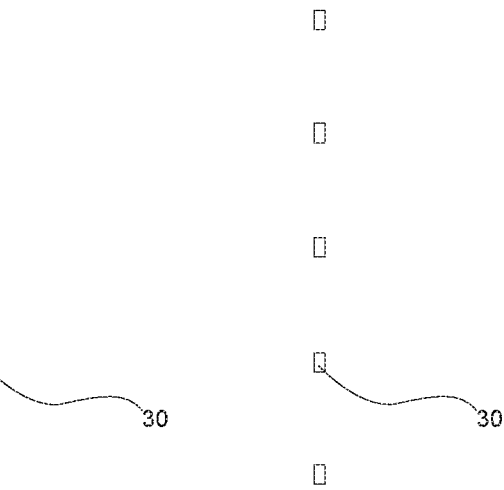
FIG. 62A    FIG. 62B
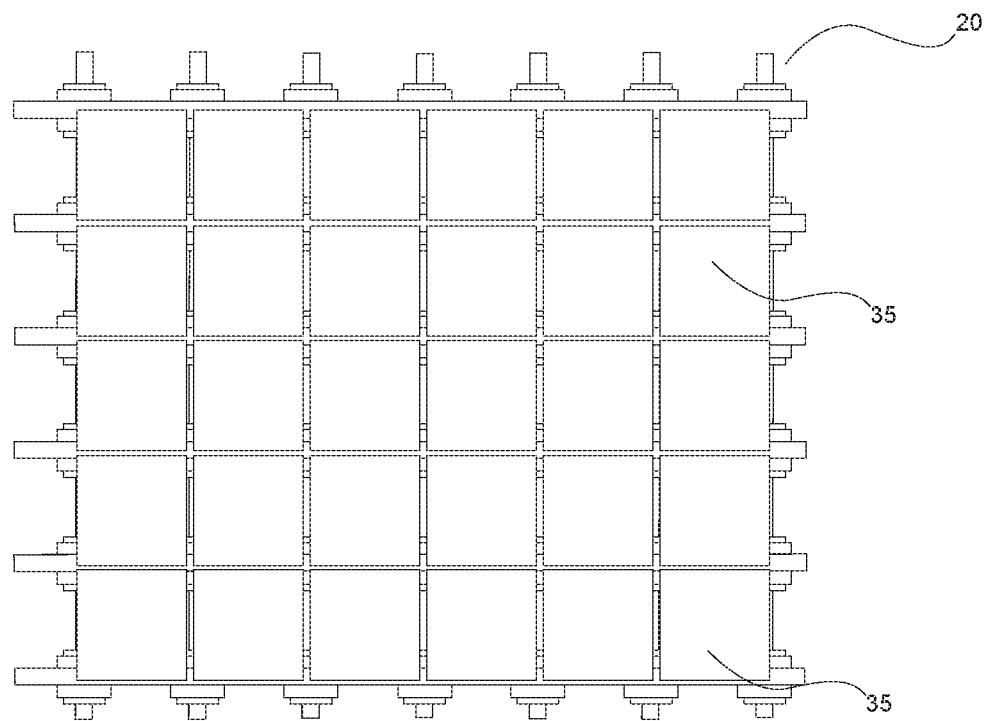
FIG. 63

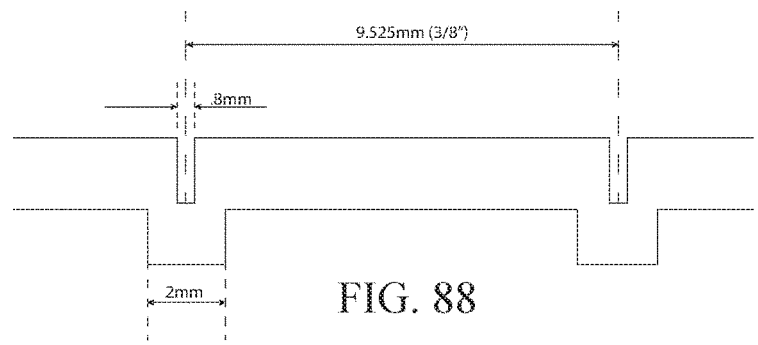
FIG. 88
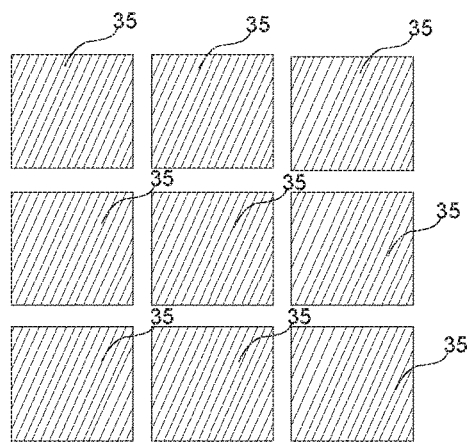
FIG. 89 A
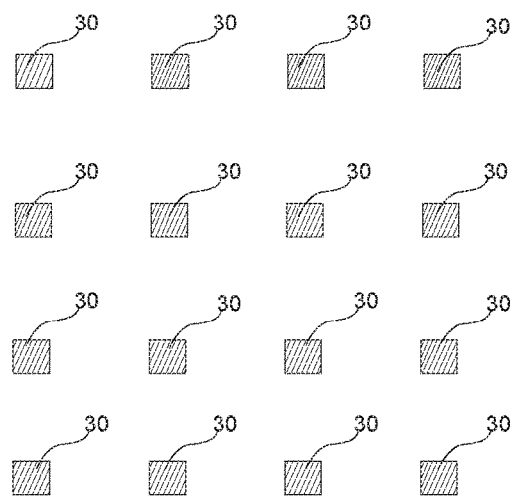
FIG. 89 B
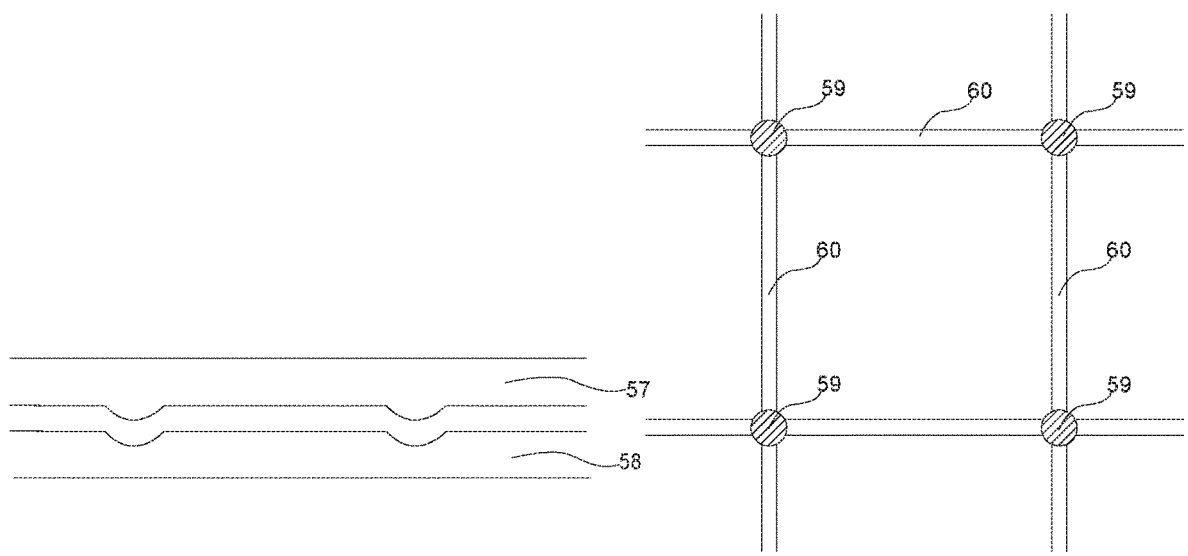
FIG. 90 A
FIG. 90 B

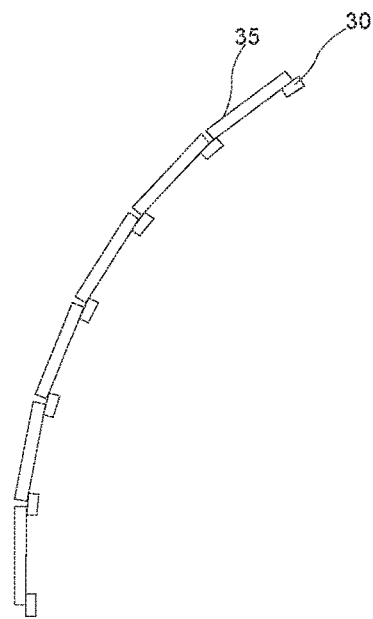
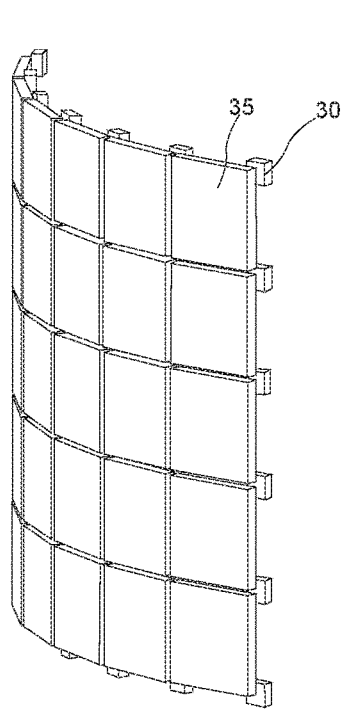
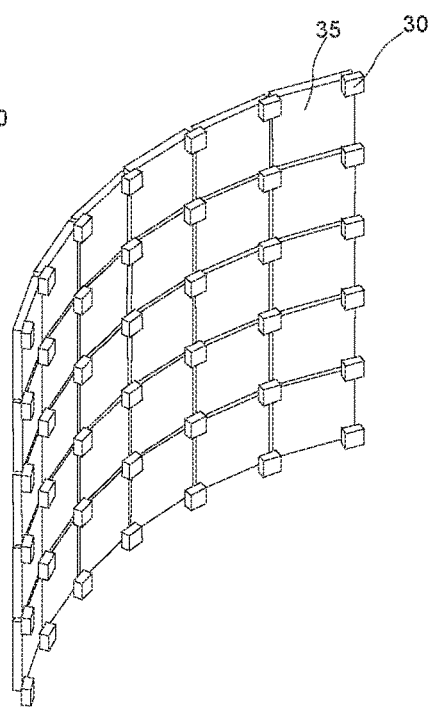
FIG. 109  FIG. 110  FIG. 111
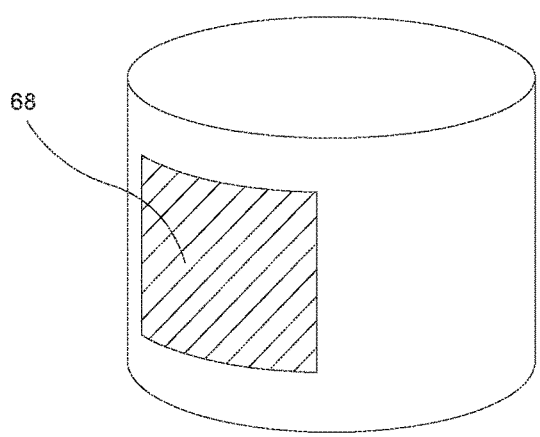
FIG. 112

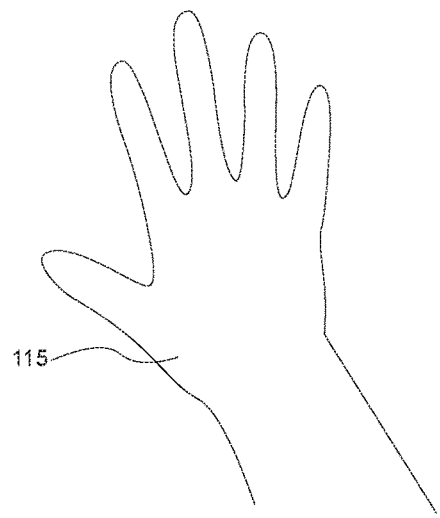
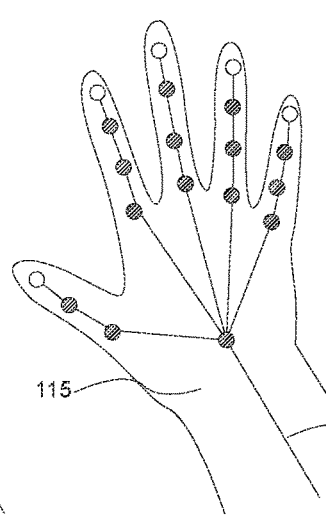
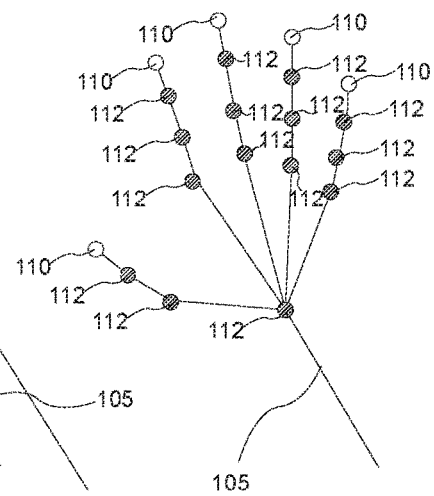
FIG. 130A  FIG. 130B  FIG. 130C
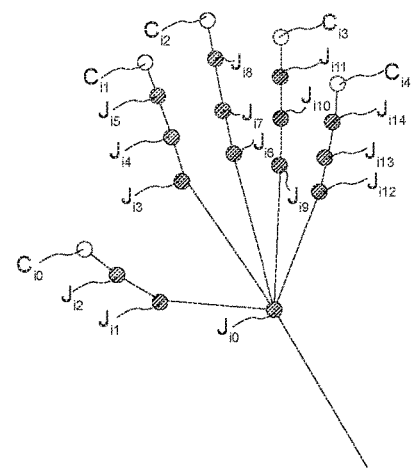
FIG. 130D
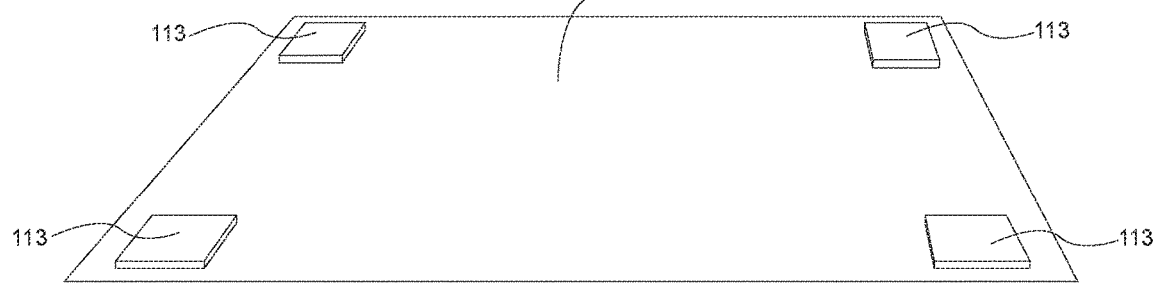
FIG. 131

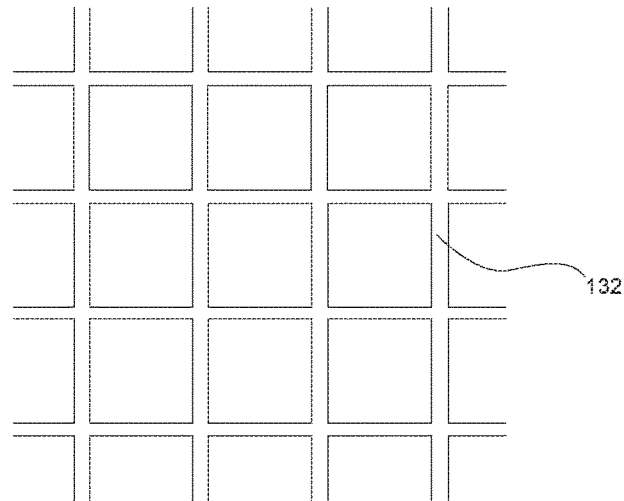
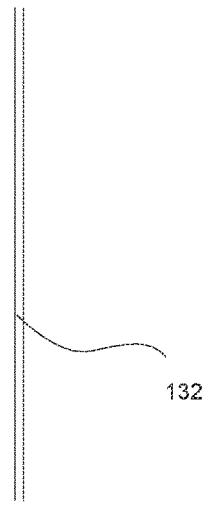
FIG. 142 A                     FIG. 142 B
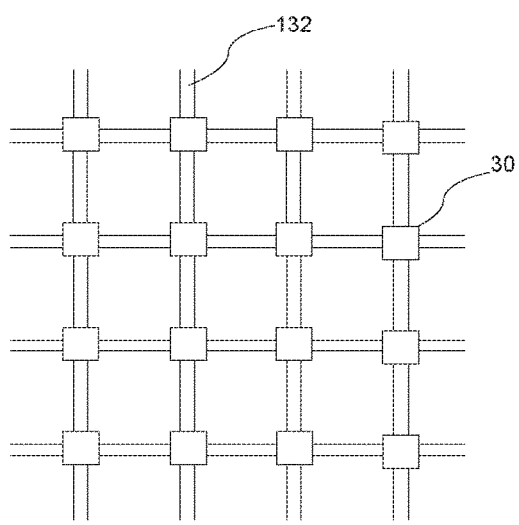
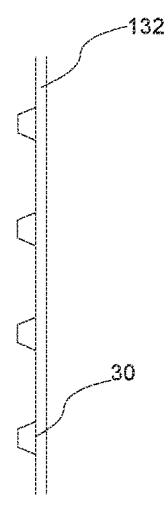
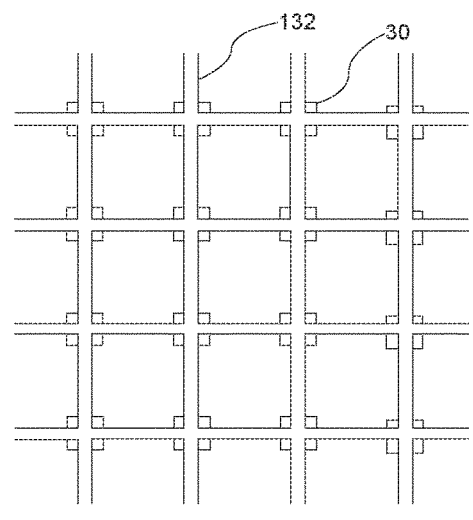
FIG. 143 A        FIG. 143 B        FIG. 143 C

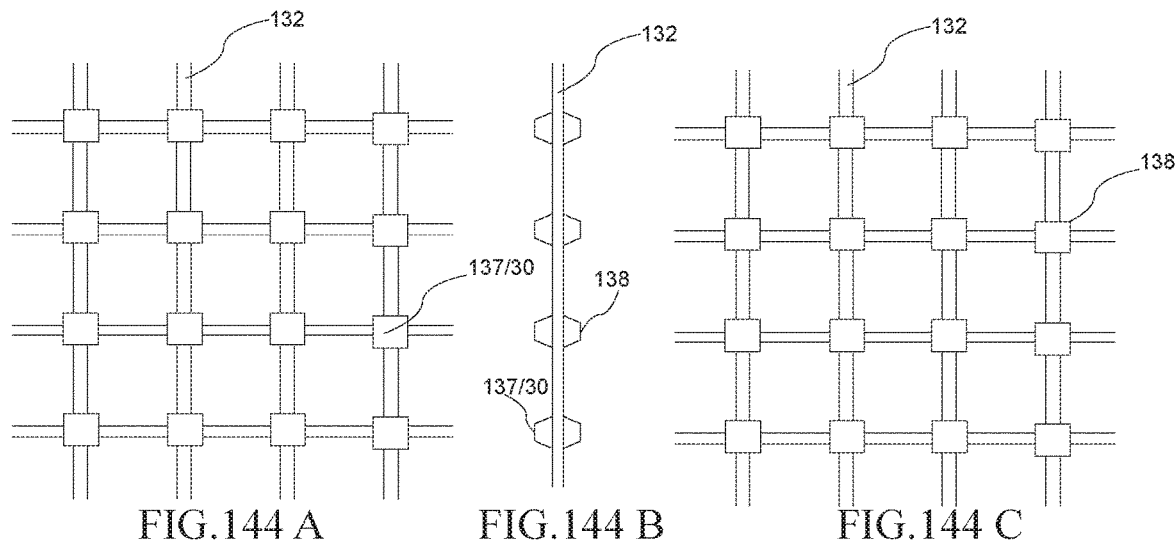
FIG.144 A   FIG.144 B   FIG.144 C
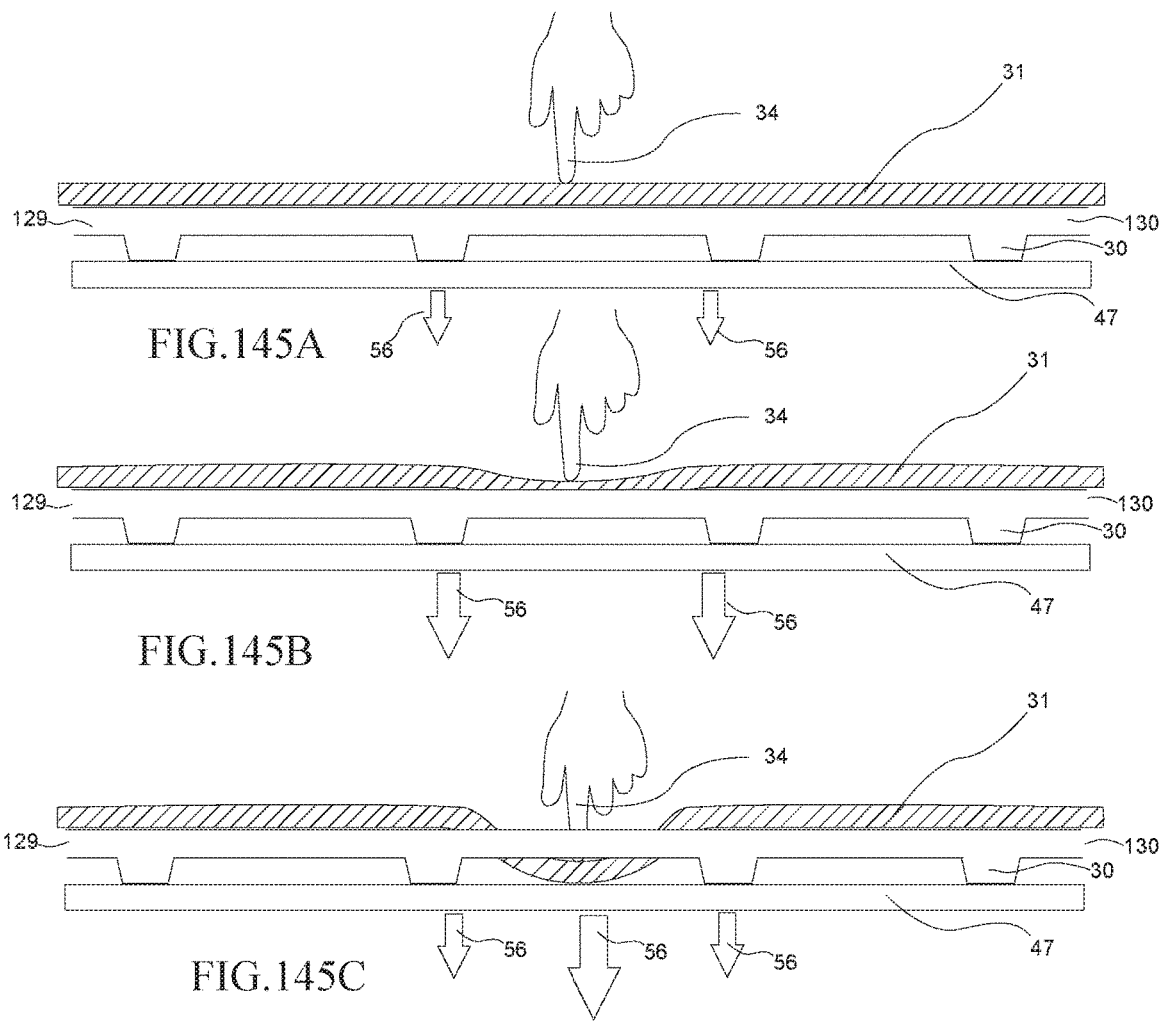
FIG.145A
FIG.145B
FIG.145C

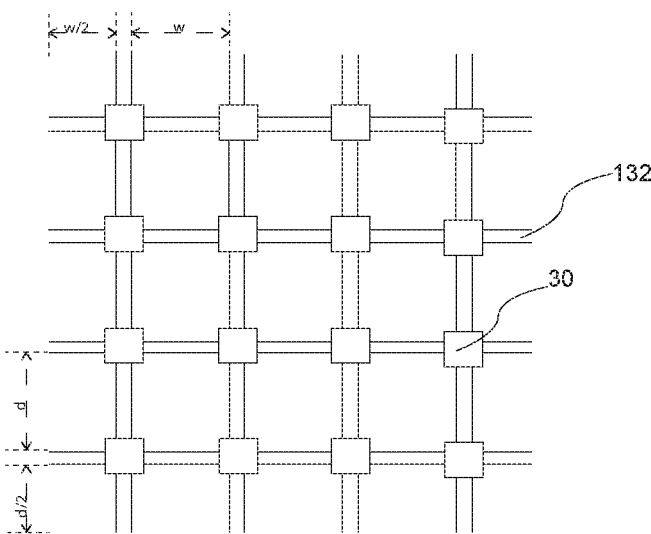
FIG. 154
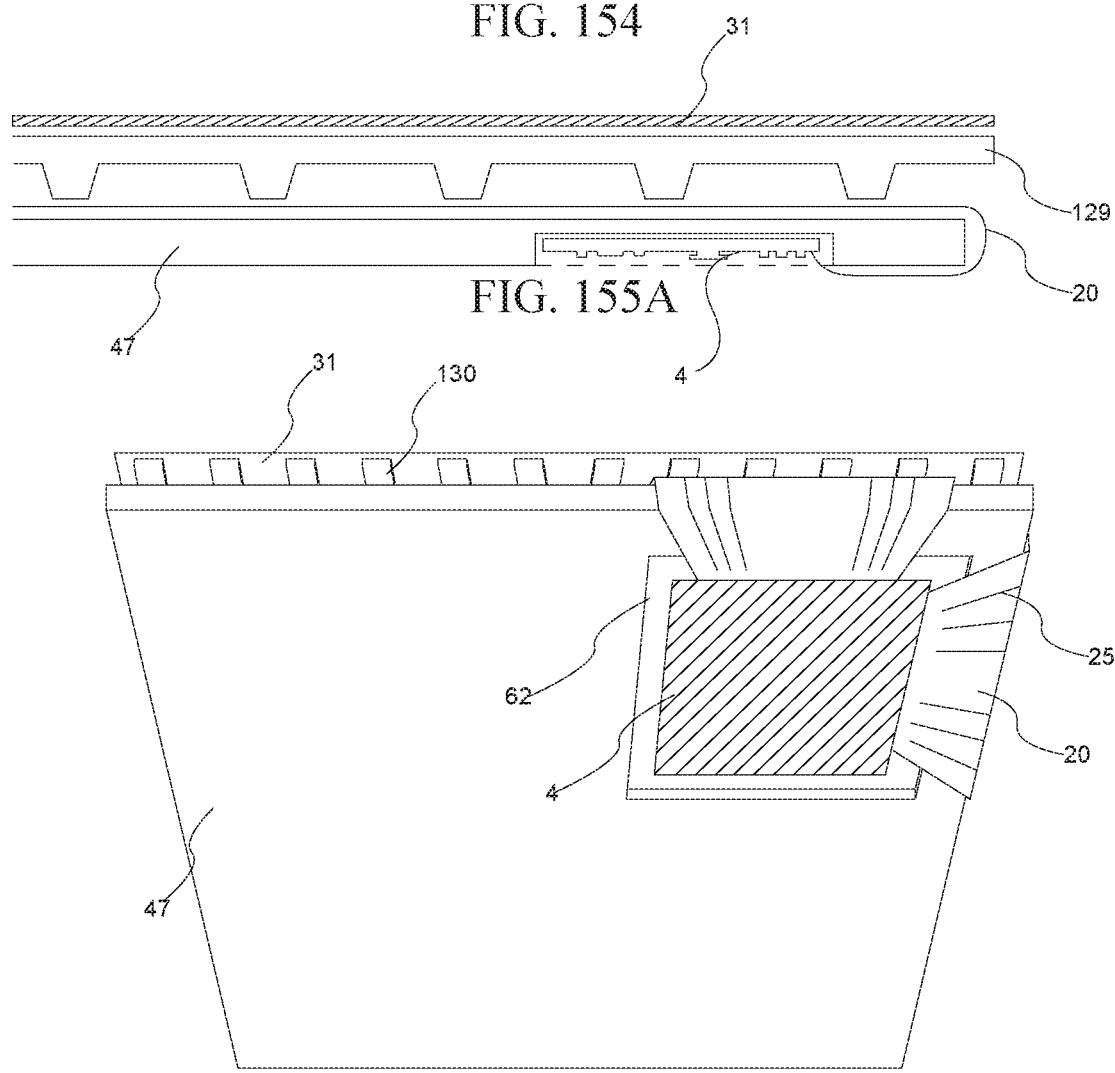
FIG. 155A
FIG. 155B

SENSOR HAVING A MESH LAYER WITH PROTRUSIONS, AND METHOD

CROSS-REFERENCE TO RELATED APPLICATIONS

This application is a continuation of U.S. patent application Ser. No. 13/847,236 filed Mar. 19, 2013, now U.S. Pat. No. 9,524,020, which claims priority from U.S. provisional application Ser. No. 61/686,472 filed Apr. 5, 2012, and is a continuation-in-part of U.S. patent application Ser. No. 13/317,138 filed Oct. 11, 2011; which claims priority from U.S. provisional patent application 61/404,897 filed Oct. 12, 2010; and from U.S. provisional patent application 61/462,789 filed Feb. 8, 2011; and from U.S. provisional patent application 61/572,642 filed Jul. 19, 2011; and from U.S. provisional patent application 61/572,938 filed Jul. 25, 2011, all of which are incorporated by reference herein.

FIELD OF THE INVENTION

The present invention is related to a sensor which reconstructs a continuous position of force on a surface from interpolation based on data signals received from a grid of wires. (As used herein, references to the "present invention" or "invention" relate to exemplary embodiments and not necessarily to every embodiment encompassed by the appended claims.) More specifically, the present invention is related to a sensor which reconstructs a continuous position of force on a surface from interpolation based on data signals received from a grid of wires where the sensor includes a plurality of plates and a set of protrusions.

The present invention relates to receiving at a computer 2d and 3d output from a 2d sensor and a 3d sensor and producing with the computer a combined output that is a function of the 2d and 3d output. More specifically, the present invention relates to receiving at a computer 2d and 3d output from a 2d sensor and a 3d sensor and producing with the computer a combined output that is a function of the 2d and 3d output, where the 2d sensor senses imposed force on its surface and the 3d sensor is a camera.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

In prior art, Rosenberg et al teach how to capture a time-varying two dimensional array of pressure upon a surface in a way that properly interpolates sensed pressure at points between individual sensing elements. This is an improvement over pervious methods, such as that of TekScan, which do not interpolate between sensing elements, and therefore must use a very finely spaced two dimensional sensing element array to approximate capture of the continuous pressure image.

Moreover, Gesture sensing abased only on range imaging cameras can be very powerful, since it can track entire hand or foot movements, maintain consistent identify over time of each hand of each user, and in some cases provide unambiguous finger and toe identity (depending on distance of camera to surface and hand or foot position). This stands in marked contrast to purely surface-based Touch Devices, such as those based on variable resistance or capacitance, which provide little or no information about finger and hand position or toe and foot position in the space above the surface. Yet range imaging camera suffers from several deficiencies:

(1) Frame rate (30 fps for the Kinect) is too slow to properly sample the movement of a finger pressing down and releasing a key. By way of comparison, the standard sampling rate for USB keyboards is 125 Hz (more than four times video rate). This higher sampling rate is needed for unambiguous detection and disambiguation of multiple overlapping typed keystrokes.

(2) It is impossible to determine from a range image alone how much pressure is being applied to a surface, thereby rendering range imaging cameras inadequate for subtle movement of virtual objects on a display, rapid and accurate control of 3D computer game characters, musical instrument emulation, simulated surgery, simulated painting/sculpting, gait monitoring, dance, monitoring stance for purposes of physical therapy, and other applications that benefit from a significant measure of isometric control.

It is therefore also impossible to determine from a 3D image gestures based on movements and variations in pressure on the underside of fingers or hands or feet or toes. For example, if a user shifts weight between different fingers, or between fingers and different parts of the palm, or between the foot heel, metatarsal or toes, these changes will be undetectable to a range imaging camera.

The decade of 2001-2011 has seen the gradual development of LCD displays that contain an optically sensitive element in each pixel (variously developed by Sharp, Toshiba and Matsushita). This approach enables the sensing of both touch and hovering. However, the optically sensitive pixel approach suffers from a number of deficiencies as compared to the present touch-range fusion apparatus approach: (1) The cost per unit area is intrinsically far higher than the cost per unit area of the approach here; (2) Such sensors cannot be seamlessly tiled to arbitrarily large form factors; (3) variations in the pressure of a detected touch 111 can be determined only with very low fidelity (via changes in fingertip contact shape); (4) hand shape can only be detected within a relatively small distance above the display. This makes it impossible to maintain a persistent model of hand and finger identify or to recognize many hand gestures. In addition, it is not practical to use such technologies for foot sensing, since the added cost to manufacture such sensors so that they possess sufficient physical robustness to withstand the weight of a human body would add prohibitively to their cost.

BRIEF SUMMARY OF THE INVENTION

One key innovation of the current invention is that, unlike Rosenberg et al., this method is able to capture a time-varying two dimensional array of pressure upon a surface of arbitrarily large size. Therefore, unlike the method of Rosenberg et al., the current invention can be used for seamless time-varying pressure capture over entire extended surfaces, such as walls, floors, tables, desks or roadways.

The key innovative techniques of the current invention which enable this capability are (1) the organization of the sensing element array into physically distinct tiles, and (2) a method of interpolation between sensing elements that can operate across tile boundaries.

Also, because the current invention is based on a strategy of seamless tiling, it is able to make use of an optimization whereby the resolution of the sub-array formed by each physical tile is chosen so as to make optimal use of a microcontroller that controls the data capture from that tile. This permits a uniquely economical implementation to be effected, whereby control of a tile requires only a single commercially available microcontroller, without requiring the use of any additional transistors or other switchable electronic components.

In addition, a Touch-Range fusion apparatus and software abstraction layer are described that reliably combine the Pressure Imaging Apparatus or other Touch Device data with the data from one or more range imaging cameras in order to create a high quality representation of hand and finger action for one or more users, as well as foot and toe action of one or more users, as well as identify and track pens and other objects on or above a Touch Device. It is believed there is currently no technology available at the commodity level that provide high quality input, over a large-scale surface, of finger-identification, pressure, and hand gesture or foot gesture, with simultaneous support of identifiable multiple users. This invention will lead to products that will fill that gap.

The present invention pertains to an apparatus for sensing. The apparatus comprises a computer. The apparatus comprises two or more individual sensing tiles in communication with the computer that form a sensor surface that detects force applied to the surface and provides a signal corresponding to the force to the computer which produces from the signal a time varying continuous image of force applied to the surface, where the surface is contiguous, detected force can be sensed in a manner that is geometrically continuous and seamless on a surface.

The present invention pertains to a sensor. The sensor comprises a grid of wires that define intersections and areas of space between the wires. The sensor comprises a set of protrusions that are in contact with a plurality of intersections of the grid of wires, and a mechanical layer that is disposed atop the set of protrusions, so that force imparted to the top of that mechanical layer is transmitted through the protrusions, and thence to the protrusions. The sensor comprises a computer in communication with the grid which causes prompting signals to be sent to the grid and reconstructs a continuous position of force on the surface from interpolation based on data signals received from the grid.

The present invention pertains to a sensor. The sensor comprises a computer having N dual analog/digital I/O pins and M digital I/O pins for data, where M and N are positive integers greater than three. The sensor comprises a pressure sensing array having N rows and M columns, with the N I/O pins in communication with the N rows and up to M columns in communication with the M I/O pins without using any transistors or other switchable electronic components outside of the computer.

The present invention pertains to a method for determining locations of tiles of a sensor. The method comprises the steps of sending a query signal from a computer to at least a plurality of the tiles in communication with the computer asking each of the plurality of tiles to identify at least one adjacent tile with which the tile is in electrical communication. There is the step of receiving by the computer responses to the query from the plurality of tile. There is the step of forming with the computer from the responses a geometric map of the tiles' locations relative to each other.

The present invention pertains to a method for sensing. The method comprises the steps of detecting a force applied to a sensor surface formed of two or more individual sensing tiles from an object moving across the surface where the surface is contiguous, detected force can be sensed in a manner that is geometrically continuous and seamless on a surface. There is the step of providing a signal corresponding to the force to a computer from the tiles in communication with the computer. There is the step of producing with the computer from the signal a time varying continuous image of force applied to the surface.

The present invention pertains to a method for sensing. The method comprises the steps of imparting a force to a top of a mechanical layer that is transmitted through to intersections defined by a grid of wires having areas of space between the wires. There is the step of causing prompting signals with a computer in communication with the grid to be sent to the grid. There is the step of reconstructing with the computer a continuous position of the force on the surface from interpolation based on data signals received from the grid.

The computer pertains to a sensor. The sensor comprises a grid of wires that define intersections and areas of space between the wires. The sensor comprises a set of protrusions that engage with a plurality of intersections of the grid of wires, and an outer surface layer having an inner face that is in juxtaposition with the set of protrusions and an outer face, so that force imparted to the outer face of the outer surface layer is transmitted through the inner face of the outer surface layer to the protrusions and the plurality of intersections. The sensor comprises a computer in communication with the grid which causes prompting signals to be sent to the grid and reconstructs an antialiased image of force upon the outer face of the outer surface layer from interpolation based on data signals received from the grid.

The present invention pertains to a method for sensing. The method comprises the steps of imparting a force to an outer face of an outer surface layer that is transmitted through an inner face of the outer surface layer to a set of protrusions and a plurality of intersections defined by a grid of wires having areas of space between the wires. There is the step of causing prompting signals with a computer in communication with the grid to be sent to the grid. There is the step of reconstructing with the computer an antialiased image of the force on the outer face of the outer surface from interpolation based on data signals received from the grid.

The present invention pertains to a sensor. The sensor comprises a grid of wires that define intersections and areas of space between the wires. The sensor comprises a set of protrusions that are in contact with a plurality of intersections of the grid of wires, and an outer surface layer having an inner face that is disposed in contact with the grid of wires and an outer face, so that force imparted onto the outer face of the outer surface layer is transmitted through the inner face of the outer surface layer to the protrusions, and thence to the intersections of the grid wires which are thereby compressed between the outer surface layer and protrusions; and that the protrusions thereby focus the imparted force directly onto the intersections. The sensor comprises a computer in communication with the grid which causes prompting signals to be sent to the grid and reconstructs an antialiased image of force upon the outer face of outer surface layer from interpolation based on data signals received from the grid.

The present invention pertains to a sensor. The sensor comprises a grid of wires that define intersections and areas of space between the wires. The sensor comprises a set of protrusions that are in contact with a plurality of intersections of the grid of wires, and a mechanical layer having a plurality of plates that is disposed atop the grid of wires, so that force imparted to the top of the mechanical layer is transmitted through the intersections, and thence to the grid of wires. The sensor comprises a computer in communication with the grid which causes prompting signals to be sent to the grid and reconstructs a continuous position of force on the surface from interpolation based on data signals received from the grid.

The present invention pertains to a sensor. The sensor comprises a grid of wires that define intersections and areas of space between the wires. The sensor comprises a set of protrusions that are in contact with a plurality of intersections of the grid of wires. The sensor comprises a plate layer having a plurality of plates that is disposed atop the grid of wires. The sensor comprises a flexible touch layer disposed on the plate layer, wherein force imparted to the touch layer is transmitted through the plate layer and at least one protrusion to the intersections. The sensor comprises a computer in communication with the grid which causes prompting signals to be sent to the grid and reconstructs a continuous position of force on the surface from interpolation based on data signals received from the grid.

The present invention pertains to a sensor. The sensor comprises a grid of wires that define intersections and areas of space between the wires. The sensor comprises a set of protrusions that are in contact with a plurality of intersections of the grid of wires. The sensor comprises a plate layer having a plurality of plates that is disposed atop the grid of wires. The sensor comprises a flexible touch layer disposed on the plate layer, wherein force imparted to the touch layer is transmitted through the plate layer to the intersections layer, and thence to the protrusions. The sensor comprises a computer in communication with the grid which causes prompting signals to be sent to the grid and reconstructs a continuous position of force on the surface from interpolation based on data signals received from the grid.

The present invention pertains to a sensor. The sensor comprises a set of plates that are in contact from the bottom at their corners with a set of protrusions that are in contact from above with a plurality of intersections, each having a sensing element, of the grid of wires, and a thin top surface layer that is disposed atop the grid of plates, so that force imparted from above onto the top surface layer is transmitted to the plates and thence to the protrusions, and thence to the intersections of the grid wires which are thereby compressed between the base and protrusions; and that the protrusions above thereby focus the imparted force directly onto the sensor intersections. The sensor comprises a computer in communication with the sensor grid which causes prompting signals to be sent to the grid and reconstructs a continuous position of force on the surface from interpolation based on data signals received from the grid.

The present invention pertains to a method for sensing. The method comprises the steps of imparting force from above onto a top surface layer that is transmitted to a set of plates and thence to a set of protrusions, and thence to a plurality intersections of a grid of wires which are thereby compressed between the base and protrusions, where the set of plates are in contact from their bottom at their corners with the set of protrusions that are in contact from above with the plurality of intersections of the grid of wires disposed on the base; and that the protrusions above thereby focus the imparted force directly onto the intersections. There is the step of causing prompting signals by a computer in communication with the grid to be sent to the grid. There is the step of reconstructing with the computer a continuous position of force on the surface from interpolation based on data signals received from the grid.

The present invention pertains to a sensor. The sensor comprises a set of protrusions that are in contact from the bottom with a plurality of intersection of the grid of wires, and a set of plates that are in contact from the top with a plurality of intersections of the grid of wires, and a thin top surface layer that is disposed atop the set of plates, so that force imparted from above onto the top surface layer is transmitted to the plates, and thence to the intersections of the grid wires, and thence the protrusions, which are thereby compressed between the plates and protrusions; and that the protrusions underneath thereby focus the imparted force directly onto the sensor intersections. The sensor comprises a computer in communication with the sensor grid which causes prompting signals to be sent to the grid and reconstructs a continuous position of force on the surface form interpolation based on data signals received from the grid.

The present invention pertains to an apparatus for inputting information into a computer. The apparatus comprises a 3d sensor that senses 3d information and produces a 3d output. The apparatus comprises a 2d sensor that senses 2d information and produces a 2d output. The apparatus comprises a processing unit which receives the 2d and 3d output and produces a combined output that is a function of the 2d and 3d output.

The present invention pertains to a method for inputting information into a computer. The method comprises the steps of producing a 3d output with a 3d sensor that senses 3d information. There is the step of producing a 2d output with a 2d sensor that senses 2d information. There is the step of receiving the 2d and 3d output at a processing unit. There is the step of producing a combined output with the processing unit that is a function of the 2d and 3d output.

The present invention pertains to a sensor. The sensor comprises a grid of bars that are contact from their bottom at bar crossings with a set of protrusions that are in contact from above with a plurality of intersections, each having a sensing element, of a grid of wires disposed on a base, and a top surface layer that is disposed atop the grid of bars, so that force imparted from above onto the top surface layer is transmitted to the grid of bars and thence to the protrusions, and thence to the intersections of the grid of wires which are thereby compressed between the base and protrusions; and that the protrusions above thereby focus the imparted force directly onto the intersections. The sensor comprises a computer in communication with the grid of wires which causes prompting signals to be sent to the grid of wires and reconstructs a continuous position of force on the surface from interpolation based on data signals received from the grid of wires.

The present invention pertains to a sensor. The sensor comprises a grid of bars that are in contact from their top at bar crossings with a set of outer protrusions and are in contact from their bottom at bar crossings with a set of inner protrusions that are in contact from above with a plurality of intersections, each having a sensing element, of a grid of wires disposed on a base, and a top surface layer that is disposed atop the outer protrusions, so that force imparted from above onto the top surface layer is transmitted to the outer protrusions and thence to the grid of bars and thence to the inner protrusions, and thence to the intersections of the grid of wires which are thereby compressed between the base and inner protrusions; and that the inner protrusions above thereby focus the imparted force directly onto the intersections. The sensor comprises a computer in communication with the grid of wires which causes prompting signals to be sent to the grid of wires and reconstructs a continuous position of force on the surface from interpolation based on data signals received from the grid of wires.

The present invention pertains to a method for sensing. The method comprises the steps of imparting force from above onto a top surface layer that is transmitted to a set of grid of bars and thence to a set of protrusions, and thence to a plurality of intersections of a grid of wires which are thereby compressed between the base and protrusions, where the set of grid of bars are in contact from their bottom at their bar crossings with the set of protrusions that are in contact from above with the plurality of intersections of the grid of wires disposed on the base; and that the protrusions above thereby focus the imparted force directly onto the intersections. There is the step of causing prompting signals by a computer in communication with the grid of wires to be went to the grid of wires. There is the step of reconstructing with the computer a continuous position of force on the surface from interpolation based on data signals received from the grid of wires.

The present invention pertains to an apparatus for sensing. The apparatus comprises a computer. The apparatus comprises one or more individual sensing tiles in communication with the computer that form a sensor surface that detects force applied to the surface and provides a signal corresponding to the force to the computer which produces from the signal a time varying continuous image of force applied to the surface, where the surface is contiguous, and detected force can be sensed in a manner that is geometrically continuous and seamless on a surface, wherein each tile includes a grid of bars that are in contact from their bottom at the bar crossings with a set of protrusions that are in contact from above with a plurality of intersections of a grid of wires disposed on a base, and a top surface that is disposed atop the set of plates, so that force imparted from above onto the top surface layer is transmitted to the plates and thence to the protrusions, and thence to the intersections of the grid of wires which are thereby compressed between the base and protrusions; and that the protrusions above thereby focus the imparted force directly onto the intersections.

BRIEF DESCRIPTION OF THE SEVERAL VIEW OF THE DRAWING

In the accompanying drawings, the preferred embodiment of the invention and preferred methods of practicing the invention are illustrated in which:

FIG. 1 shows the active sensing array.
FIG. 2 shows the alignment of two Sensor Surfaces.
FIG. 3 shows schematic of Sensor Surface.
FIG. 4 shows the layers of a Sensor Surface.
FIG. 5 shows schematic of Conductor Trace Lines.
FIG. 6 shows schematic pattern of FSR placement.
FIG. 7 shows schematic of Conductor Trace Lines Test Pattern.
FIG. 8 shows schematic pattern of FSR placement Test Pattern.
FIG. 9A shows a sensor surface with Conductor and FSR Test Patterns.
FIG. 9B shows an active sensing array with Conductor and FSR Test Patterns.
FIG. 10 shows the exploded schematic makeup of a single Sensing element.
FIG. 11 shows the active area of a sensing element.
FIG. 12 shows, at a single sensing element, the layers of elements in an embodiment where the protrusions are integrated onto the outer surface of the Active Sensing Array.
FIG. 13 shows force imparted upon touch layer in an embodiment where the protrusions are integrated onto to the outer surface of the Active Sensing Array.
FIG. 14 shows force imparted upon touch layer between two adjacent tiles in an embodiment where the protrusions are integrated onto to the outer surface of the Active Sensing Array.
FIG. 15 shows, at a single sense, the layers of elements in an embodiment where the protrusions are integrated onto the inner surface of the Semi-Rigid Touch Layer.
FIG. 16 shows a view from the body of an embodiment of the semi-rigid touch layer where the protrusions are integrated into the semi-rigid touch layer.
FIG. 17 shows layers of elements in an embodiment where the protrusions are integrated onto the inner surface of the Semi-Rigid Touch Layer at a single sensing element.
FIG. 18 shows a profile view of the redistributing of pressure between sensing elements that belong to different physical tiles and also showing the active sensing array wrapped under the tile.
FIG. 19 shows exploded view of tile and the appropriate alignment of protrusions and sensing elements for an integrated protrusion and base layer.
FIG. 20 shows layer of elements in an embodiment with an integrated protrusion and base layer.
FIG. 21 shows an embodiment where the proposed semi-rigid touch layer is unacceptably too rigid.
FIG. 22 shows an embodiment where the semi-rigid touch layer is acceptably semi-rigid.
FIG. 23 shows an embodiment where the proposed semi-rigid touch layer is unacceptably not rigid enough.
FIG. 24 shows distribution of force imparted upon a semi-rigid touch layer in an integrated protrusion and base layer embodiment.
FIG. 25 shows a region where force would be distributed to four protrusions on the same pressure tile.
FIG. 26 shows a region where force would be distributed to two protrusions on each of two adjacent pressure tiles.
FIG. 27 shows a region where force would be distributed to one protrusion on each of four adjacent pressure tiles.
FIG. 28 shows tall/narrow protrusions.
FIG. 29 shows hemispherical protrusions.
FIG. 30 shows rounded protrusions wider at the base than the height.
FIG. 31 shows rounded protrusions with base very large relative to its height.
FIG. 32 is a side view showing the active sensing array folded under the integrated Protrusion and Base Layer embodiment.
FIG. 33 shows the side view showing the active sensing array folded under the Integrated Protrusion and Base Layer embodiment.
FIG. 34 shows the bottom view showing the active sensing array folded under the Integrated Protrusion and Base Layer, having a cavity for the PCB embodiment.
FIG. 35 shows the use of the single tile sensing apparatus.
FIG. 36 shows the use of the grid of tiles sensing apparatus.
FIG. 37 shows the schematic of a data bus of a grid of tiles using I2C.
FIG. 38 shows grid of tiles and their electronic connectors.
FIG. 39 shows a multiplicity of zones of grids of tiles.
FIG. 40 shows schematic of tiles with N/S/E/W detection lines.
FIG. 41 shows exploded inter tile alignment connectors.

Figure 51:
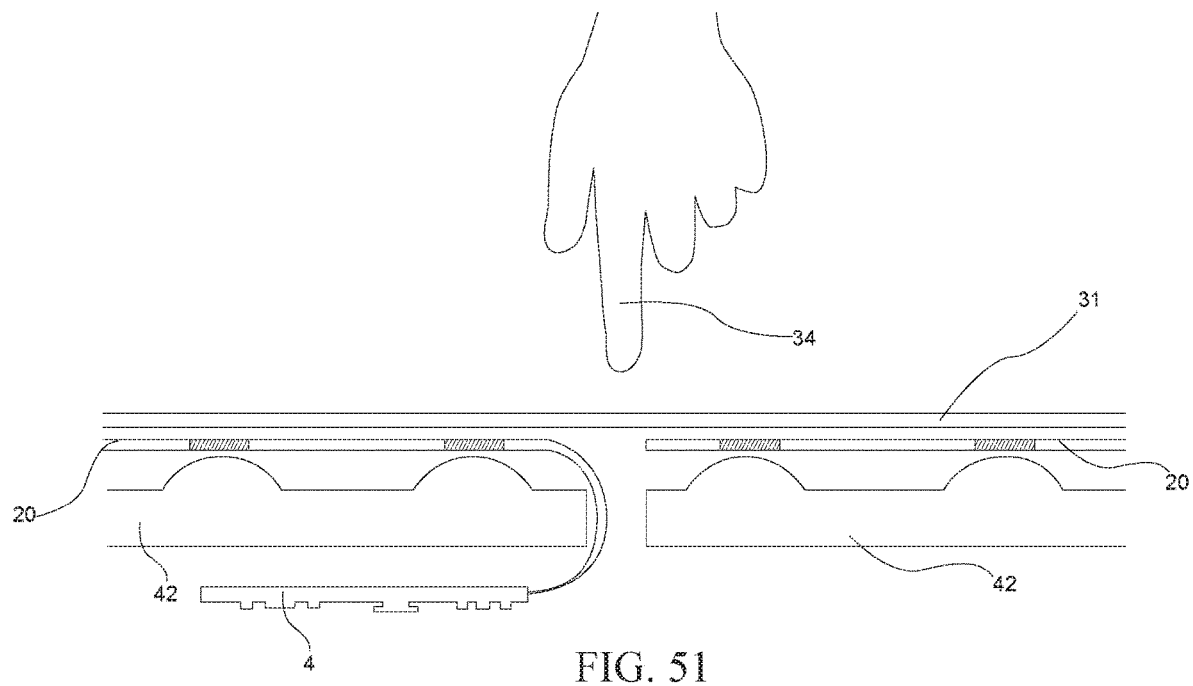

FIG. 51 showing applied force applied to sensing elements on different tiles in the integrated protrusion and base layer embodiment.

Figure 52:
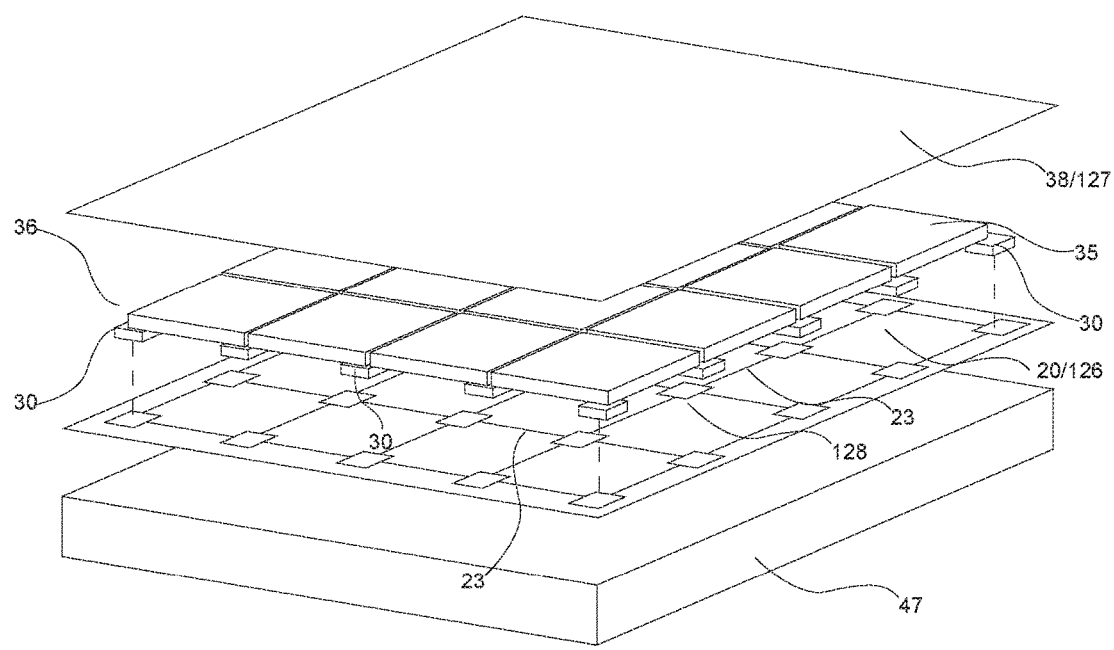

FIG. 52 shows an exploded view of a Tile for the Integrated Plate and Protrusion Matrix Component layer.

Figure 53:
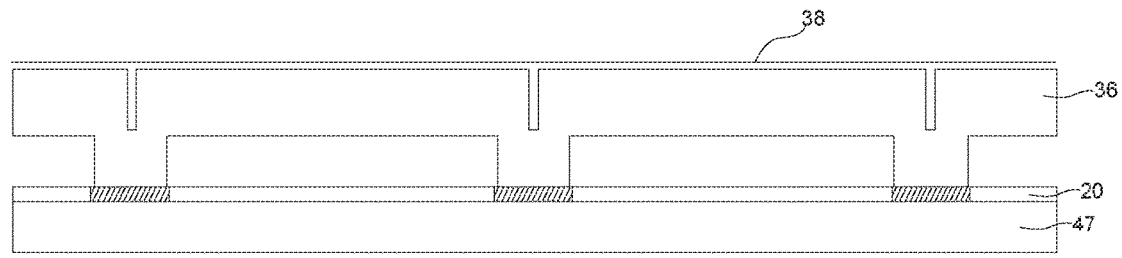

FIG. 53 shows a profile view of a Tile for the Integrated Plate and Protrusion Matrix Component layer.

Figure 54:
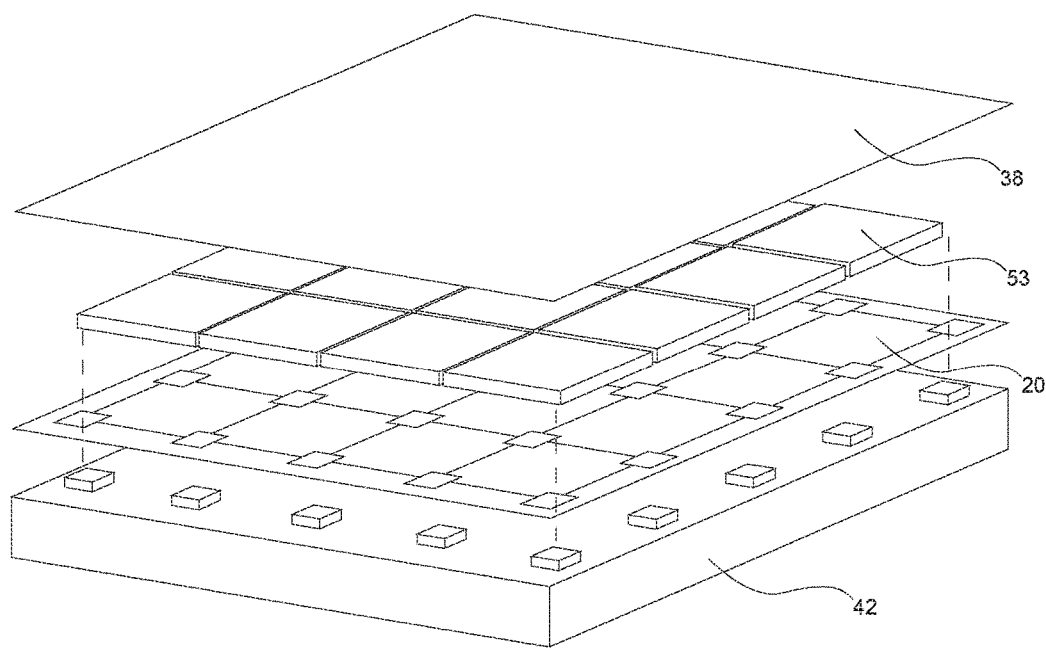

FIG. 54 shows an exploded view of a Tile for the Distinct Plate and Protrusion Matrix Components embodiment.

Figure 55:
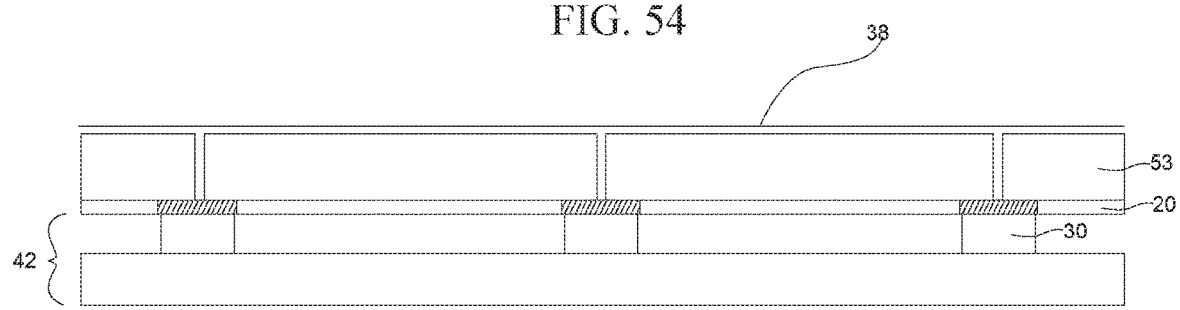

FIG. 55 shows a profile view of a Tile for the Distinct Plate and Protrusion Matrix Components embodiment.

Figure 56:
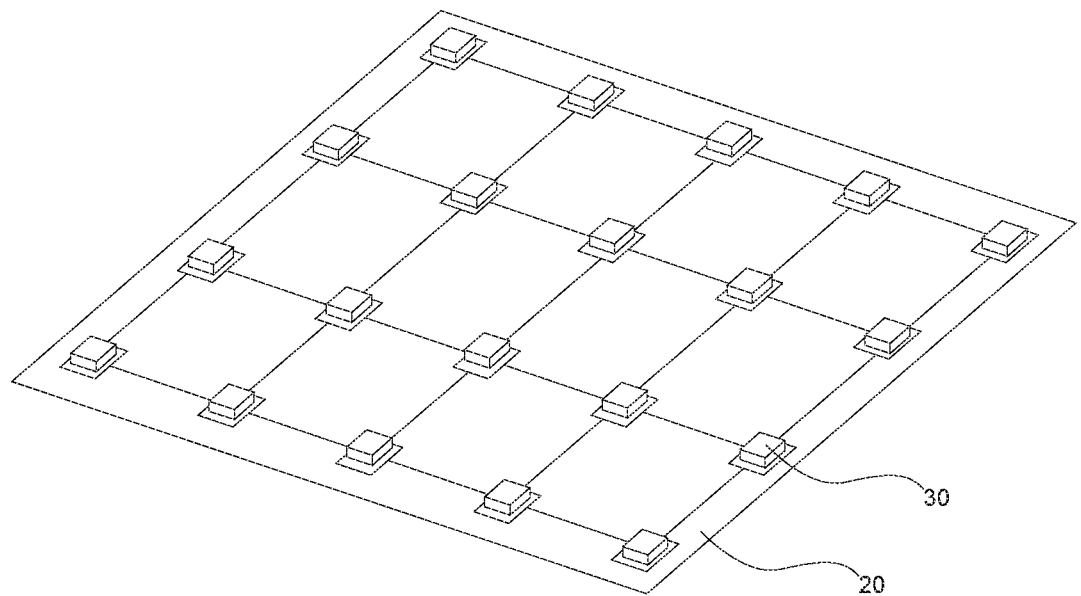

FIG. 56 shows an embodiment where the protrusions are affixed to the Active Sensing Array.

Figure 57:
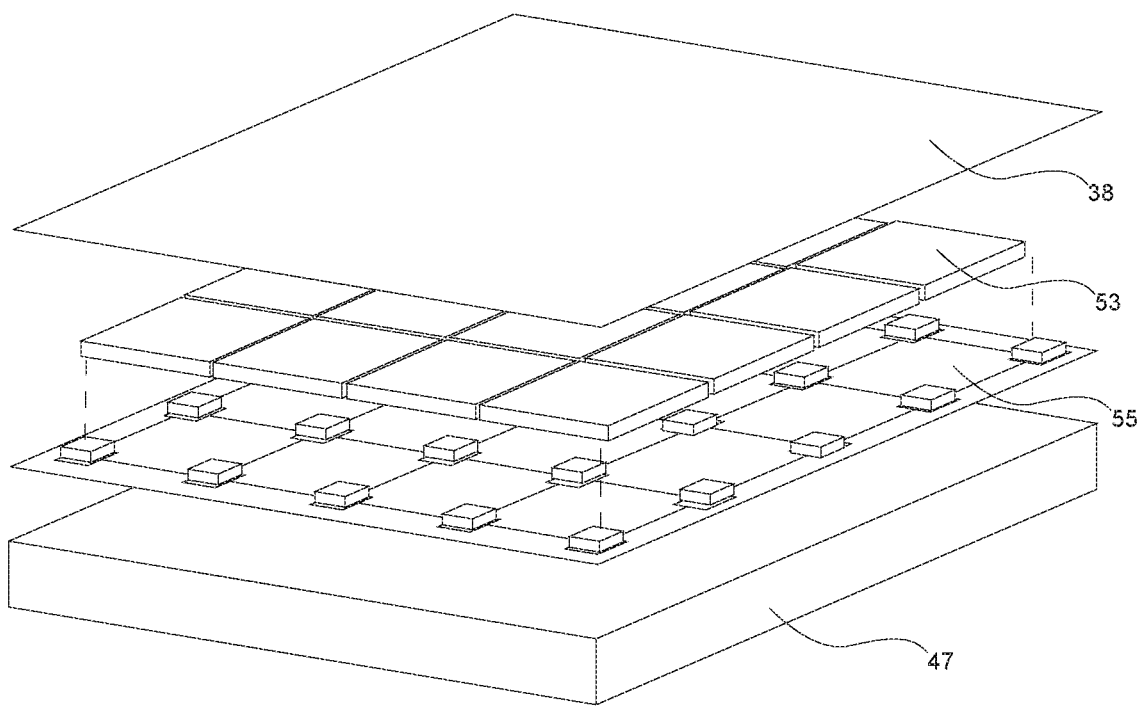

FIG. 57 shows an exploded view of embodiment where protrusions are affixed to the Active Sensing Array.

Figure 58:
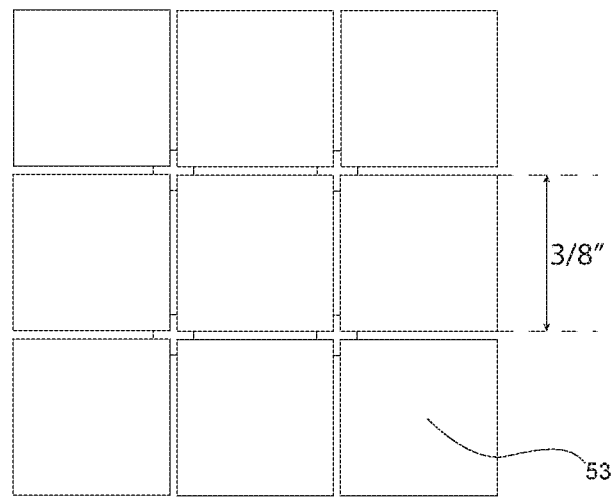
Figure 58:
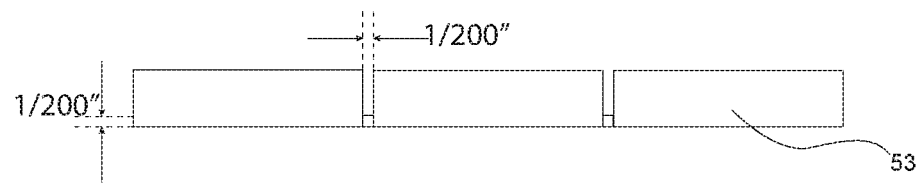

FIG. 58A shows top view of dimensions used in the prototype embodiment of the Distinct Plate matrix and Protrusion Matrix Layers Technique.

FIG. 58A shows side view of dimensions used in the prototype embodiment of the Distinct Plate matrix and Protrusion Matrix Layers Technique.

Figure 59:
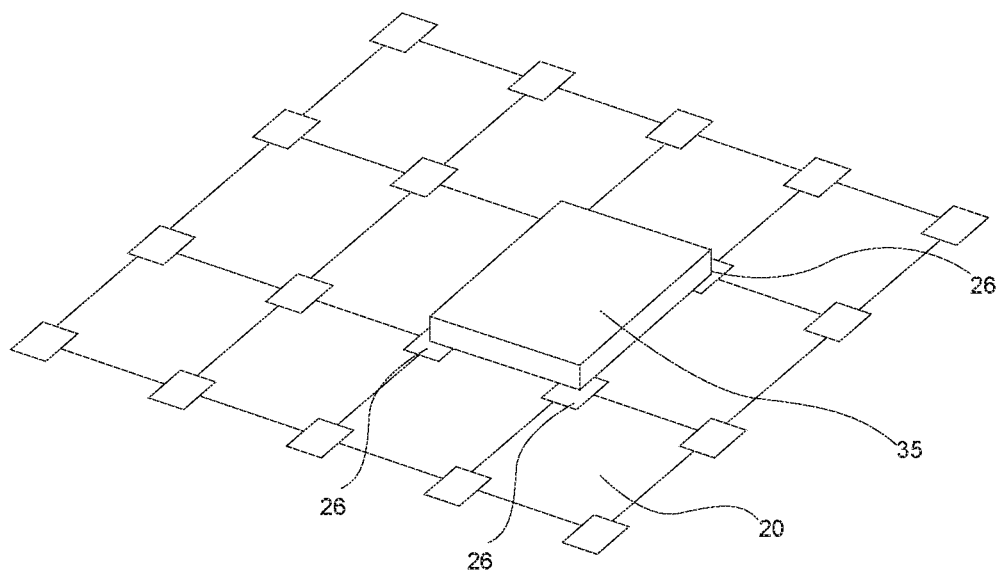

FIG. 59 shows Plate alignment over Active Sensing array.

FIG. 60 shows top view of Rigid Plate properly aligned and inside of corresponding sensing elements on the Active Sensing array.

FIG. 61A shows top view of Plate Matrix.

FIG. 61B shows side view of Plate Matrix.

FIG. 62A shows top view of Protrusion Matrix.

FIG. 62B shows side view of Protrusion Matrix.

FIG. 63 shows Plate Matrix aligned with an Active Sensing Array.

Figure 64:
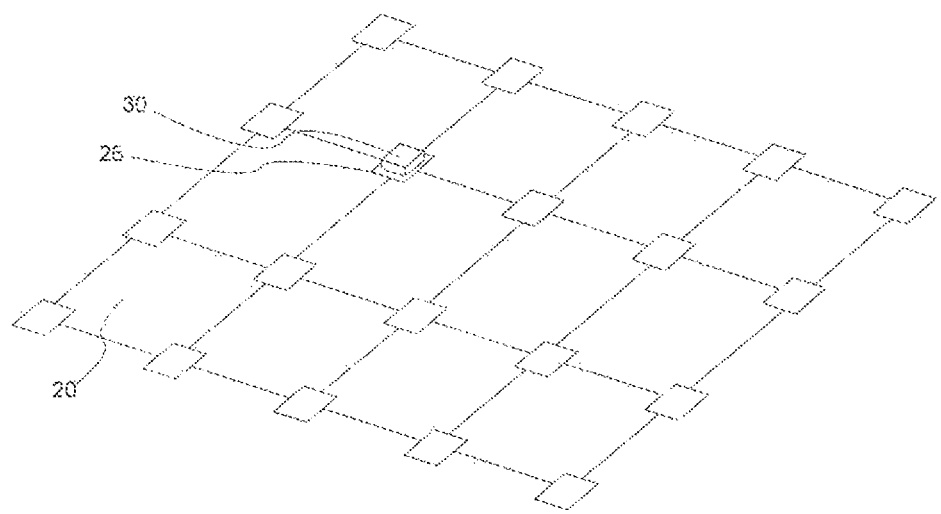

FIG. 64 shows the top view of a protrusion properly aligned upon the corresponding sensing element on the Active Sensing array.

FIGS. 65A-65F shows various valid and invalid configurations of protrusions.

Figure 66A:
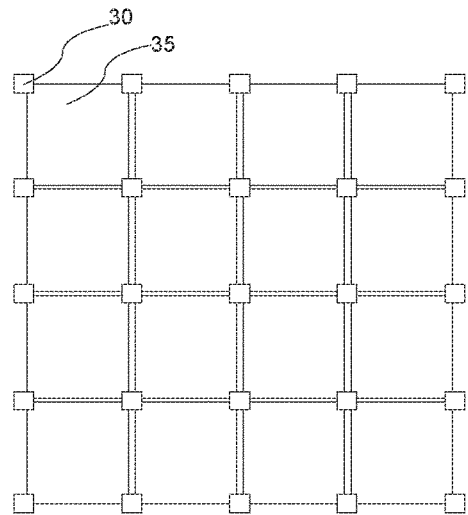
Figure 66B:
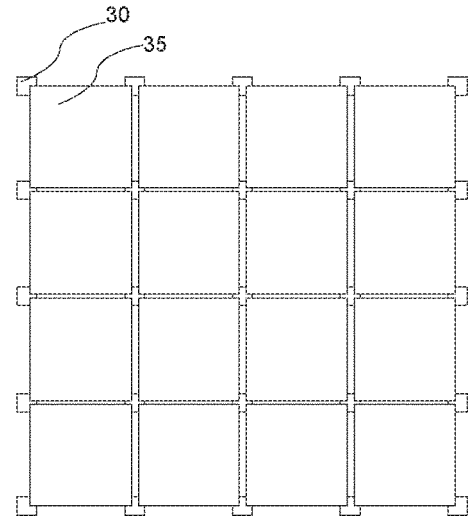
Figure 66C:
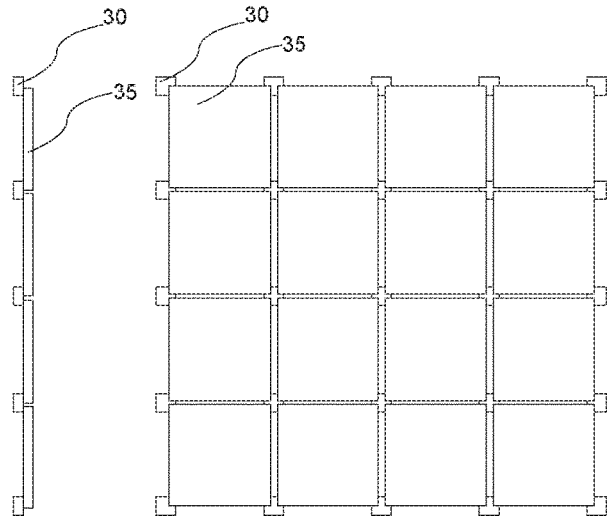

FIGS. 66A-66C shows A Bottom, B Side, and C Top Views of the superposition of a properly aligned Plate a Matrix and Protrusion Matrix.

Figure 67:
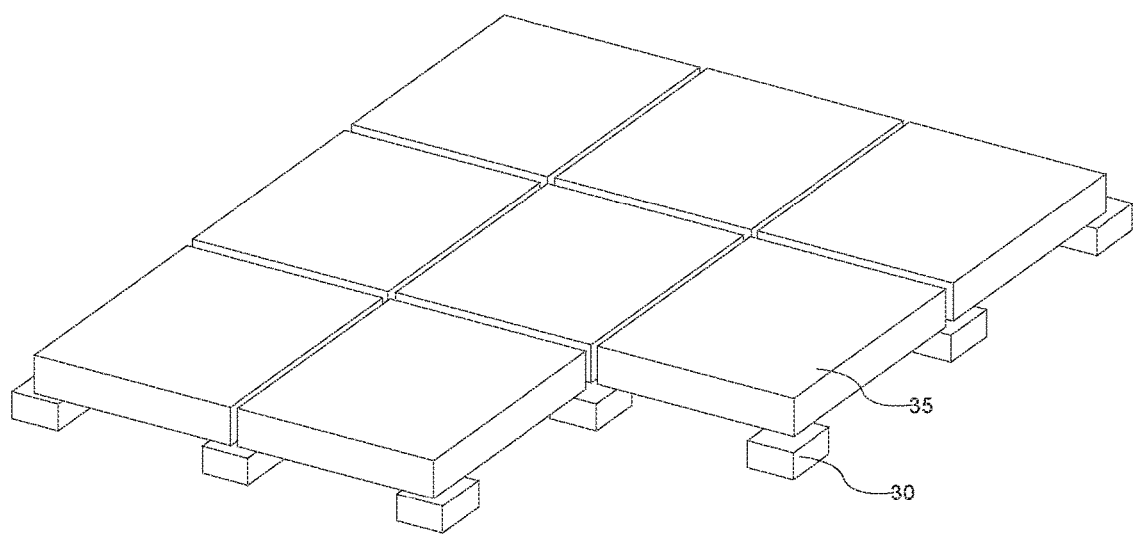

FIG. 67 shows a cut out view of the superposition of a properly aligned Plate Matrix and Protrusion Matrix.

Figure 68:
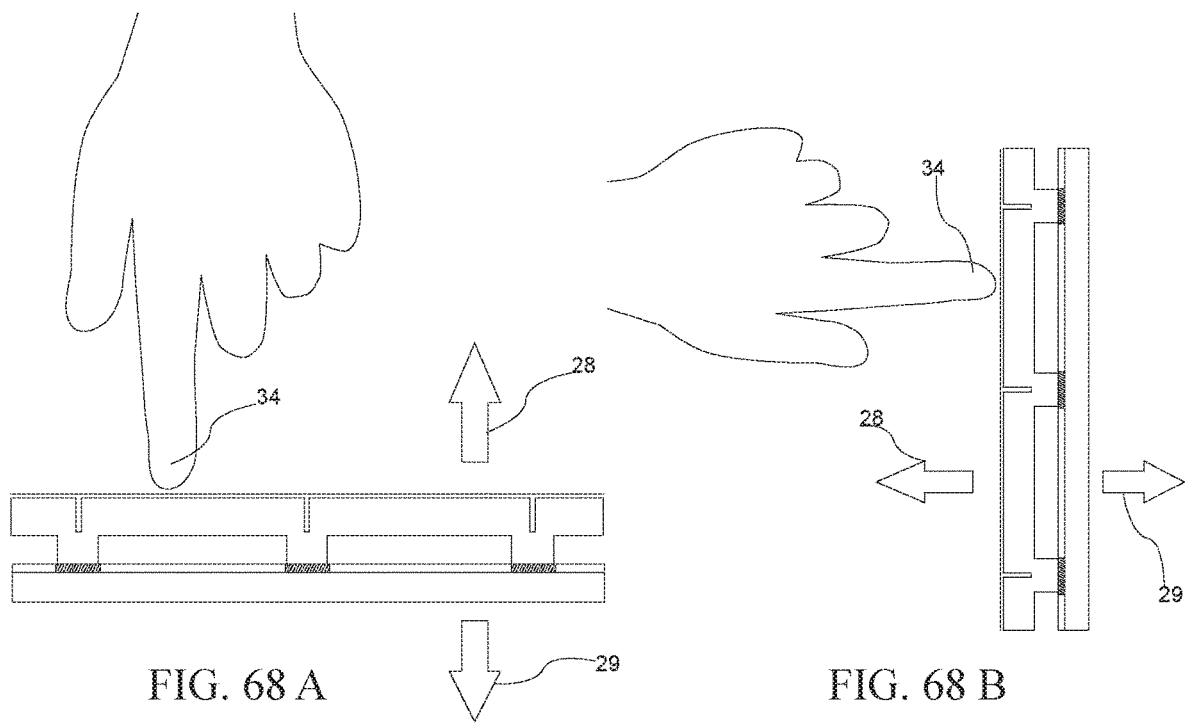

FIG. 68A shows a horizontal sensor, as on a table.

FIG. 68B shows a vertical sensor, as on a wall.

Figure 69:
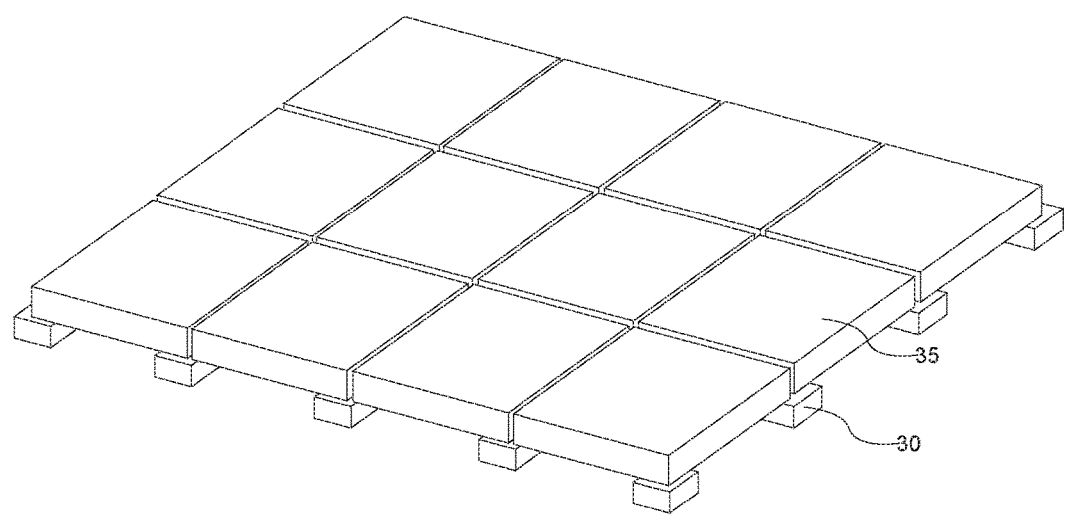

FIG. 69 shows an embodiment of an Integrated Plate and Protrusion Layer.

Figure 70:
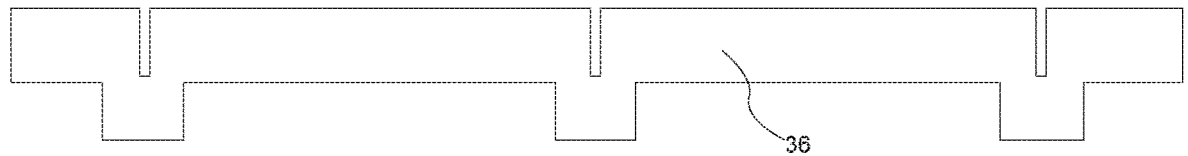

FIG. 70 shows a side view of an Integrated Plate and Protrusion Layer with slits and rectangular protrusions.

Figure 71:
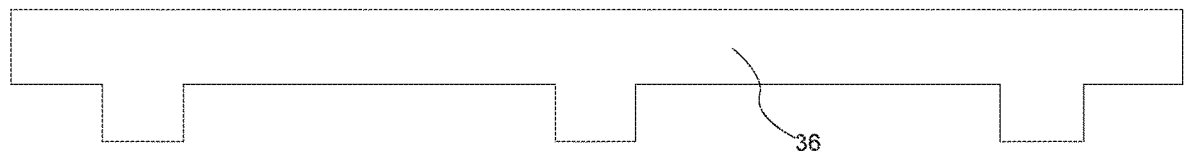

FIG. 71 shows a side view of an Integrated Plate and Protrusion Layer with slits and rectangular sensors such that the protrusions continue through the junction to be flush with the plate.

Figure 72:
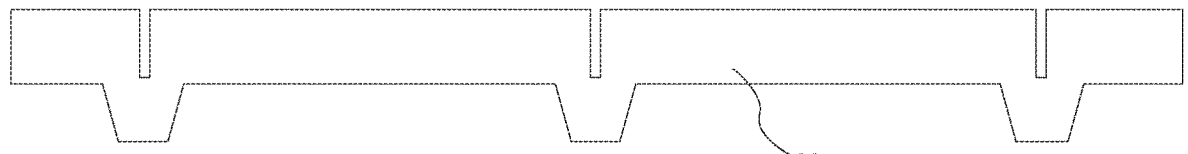

FIG. 72 shows a side view of an Integrated Plate and Protrusion Layer with slits and trapezoidal protrusions.

Figure 73:
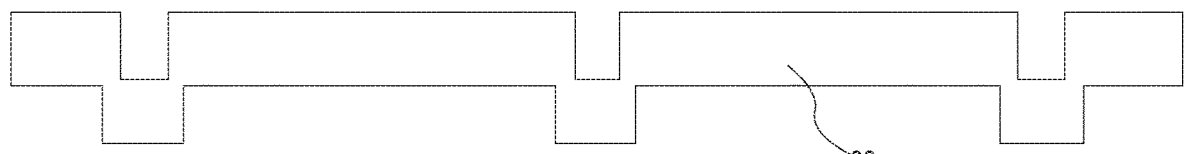

FIG. 73 shows a side view of an Integrated Plate and Protrusion Layer with wider slits and rectangular protrusions.

Figure 74:
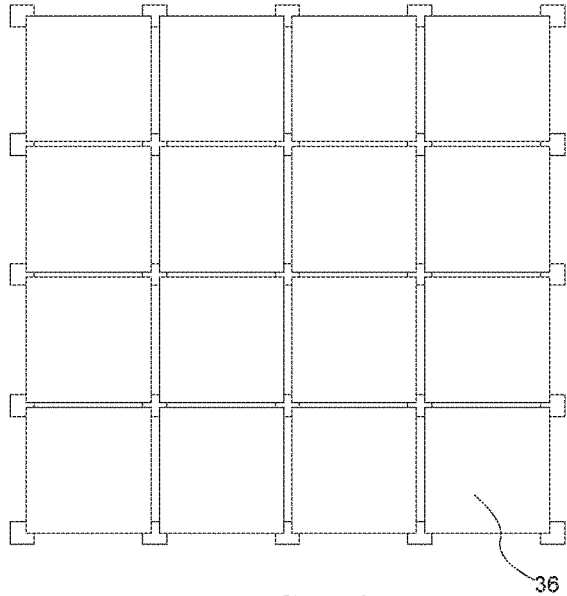

FIG. 74 shows a top view of an Integrate Plate and Protrusion Layer with slits that, at the junctions, are not flush with the outer surface of the plates.

Figure 75:
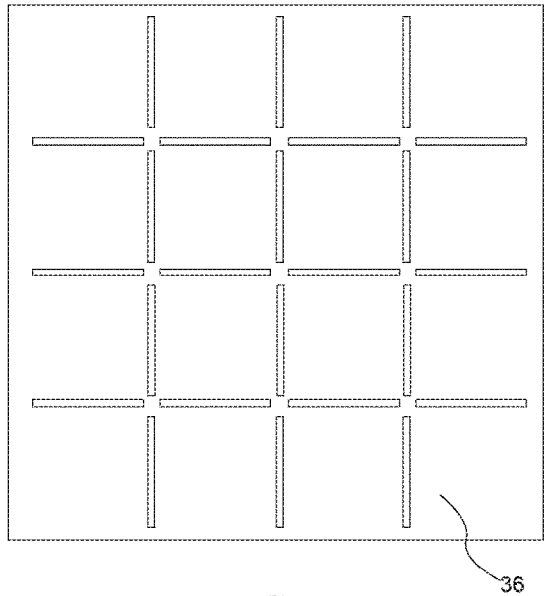

FIG. 75 shows a top view of an Integrate Plate and Protrusion Layer with slits and rectangular protrusions such that the protrusions continue through the junction to be flush with the plate.

Figure 76:
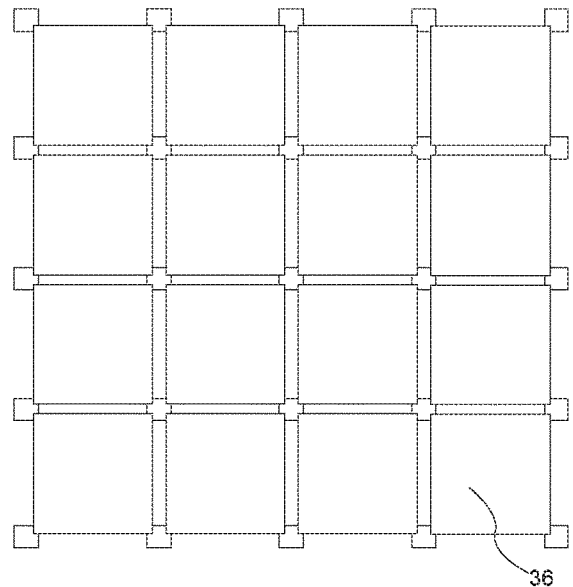

FIG. 76 shows a top view of an integrated Plate and Protrusion Layer with wider slits that, at the junctions, are not flush with the outer surface of the plates.

Figure 77:
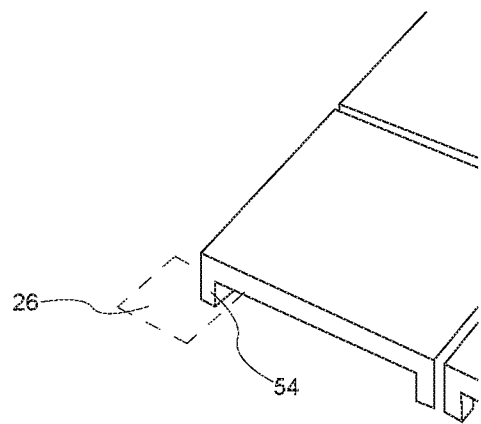
Figure 77:
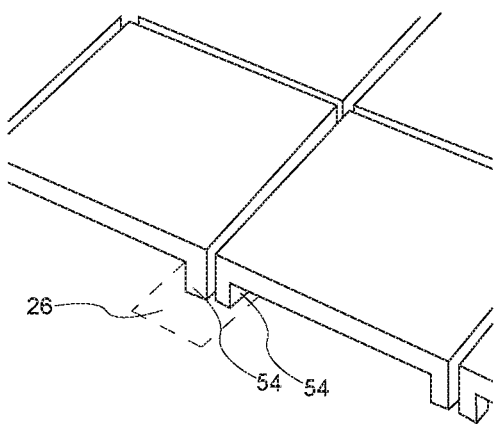
Figure 77:
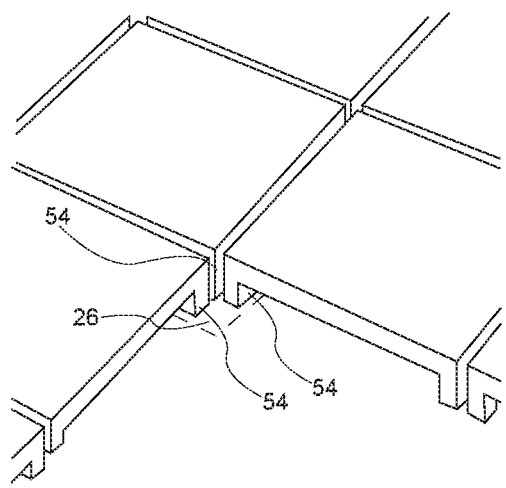

FIGS. 77A-77C shows examples of sets of corner protrusions constituting a protrusion over a sensing element.

Figure 78:
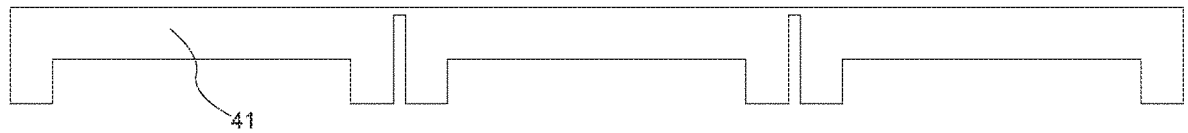

FIG. 78 shows a side view of Flat Top Integrated Plate and Protrusion Layer embodiment.

Figure 79:
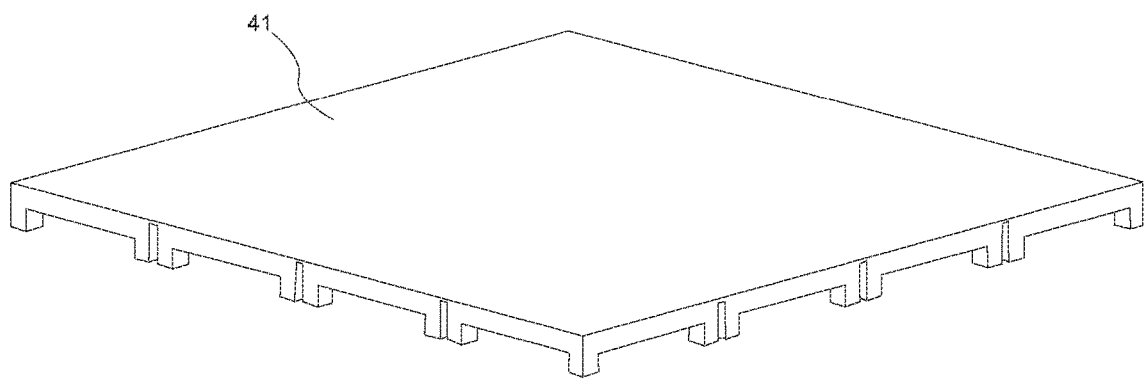

FIG. 79 shows the outer face of a Flat-Top Integrated Plate and Protrusion Layer embodiment.

Figure 80:
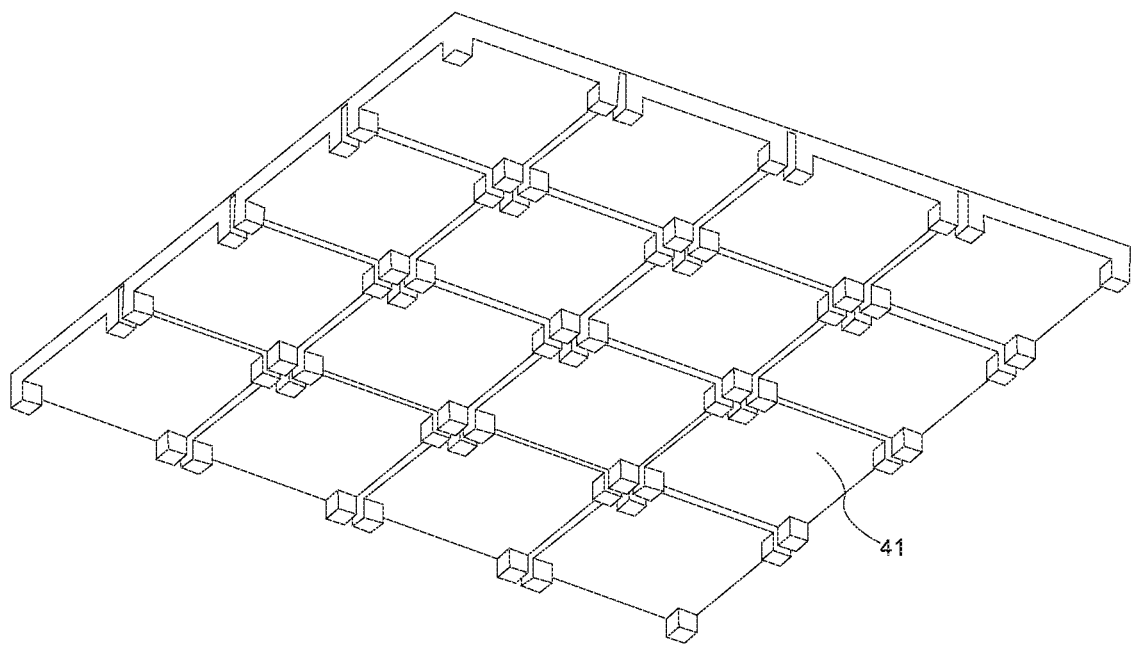

FIG. 80 shows the inner face of a Flat-Top Integrated Plate and Protrusion Layer embodiment.

Figure 81:
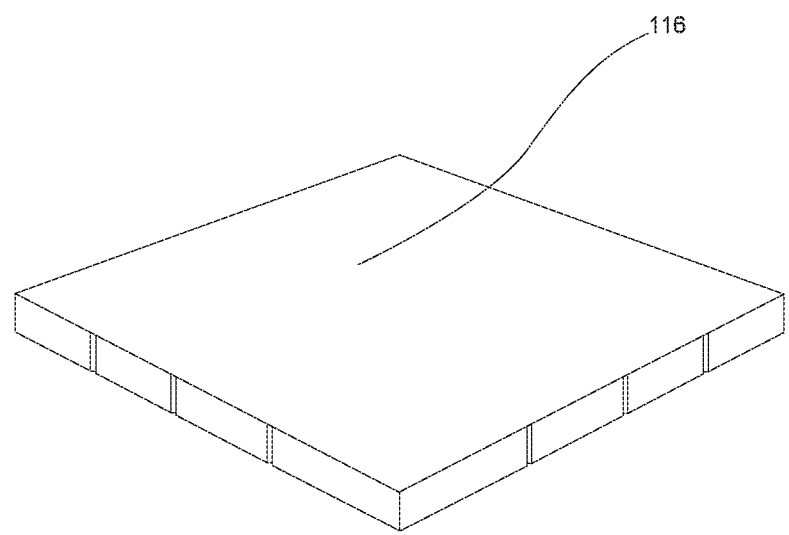

FIG. 81 shows a Flat Top Plate Matrix Layer.

Figure 82:
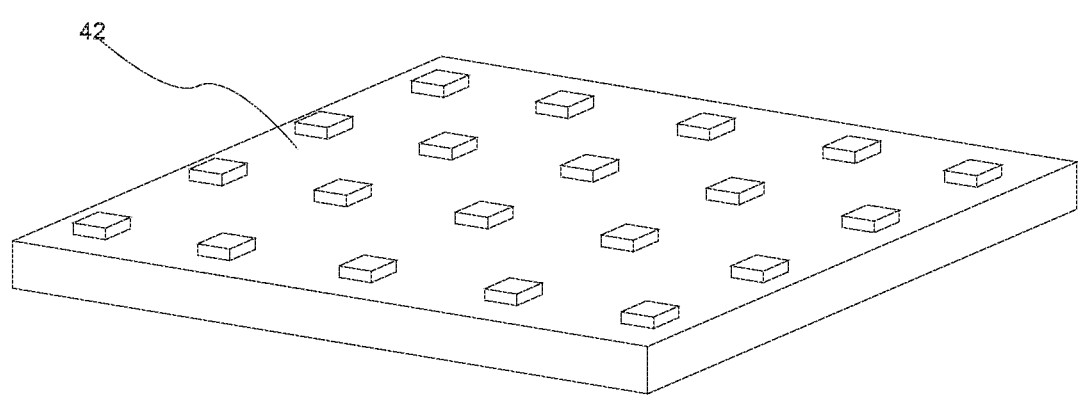

FIG. 82 shows an Integrated Protrusion and Base Support Layer.

Figure 83:
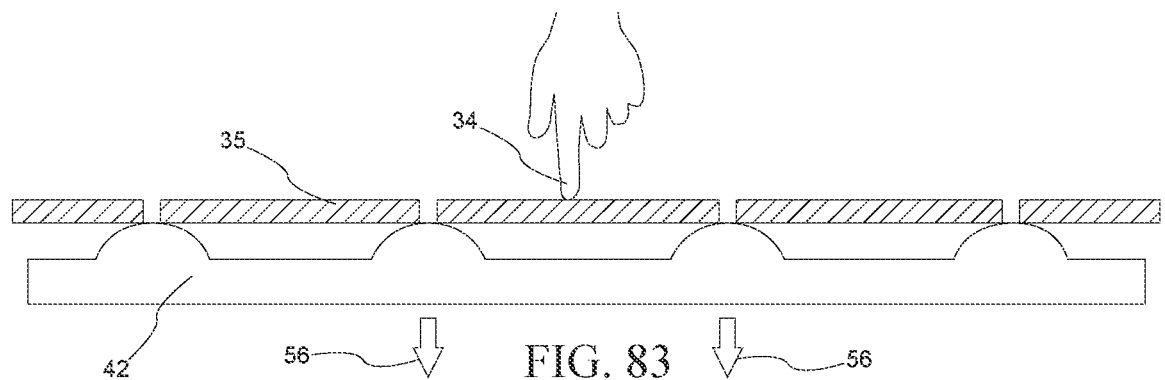

FIG. 83 shows an acceptably rigid plate.

Figure 84:
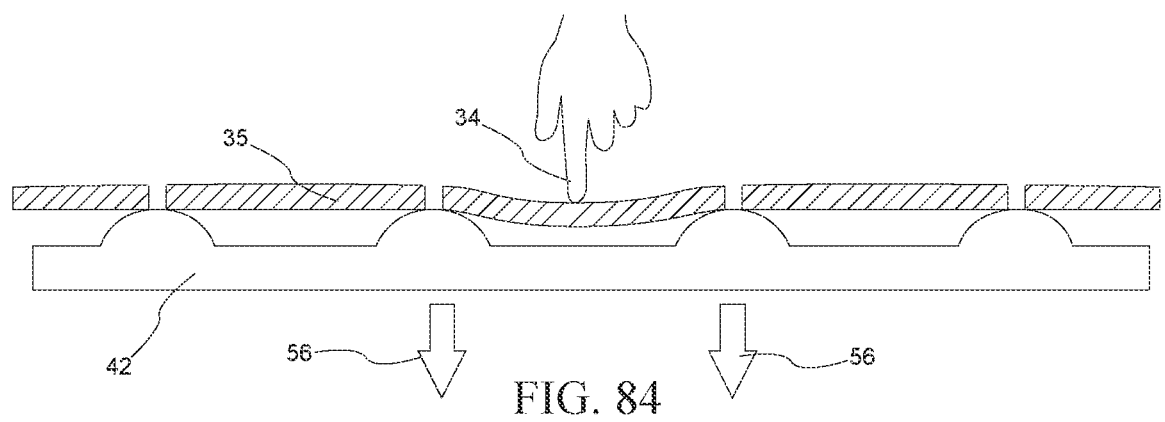

FIG. 84 shows an acceptably semi-rigid plate.

Figure 85:
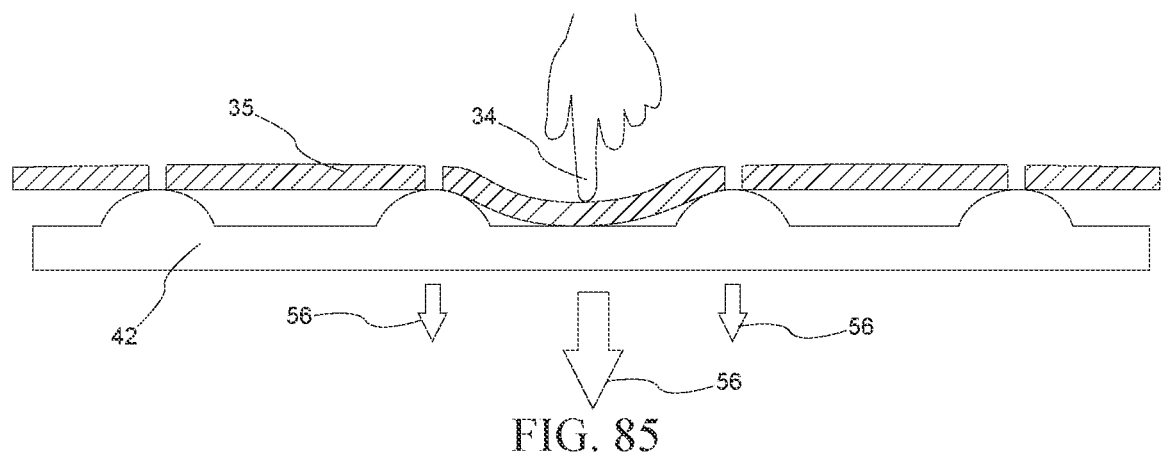

FIG. 85 shows an unacceptably non-rigid plate.

Figure 86:
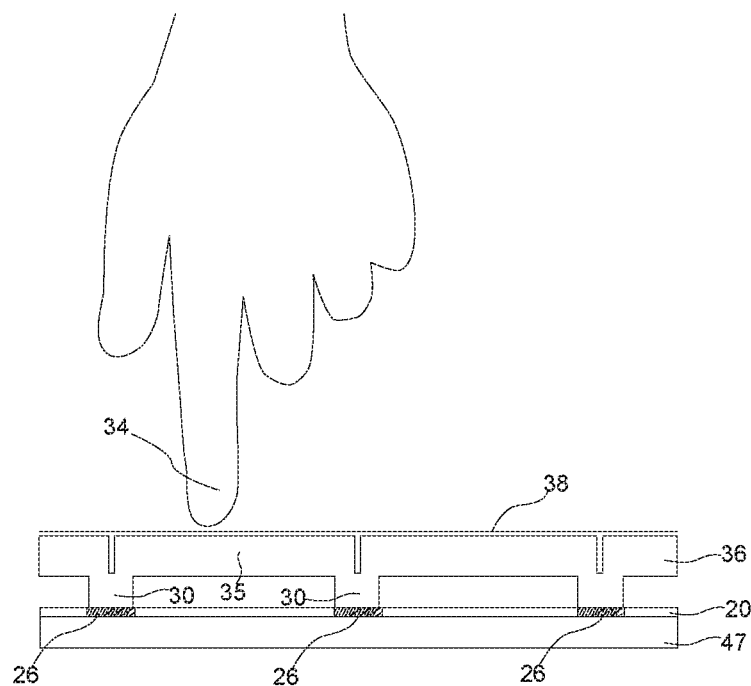

FIG. 86 shows a cross Section of Force Distribution at a plate.

Figure 87:
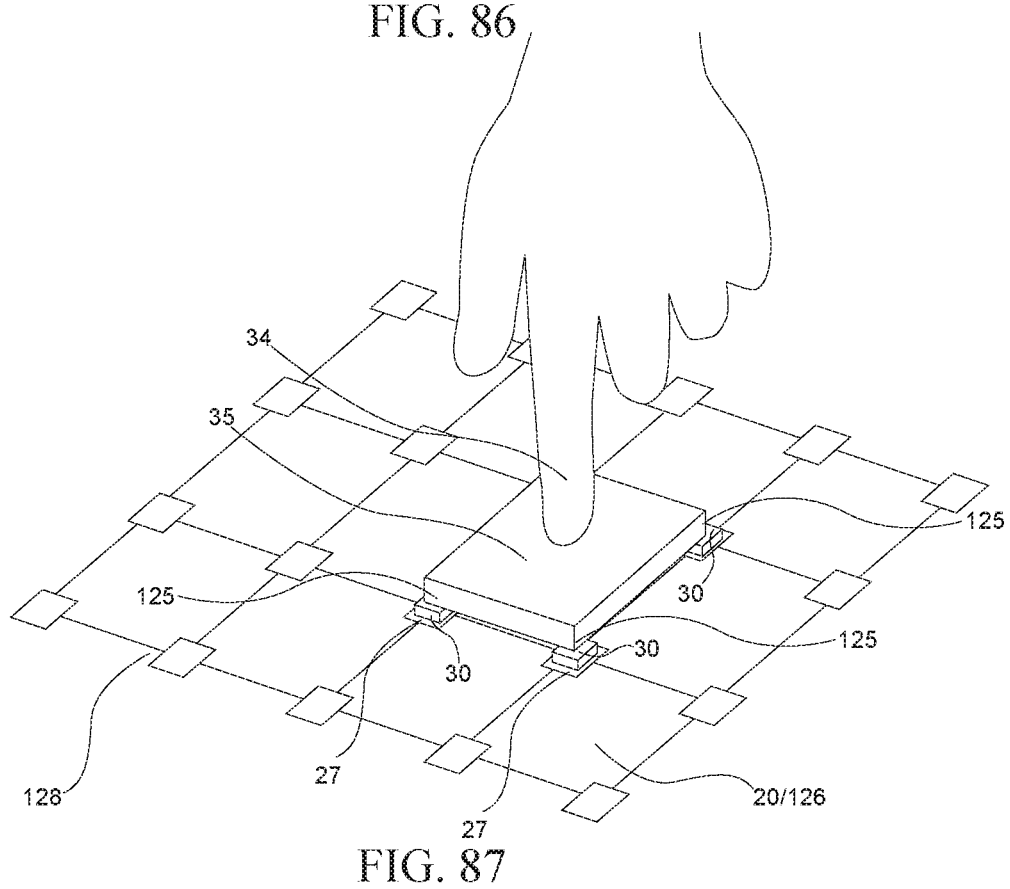

FIG. 87 shows a schematic view of an isolated plate and its mechanically interpolated force distribution exclusively to adjacent sensing elements.

FIG. 88 shows the plate and protrusion dimensions used in the prototype embodiment of the Integrated Plate and Protrusion Layer.

FIG. 89A shows photo-resistive ink pattern for plates.

FIG. 89B shows photo-resistive ink pattern for protrusions.

FIG. 90A shows cross section view the compression plates manufacturing embodiment.

FIG. 90B shows the top view the compression plates manufacturing embodiment.

Figure 91:
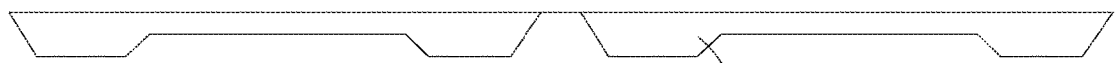
Figure 91:
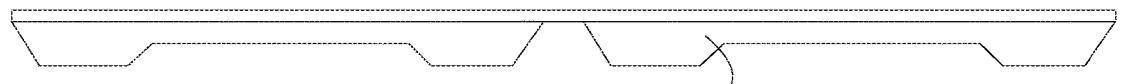

FIG. 91A shows an embodiment of a plate and protrusion layer with plates having discontinuous corner protrusions and abutting corners.

FIG. 91B shows an embodiment of a single part flat top plate and protrusion layer with plates having discontinuous corner protrusions and abutting corners.

Figure 92:
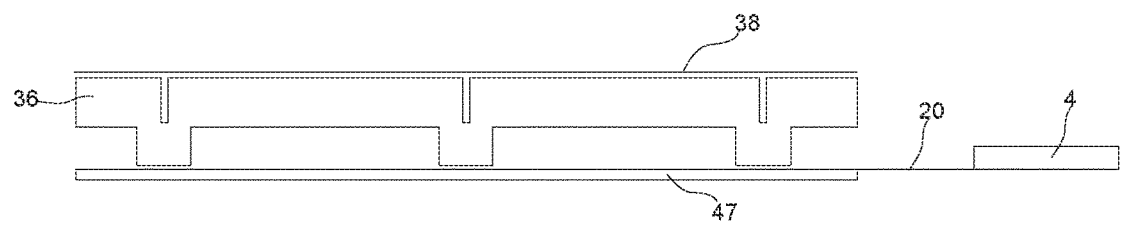

FIG. 92 shows an embodiment with the circuit board coplanar with the Active Sensing Array.

Figure 93:
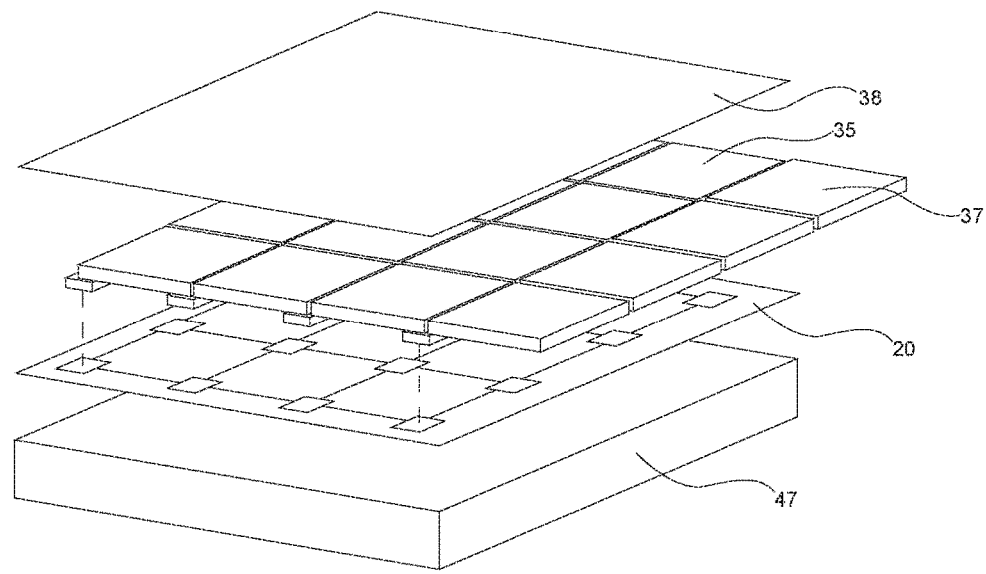

FIG. 93 shows an exploded view of an interior grid tile with bridging plates.

Figure 94:
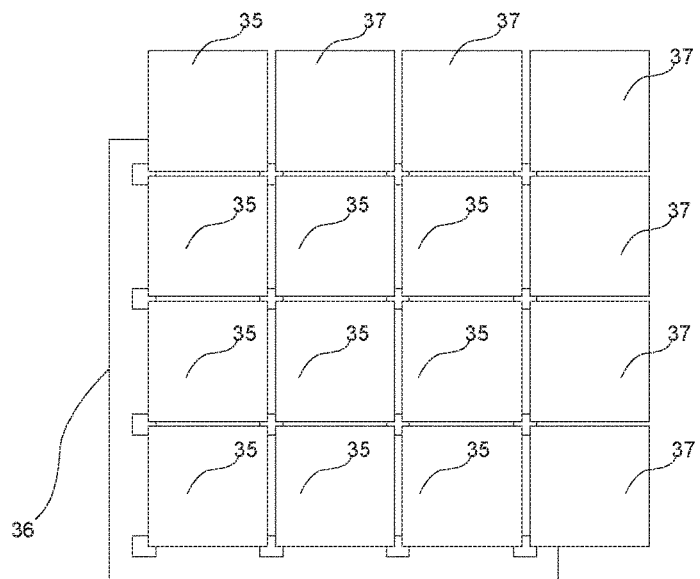

FIG. 94 shows a top view of an interior grid tile with bridging plates.

Figure 95:
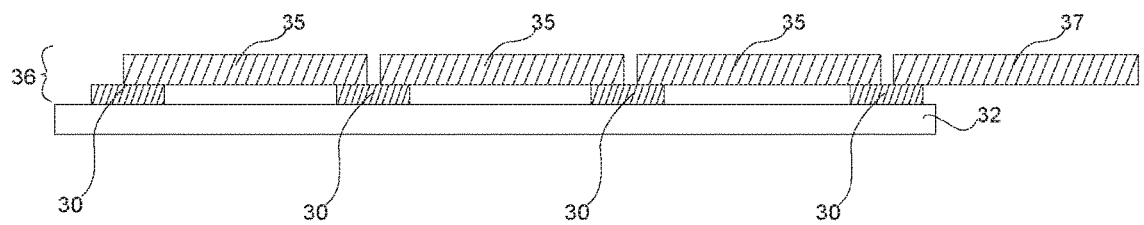

FIG. 95 shows a side view of an interior grid tile with bridging plates.

Figure 96A:
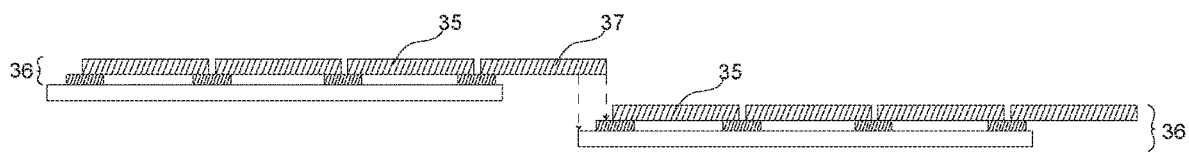

FIG. 96A shows the alignment of the bridging plates of adjacent tiles.

Figure 96B:

FIG. 96B shows the correct positioning of the bridging plates of adjacent tiles.

Figure 97A:
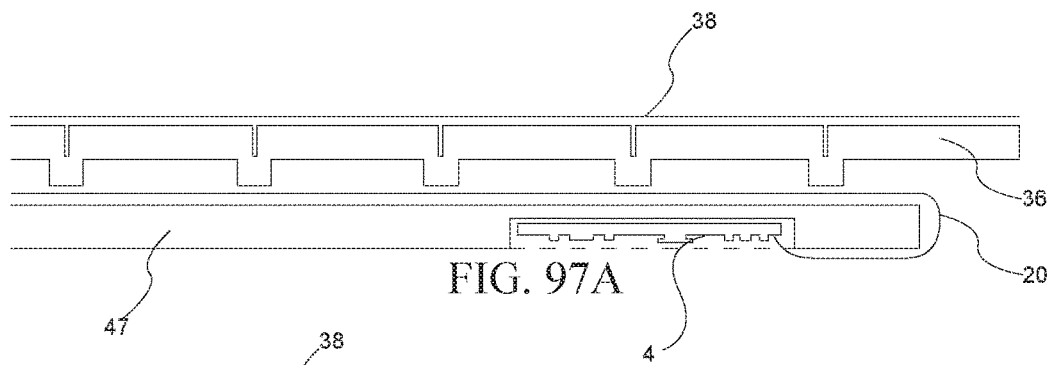

FIG. 97A shows a side view of circuit board embedded in the base layer of a tile with Bridging plates.

Figure 97B:
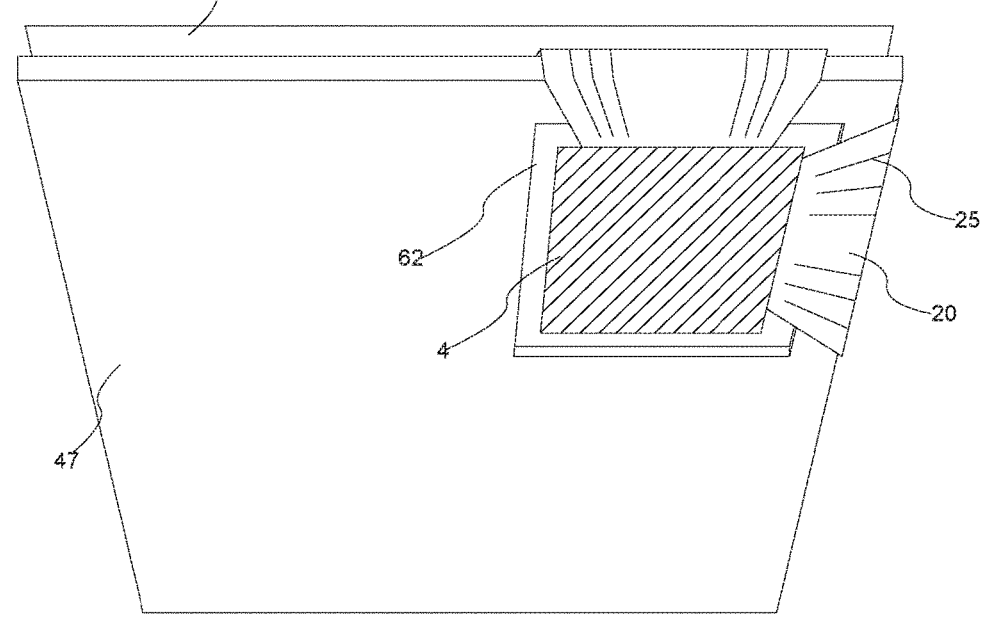

FIG. 97B shows bottom perspective view of circuit board embedded in the base layer of a tile with Bridging plates.

Figure 98A:
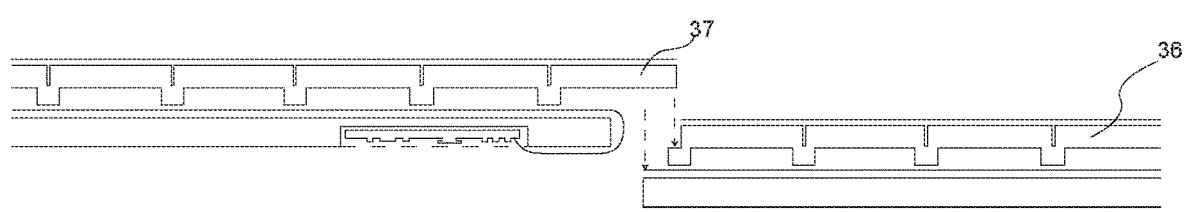

FIG. 98A shows the schematic of adjacent tile alignment of tiles with bridging plates and assembly of circuitry under the support layer in position.

Figure 98B:
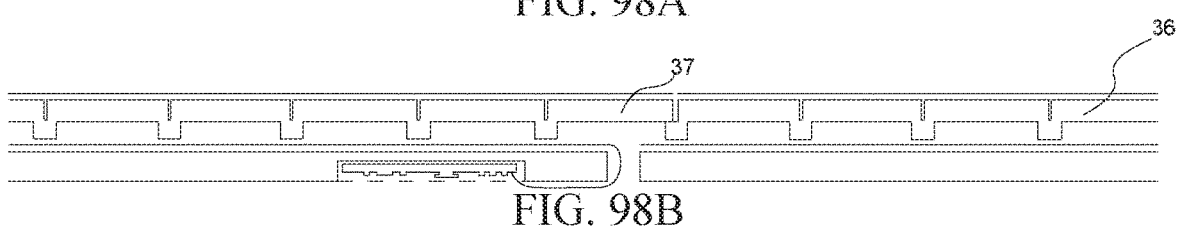

FIG. 98B shows the alignment of adjacent tiles with bridging plates and assembly of circuitry under the support layer.

Figure 99:
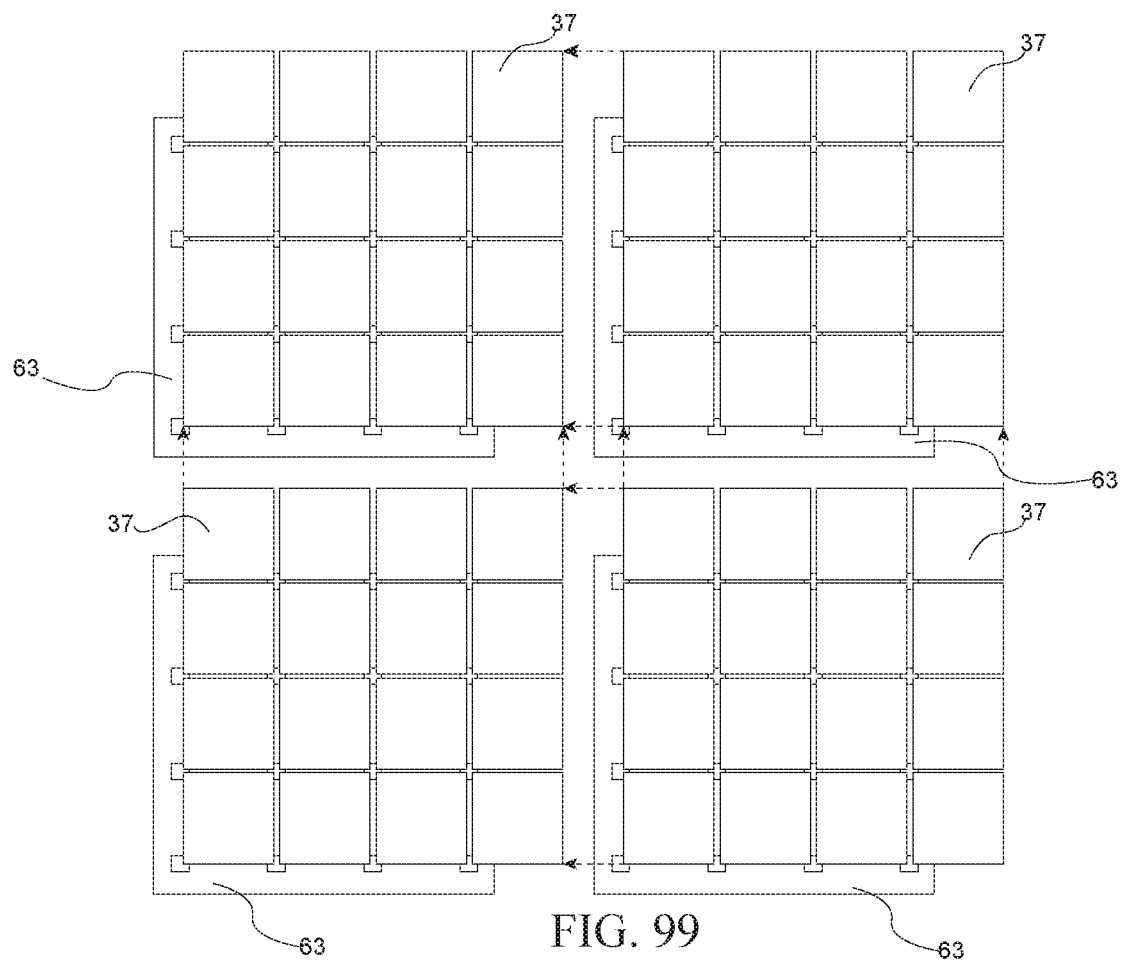

FIG. 99 shows schematic of a grid of tiles with bridging plates being properly aligned.

Figure 100:
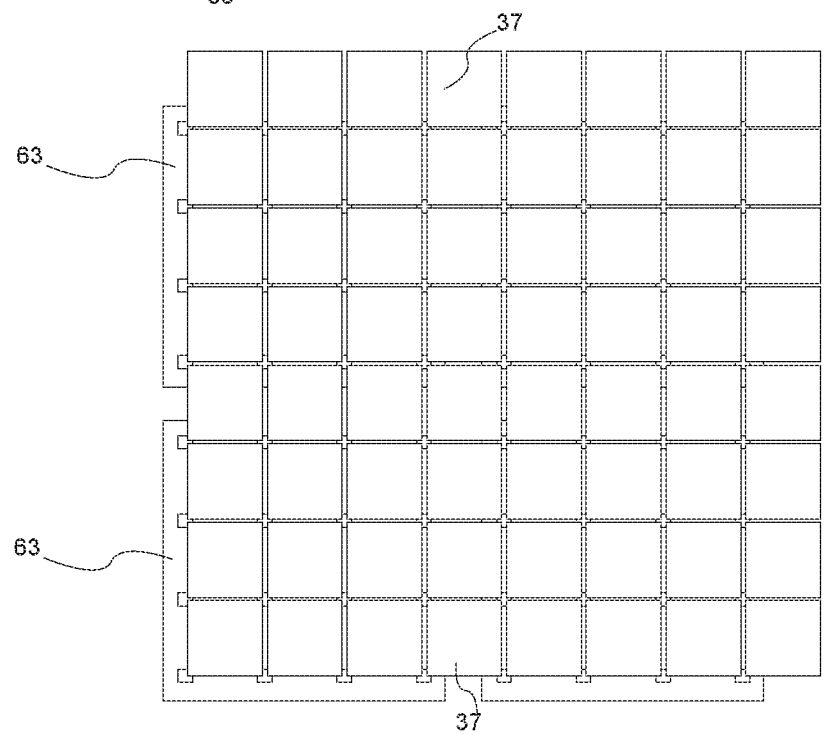

FIG. 100 shows of a grid of tiles with bridging plates in position.

Figure 101:
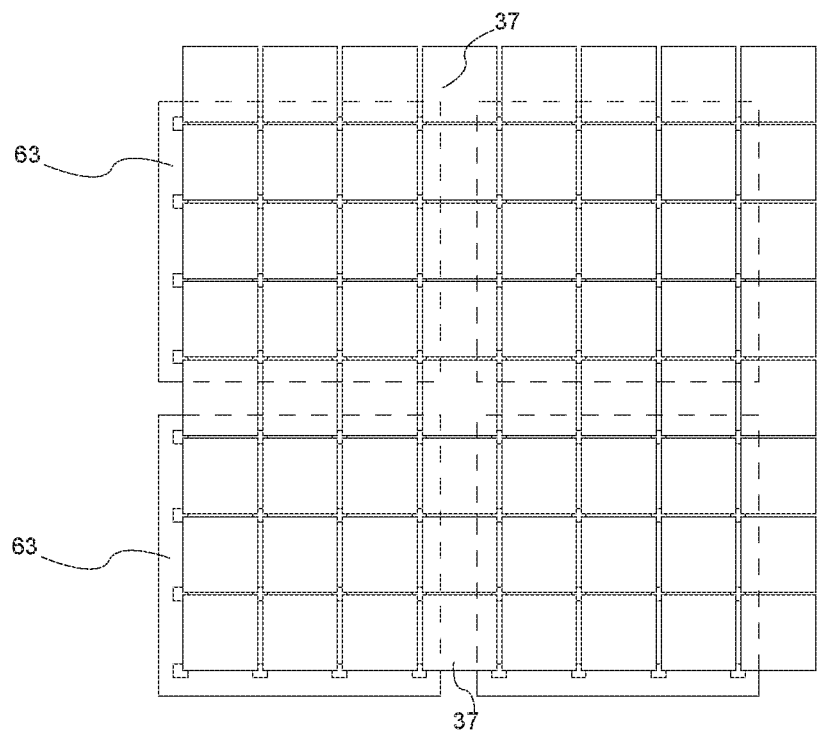

FIG. 101 shows of a grid of tiles with bridging plates in position with bridging tiles transparent exposing bridge plate alignment on protrusions.

Figure 102:
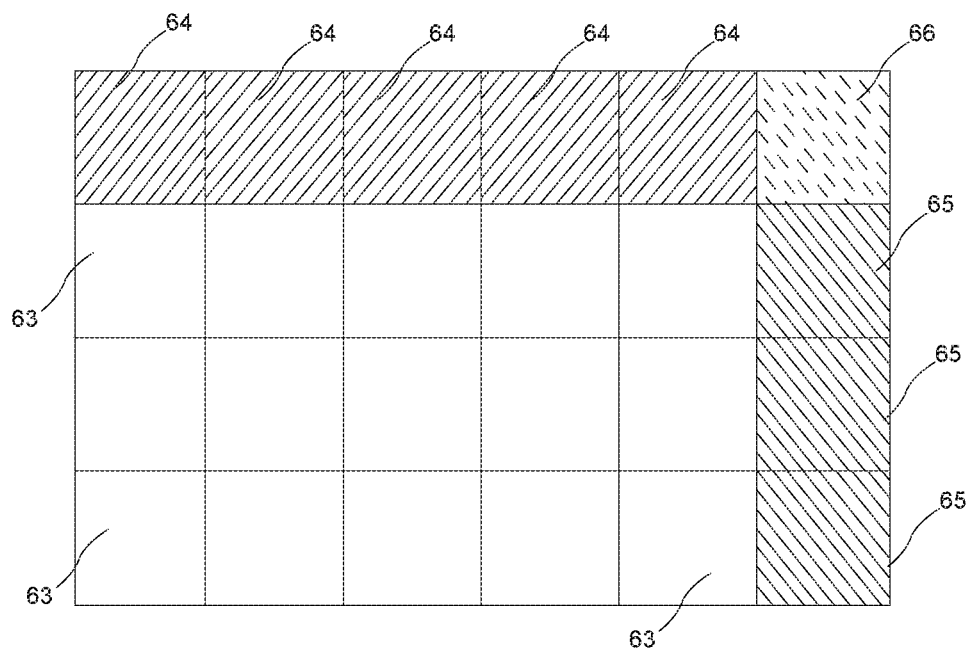

FIG. 102 shows a grid of interior, north, east and northeast tiles embodiment.

Figure 103:
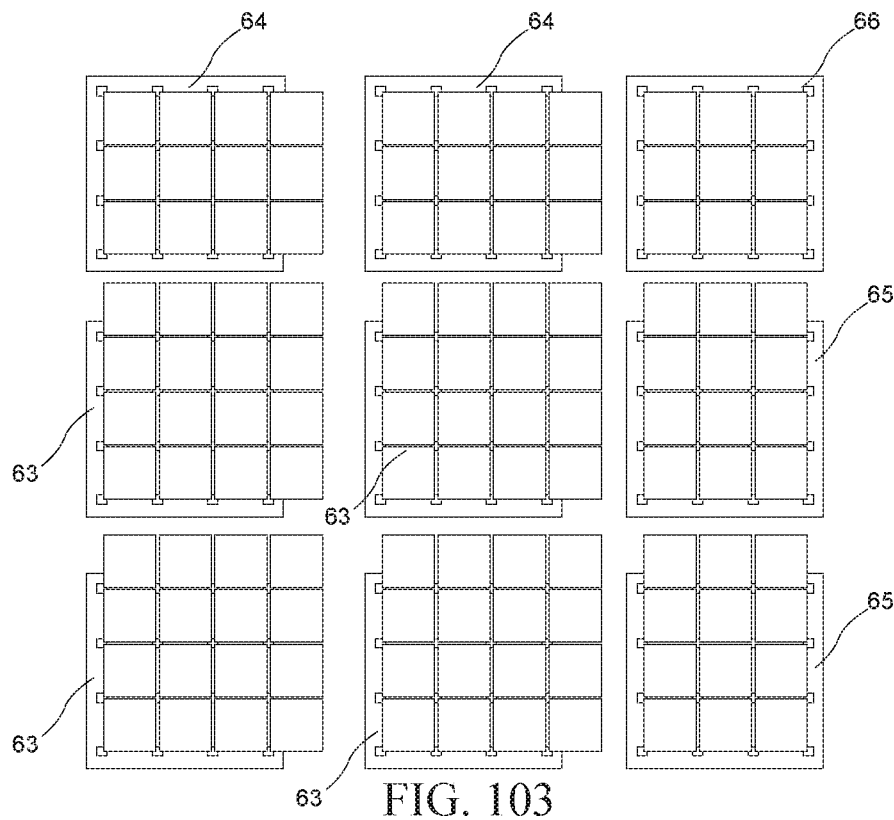

FIG. 103 shows a schematic alignment of a 3×3 grid of interior, north, east and northeast tiles embodiment.

Figure 104:
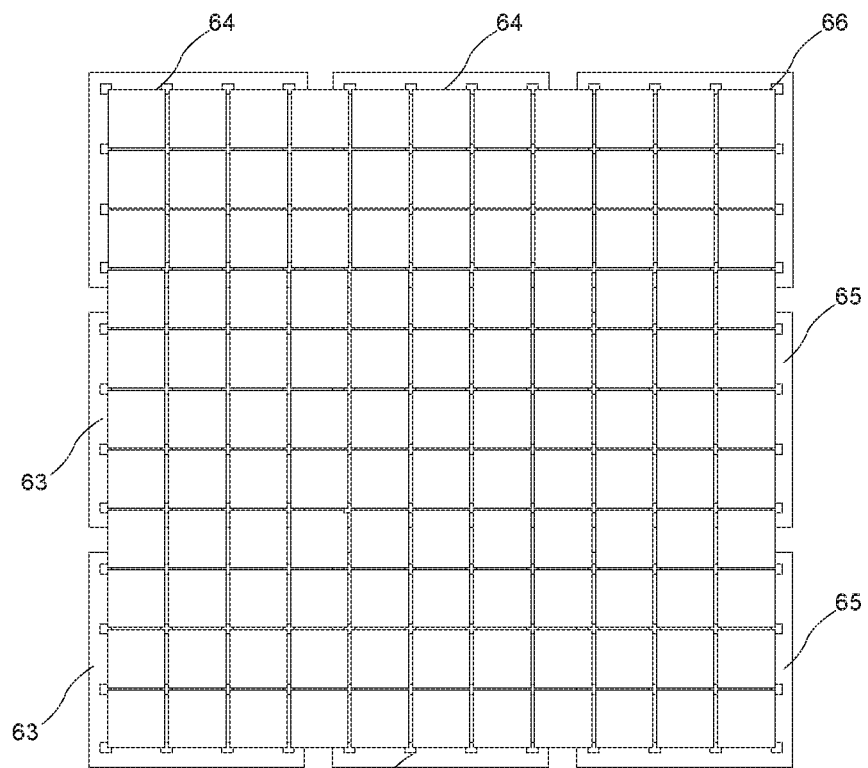

FIG. 104 shows a 3×3 grid of interior, north, east and northeast tiles embodiment in their proper positions.

Figure 105:
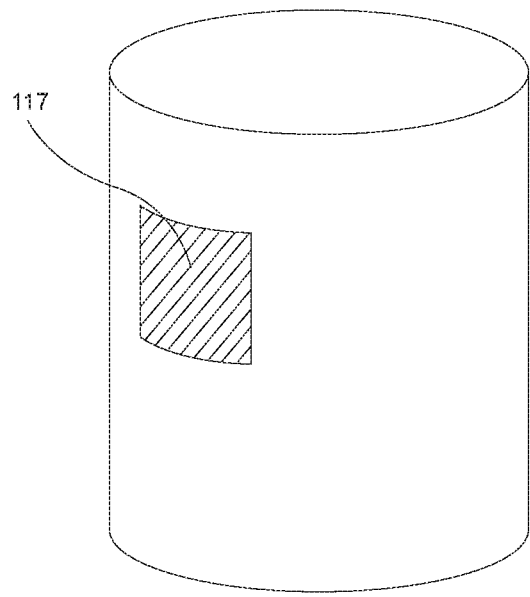

FIG. 105 shows a deformable patch on a cylindrical surface.

Figure 106:
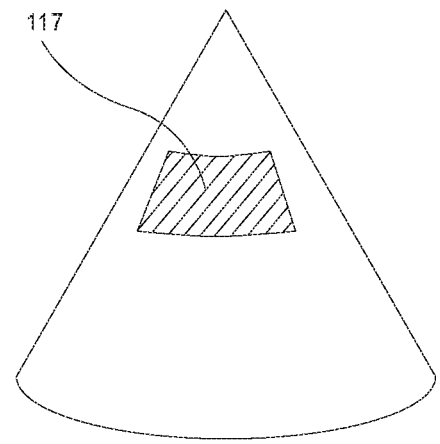

FIG. 106 shows a deformable patch on a conic surface.

Figure 107:
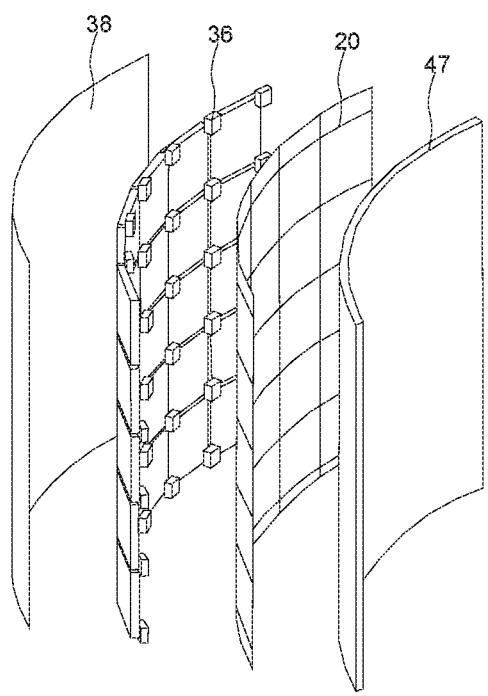

FIG. 107 shows the inside view of an assembly of a cylindrical section curved sensor.

Figure 108:
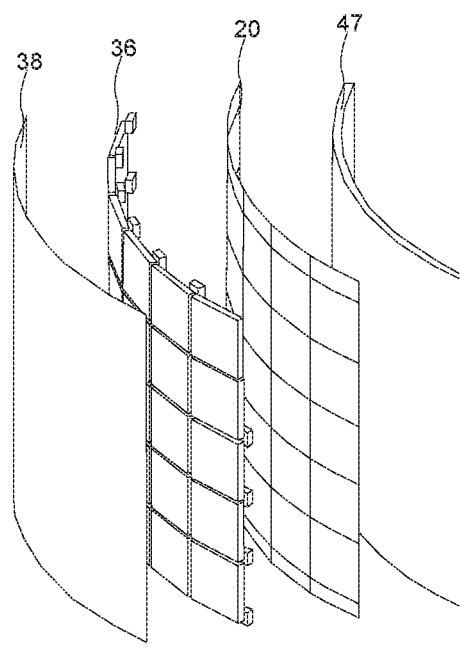

FIG. 108 shows the outside view of an assembly of a cylindrical section curved sensor.

FIG. 109 shows a height edge view of a cylindrical section Integrated Plate and Protrusion Layer.

FIG. 110 shows an outside view of a cylindrical section Integrated Plate and Protrusion Layer.

FIG. 111 shows an inside view of a cylindrical section Integrated Plate and Protrusion Layer.

FIG. 112 shows a sensor mounted on a cylindrical surface.

Figure 113:
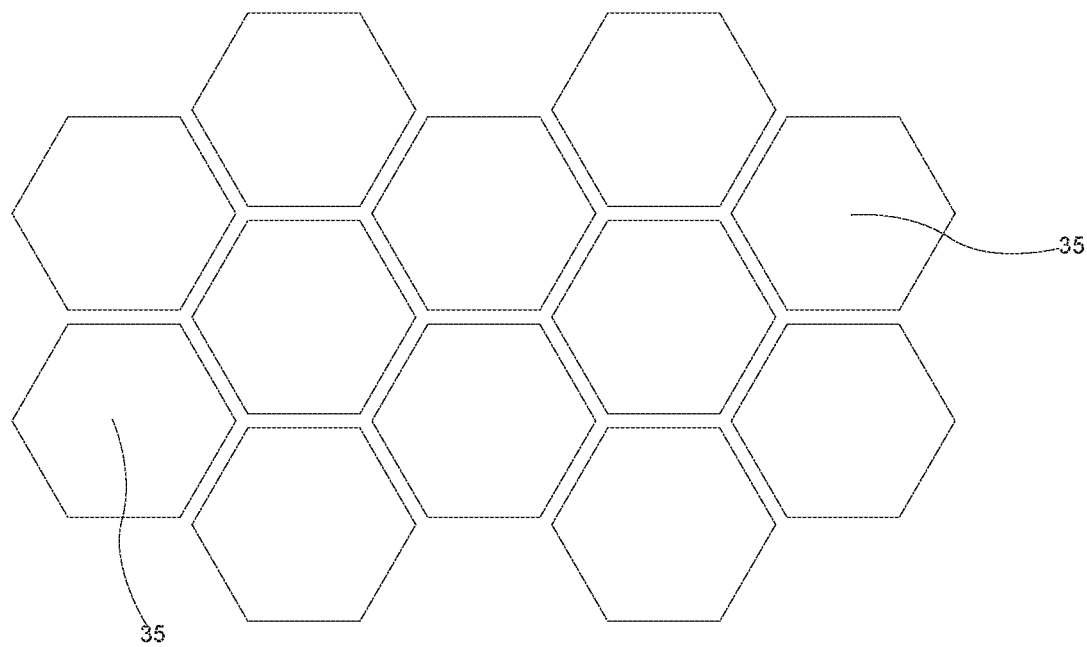

FIG. 113 shows a plate matrix of hexagonal plates.

Figure 114:
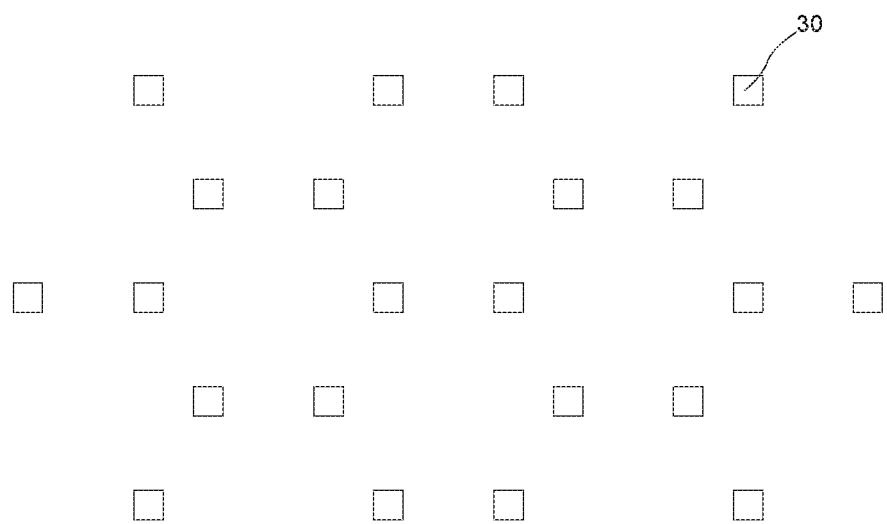

FIG. 114 shows a protrusion matrix corresponding to a hexagonal plate matrix.

Figure 115:
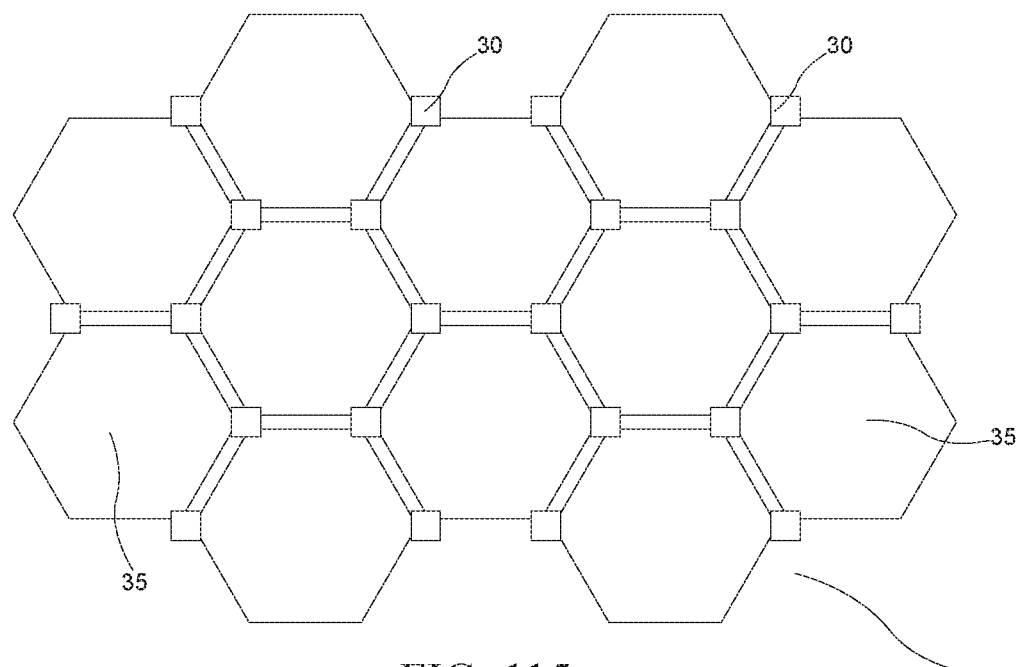

FIG. 115 shows an Integrated Plate and Protrusion Layer with hexagonal plates.

Figure 116:
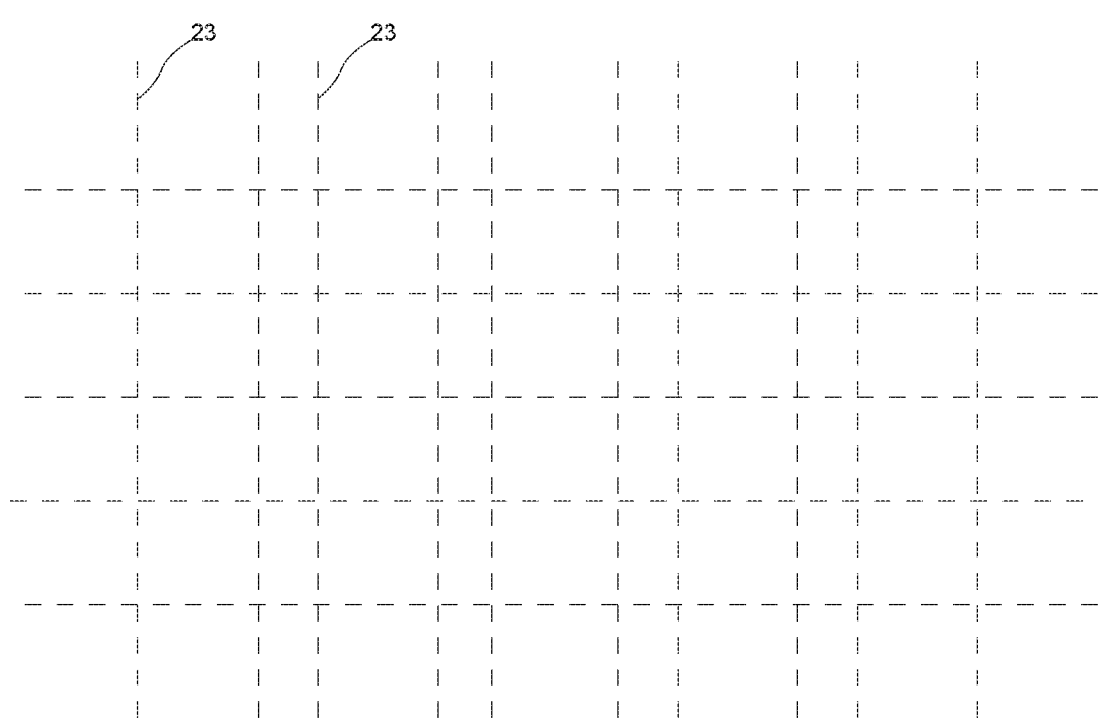

FIG. 116 shows an Active Sensing Array with corresponding spacing to a hexagonal plate matrix.

Figure 117:
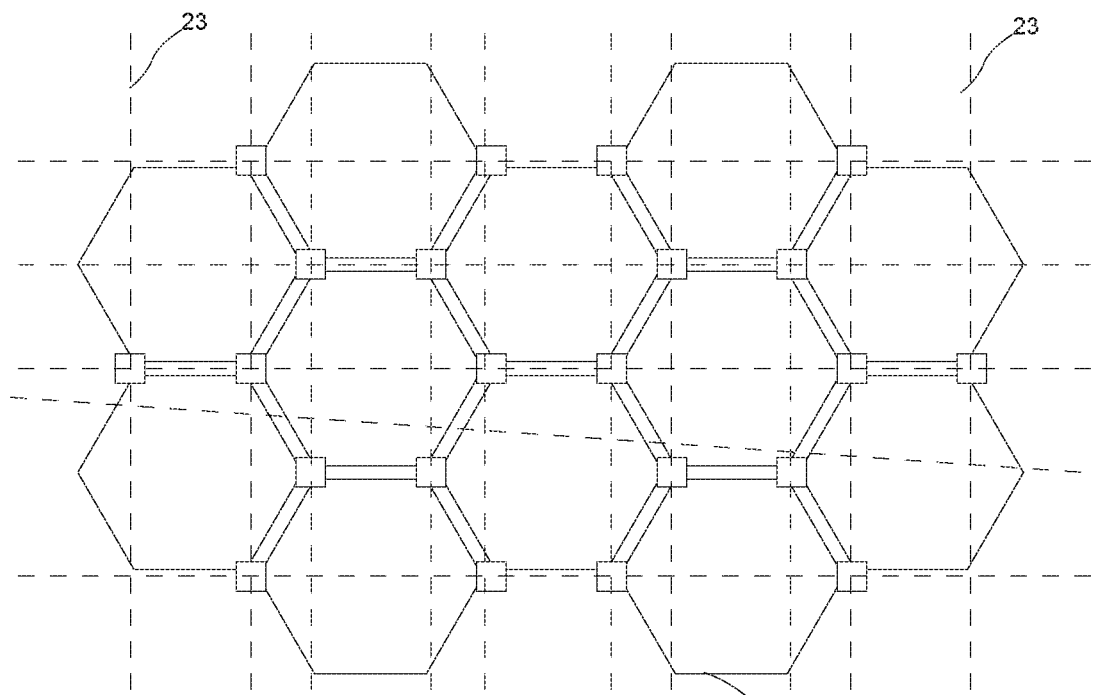

FIG. 117 shows a hexagonal Integrated Plate and Protrusion Layer positioned above the Active Sensing Array.

Figure 118:
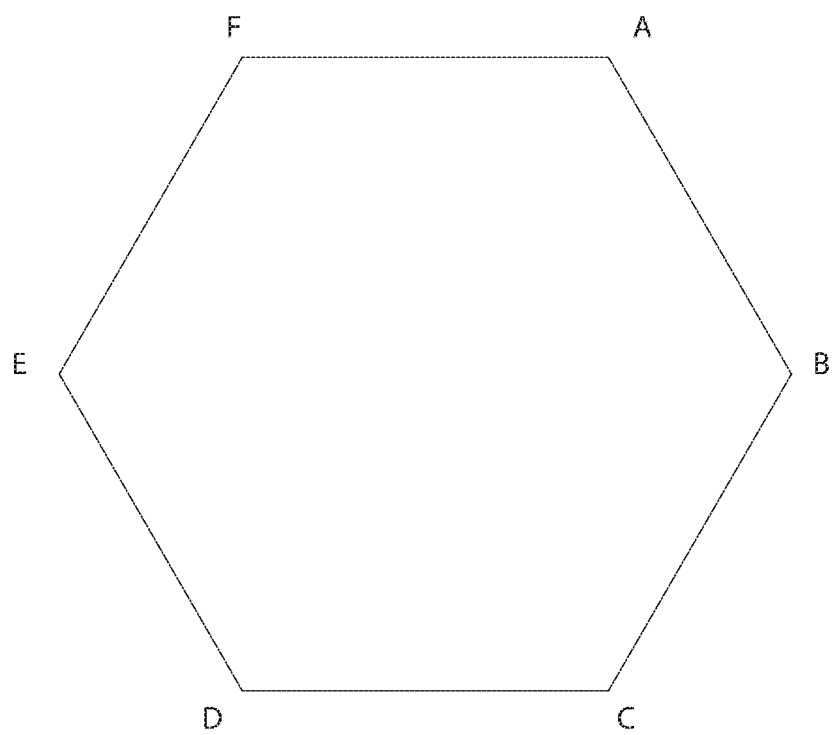

FIG. 118 shows a hexagonal plate with corners labeled.

Figure 119:
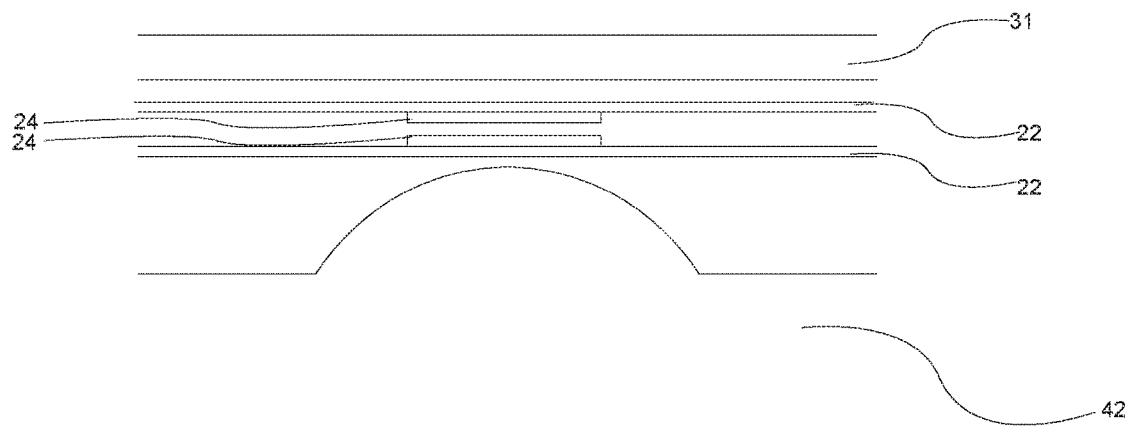

FIG. 119 shows an embodiment with the protrusions affixed to the active sensing array, which is wrapped around the support layer to circuitry on the bottom of the tile.

Figure 120:
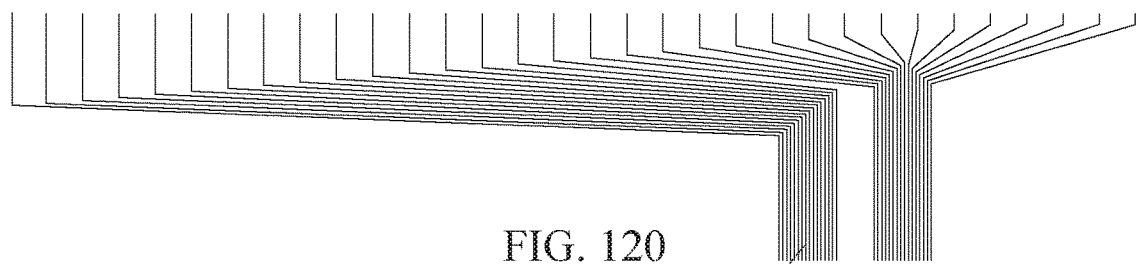

FIG. 120 showing Connector Tails separated into banks of 16 trace lines.

Figure 121:
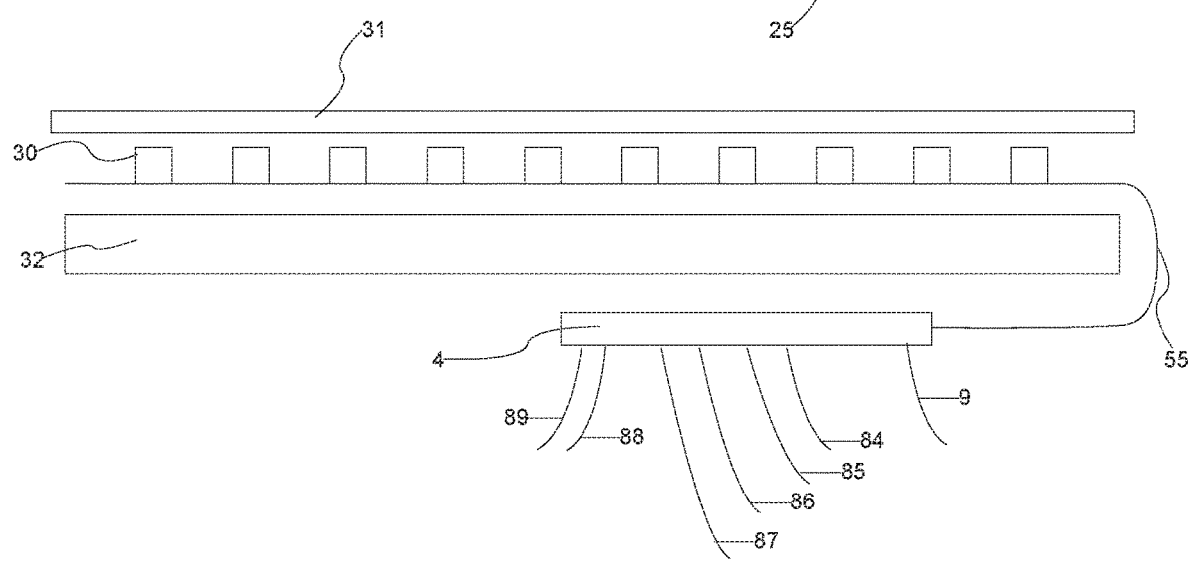

FIG. 121 showing layers and applied force on the integrated protrusion and base layer embodiment.

Figure 122:
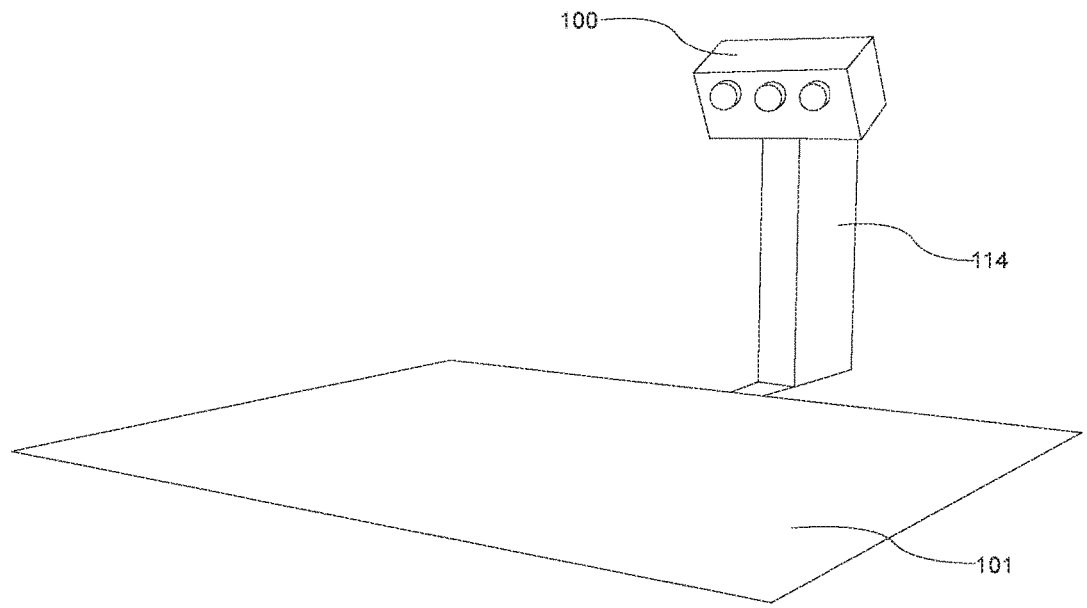

FIG. 122 shows an embodiment with a touch device and two range imaging cameras.

Figure 123:
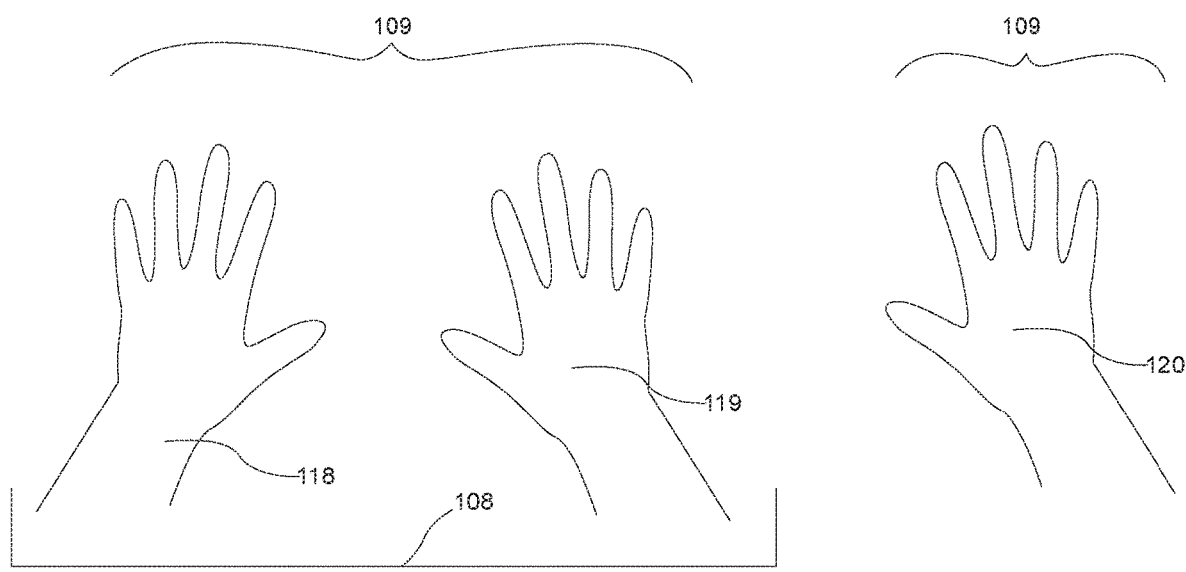

FIG. 123 shows the left hand and right hand of one individual user. Beyond the individual user maximum reach, another individual user is identified.

Figure 124:
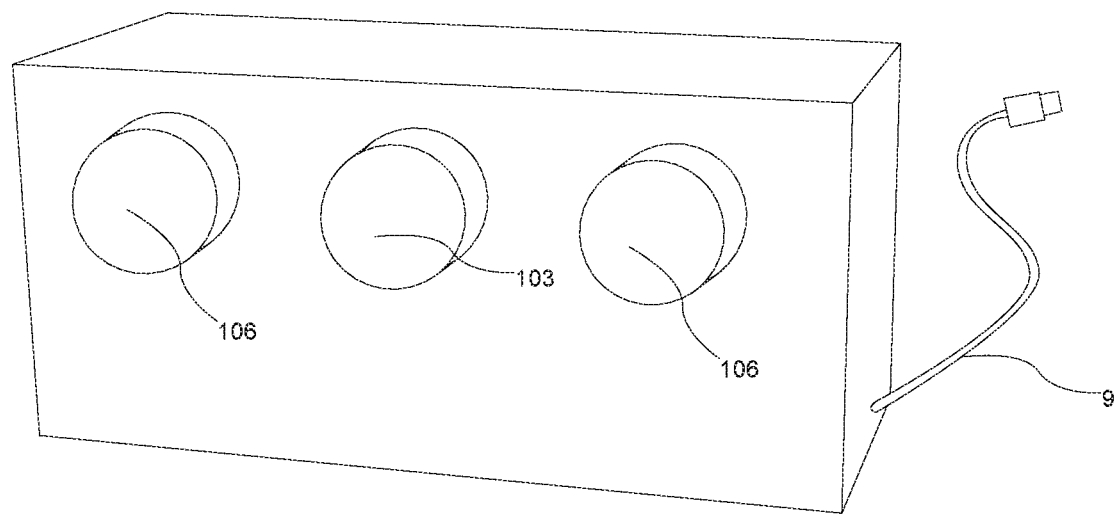

FIG. 124 shows a range imaging camera.

Figure 125:
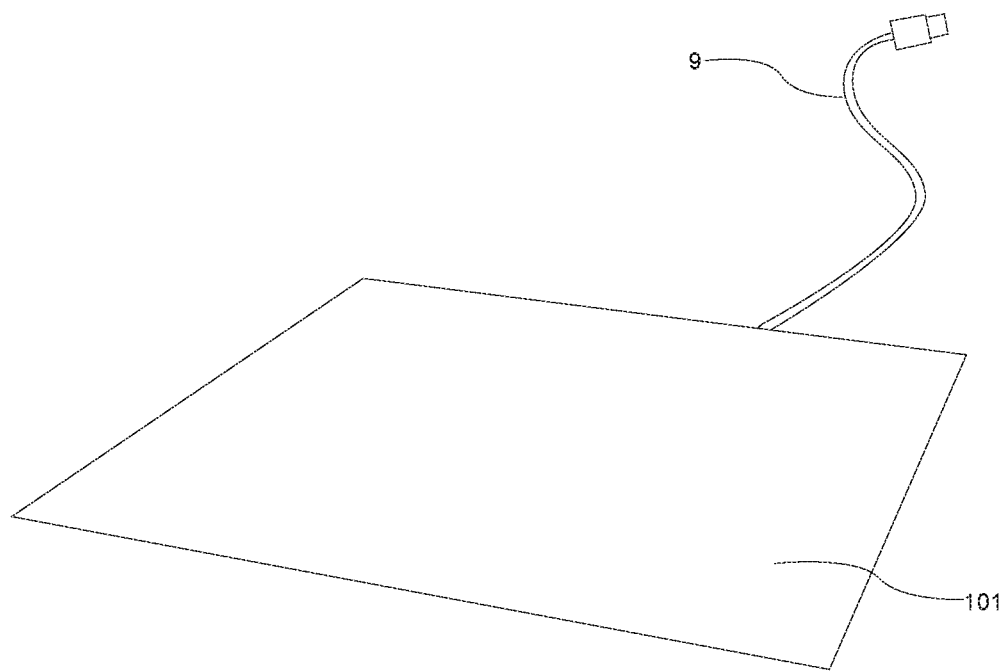

FIG. 125 shows a touch imaging device.

Figure 126:
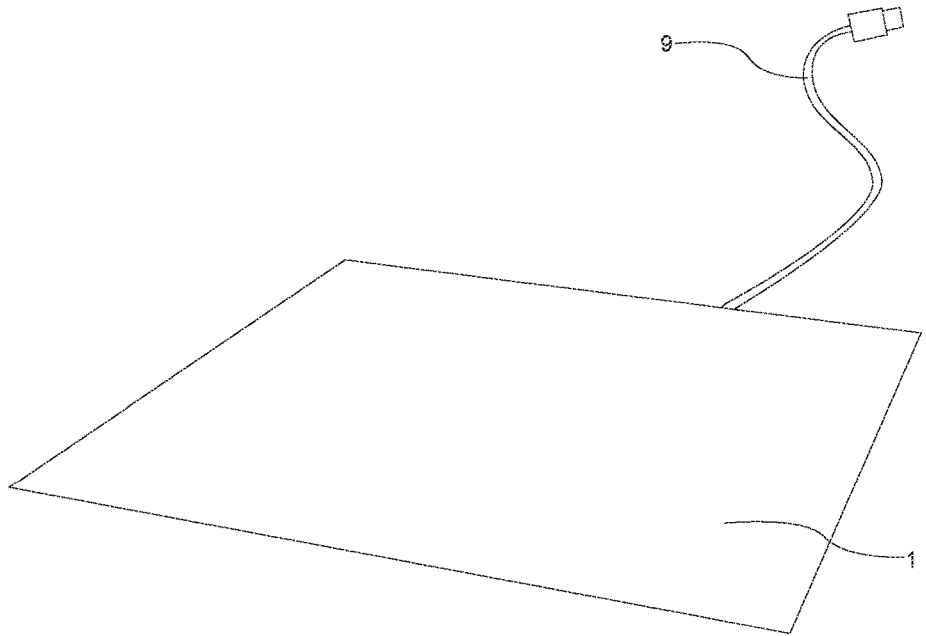

FIG. 126 shows a pressure imaging apparatus.

Figure 127:
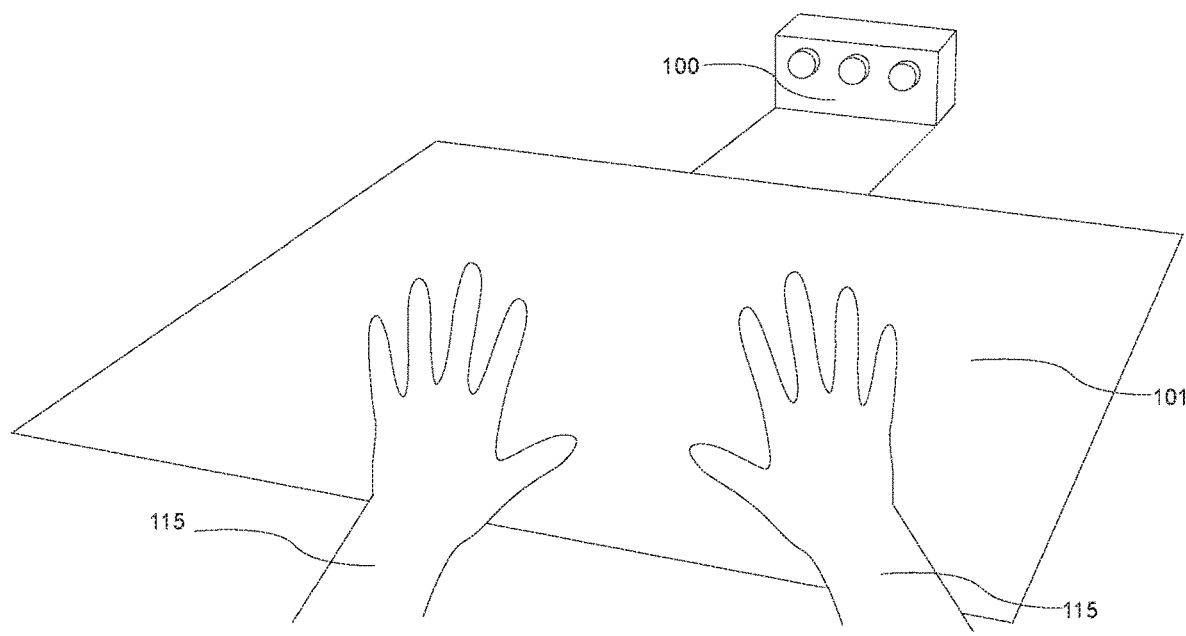

FIG. 127 shows a table top embodiment.

Figure 128:
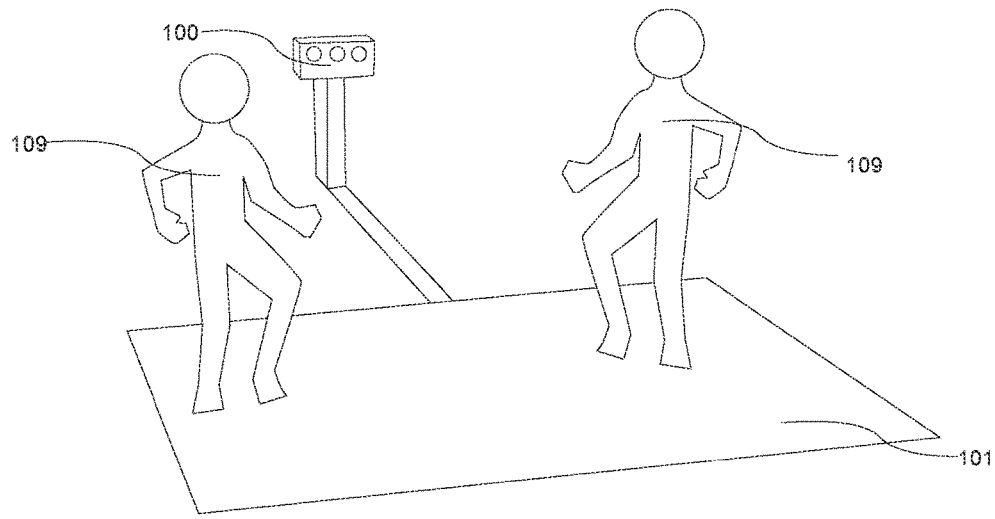

FIG. 128 shows a floor embodiment.

Figure 129:
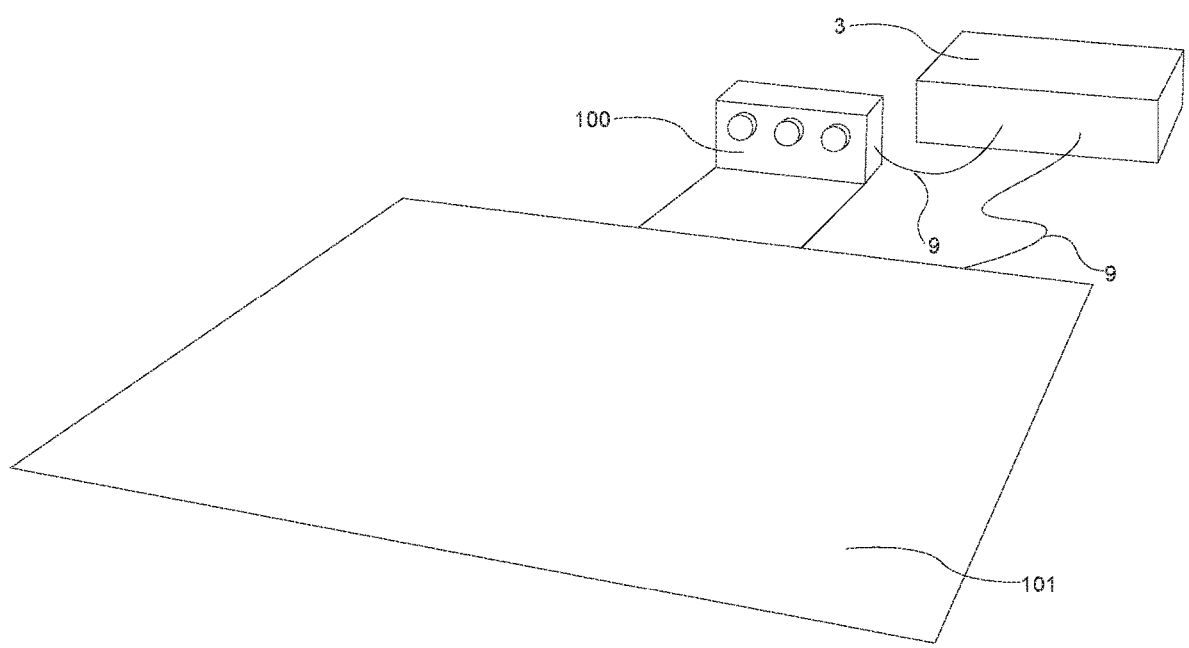

FIG. 129 shows an embodiment of the Touch-Range Fusion Apparatus with a computer.

FIGS. 130A, 130B, 130C and 130D show a hand, the outline of a hand using edge detection, a skeleton matched to edge hand, and figure touches identified, respectively.

FIG. 131 shows that cubes can be placed at the four corners.

Figure 132:
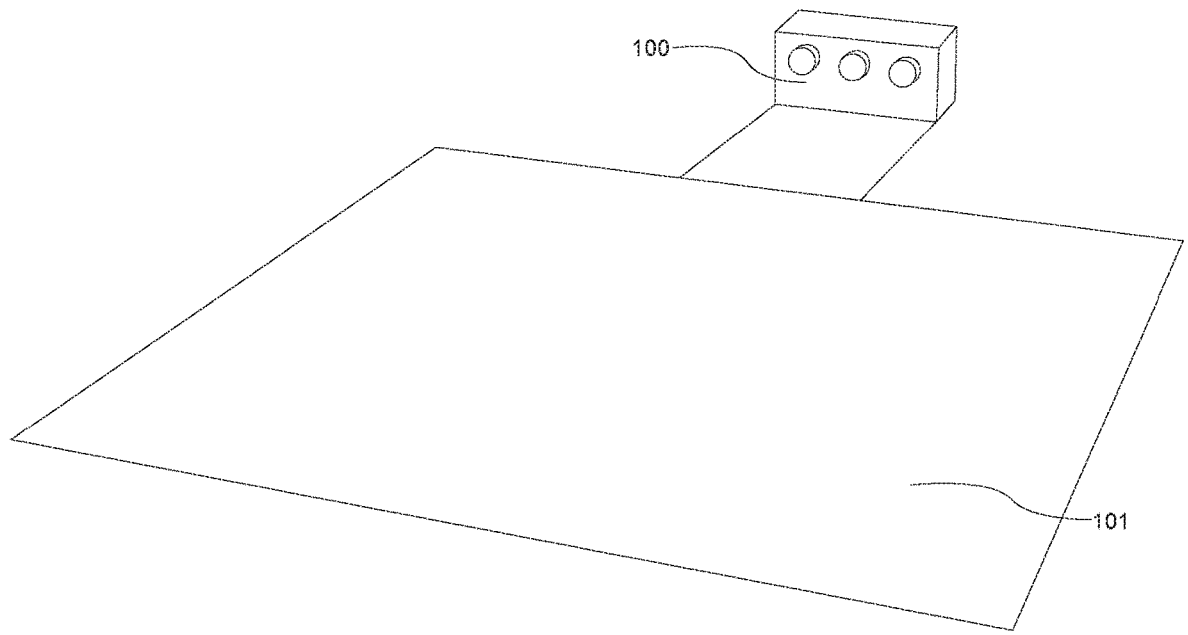

FIG. 132 shows an embodiment of the Touch-Range Fusion Apparatus.

Figure 133:
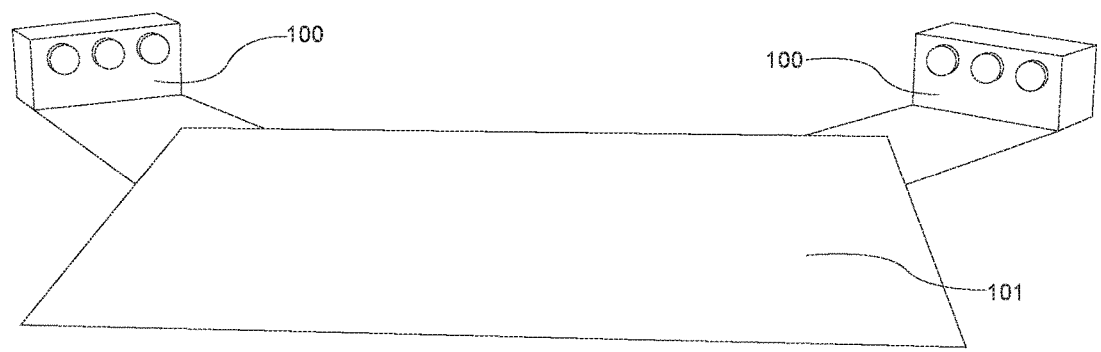

FIG. 133 shows an embodiment with a touch device, range imaging camera, and supporting stand for the range imaging camera.

Figure 134:
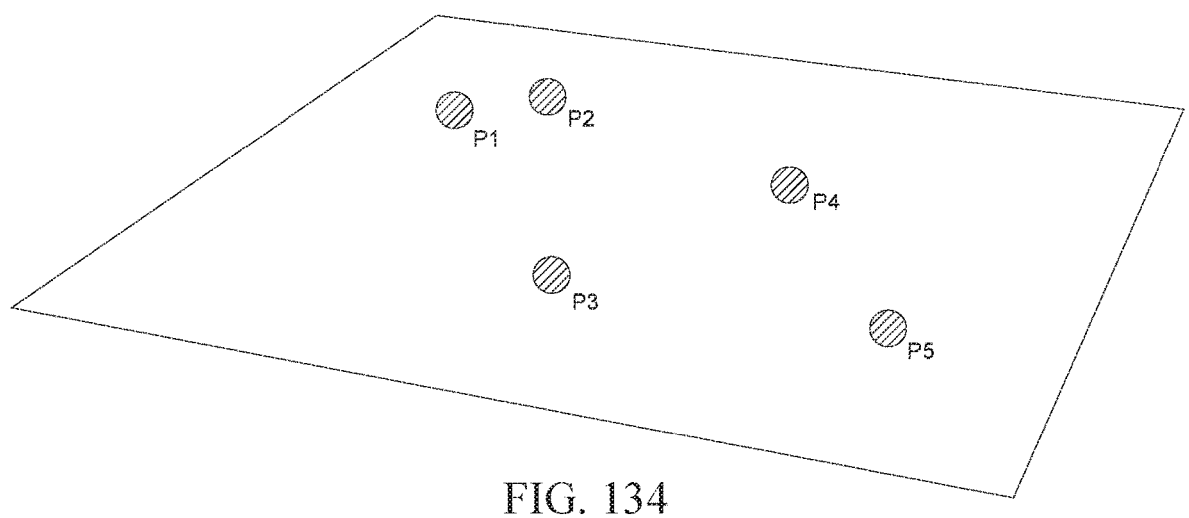

FIG. 134 shows a Touch Device 101 with a set of Contact Points Pk.

Figure 135:
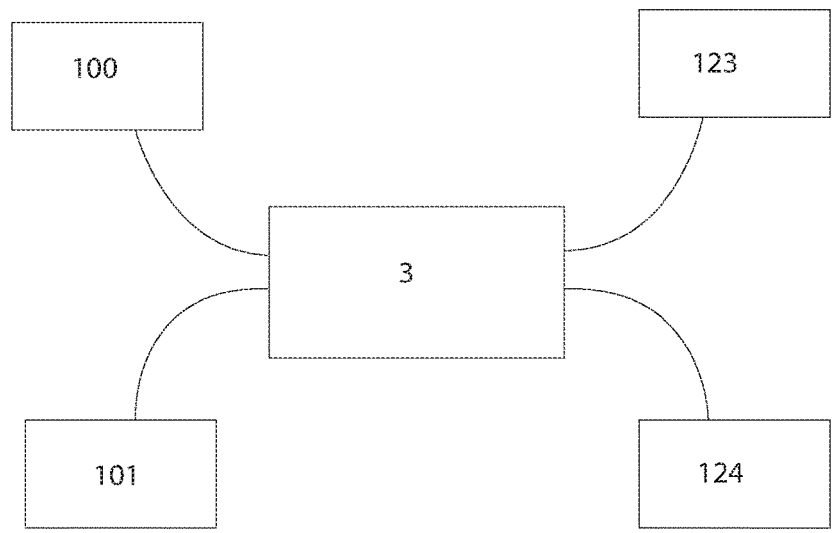

FIG. 135 is a block diagram of Data from Range Imaging Camera and Touch Device being processed by the computer and stored in computer memory.

Figure 136:
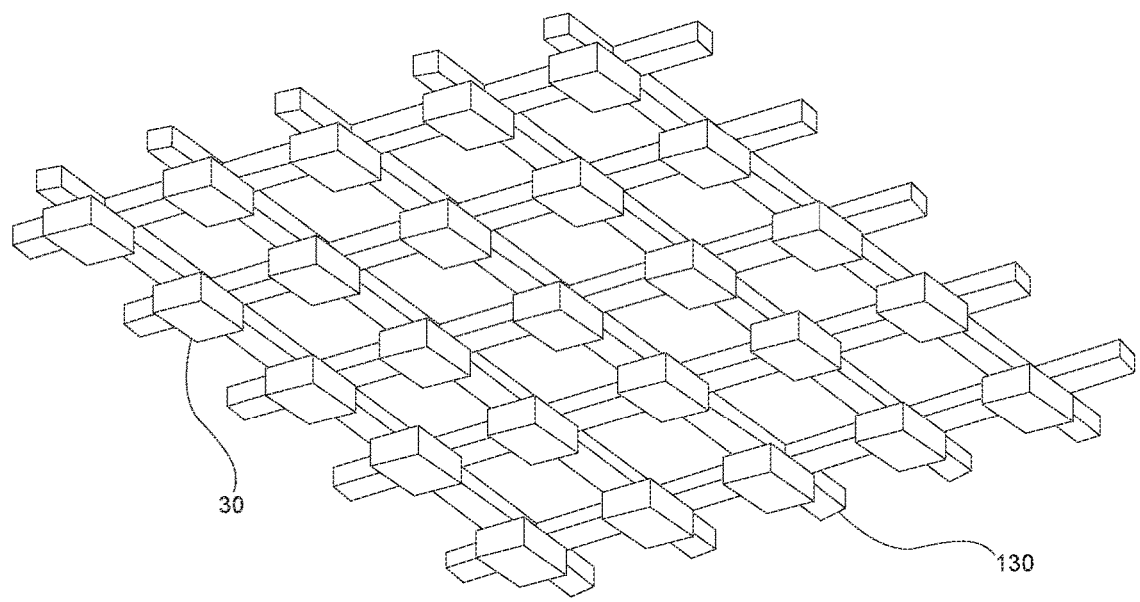

FIG. 136 shows an embodiment of a Mesh and Protrusion Layer component.

Figure 137:
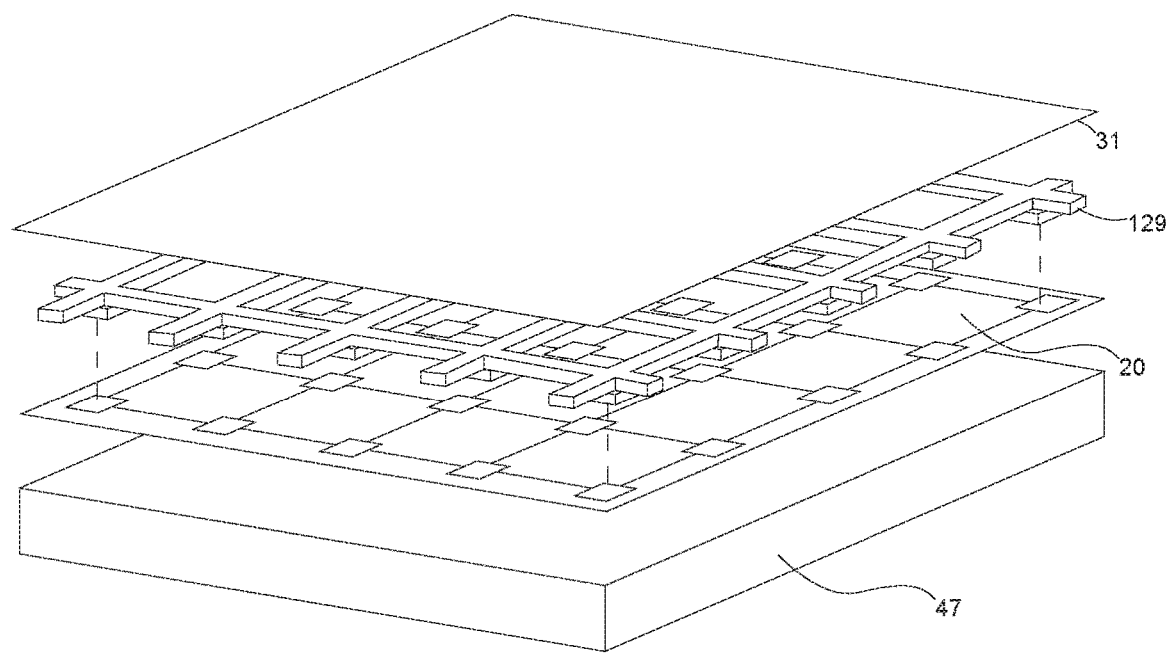

FIG. 137 shows an exploded view of a Tile for the Mesh with Single Protrusion Component embodiment.

Figure 138:
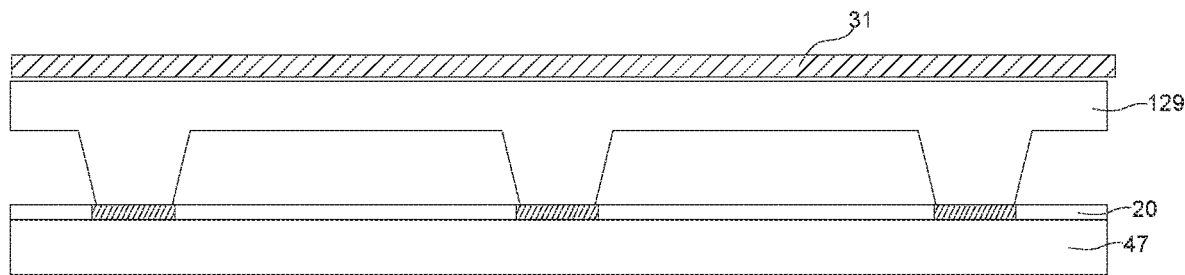

FIG. 138 shows a side view of a Tile for the Mesh with Single Protrusion Component embodiment.

Figure 139:
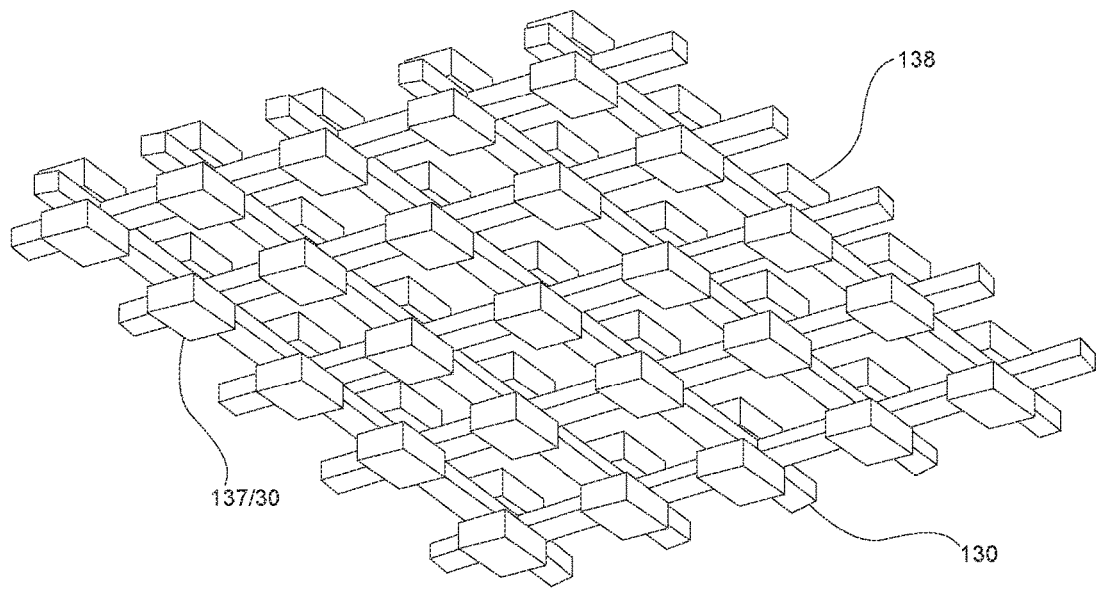

FIG. 139 shows an embodiment of a Mesh and Double Protrusion Layer component.

Figure 140:
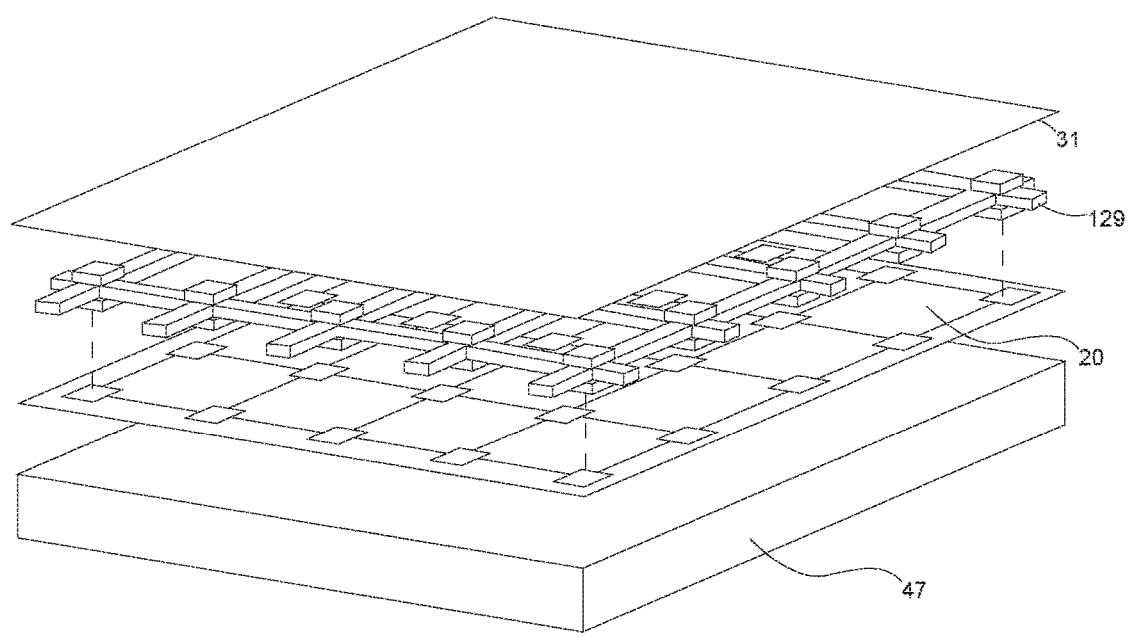

FIG. 140 shows an exploded view of a Tile for the Mesh with Double Protrusion Component embodiment.

Figure 141:
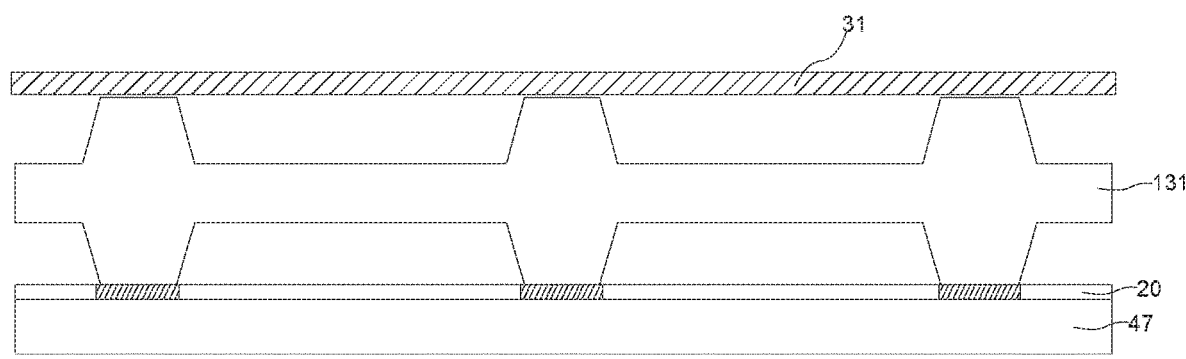

FIG. 141 shows a side view of a Tile for the Mesh with Double Protrusion Component embodiment.

FIG. 142A shows a top view grid of mesh bars.

FIG. 142B shows a side view grid of mesh bars.

FIG. 143A shows a top view grid of mesh bars with aligned protrusions.

FIG. 143B shows a side view grid of mesh bars with aligned protrusions.

FIG. 143C shows a bottom view grid of mesh bars with aligned protrusions.

FIG. 144A shows a top view grid of mesh bars with aligned inner and outer protrusions.

FIG. 144B shows a side view grid of mesh bars with aligned inner and outer protrusions.

FIG. 144C shows a bottom view grid of mesh bars with aligned inner and outer protrusions.

FIG. 145A shows an acceptably rigid semi-rigid touch layer in a mesh and single protrusion embodiment.

FIG. 145B shows an acceptably deforming rigid semi-rigid touch layer in a mesh and single protrusion embodiment.

FIG. 145C shows an unacceptably deforming semi-rigid touch layer in a mesh and single protrusion embodiment.

Figure 146A:
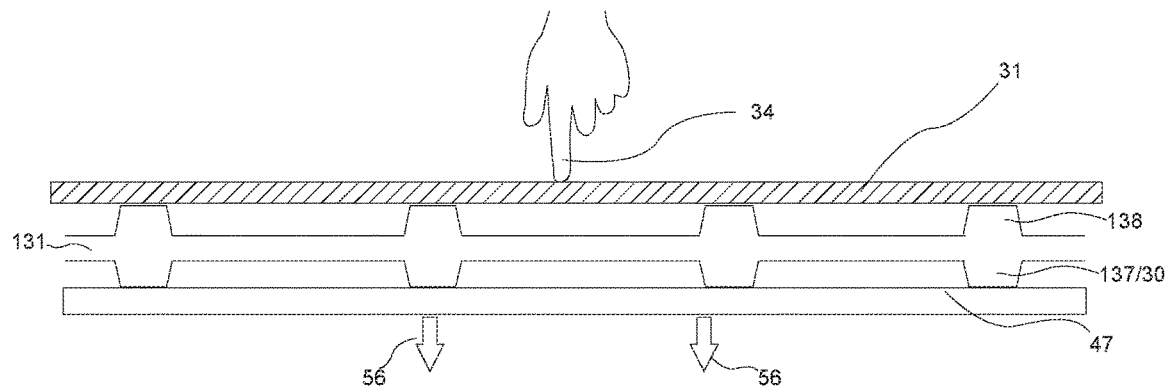

FIG. 146A shows an acceptably rigid semi-rigid touch layer in a mesh and double protrusion embodiment.

Figure 146B:
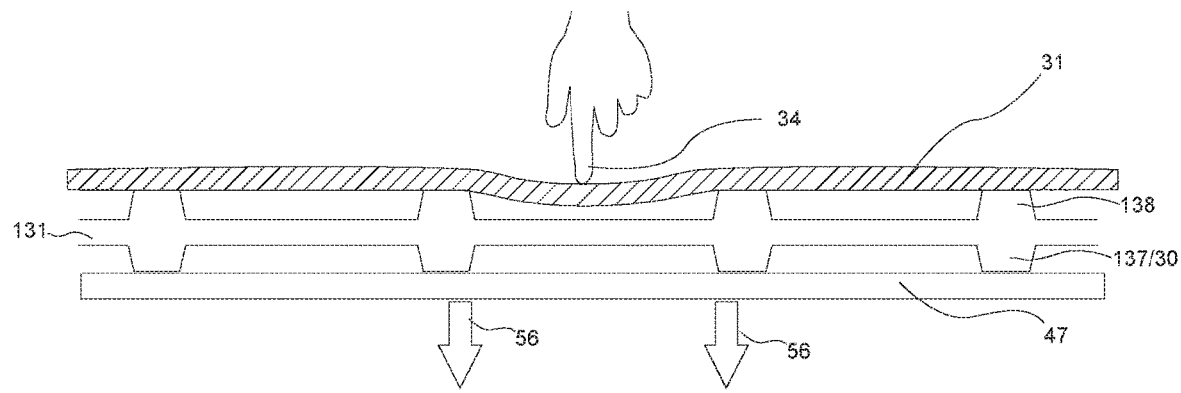

FIG. 146B shows an unacceptably deforming semi-rigid touch layer in a mesh and double protrusion embodiment.

Figure 146C:
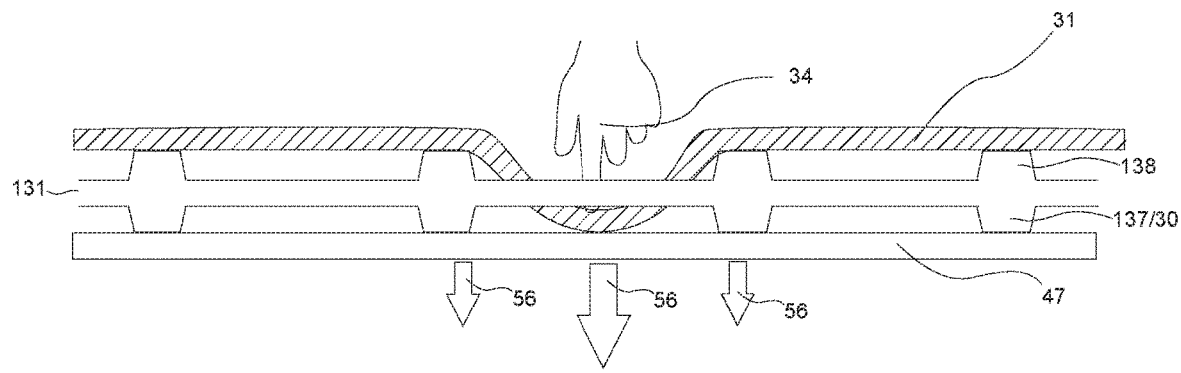

FIG. 146C shows an unacceptably deforming semi-rigid touch layer in a mesh and double protrusion embodiment.

Figure 147A:
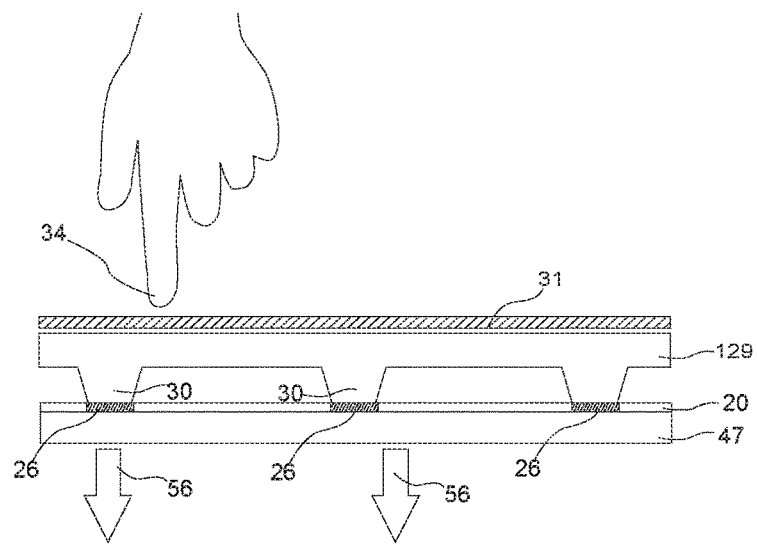

FIG. 147A shows a cross section of Force Distribution between protrusions with a Mesh and Single Protrusion Layer.

Figure 147B:
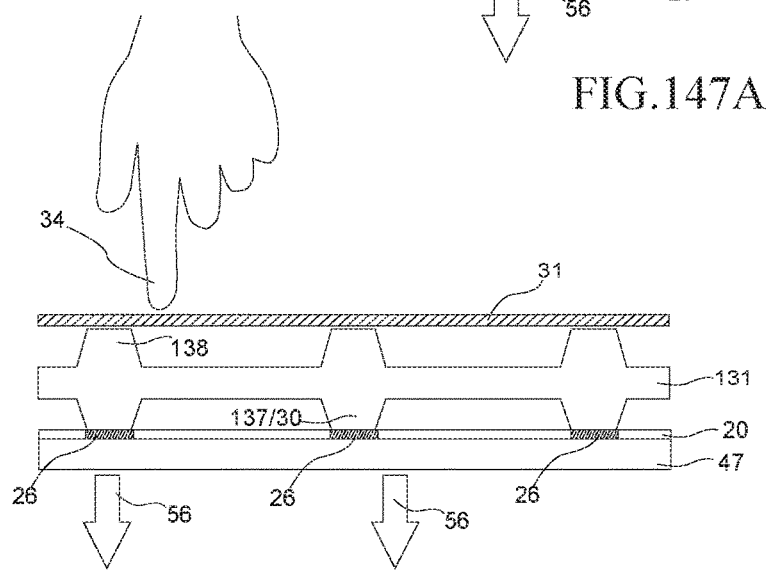

FIG. 147B shows a cross section of Force Distribution between protrusions with a Mesh and Double Protrusion Layer.

Figure 148:
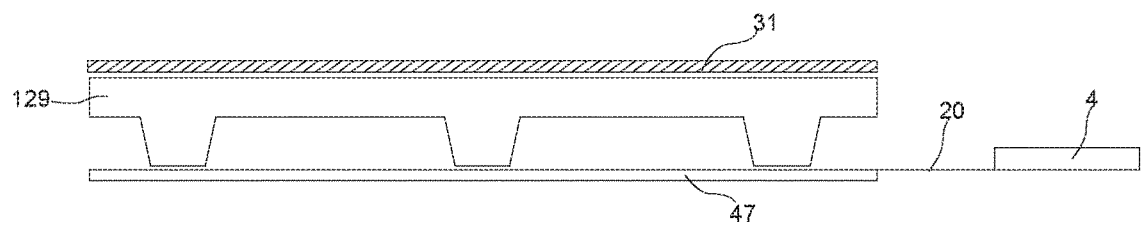
Figure 148:
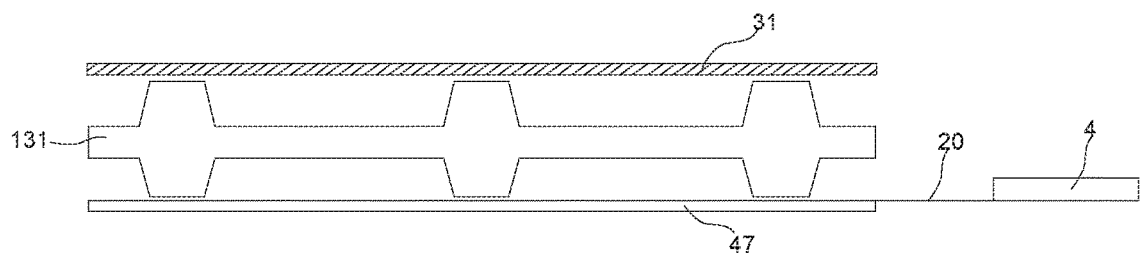

FIG. 148A shows an embodiment with the circuit board coplanar with the Active Sensing Array in the Mesh and Single Protrusion Embodiment.

FIG. 148B shows an embodiment with the circuit board coplanar with the Active Sensing Array in the Mesh and Double Protrusion Embodiment.

Figure 149A:
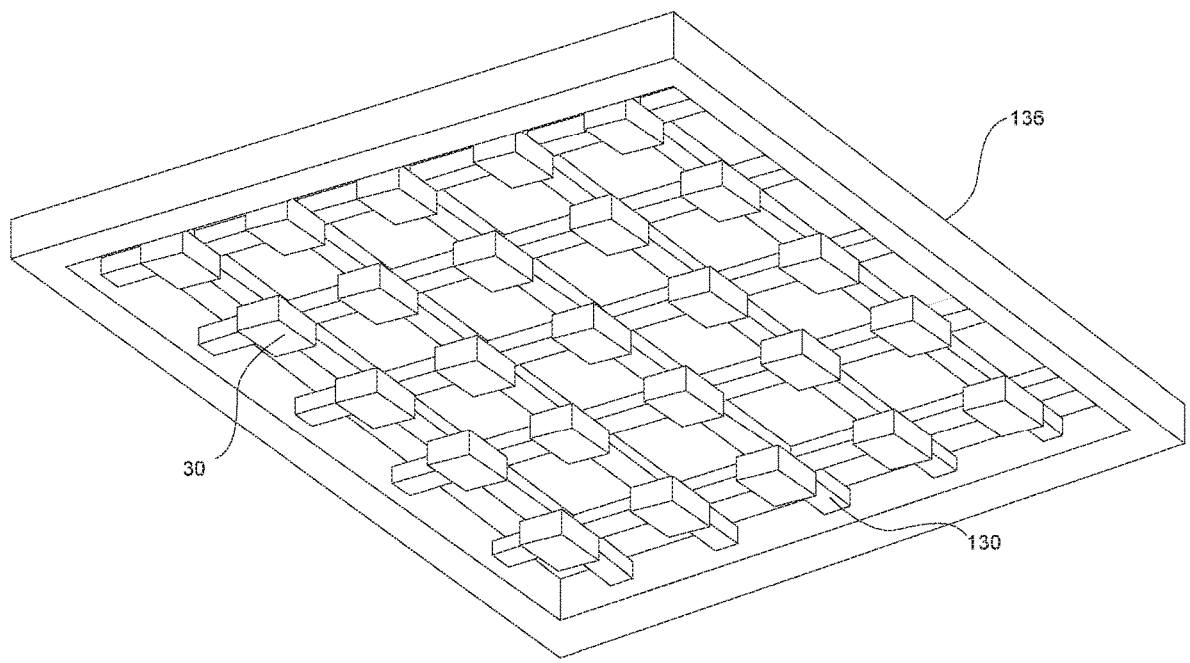

FIG. 149A shows an embodiment of a Mesh and Protrusion Layer with Bezel component.

Figure 149B:
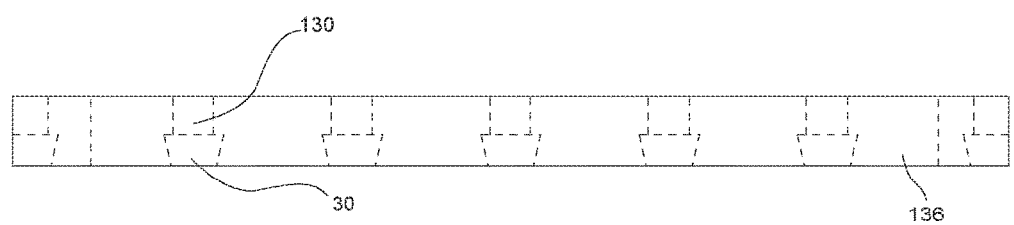

FIG. 149B shows a side view of an embodiment of a Mesh and Protrusion Layer with Bezel component.

Figure 150A:
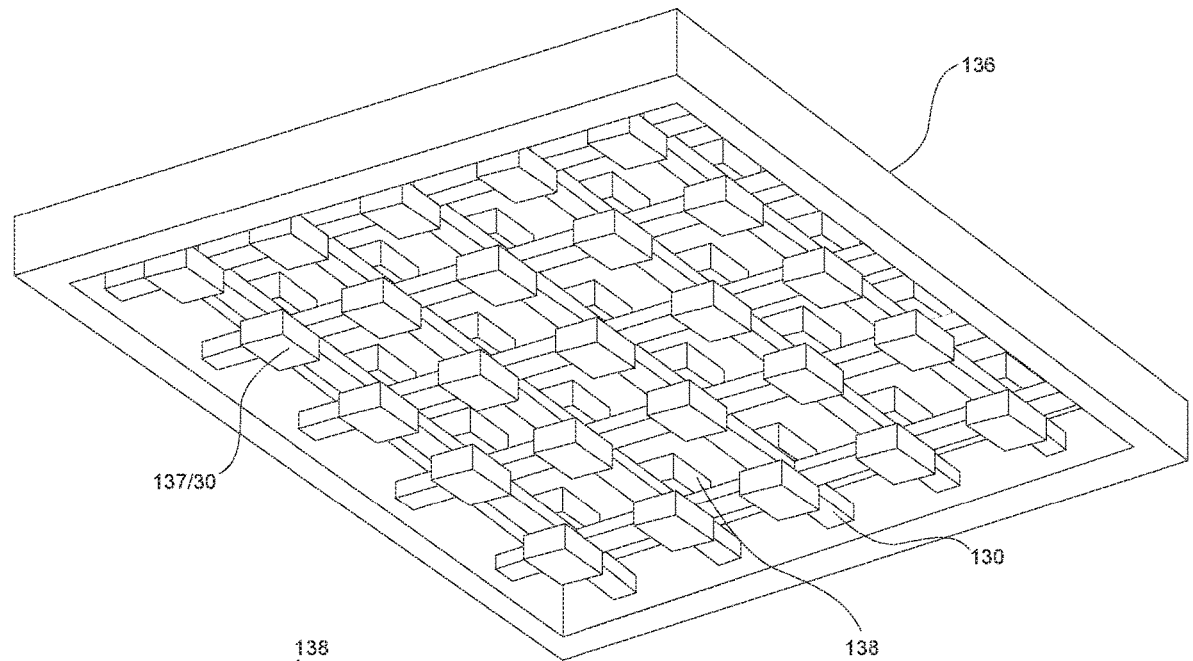

FIG. 150A shows an embodiment of a Mesh and Double Protrusion Layer with Bezel component.

FIG. 150A shows a side view of an embodiment of a Mesh and Double Protrusion Layer with Bezel component.

Figure 151:
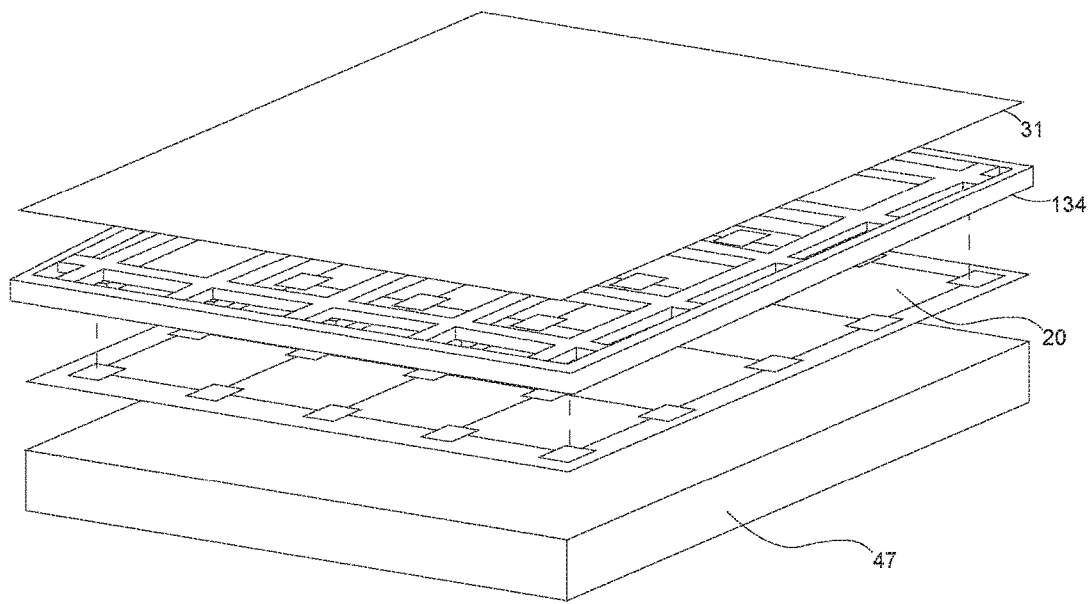

FIG. 151 shows a side view of a Tile for the Mesh with Single Protrusion with Bezel Component embodiment.

Figure 152:
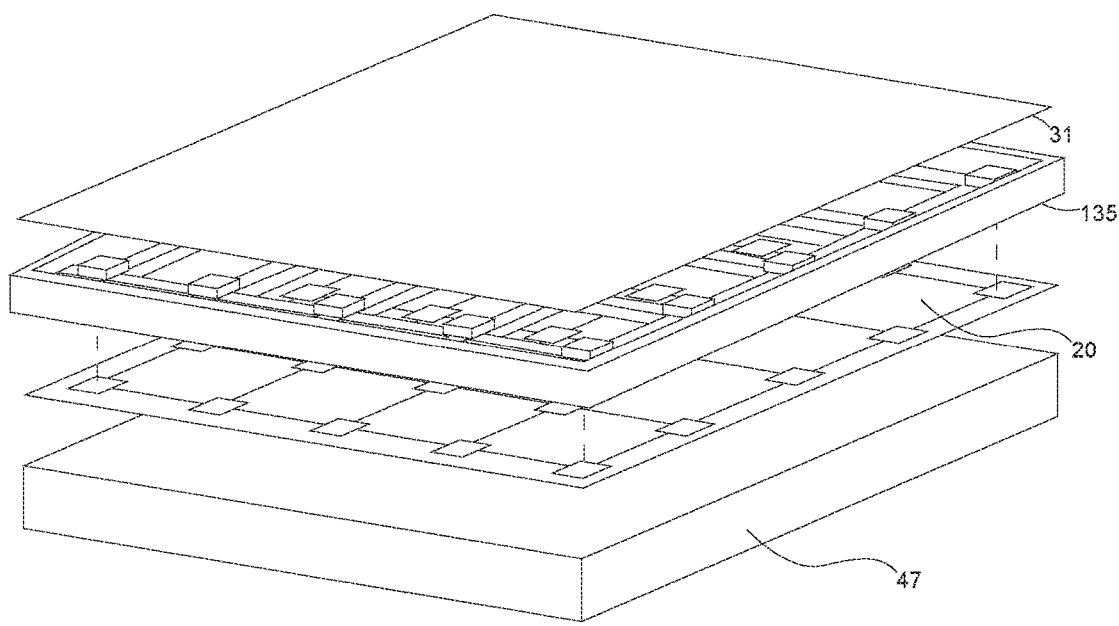

FIG. 152 shows an exploded view of a Tile for the Mesh with Double Protrusion with Bezel Component embodiment.

Figure 153:
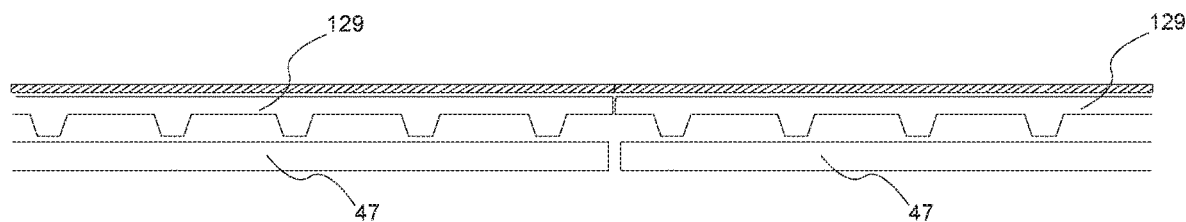

FIG. 153 shows a side view of two adjacent tiles in the Mesh and Single Protrusion embodiment.

FIG. 154 shows a perimeter mesh bar segment dimensions.

FIG. 155A shows side view of circuit board embedded in the base layer for the Mesh and Protrusion Layer Embodiment.

FIG. 155B shows bottom perspective view of circuit board embedded in the base layer for the Mesh and Protrusion Layer Embodiment.

Figure 156:
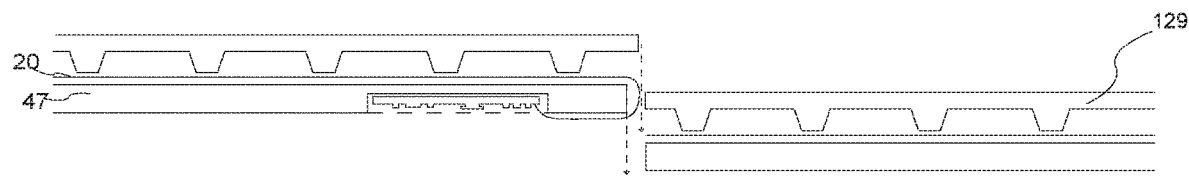
Figure 156:
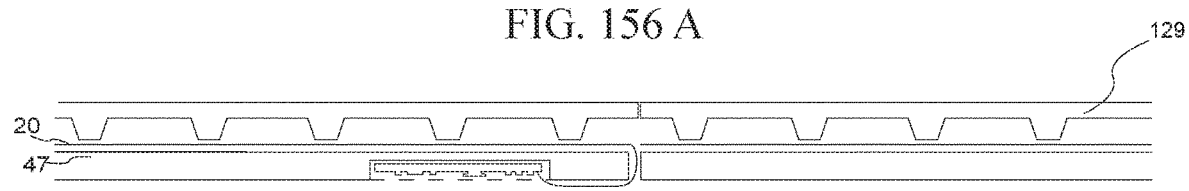
Figure 156:
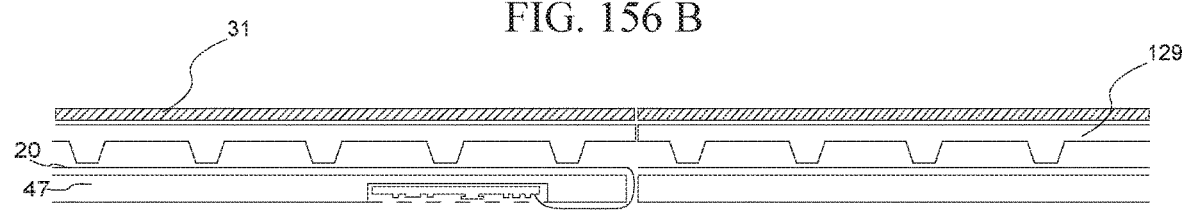

FIG. 156A shows the schematic of adjacent tile alignment of tiles and assembly of circuitry under the support layer in position for the Mesh and Protrusion Embodiment.

FIG. 156B shows the schematic of adjacent tile aligned tiles and assembly of circuitry under the support layer in position for the Mesh and Protrusion Embodiment.

FIG. 156C shows the schematic of the semi-rigid touch layer spanning multiple tiles after alignment in position for the Mesh and Protrusion Embodiment.

Figure 157:
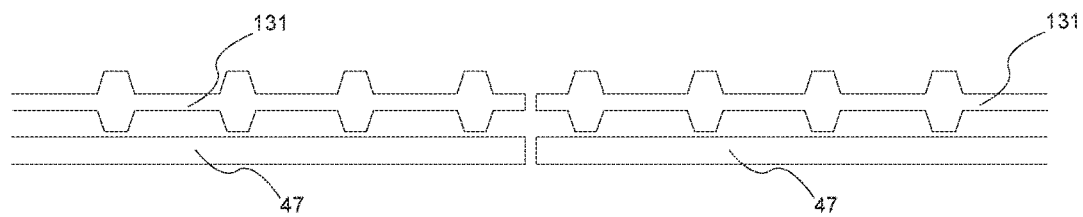

FIG. 157 shows a side view of two adjacent tiles in the Mesh and Double Protrusion embodiment.

Figure 158A:
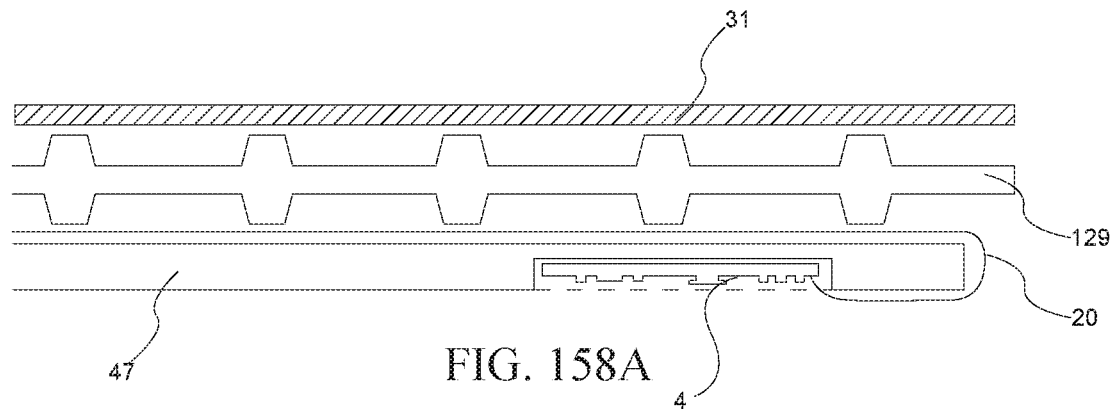

FIG. 158A shows a side view of circuit board embedded in the base layer for the Mesh and Double Protrusion Layer Embodiment.

Figure 158B:
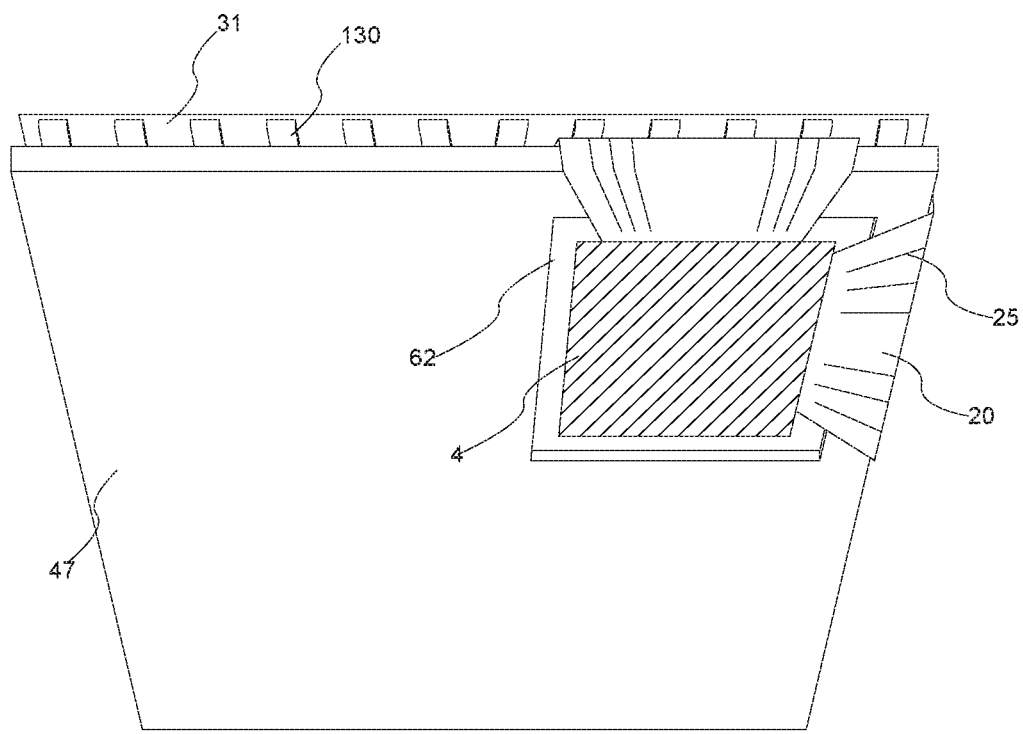

FIG. 158B shows a bottom perspective view of circuit board embedded in the base layer for the Mesh and Double Protrusion Layer Embodiment.

Figure 159:
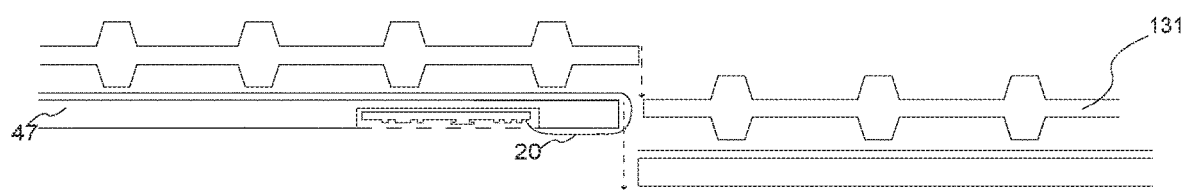
Figure 159:
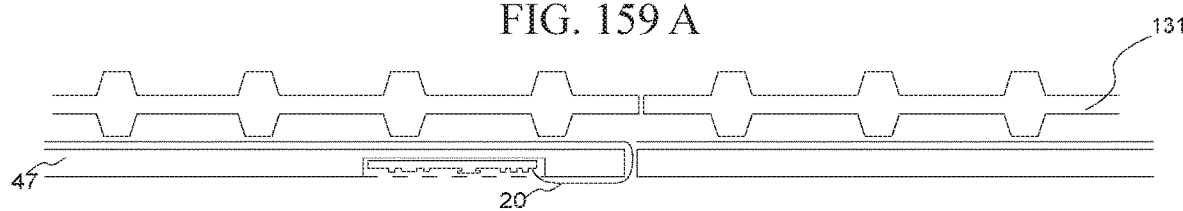
Figure 159:
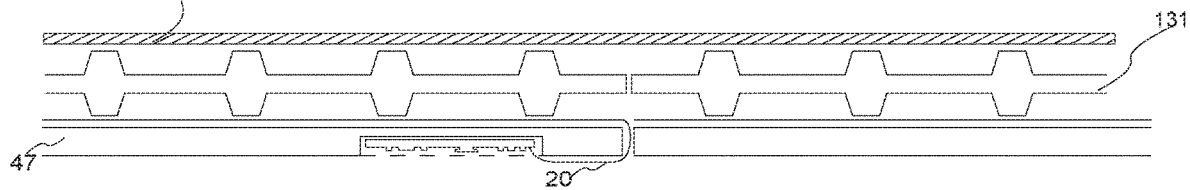

FIG. 159A shows the schematic of adjacent tile alignment of tiles and assembly of circuitry under the support layer in position for the Mesh and Double Protrusion Embodiment.

FIG. 1599B shows the schematic of adjacent tile aligned tiles and assembly of circuitry under the support layer in position for the Mesh and Double Protrusion Embodiment.

FIG. 159C shows the schematic of the semi-rigid touch layer spanning multiple tiles after alignment in position for the Mesh and Double Protrusion Embodiment.

DETAILED DESCRIPTION OF THE INVENTION

Figure 35:
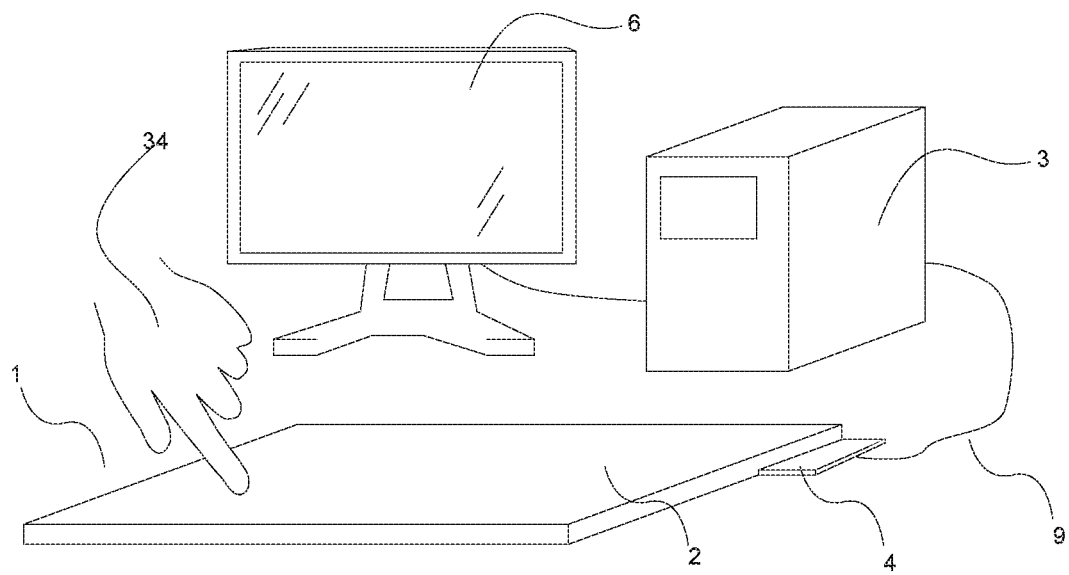
Figure 36:
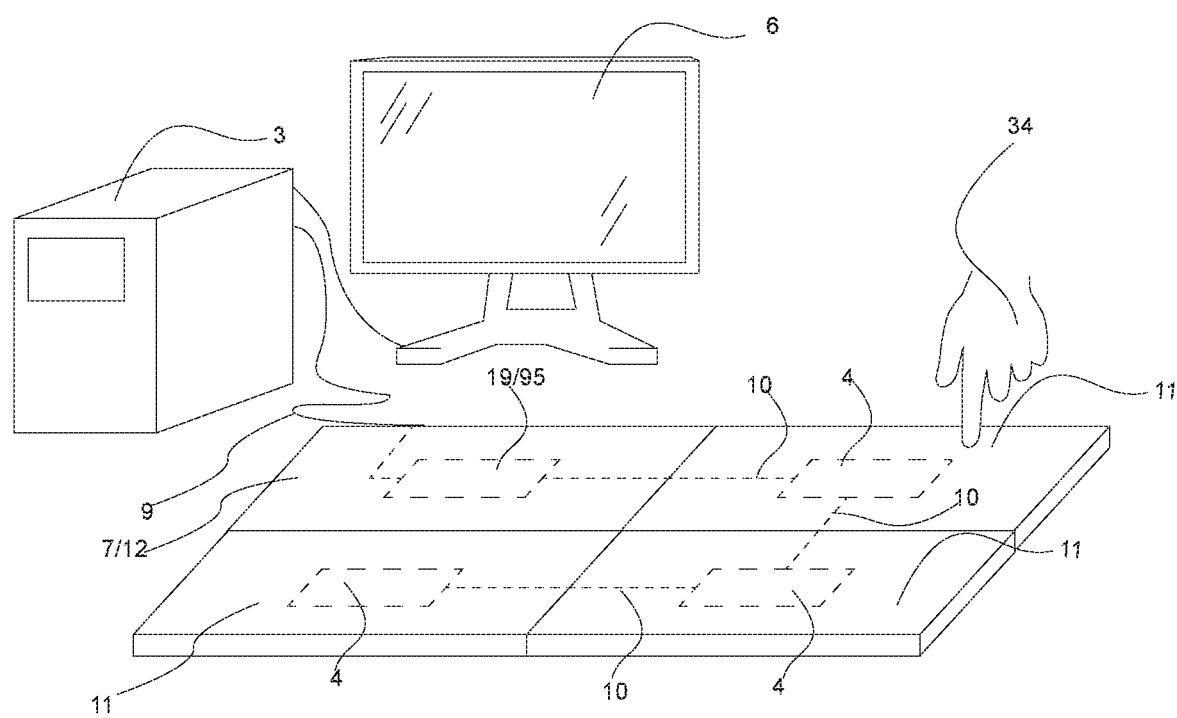

Referring now to the drawings wherein like reference numerals refer to similar or identical parts throughout the several views, and more specifically to FIGS. 35 and 36 thereof, there is shown an apparatus 1 for sensing. The apparatus 1 comprises a computer 3. The apparatus comprises two or more individual sensing tiles 2 in communication with the computer 3 that form a sensor surface that detects force applied to the surface and provides a signal corresponding to the force to the computer 3 which produces from the signal a time varying continuous image of force applied to the surface, where the surface is contiguous, detected force can be sensed in a manner that is geometrically continuous seamless on a surface.

Figure 50:
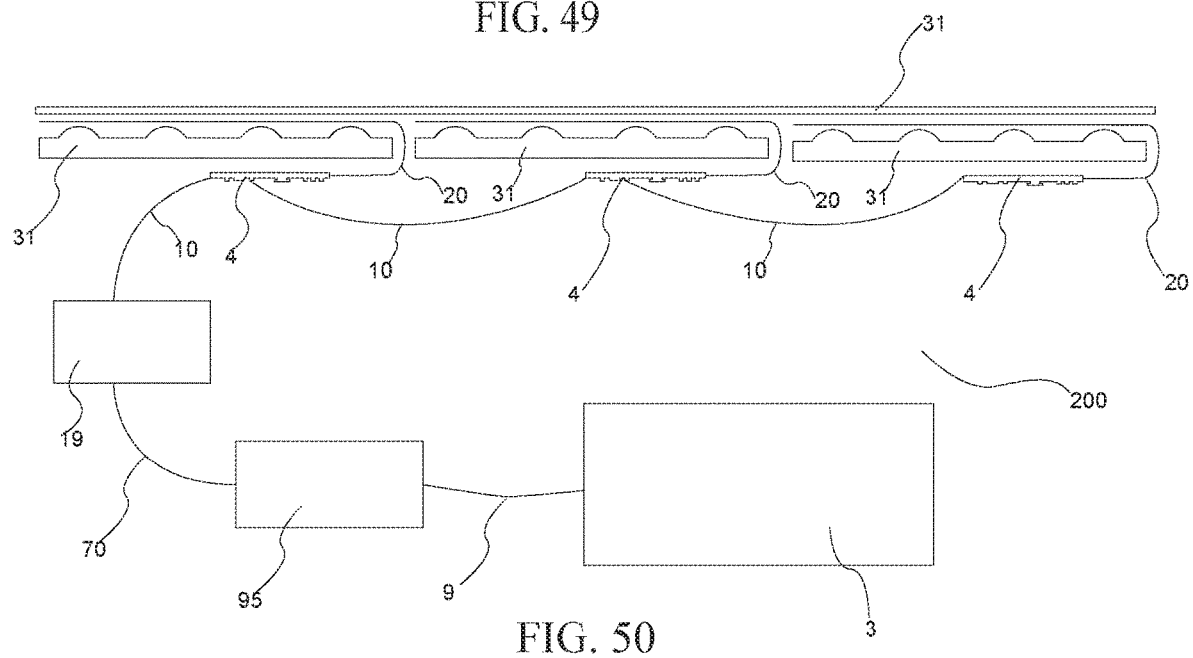
FIG. 50 shows multiple tiles with common touch layer.

The present invention pertains to a sensor 200, as shown in FIGS. 50-52. The sensor 200 comprises a grid 126 of wires 23 that define intersections and areas of space between the wires 23. The sensor comprises a set of protrusions 30 that are in contact with a plurality of intersections of the grid 126 of wires 23, and a mechanical layer that is disposed atop the set of protrusions 30, so that force imparted to the top of that mechanical layer is transmitted through the protrusions 30, and thence to the. The sensor comprises a computer 3 in communication with the grid 126 which causes prompting signals to be sent to the grid 126 and reconstructs a continuous position of force on the surface from interpolation based on data signals received from the grid 126.

The sensor 200 may include a force resistive material in proximity to a plurality of the intersections of the grid 126 of wires 23. The force resistive material may be disposed only in proximity to a plurality of the intersections of the grid 126 of wires 23 and in spaced relationship.

The present invention pertains to a sensor. The sensor comprises a computer 3 having N dual analog/digital I/O pins and M digital I/O pins for data, where M is less than N and M and N are positive integers greater than three. The sensor comprises a pressure sensing array having N rows and M columns, with the N I/O pins in communication with the N rows and up to M columns in communication with the M I/O pins without using any transistors or other switchable electronic components outside of the computer 3.

The present invention pertains to a method for determining locations of tiles 2 of a sensor. The method comprises the steps of sending a query signal from a computer 3 to at least a plurality of the tiles 2 in communication with the computer 3 asking each of the plurality of tiles 2 to identify at least one adjacent tile 2 that the tile 2 is in electrical communication. There is the step of receiving by the computer 3 responses to the query from the plurality of tiles 2. There is the step of forming with the computer 3 from the responses a geometric map of the tiles' locations relative to each other.

The present invention pertains to a method for sensing. The method comprises the steps of detecting a force applied to a sensor surface formed of two or more individual sensing tiles 2 from an object moving across the surface is contiguous, detected force can be sensed in a manner that is geometrically continuous and seamless on a surface. There is the step of providing a signal corresponding to the force to a computer 3 from the tiles 2 in communication with the computer 3. There is the step of producing with the computer 3 from the signal a time varying continuous image of force applied to the surface. There may be the step of connecting an additional tile 2 to at least one of the two tiles 2 to expand the size of the sensor surface, where the surface includes the additional tile 2 and is contiguous, detected force can be sensed in a manner that is geometrically continuous and seamless on a surface.

The present invention pertains to a method for sensing. The method comprises the steps of imparting a force to a top of a mechanical layer that is transmitted through t intersections defined by a grid 126 of wires 23 having areas of space between the wires 23. There is the steep of causing prompting signals with a computer 3 in communication with the grid 126 to be sent to the grid 126. There is the step of reconstructing with the computer 3 a continuous position of the force on the surface from interpolation based on data signals received from the grid 126.

The computer pertains to a sensor 200. The sensor comprises a grid 126 of wires 23 that define intersections and areas of space between the wires 23. The sensor comprises a set of protrusions 30 that engage with a plurality of intersections of the grid 126 of wires 23, and an outer surface layer having an inner face that is in juxtaposition with the set of protrusions 30 and an outer face, so that force imparted to the outer face of the outer surface layer is transmitted through the inner face of the outer surface layer to the protrusions 30 and the plurality of intersections. The sensor comprises a computer 3 in communication with the grid 126 which causes prompting signals to be sent to the grid 126 and reconstructs an antialiased image of force upon the outer face of the outer surface layer from interpolation based on data signals received from the grid 126.

The outer surface layer may be a mechanical layer, and the set of protrusions 30 are disposed between the grid 126 of wires 23 and the mechanical layer. The grid 126 of wires 23 may be disposed between the set of protrusions 30 and the outer surface layer.

The present invention pertains to a method for sensing. The method comprises the steps of imparting a force to an outer face of an outer surface layer that is transmitted through an inner face of the outer surface layer to a set of protrusions 30 and a plurality of intersections defined by a grid 126 of wires 23 having areas of space between the wires 23. There is the step of causing prompting signals with a computer 3 in communication with the grid 126 to be sent to the grid 126. There is the step of reconstructing with the computer 3 at an antialiased image of the force on the outer face of the outer surface from interpolation based on data signals received from the grid 126.

The present invention pertains to a sensor 200. The sensor comprises a grid 126 of wires 23 that define intersections and areas of space between the wires 23. The sensor comprises a set of protrusions 30 that are in contact with a plurality of intersections of the grid 126 of wires 23, and an outer surface layer having an inner face that is disposed in contact with the grid 126 of wires 23 and an outer face, so that force imparted onto the outer face of the outer surface layer is transmitted through the inner face of the outer surface layer to the protrusions 30, and thence to the intersections of the grid 126 wires 23 which are thereby compressed between the outer surface layer and protrusions 30; and that the protrusions 30 thereby focus the imparted force directly onto the intersections. The sensor comprises a computer 3 in communication with the grid 126 which causes prompting signals to be sent to the grid 126 and reconstructs an antialiased image of force upon the outer face of outer surface layer from interpolation based on data signals received from the grid 126.

The present invention pertains to a sensor 200. The sensor comprises a grid 126 of wires 23 that define intersections and areas of space between the wires 23. The sensor comprises a set of protrusions 30 that are in contact with a plurality of intersections of the grid 126 of wires 23, and a mechanical layer having a plurality of plates 35 that is disposed atop the grid 126 of wires 23, so that force imparted to the top of the mechanical layer is transmitted through the intersections, and thence to the protrusions. The sensor comprises a computer 3 in communication with the grid 126 which causes prompting signals to be sent to the grid 126 and reconstructs a continuous position of force on the surface from interpolation based on data signals received from the grid 126.

The mechanical layer may include a flexible touch layer disposed on the plurality of plates 35. Each plate 35 may have corners 125 that are aligned over a corresponding protrusions 30 outer face.

The present invention pertains to a sensor 200. The sensor comprises a grid 126 of wires 23 that define intersections and areas of space between the wires 23. The sensor comprises a set of protrusions 30 that are in contact with a plurality of intersections of the grid 126 of wires 23. The sensor comprises a plate layer having a plurality of plates 35 that is disposed atop the grid 126 of wires 23. The sensor comprises a flexible touch layer disposed on the plate layer, wherein force imparted to the touch layer is transmitted through the plate layer and at least one protrusion to the intersections. The sensor comprises a computer 3 in communication with the grid 126 which causes prompting signals to be sent to the grid 126 and reconstructs a continuous position of force on the surface from interpolation based on data signals received from the grid 126.

The present invention pertains to a sensor 200. The sensor comprises a grid 126 of wires 23 that define intersections and areas of space between the wires 23. The sensor comprises a set of protrusions 30 that are in contact with a plurality of intersections of the grid 126 of wires 23. The sensor comprises a plate layer having a plurality of plates 35 that is disposed atop the grid 126 of wires 23. The sensor comprises a flexible touch layer disposed on the plate layer, wherein force imparted to the touch layer is transmitted through the plate layer to the intersections layer, and thence to the protrusions 30. The sensor comprises a computer 3 in communication with the grid 126 which causes prompting signals to be sent to the grid 126 and reconstructs a continuous position of force on the surface from interpolation based on data signals received from the grid 126.

The present invention pertains to a sensor 200. The sensor comprises a set of plates 35 that are in contact from the bottom at their corners 125 with a set of protrusions 30 that are in contact from above with a plurality of intersections, each having a sensing element, of the grid 126 of wires 23, and a thin top surface layer 127 that is disposed atop the grid 126 of plates 35, so that force imparted from above onto the top surface layer 127 is transmitted to the plates 35 and thence to the protrusions 30, and thence to the intersections of the grid 126 wires 23 which are thereby compressed between the base 47 and protrusions 30; and that the protrusions 30 above thereby focus the imparted force directly onto the sensor intersections, as shown in FIG. 52. The sensor comprises a computer 3 in communication with the sensor grid 126 which causes prompting signals to be sent to the grid 126 and reconstructs a continuous position of force on the surface from interpolation based on data signals received from the grid 126.

Each sensing element may include FSR 24. When force is imparted to the surface layer, each protrusion may be aligned to e in contact with a corresponding sensing element 26. The sensor may include adhesive 40 disposed between the surface layer and the set of plates 35, and between the protrusions 30 and the grid 126, and between the grid 126 and the base 47.

Each plate 35 may be positioned such that its corners 125 are aligned inside of the adjacent sensing elements 26. The plates 35 may be specially aligned such that there is a gap between the plates 35, and that a center of the gap between the corners 125 of the plates 35 is aligned to correspond with a sensing element 26. Each protrusion may be a rigid bump of plastic, metal, wood or glass and focuses force onto the corresponding sensing element 26, each protrusion having a shape whose contact with the corresponding sensing element 26 lies exactly upon or inside of the corresponding sensing element 26. The protrusions 30 may continue through the gap between the plates 35 to be flush with the plates 35. The protrusions 30 may emanate from vertices of the plates 35 with the plates 35.

In regard to the surface layer in contact with the set of plates 35, and the protrusions 30 in contact with the grid 126, and the grid 126 in contact with the base 47, it is understood that in contact also includes the situation when adhesive 40 is between the surface layer and the set of plates 35, and adhesive 40 is between the protrusions 30 and the grid 126, and adhesive 40 is between the grid 126 and the base 47.

The present invention pertains to a method for sensing. The method comprises the steps of imparting force from above onto a stop surface layer 127 that is transmitted to a set of plates 35 and thence to a set of protrusions 30, and thence to a plurality intersections of a grid 126 of wires 23 which are thereby compressed between the base 47 and protrusions 30, wherein the set of plates 35 are in contact from their bottom at their corners 125 with the set of protrusions 30 that are in contact from above with the plurality of intersections of the grid 126 of wires 23 disposed on the base 47; and that the protrusions 30 above thereby focus the imparted force directly onto the intersections. There is the step of causing prompting signals by a computer 3 in communication with the grid 126 to be sent to the grid 126. There is the step of reconstructing with the computer 3 a continuous position of force on the surface from interpolation based on data signals received from the grid 126.

The present invention pertains to a sensor 200. The sensor comprises a set of protrusions 30 that are in contact from the bottom with a plurality of intersections of the grid 126 of wires 23, and a set of plates 35 that are in contact from the top with a plurality of intersections of the grid 126 of wires 23, and a thin top surface layer 127 that is disposed atop the set of plates 35, so that force imparted from above onto the top surface layer 127 is transmitted to the plates 35, and thence to the intersections of the grid 126 wires 23, and thence the protrusions 30, which are thereby compressed between the plates 35 and protrusions 30; and that the protrusions 30 underneath thereby focus the imparted force directly onto the sensor intersections. The sensor comprises a computer 3 in communication with the sensor grid 126 which causes prompting signals to be sent to the grid 126 and reconstructs a continuous position of force on the surface from interpolation based on data signals received from the grid 126.

There may be the step of imparting force to a top of a mechanical layer that is transmitted through at least one intersection of a plurality of intersections, and thence to at least one protrusion of a set of protrusions 30 in contact with at least one of the intersections, where the intersections are defined by a grid 126 of wires 23 and areas of space between the wires 23, and the mechanical layer has a plurality of plates 35 that are disposed atop the grid 126 of wires 23.

There may be the step of imparting force to a top of a mechanical layer that is transmitted through at least one protrusion of a set of protrusions 30 to at least one intersection of a plurality of intersections, where the intersections are defined by a grid 126 of wires 23 and areas of space between the wires 23, and the mechanical layer has a plurality of plates 35 that are disposed atop the grid 126 of wires 23.

The present invention pertains to an apparatus 104 for inputting information into a computer 3, as shown in FIGS. 122-129. The apparatus comprises a 3d sensor that senses 3d information and produces a 3d output. The apparatus comprises a 2d sensor that senses 2d information and produces a 2d output. The apparatus comprises a processing unit which receives the 2d and 3d output and produces a combined output that is a function of the 2d and 3d output.

Objects may be identified and tracked in 3D and 2D by the 3D and 2D sensors. Fingers, hands, feet, people, pens or other objects may be identified and tracked in 3D and 2D. The apparatus may include a memory and wherein the identity of each object is maintained over time. The identity of objects from the 3D sensor may be paired with objects from the 2D sensor by the processing unit. The 2D sensor has a surface and the 2D sensor may sense contact on the surface. The 2D sensor may sense imposed force on the surface. The 2D sensor may include a pressure imaging sensor. The 3D sensor may include a range imaging camera. The 3D sensor may include an IR depth camera. The 3D sensor may include an RGB camera. The apparatus may include a display upon which the combined output is displayed.

The present invention pertains to a method for inputting information into a computer 3. The method comprises the steps of producing a 3d output with a 3d sensor that senses 3d information. There is the step of producing a 2d output with a 2d sensor that senses 2d information. There is the step of receiving the 2d and 3d output at a processing unit. There is the step of producing a combined output with the processing unit that is a function of the 2d and 3d output.

There may be the step of identifying and tracking objects in 3D and 2D by the 3D and 2D sensors. There may be the step of identifying and tracking fingers, hands, feet, people, pens or other objects in 3D and 2D. There may be the step of maintaining in a memory the identity of each object over time. There may be the step of pairing with the processing unit the identity of objects from the 3D sensor with objects from the 2D sensor. There may be the step of the 2D sensor senses contact on its surface. There may be the step of the 2D sensor senses imposed force on its surface. The 2D sensor may include a pressure imaging sensor. The 3D sensor includes a range imaging camera. There may be the step of displaying on a display the combined output.

The grid of conductive wires 126 is comprised of the conductive trace lines 23 on the outer and inner surface sheets 21. An intersection of the grid of wires 128 is the location where two conductive trace lines 23 meet. The intersection is also where the FSR material 24 is located. The flexible touch layer 38 constitutes a top surface layer 127 for the pressure imaging apparatus 1 in the embodiments utilizing plates 35 and protrusions 30.

The following is a description in regard to the operation of the invention.

Figure 1:
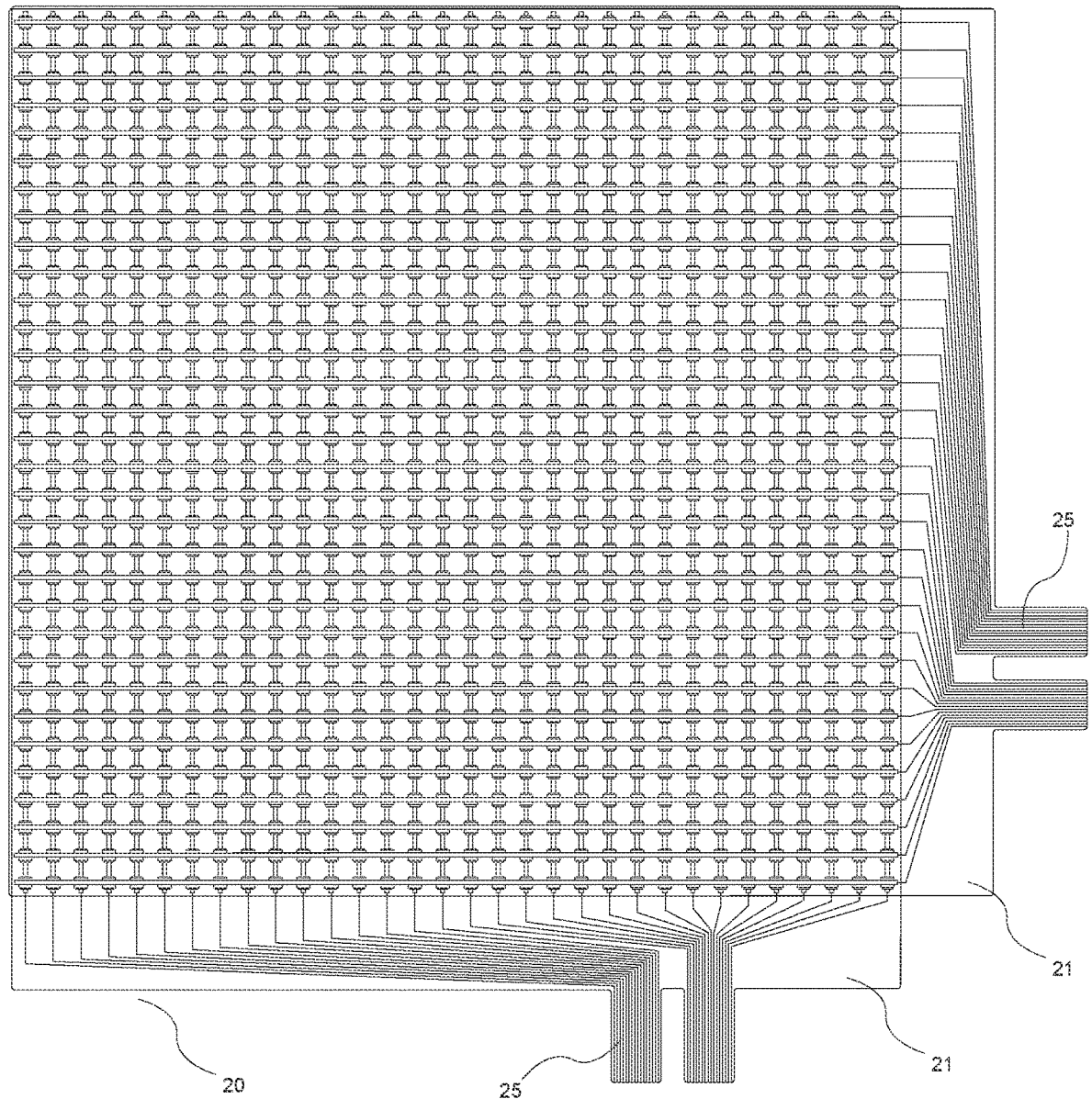
Figure 2:
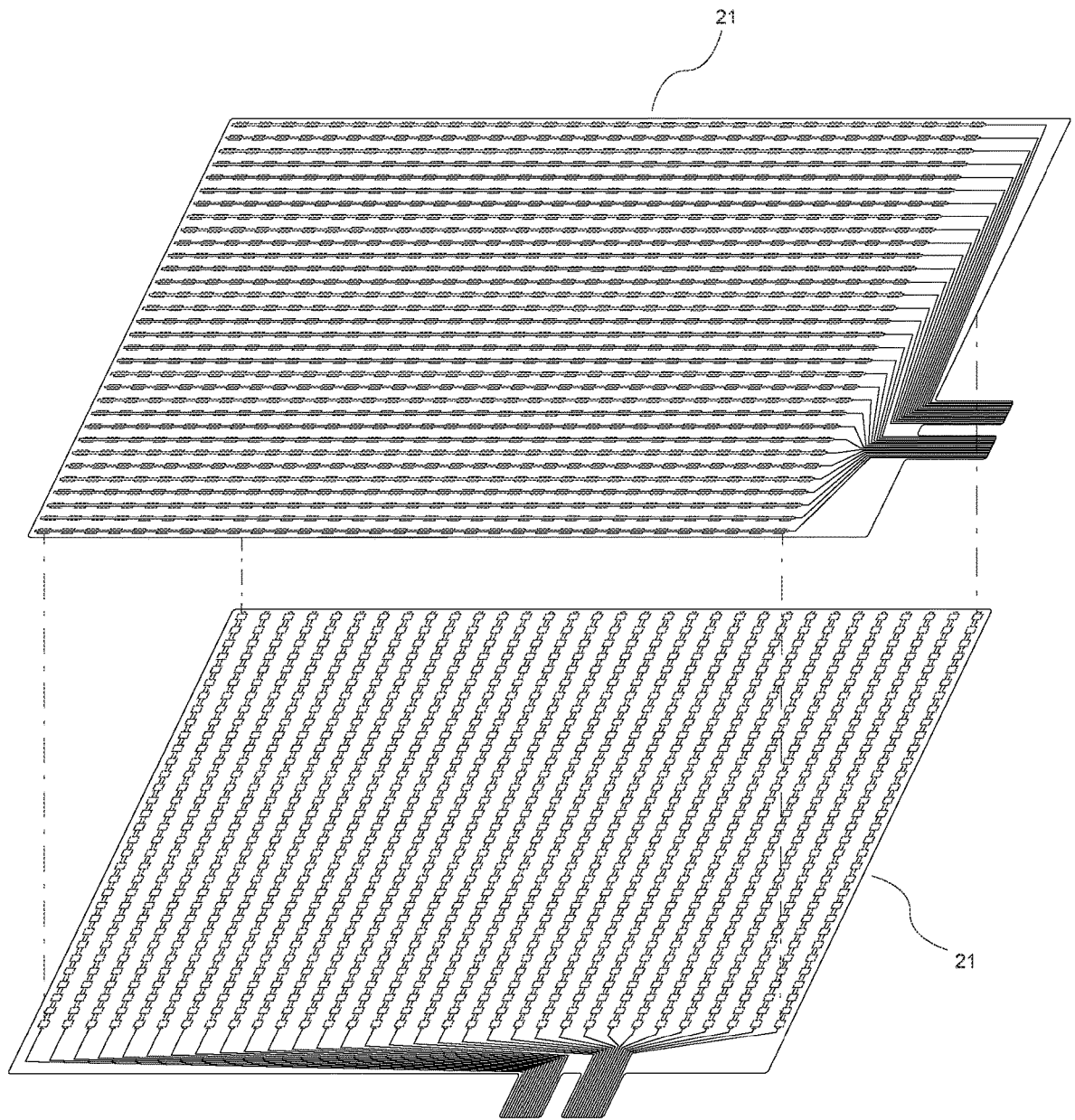
Figure 3:
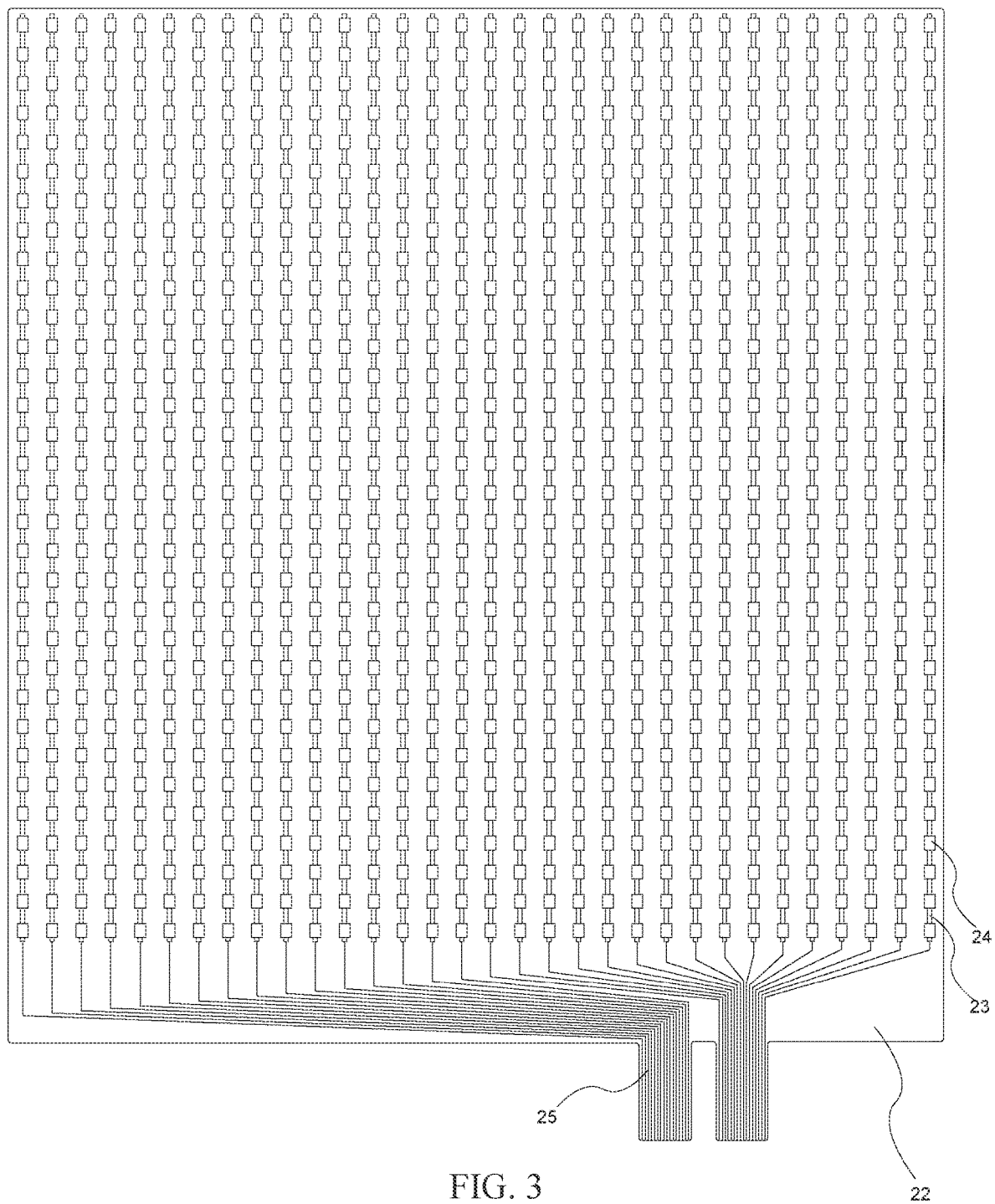

A List of Hardware Components:

Active Sensing Array: The Active Sensing Array 20 as seen in FIG. 1 consists of two Sensor Surface Sheets 21 facing each other, with one rotated 90° with respect to the other, as seen in FIG. 2. Each of the two Sensor Surface Sheets 21 consists of the Non-Conductive Surface Substrate 22 with printed Conductive Trace Lines 23 with small amounts of Force Sensitive Resistive (FSR) material 24 printed over them, as seen in FIG. 3 and in an exploded view in FIG. 4, at intervals such that when the two Surface Sheets 21 are placed into mutual contact, with the inked sides facing each other, the FSR 24 material is place in the vicinity of the intersections of the grid of Conductive Trace Line 23 as seen in FIG. 1, but is not required at other locations of the sensor surface.

Figure 38:
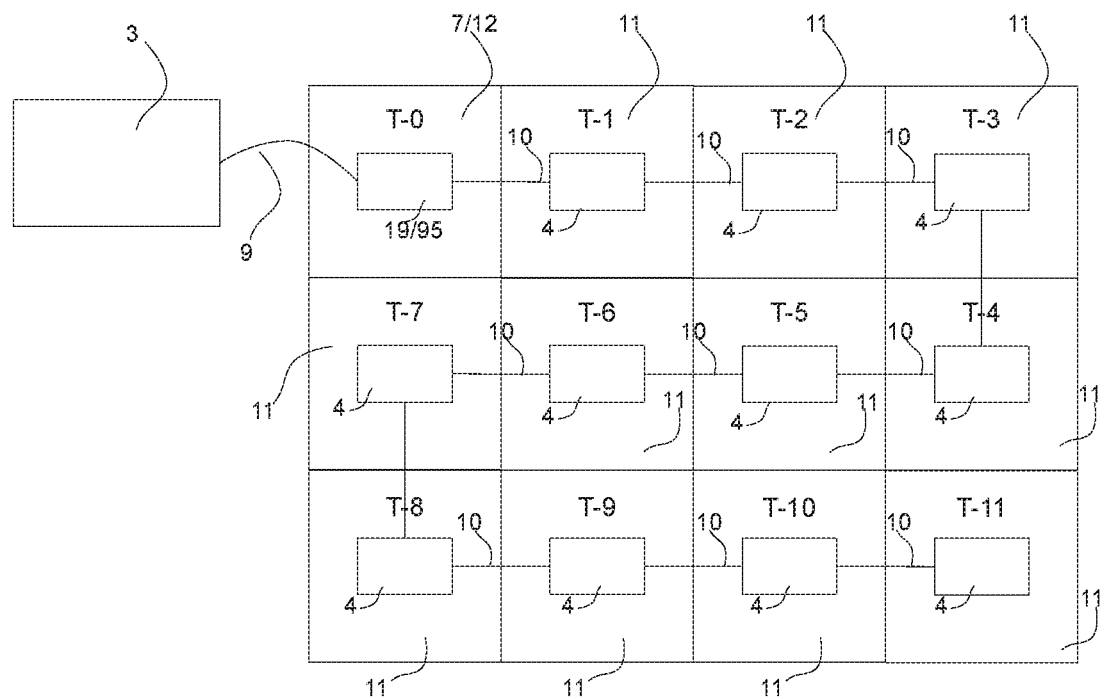

A Description Explaining how the Tiles 2 are Connected Together:

The sensor tiles 2 are connected together by wiring and a physical linking device in an apparatus 1 containing a plurality of adjacent tiles as shown in schematic in FIG. 38.

Wiring between tiles is used for the system protocol communication and in identify local tile neighbors. The protocol wiring depends on topology of the protocol used in the system. In one implementation, the tiles are connected together by an I²C hub. In this system, the wiring starts at the master and reaches each sensor in the grid. To detect the local neighbors of each sensor, wires 23 are passed from one sensor tile to its neighbors.

Figure 41:
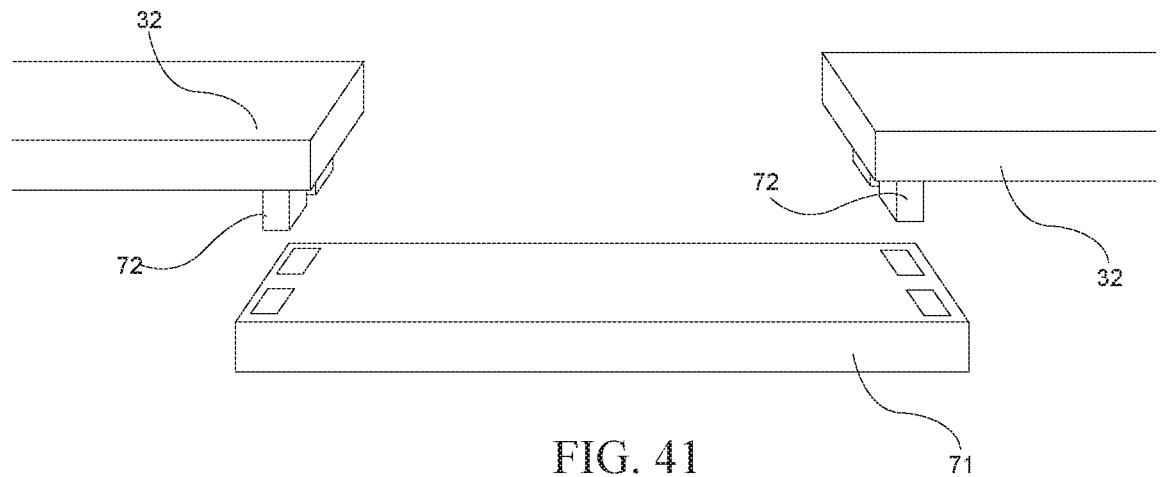
Figure 42:
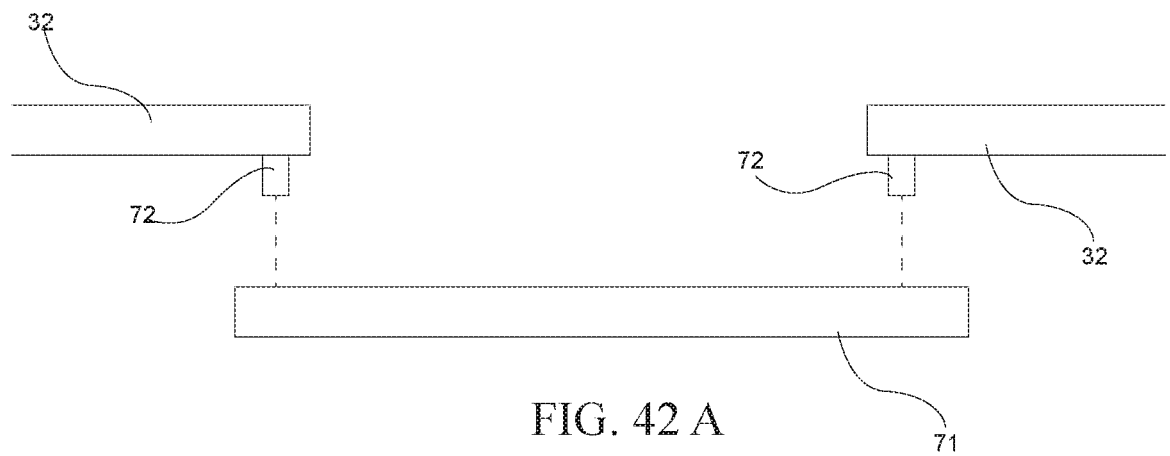
FIG. 42A shows side view of alignment of inter-tile alignment connectors.
FIG. 42B shows side view of inter-tile alignment connectors in position.
Figure 42:
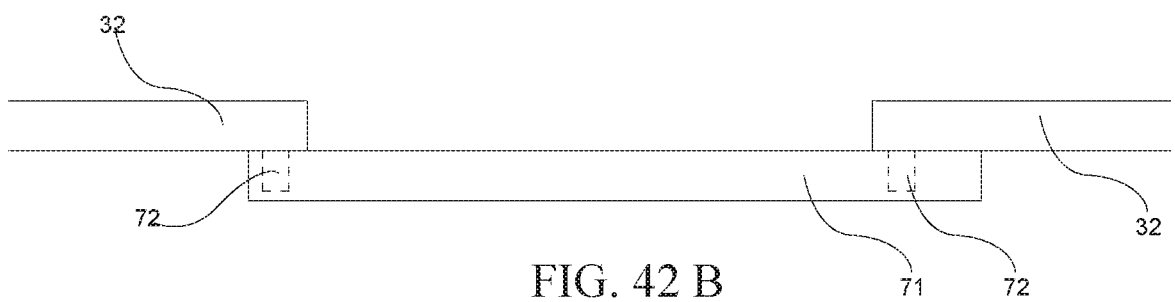

In addition to wiring, a physical connector is used to link adjacent tiles. The appearance of this connector depends on the desired use of the system. In one implementation, as seen in FIG. 41, FIG. 42A and FIG. 42B, a plastic connector 71, which has holes located at key positions, is placed between adjacent tiles 2. The holes on the connector 71 line up with tabs 72 on the base support layer 32 of each tile 2. The connector can then slide onto the two adjacent devices and provides additional support to the grid.

FIG. 41 shows an exploded view of the base layer 32 with tabs 72 and the connector 71; FIG. 42A shows proper alignment of tabs 72 into connector 71; FIG. 42B shows proper position of tabs 72 and connector 71 for two adjacent tiles.

Figure 15:
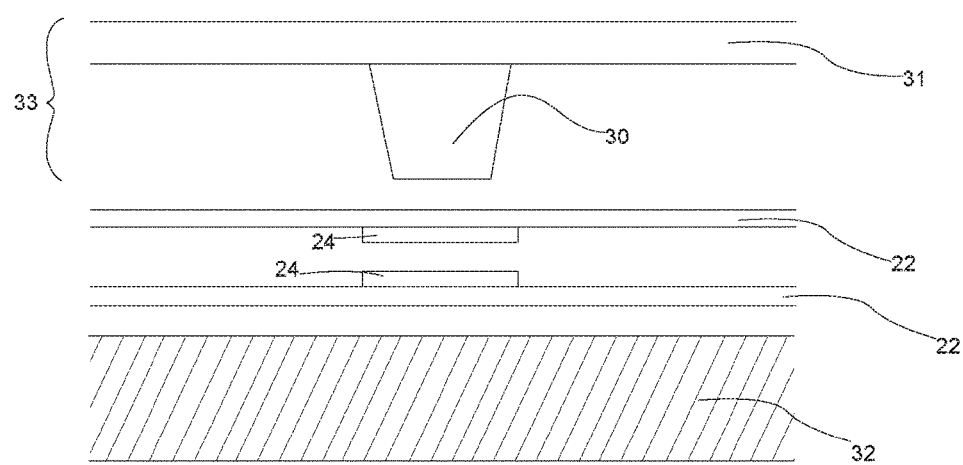

How Each Layer in the Profile View is Made, how the Overall Profile is Made, and the Purpose of Each Layer:

How Each Layer is Made:

The semi-rigid touch Layer 31 and the protrusions 30 as seen in FIG. 15, can be a single mechanical component, which can be made of plastic, glass, wood, metal, or any other semi-rigid material. This component can be manufactured by a variety of standard methods, including injection molding, stamping, and cold casting.

Figure 12:
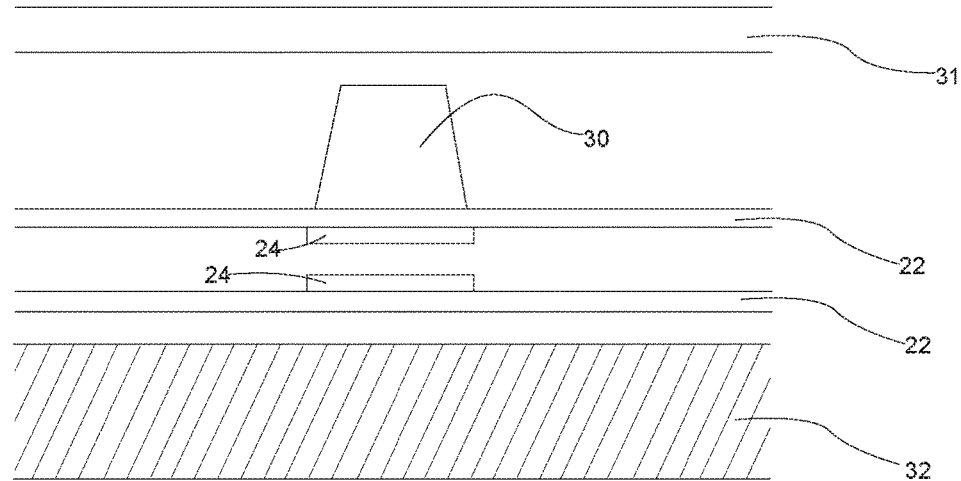

In an alternate embodiment, as seen in FIG. 12, the protrusions 30 can be rigidly affixed to surface substrate 22 of the outer sensor surface sheet 21 at the corresponding sensing element locations. One method for doing this by cold casting: In one method of manufacture, a mold, which can consist of silicone rubber, that contains regularly spaced holes, is placed atop the outer side of surface substrate 22, and a resin is poured into these holes. When the resin hardens, the mold is removed, and the resin forms regularly spaced bumps upon the top surface of the surface substrate 22. In this embodiment, touch layer 31 is simply a semi-rigid sheet, which can be made of plastic, glass, wood or metal, or any other semi-rigid material. One advantage of this alternate embodiment is that it ensures that the protrusions 30 remain correctly aligned with the FSR material 24 corresponding to the active area of each sensing element 27 during operation of the sensor. Such a construction constitutes an active sensing array with attached protrusions 55.

How the Overall Profile is Made:

The overall profile is made by assembling the component layers during the manufacturing process.

For clarity, 'Outer' or 'Outer Surface' of a component, is designated to signify the side/direction of the device from which the external force is being applied, such as a user touching the surface. 'Inner' or 'Inner Surface' is designated to be the opposite direction of Outer.

The purpose of each layer from Outer to Inner, as seen as a sensor cross section in FIG. 12, where outer to inner in this case is from the top of the page downward.

Figure 11:
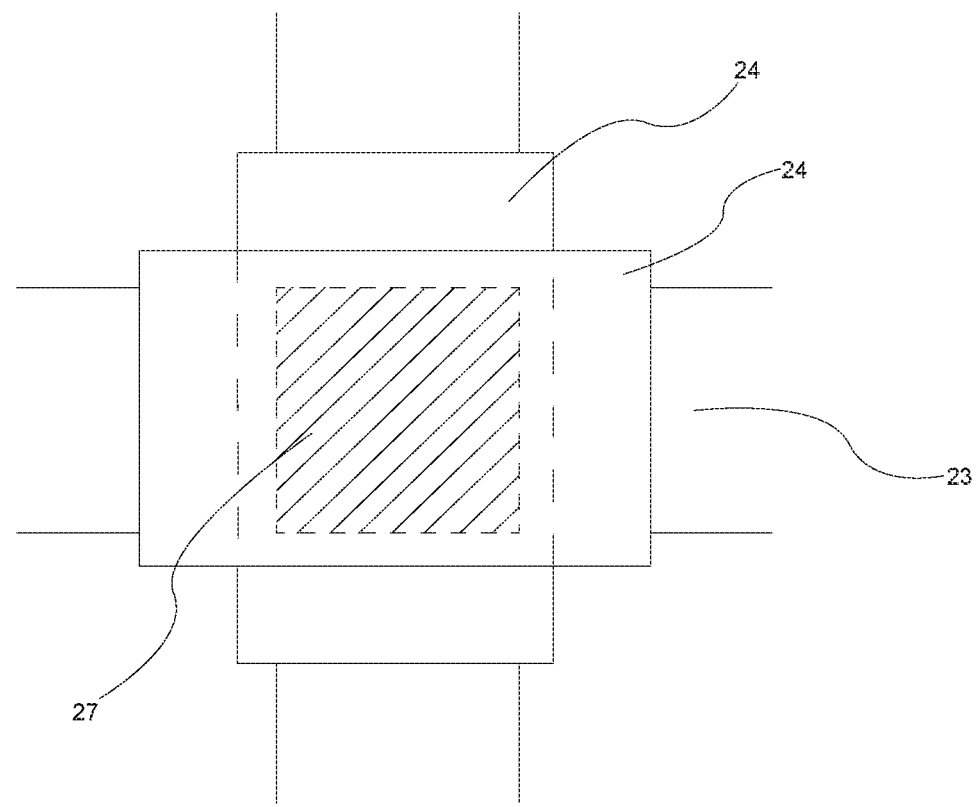
Figure 13:
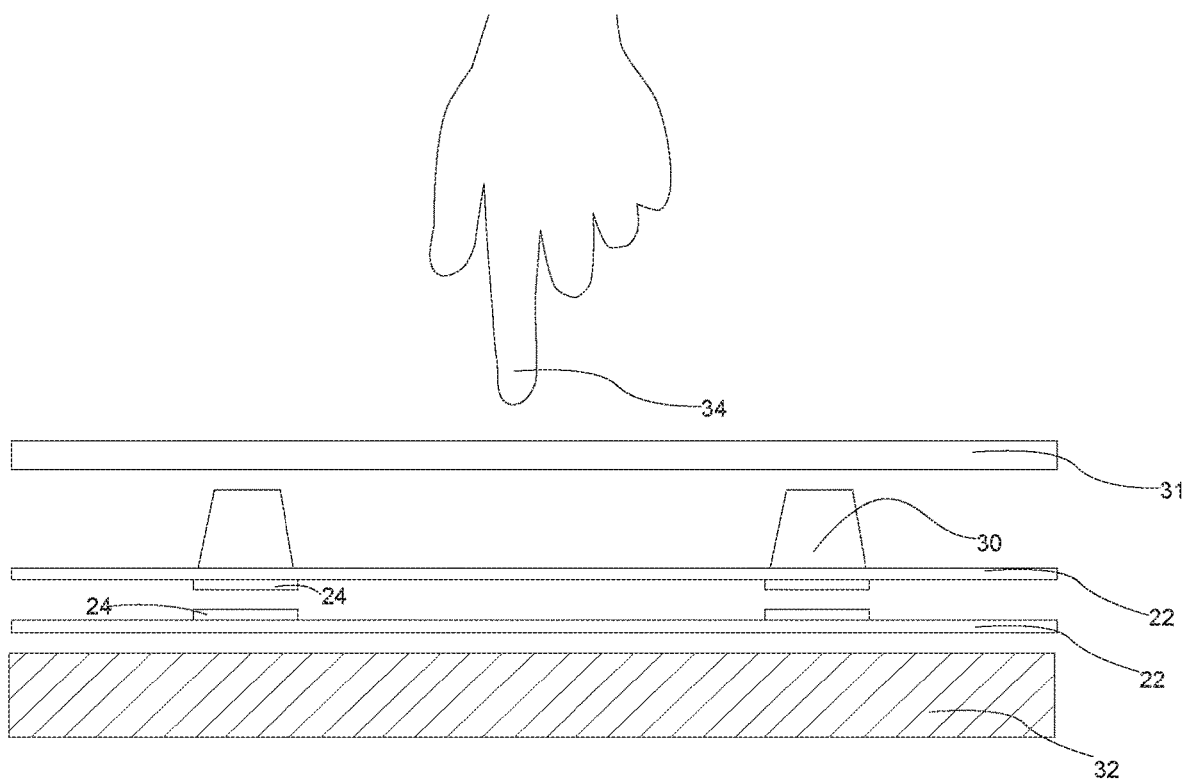

The purpose of the semi-rigid touch layer 31 and the protrusions 30, as seen in FIGS. 12 and 13, is to redistribute continuous force 34 which is applied to the outer surface of the semi-rigid touch layer 31 so that all applied force is distributed only to the active sensing element areas 27, namely at the outer or inner surface at the junctions of conductor traces 23 in the active sensing array 20, as seen in FIG. 11.

The next inner layer is the non-conductive sensor substrate 22 of the outer sensor surface sheet 21 of the active sensing array 20, which can be made of thin acetate which can, in one implementation be 5 mils in thickness, followed by the next inner layer of a the pattern of metal-infused ink conducting trace lines 23 which is printed on the inner side of the substrate 22.

Figure 4:
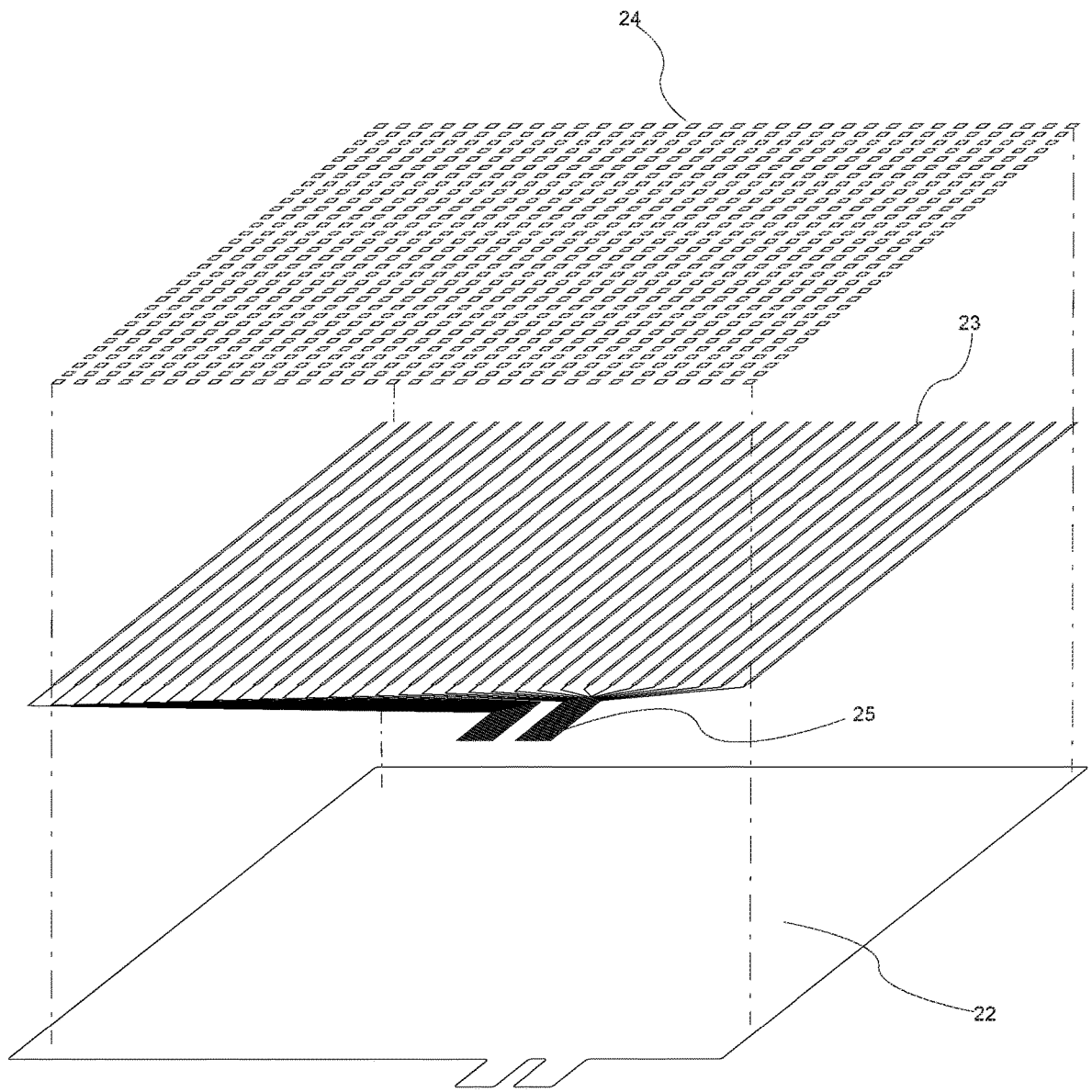

The next inner layer shows FSR material 24 against FSR material 24: The outer FSR 24 pattern that is overprinted over the conducting lines 23 of the outer sensor surface sheet 21 of the active sensing array 20, as shown in FIGS. 3 and 4. The inner FSR 24 is overprinted over the conducting lines 23, the next inner layer, of the inner sensor surface sheet 21 of the active sensing array 20. In operation, these two FSR 24 components are in contact with each other, but are not mechanically affixed to each other.

The next inner layer is the non-conductive sensor substrate 22 of the inner sensor surface sheet 21 of the active sensing array 20, which can be made of thin acetate which can, in one implementation be 5 mils in thickness, together with the pattern of metal-infused ink conducting trace lines 23 of the previous layer, which is printed on the outer side of this substrate 22.

The next inner layer is the support layer 32 which can be made of any solid material, such as glass, acrylic, wood or metal. In one implementation, it was made of ¼" thick acrylic.

Figure 10:
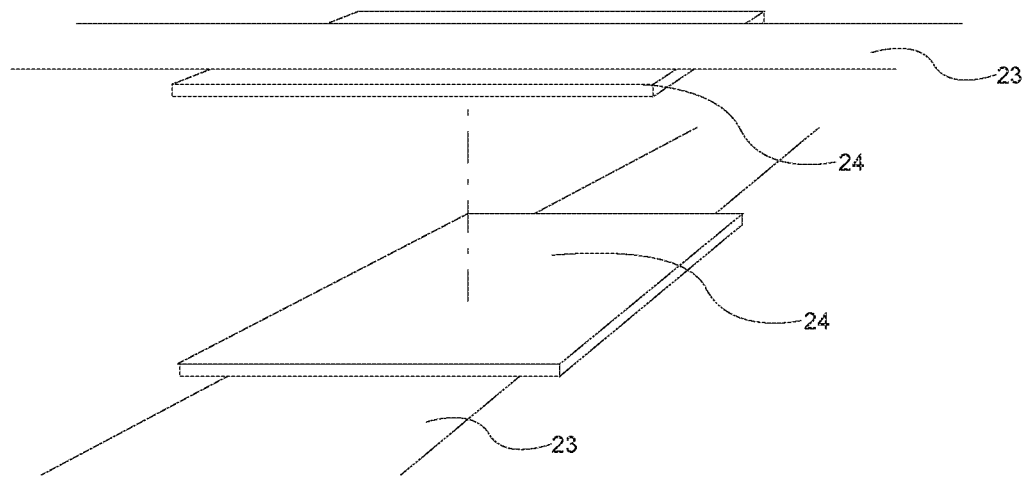

For clarity, the sensing element 26 comprises all the material on all of the Active Sensing Array 20 at the junction of conductor traces 23 enabling the electronically measuring force in that region, as seen in FIG. 10. The active area of a sensing element 27 corresponds to the inner or outer area on the surface of the active sensing array 20 corresponding to that location of that sensing element, specifically where force is focused upon, as seen in FIG. 11. As such, 'in contact with the sensing element' implies contact with the active area corresponding to that sensing element.

A detailed description of following a signal through each feature of the invention from start to finish: Specifically, how the signal is generated from an object contacting the outer surface of the touch layer and what happens to it from that point on through the conducting lines, along the network, and ultimately to the computer 3 where it is imaged, covering every specific step along the way, including how interpolation is applied to the signal as part of this detailed description following the signal.

FIG. 13 shows the imposition of force or pressure 34 applied to the semi-rigid upper plate being mechanically transmitted to nearby supporting protrusions 30, and thence to the pressure sensing active area of the sensing elements 27 where conducting lines 23 intersect on active sensing array 20 of the tile. In this embodiment the protrusions are attached to the outer surface of the active sensing array 20, rather than to the semi-rigid touch layer 31.

Figure 14:
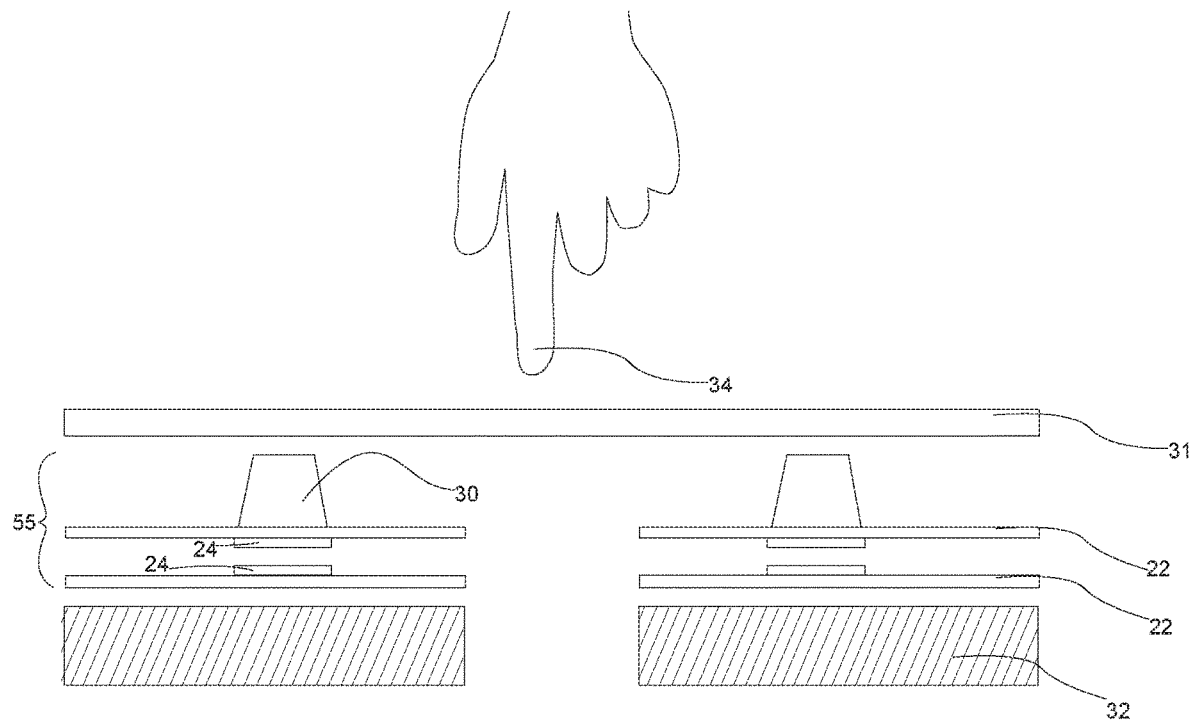

The nearby protrusions 30 and corresponding sensing elements 26 do not need to be on the same tile, but rather can be on adjacent, mechanically separate tiles, as in FIG. 14.

FIG. 14 shows the imposition of force or pressure 34 applied to the semi-rigid upper plate being mechanically transmitted to nearby supporting protrusions 30 on two adjacent but mechanically distinct tiles, and thence to the pressure sensing active area on the sensing elements 27 where conducting lines 23 intersect on respective active sensing arrays 20 of distinct sensor tiles. In this embodiment the protrusions 30 are attached to the outer side of the active sensing array 20, rather than to the semi-rigid touch layer 31.

Interpolation

For each sensor apparatus, force imparted on a surface is mechanically redistributed such that all the force is focused onto a grid of pressure sensing elements 26 under that surface one or a plurality of tiles 2 containing active sensing arrays 20 containing sensing elements 26, as demonstrated the various embodiments described here within. Interpolation is achieved by this mechanical redistribution. When contact is made upon the outer surface of the apparatus and above a sensing element 26, the force applied to that location is registered at sensing element 26. When the contact is moved between locations above sensing elements 26, the force is applied to multiple sensing elements 26. The distribution of the force of the contact at each of the sensing elements 26 is used to calculate the centroid of that contact.

Figure 48:
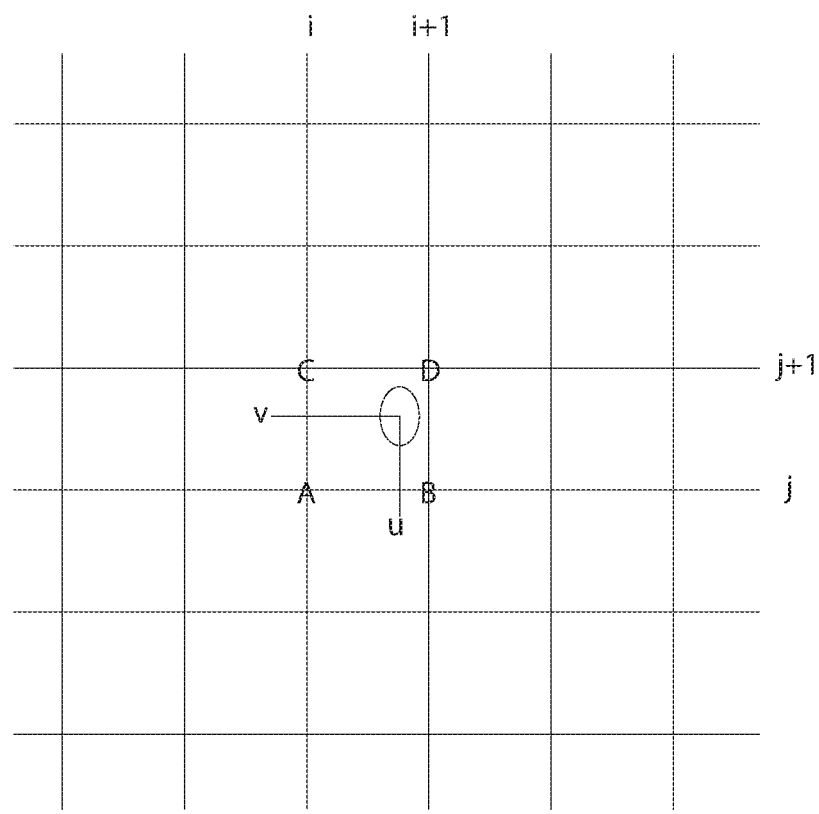
FIG. 48 shows labeled positions for use in compensation function.

In particular, consider the 2×2 of adjoining sensing elements 26 at respective locations (i,j), (i+1,j), (i,j+1), (i+1,j+1). These intersections may be labeled, A, B, C, and D as seen in FIG. 48, where the intersections represent the locations of sensing elements 26 on an active sensing array 20. The forces sensed at each of these sensing elements 26 may be described by fA, fB, fC, and fD, respectively.

Because the mechanical redistribution of force described here within is approximately linearly as a function of position, the centroid position [x, y] of the touch can be well approximated by the following linear interpolation of position as a function of force at the four locations. One may first approximate the fractional east/west position of the centroid between two adjoining columns by linear interpolation followed by a compensation for any nonlinearity:

$$u'=(fB+fD)/(fA+fB+fC+fD)$$

$$u=COMP(u')$$

and the fractional north/south position between two adjoining rows by linear interpolation followed by a compensation for any nonlinearity:

$$v'=(fC+fD)/(fA+fB+fC+fD)$$

$$v=COMP(v')$$

Interpolation of touch position between rows and columns is based on relative force at the nearest row/column intersections A, B, C and D as seen in FIG. 48 and described above. From this information, the centroid position of any single touch within the sensor array can be computed.

One can make use of a compensation function, represented in the above equations by the function COMP( ). This function is a monotonic mapping from the domain 0 . . . 1 to the range 0 . . . 1. This function compensates for non-linearity in the mechanical interpolation of the sensor between successive sensor elements. For example, a pressure applied to a location that is 0.25 of the way from the left neighboring conductor line 23 for a sensing element 26 to the right neighboring conductor line 23 of a neighboring sensing element 26 will result in a proportional value of pressure, with respect to total pressure, down onto the protrusion 30 on the right which is greater than 0.0 and less than 0.5, but which is not necessarily 0.25. The use of a compensation function corrects for any disparity.

Figure 49:
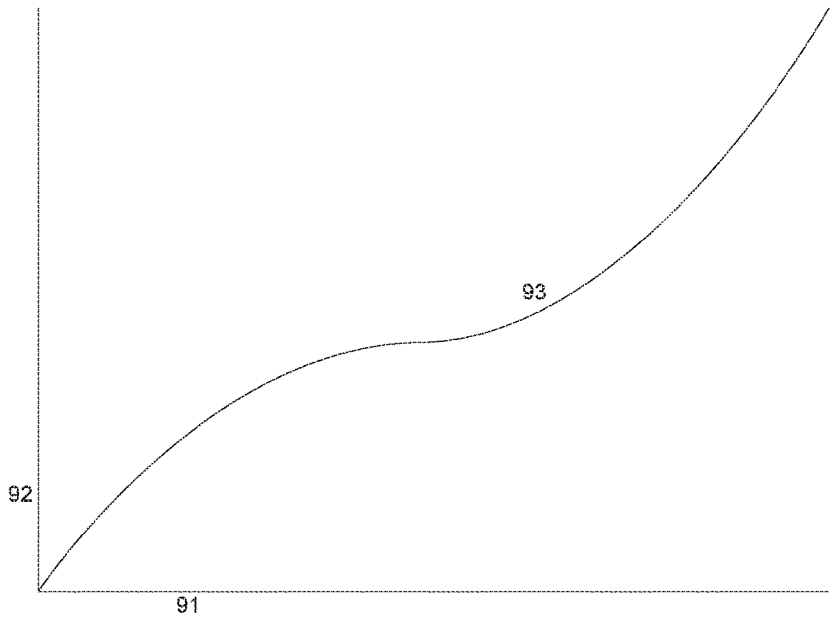
FIG. 49 shows a graph of a compensation function.

FIG. 49 shows a typical set of values for the compensation function. 91 is the fractional proportion u' from left to right of the sensed pressure, in the range from 0 to 1. 92 is the desired proportional geometric position. 93 is the function that maps 91 to 92.

In another embodiment, even more precise compensation can be attained by defining two compensation functions: COMP_u(u', v') and COMP_v(u', v'). In all implementations, the compensation values can be constructed by a standard calibration procedure in which pressure is applied at known positions on the sensor, and the results stored in a table. A continuous curve, such as a piecewise linear or piecewise cubic function, is then fit between measured values from this table, to create a continuous function. In the case of COMP_u and COMP_v, the table is two dimensional, and the interpolation between table values is effected by a continuous two dimensional function, such as piecewise bilinear or piecewise bicubic.

From the values of u and v, the coordinates of the centroid may be obtained:

$$[x,y]=[S*(i+u),S*(j+v)]$$

where S is the spacing between successive rows and columns in the sensor array. In one embodiment, S=⅜".

Scanning

One microcontroller is associated with each sensor tile. For each sensor tile, that tile's microcontroller scans successive row/column pairs within a sub-region. The microcontroller uses digital and analog I/O pins on the microcontroller to scan the sensor for pressure information. When connected, the sets of row and column wires 23 are either assigned to be output or input wires 23. Output wires 23 can provide a positive voltage or be set to ground. Input wires 23 can either be set to ground or read a voltage from a wire. At the start of each frame, one output wire is set to a positive voltage, while the rest of the output wires 23 are set to ground. The input wires 23 are also set to ground, except for one wire which scans the voltage coming from the intersection of the output and input wires 23. The firmware then scans the next input wire, while setting the others to ground. After all input wires 23 have been scanned, the next output wire is set to a positive voltage, while the first is set to ground, and the input wires 23 are scanned again. This is repeated for all the voltage wires 23, until every intersection as been scanned.

Scanning the device gives a frame of pressure information which registers the fingers or other objects that imposed force upon the MFRL. On each sensor tile, the tile's microcontroller optionally compresses the gathered sensor image data by ignoring all data values below a chosen cut-off threshold (i.e.: this data is redefined to be identically zero). Non-zero data is formed in packets, using a compression technique such as run-length encoding.

Communication from Tiles to the Computer 3

Data packets, each tagged with the identity of the tile from which it originated, are sent over a common data communication protocol that is shared by the microcontrollers of all of the tiles in the sensor array. One sensor tile is designated as the master tile 7. This master tile 7 possesses a SUB or similar communication connection 9 to the host computer 3, as seen in FIG. 38. The master tile 7 sends all of the compressed packets to the host computer 3.

On the host computer, the packets are assembled into a single seamless image of pressure.

Possible Applications for the Invention:

Electronic white boards.

Pressure sensitive floors. One use in this area is security, such as at an airport. In this application, the sensor array would be used in conjunction with image recognition software that can identify different individuals by the differing pressure patterns of their footsteps.

Pressure sensitive touch walls.

Pressure sensitive tables or desks.

Pressure sensitive surfaces for factories.

Pressure sensitive roadways, such as highways or bridges. Uses for this include traffic monitoring, including both speed and weight of vehicles, as well as an accurate image of number of wheels and wheel distribution, which can be used for accurate assessment and categorization of vehicle type.

Pressure sensitive seats. Uses for this include train seats, automobile seats, airplane seats and seats for assistive devices such as wheelchairs.

Pressure sensitive displays. OLED displays as part of the touch layer.

Enabling Information about the third invention that has to do with matching the number of lines to the computer:

A given microcontroller chip has a particular number N of dual analog/digital IO pins, while the number of purely digital IO pins 82 on the microcontroller chip M. By connecting the N dual analog/digital IO pins 81 to N rows of an active sensing array 20, and up to M of the purely digital IO pins 82 to the N columns of the active sensing array 20, an active sensing array 20 driven from a single microcontroller can achieve up to N×M pressure sensing elements 26 without the requirement of supplementary electronic components. This architecture results in a simple configuration of electronic components.

One embodiment uses the PIC24HJ256GP610 microcontroller from MicroChip, which contains 84 data pins altogether, of which 32 are dual analog/digital IO pins 81, and these can be used as analog voltage input pins, one for each row of the sensor array. Setting aside the pins that are used for external communication with other microcontrollers in the grid of tiles, at least 32 digital IO pins 82 are available as power/ground switchable pins to drive 32 columns of the sensing array. Thus, this particular microcontroller is able to drive a 32×32 array pressure sensing tile 2, with no other electronics required aboard the tile other than a small number of resistors and capacitors to smooth out current and avoid spikes in current.

The master tile 7 in the embodiment requires a single 3.3 volt regulator, such as the Fairchild REG1117A, to drive the 5V from the host computer's USB port to the 3.3 volts required by the microcontroller. No other electronics are required.

Utility of the Invention

There is currently on solution for low cost pressure sensing that can be easily mass-produced and that is economically scalable to form a seamless surface of arbitrarily large surface area. There are indeed specialized technologies, such as the UnMousePad by [Rosenberg] and TekScan, Inc. devices based on sensing grids that make use of force sensitive resistance (FSR) materials 24 [Eventoff], but none of these are designed or engineered to scale up reliably to large surface area at low cost per unit sensing area.

The current invention is an inexpensive and flexible way to convert any area of floor, wall, table or any other surface into a "video camera for pressure" or pressure imaging apparatus. Once the apparatus 1 is connected via a standard method for transferring digital signals, such as a serial protocol over a USB cable, to a host computer 3, then the time-varying pressure image of any and all touches upon the surface can be read and processed to support many different applications.

The system consists of a set of one or more modular pressure tiles 2. These tiles 2 can be of arbitrary shape, including triangular, hexagonal or other irregular tile shape. In one embodiment, each tile 2 is a square containing 32×32 sensing elements, so the total resolution of the sensing array will be the number of tiles times 32×32.

A networked tile assembly 18 is composed of a collection of tiles which communicate with each other such that the physical arrangement of tiles can be reconstructed virtually. In one embodiment the size of each tile is 12 inches×12 inches square pressure tile 2 (though the sizes of tiles in an assembly need not necessarily be equivalent). In this embodiment, if every tile has 32×32 sensing elements 26, then the spacing between successive sensing elements is ⅜".

Tiles can be assembled together to create an arbitrarily large seamless pressure imaging apparatus 1. The apparatus 1 sends to a host computer 3 a single time-varying composite image of pressure variation across the entire surface.

Power can optionally be augmented or supplied by one or more supplementary power modules as needed.

The sensor can incorporate, on its upper surface, a mechanical force redistribution layer that distributes pressure predictably so that the sensed pressure is well distributed to the sensing elements in the tile.

Step by Step Description of User Experience:

From the user's perspective, operation is as follows and as seen in FIG. 35.

In one time step, the user imposes a finger or other physical object 34 onto the top of the pressure sensing apparatus 1. A continuous image of this imposed pressure is transmitted by the pressure sensing apparatus 1 to a host computer 3.

On the host computer 3 this image of spatially varying pressure is stored in a region of computer memory. From there, computer software on the host computer 1 can be used to store the image to secondary storage such as a disk file, to display the image as a visual image on a computer display 6, to perform analysis such as finger tracking, region finding, shape analysis or any other image analysis process which is standard in the art, or for any other purpose for which an image can be used.

On the next time step, the above process is repeated, and so on for each successive time step.

Step by Step Description of Internal Working:

Internal operation begins when fingers or other objects 34 impose downward force upon the outer surface of the semi-rigid touch layer 31, as seen in FIG. 13.

Figure 22:
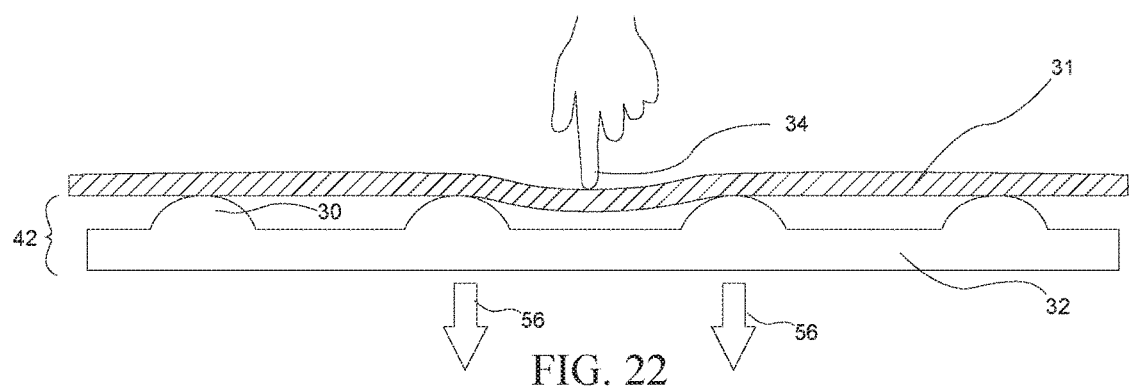
Figure 32:
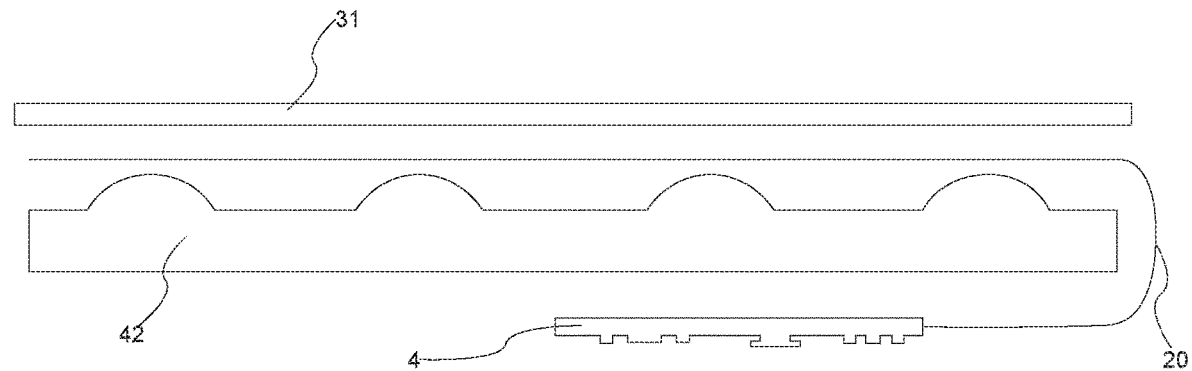

This force is then transmitted, and properly redistributed, from the semi-rigid touch layer 31 to the sensing elements 26 on the active sensing array 30 of each sensor tile 2, as seen in FIG. 22. One microcontroller 5 is associated with the tile circuit board 4 for each sensor tile 2, as seen in FIG. 32. Grids of tiles 2 are physically, as well as with electronic cabling 10, connected to form a coherent sensing apparatus 1, as seen in FIG. 36.

Then, for each sensor tile 2, that tile's microcontroller 5 scans the pressure values at the sensing elements at each successive row/column pairs within a sub-region as described here within to form an image of pressure.

On each sensor tile 2, the tile's microcontroller optionally compresses the gathered sensor image data by ignoring all data values below a chosen cut-off threshold (i.e.: this data is redefined to be identically zero). Non-zero data is formed in packets, using a compression technique such as run-length encoding.

Figure 37:
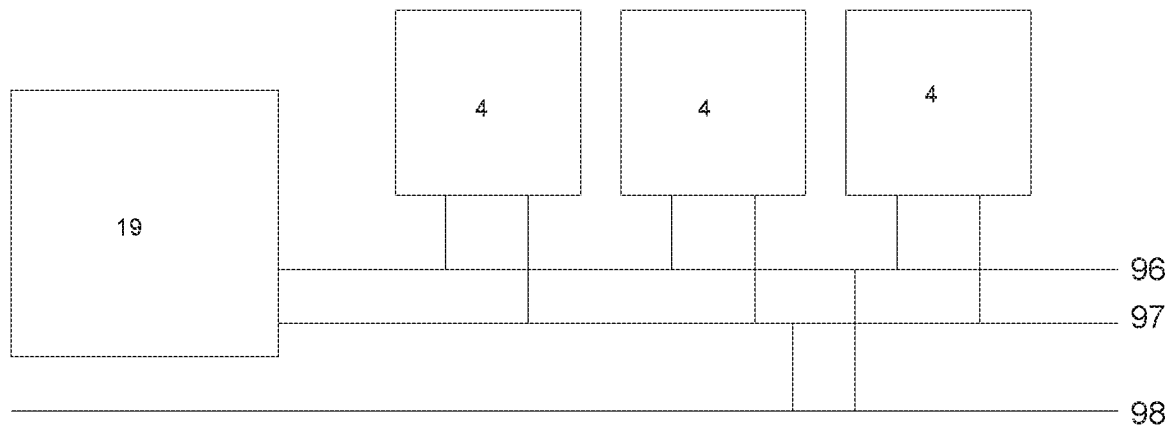

The packets, each tagged with the identity of the tile from which it originated, are sent over a common data bus that is shared by the microcontrollers of all of the tiles 2 in the sensing apparatus 1 grid, as seen in FIG. 37. One sensor tile is designated as the host communicator tile 7. This tile possesses a USB or similar communication connection 9 to the host computer 3. The host connection tile 7 sends all of the compressed packets to the host computer 3, as seen in FIG. 36.

On the host computer 3, the packets are assembled into a single image of pressure. The identification of each tile, stored with each packet, together with pre-stored information about the relative position of each tile, as seen in one organization of Tiles seen in FIG. 38 in the corresponding Sample Tile Topology Table (below) is used by the host computer 3 to place each sub-image in its proper location within the complete multi-tile image of pressure.

| Tile ID | Row | Column |
|---------|-----|--------|
| T-0 | 0 | 0 |
| T-1 | 0 | 1 |
| T-2 | 0 | 2 |
| T-3 | 0 | 3 |
| T-4 | 1 | 0 |
| T-5 | 1 | 1 |
| T-6 | 1 | 2 |
| T-7 | 1 | 3 |
| T-8 | 2 | 0 |
| T-9 | 2 | 1 |
| T-10 | 2 | 2 |
| T-11 | 2 | 3 |

Figure 40:
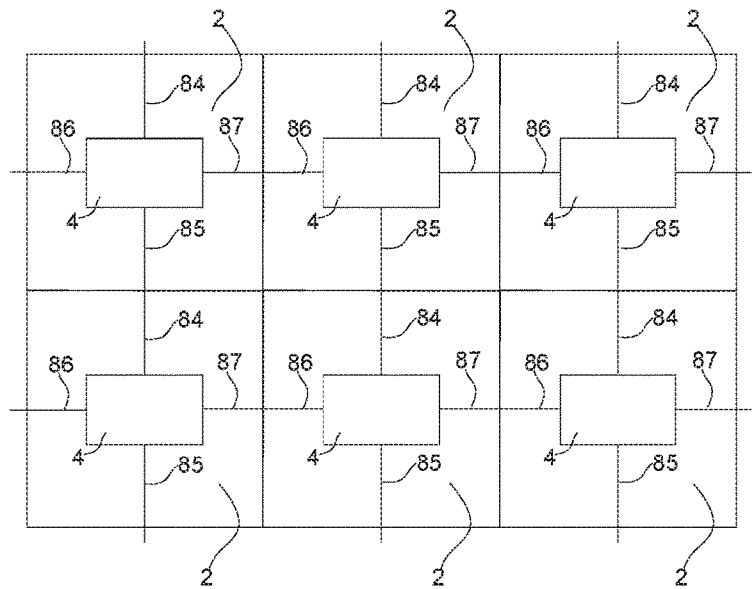

Optionally, a protocol between the microcontrollers associated with each tile can identify neighbor information within the tile grid itself. In this option, upon initialization of the connection between the tile grid and the host computer, each microcontroller is directed to send a data packet through the shared bus which identifies all neighbors with whom it is connected, as well as the direction and Tile ID of that neighbor (north, east, west or south), as seen in FIG. 40. In FIG. 40 and the Sample Tile Topology Table and Sample Tile Adjacency Table (below), the Tile IDs are designated T-0, T-1, etc. the host computer stores this information in a table, which is indexed by tile ID, seen in Tile Topology Table (below). Each table entry contains a list of between one and four neighbor ids for that tile in the respective North, South, East, and/or west column. As with the earlier described embodiment where the tile adjacency table is manually configured, the host computer 3 uses this connectivity information to assemble all received data packets into the coherently reconstructed measured pressure data image with sensing element data from all sensing elements on all tiles in the following manner: At each time step, starting with the location of the Host Tile, placing the pressure data for host tile in a particular block of memory corresponding the data measured from that tile's sensing elements, then placing the data for the neighbors of the host tile in their proper relative positions to the host tile, then placing data for those neighbors in their respective relative positions, and so on, in a breadth first traversal of the entire connectivity graph, until data for all tiles has been properly placed in their respective positions on a Tile Topology table. An advantage of this approach is that it allows arbitrary arrangements of tiles to be accommodated.

The above method relies upon each processor knowing the identities of its immediate neighbors. In one embodiment, processors determine these identities at initialization time as follows: (1) a neighbor-determining signal is sent from the host computer along the shared bus to each tile's microcontroller in turn. A microcontroller only acts upon the neighbor-determining signal when that signal is addressed to its own unique identify; (2) upon receiving this signal, the processor sends, in turn, an identity query to each of its immediate North, South, East and West neighbors. (3) When a processor receives such an identity query from a neighboring processor, it outputs its own identity through the shared bus to the host computer, which stores this neighbor information into a software table, such the Tile Adjacency Table below. In this way, the host computer is able to establish the identities of all immediate neighbors of all tiles.

Sample Tile Adjacency Table showing results of tile neighbor queries, corresponding to FIG. 38

| Tile ID | North | South | East | West |
|---------|-------|-------|------|------|
| T-0 | none | T-4 | T-1 | none |
| T-1 | none | T-5 | T-2 | T-0 |
| T-2 | none | T-6 | T-3 | T-1 |
| T-3 | none | T-7 | none | T-2 |
| T-4 | T-0 | T-8 | T-5 | none |
| T-5 | T-1 | T-9 | T-6 | T-4 |
| T-6 | T-2 | T-10 | T-7 | T-5 |
| T-7 | T-3 | T-11 | none | T-6 |
| T-8 | T-4 | none | T-9 | none |
| T-9 | T-5 | none | T-10 | T-8 |
| T-10 | T-6 | none | T-11 | T-9 |
| T-11 | T-7 | none | none | T-10 |

Tiles Seamlessly Abutting to Create a Seamless Pressure Sensing Device

The difficulty of seamlessly tiling sensor arrays can be described by analogy with LCD arrays. When a collection of LCD monitors are arrayed to create larger image, there is generally a visible gap between successive monitors. This gap is caused by the fact that there are edge connections and electronics, outside of the image area of each monitor, which takes up non-zero area. Existing FSR based pressure sensor arrays, such as the TekScan sensor array, suffer from the same problem—the non-zero area around the active sensing area which is taken up by connectors and electronic components creates a geometric gap. Because of this gap, a plurality of TekScan sensors cannot be tiled to create a seamless larger sensing surface.

A plurality of TouchCo sensors cannot be seamlessly tiled for a different reason: Because the method of the TouchCo sensor requires spatial interpolation upon a continuous area of FSR material between successive active conducting lines, the sensor cannot seamlessly interpolate in any area that is not between successive conducting lines on a single sensor array. Therefore, the sensor cannot seamlessly interpolate across different physical sensors.

Our method makes use of a mechanical interpolation layer that is able to span physically different tiles. Therefore one of the novel features of the technique here is the ability to seamlessly interpolate detected force even between physically distinct sensing area tiles.

The Mechanism for Even Force Redistribution from the Continuous Upper Touch Layer to the Discrete Sensor Layer:

A mechanical layer is imposed on top of the active sensing array 20. The purpose of this layer is to redistribute the force imposed downward onto the mechanical layer, so that all of this force is transmitted exclusively to the active areas of the surface of the active sensing array 20. Where "active area" 27 is defined as any region in which the upper and lower conductive wires 23 cross, with FSR material 24 sandwiched between them where they cross, as seen in FIGS. 10 and 11. In particular, every such intersection corresponds to a sensing element 26 for measuring pressure data.

For clarity, the sensing element 26 comprises all the material on all of the Active Sensing Array 20 at the junction of conductor traces 23 enabling the electronically measuring force in that region. The active area of a sensing element 27 corresponds to the inner or outer area on the surface of the active sensing array 20 corresponding to that location of that sensing element, specifically where force is focused upon. As such, 'in contact with the sensing element' implies contact with the active area corresponding to that sensing element.

Figure 16:
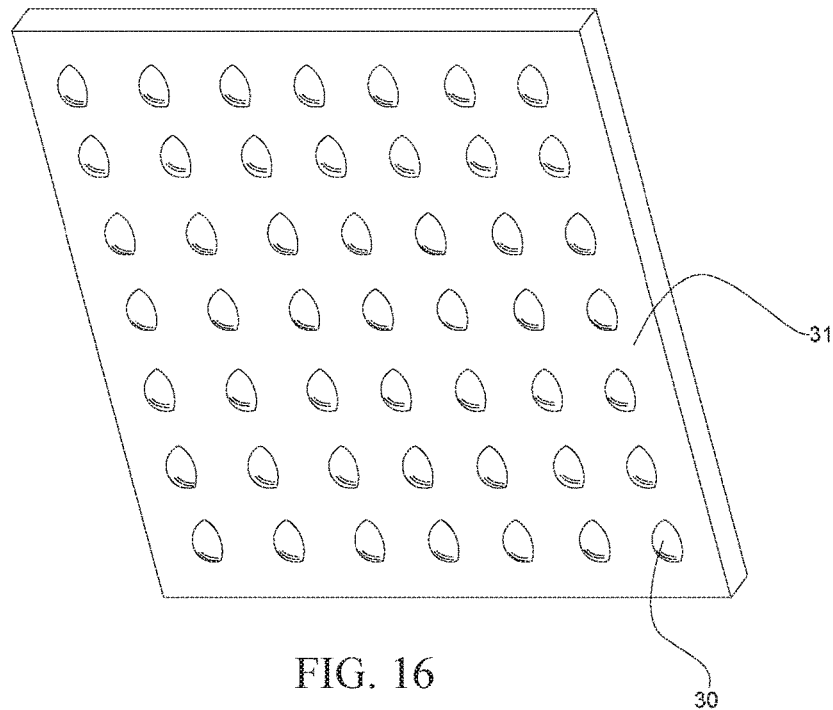

In one implementation, as seen in FIG. 16, the semi-rigid touch layer 31 and protrusions 30 are constructed as a single part, implemented as a thin semi-rigid plastic sheet with small raised bumps on its underside. The protrusions 30 are spaced so that when the this part is resting over the active sensing array 20, each of these protrusions 30 sits over one of the active areas of the corresponding sensing elements 27, namely the small regions of the tile where conductive trace lines 23 cross, when FSR layers 24 sandwiched between them, as seen in FIG. 17, FIG. 16 shows a semi-rigid touch surface with protrusions 33.

This structure forms a mechanism whereby a continuous change in position of a touch on the outer side of the touch surface results in a corresponding continuous change in the relative force applied to the sensor junctions that are nearest to that touch. Those relative forces, when sent to the host computer as part of the data image, permit the host computer to reconstruct the position of the touch through simple arithmetic interpolation.

Figure 17:
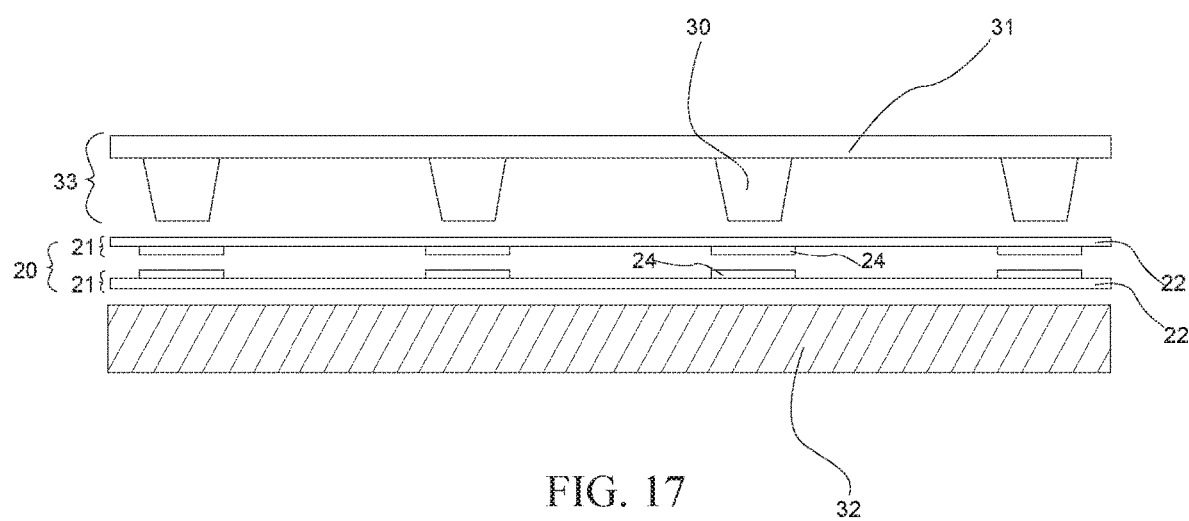

FIG. 15 and FIG. 17 show a schematic profile view of the semi-rigid touch surface with protrusions 33 sitting atop the active sensing array 20. In this implementation, the bumps 30 are rigidly affixed to the semi-rigid flat touch layer 31 as a coherent part 33. This part 33 sits atop the non conduction substrate 21 of the active sensing array 20, which consists of an upper surface 21, a lower surface 21, each of which includes a respective FSR layer 24. In this figure, the conductive trace lines 23 of the active sensing array 20 are not shown. On the inner most layer is a solid support layer 32 providing a rigid base for the apparatus to counter the surface forces. In one embodiment, the support layer 32 can be a ½" plate of acrylic.

In FIG. 17, it can be seen that the protrusions 30 contacts the upper surface of the sensor tile only in the active regions 27 of the active sensing array 20.

Figure 18:
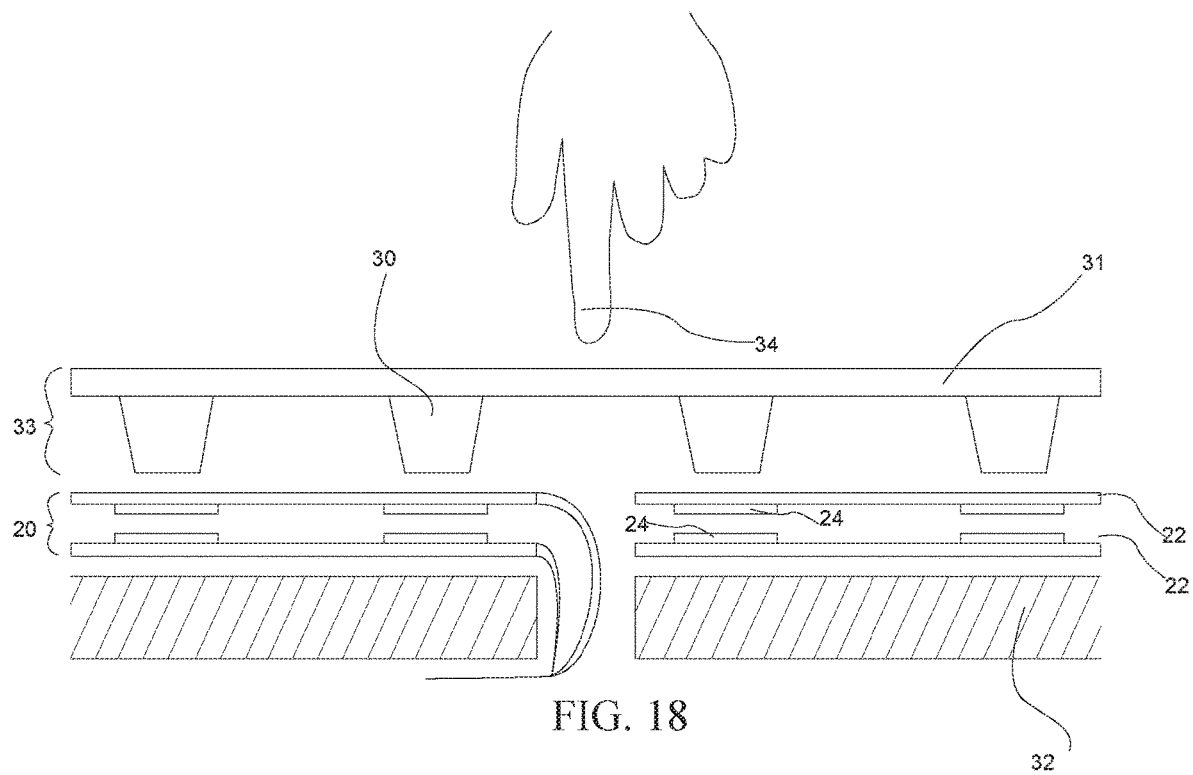

This method of redistributing pressure also works when adjacent sensor elements are on physically disjoint adjacent tiles, as shown in FIG. 18. In FIG. 18, the constituent layers of the respective tiles are the same as described above for FIGS. 15 and 17. FIG. 18 shows the semi-rigid touch and protrusions layer 33 as a continuous sheet spanning the plurality of tiles, showing the physical redistributing pressure 34 between sensor elements that belong to different physical sensor array tiles.

FIG. 18 also shown an embodiment in which the active sensing array 20 wraps around the edge of one of the tiles to connect the connector tails 25 lines of that tile to the tile's printed circuit board 4, which are located on the underside of the support layer 32.

FIG. 18 illustrates seamless sensing across adjacent physical tiles, by using mechanical force redistribution, as in the semi-rigid touch and protrusion part 33 in this embodiment, distribute force between adjacent sensing elements on distinct tiles in a way that does not require a mechanical connection between the underlying tiles themselves. When the tile array is in operation, there is no difference in signal response between the following two cases: (a) adjacent sensing elements that are on the same physical tile, and (b) adjacent sensing elements that are on different, but adjoining, physical tiles.

During any given time step, when a force is applied at the seam between two adjoining tiles, some of the force is distributed to, as seen in the cross sectional view in FIG. 18 of one embodiment, the rightmost bump of the semi-rigid touch and protrusion layer 33 that touches the tile to the left, and the remainder of the force is distributed to the leftmost bump of 33 that touches the tile to the right.

These two respective force signals will be detected by the respective microcontrollers of the tile to the left and the tile to the right, and will be sent by each of those tiles to the host computer as part of that tile's respective force image for this time step.

The host computer will then be able to reconstruct—from the respective values along the rightmost edge of the force image from the tile on the left and along the leftmost edge of the force image from the tile on the right—the position of the force applied in the region between the two adjoining tiles, using exactly the same linear interpolation that is used to compute the position of a force applied between two conducting lines within a single tile.

The result is that from the perspective of the end user and software application developer, it makes no difference whether a touch upon the grid of sensor array tiles falls within a single tile or between two adjoining tiles of the grid.

Physical Implementation of the Active Sensor Array

Figure 33:
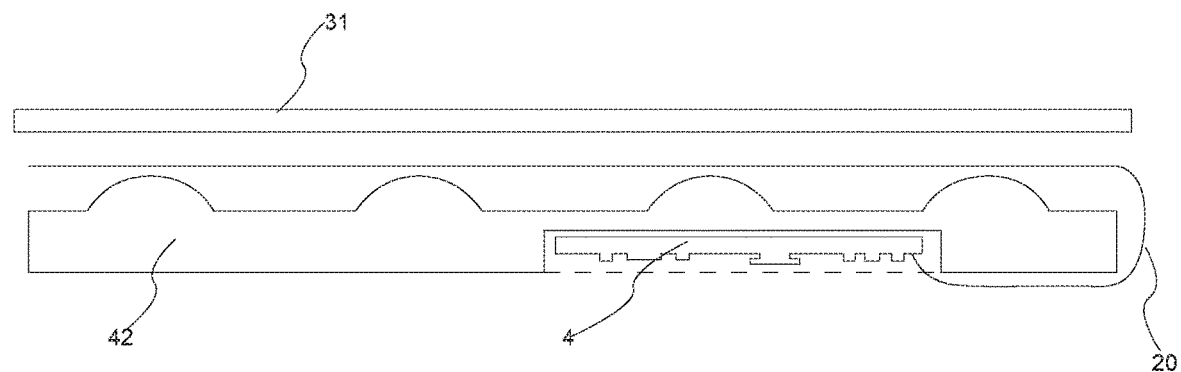
Figure 34:
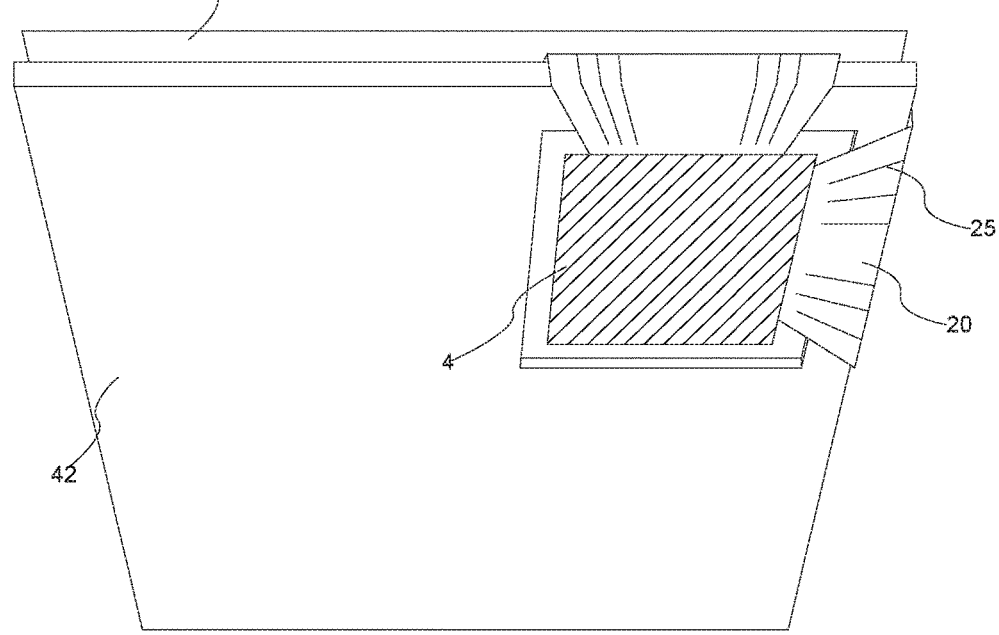

In one embodiment, the Conductive Trace Lines 23 are printed with metal infused ink over a non-conducting substrate 22, such as plastic, as shown in FIG. 3. All tracings 23 can be the same line width, the routing of traces 23 continue to form a Connector Tail 25 for connection to the tile's circuit board 4, with the tails possibly of a different/thinner line width. In one embodiment of a tile, the Connector Tail 25 to the tile's printed circuit board 4 can be folded to the underside of the tile, around the protrusion 31 and Support Layer 32, with the circuit board 4 placed beneath the Active Sensing Array 20, as seen in FIGS. 33 and 34. This arrangement permits adjacent tiles to abut smoothly, with no gaps in sensing area between adjacent tiles, as seen in FIG. 18.

Figure 5:
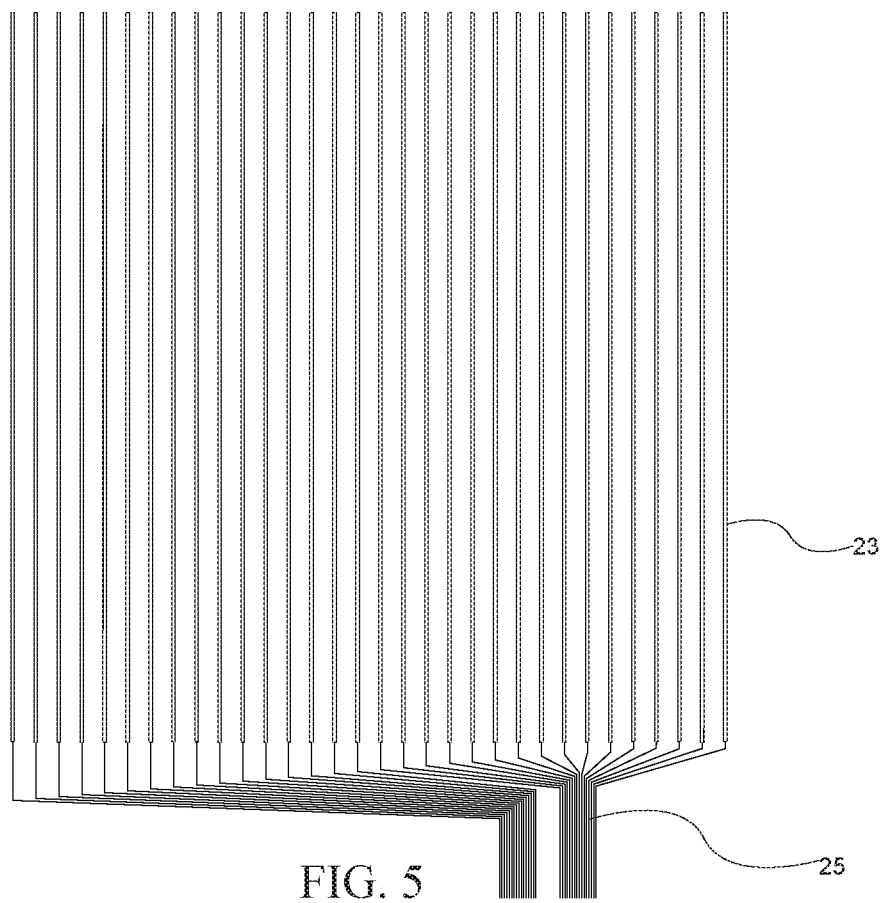

One embodiment of printed electrical conductor tracing lines 23 for the surface sheet 21 of the Active Sensing Array 20 of the invention as in the schematic on FIG. 5, all conducting lines 23 are 0.5 mm in width, and are spaced at intervals of ⅜", and the line width of the connector tails 25, are 0.25 mm.

Figure 6:
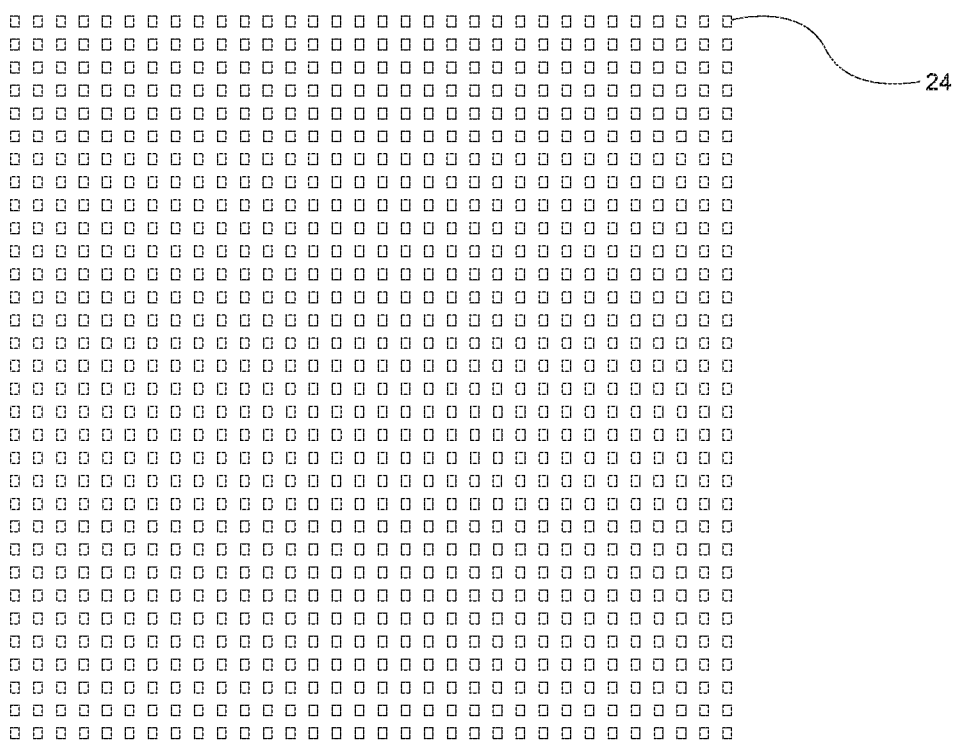
Figure 7:
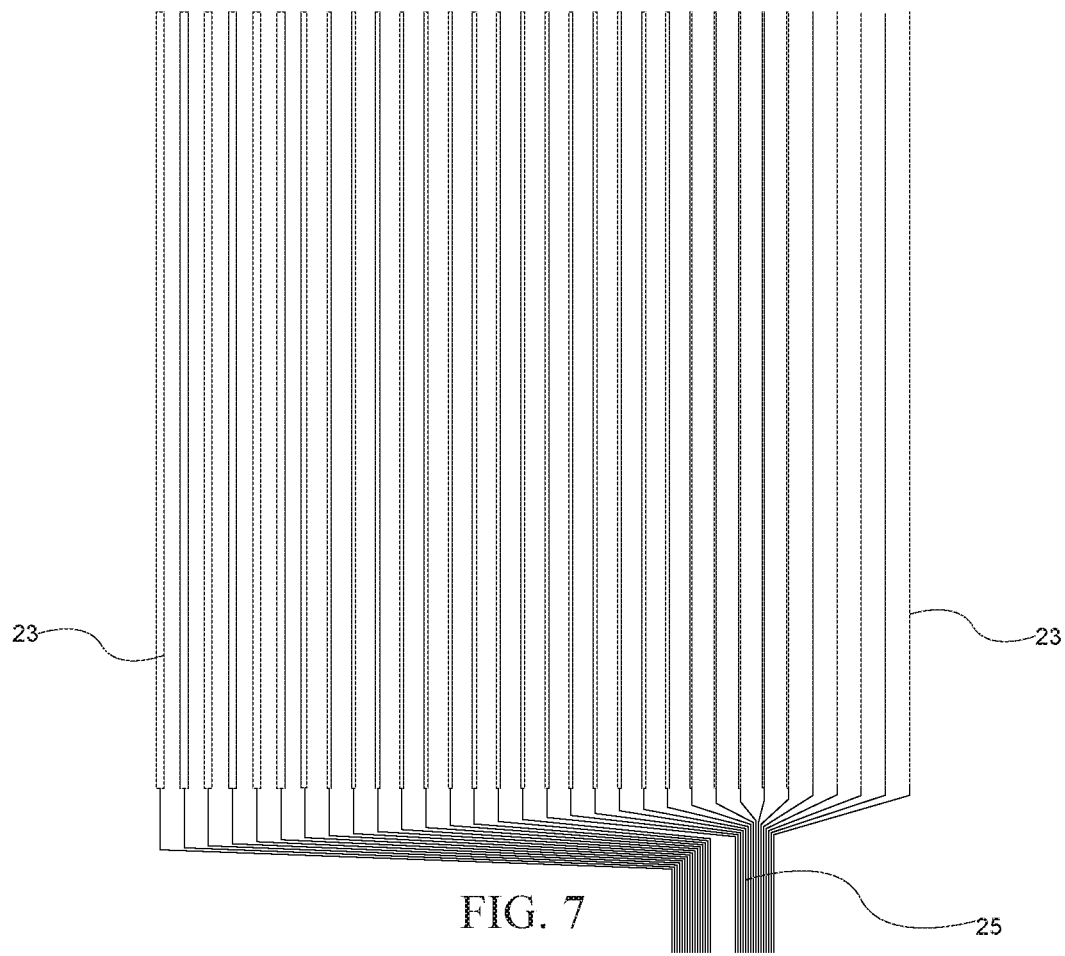

The FSR Ink 24 is printed as a grid of 1 mm squares over the Conductive lines 23 in an arrangement as shown in FIG. 6 resulting in a sensor surface sheet 21, as seen in FIG. 3.

Note that FSR ink 24 need only be printed in the immediate neighborhood of those parts of the sensor where conducting lines cross between top and bottom layer as seen in FIGS. 3, 10 and 11. This arrangement results in a very small usage of FSR per unit area.

FIG. 6 shows one embodiment the FSR layer 24 that is printed over the conducting lines 23 on the Sensor Surfaces 21 of the Active Sensing Array 20 of the invention. In this embodiment, all conducting lines 23 are 0.5 mm in width, and are spaced at intervals of ⅜". Therefore, each 1 mm square of printed FSR 24 is a patch that is slightly larger than 0.5 mm×0.5 mm square of the intersections of the conducting lines 23 as seen in the exploded view in FIG. 10, so that the regions were conducting lines cross are completely covered by FSR material, as seen in FIG. 11, with the active area of the sensing element 27 at that grid location shown as hatched.

FIG. 2 shows the exploded view of the superposition of conducting lines 23 for top and bottom Sensor Surface Sheets 21 one Active Sensing Array 20 of a tile, in their final operational positions. In one embodiment, all conducting lines are 0.5 mm in width, and are spaced at intervals of ⅜". FIG. 1 shows the Connector Tails 25 for connecting the Tile Circuit Board have not yet been folded under the tile. Therefore, these Connector Tails 25 appear to stick out at a vertical and a horizontal edge.

Figure 9A:
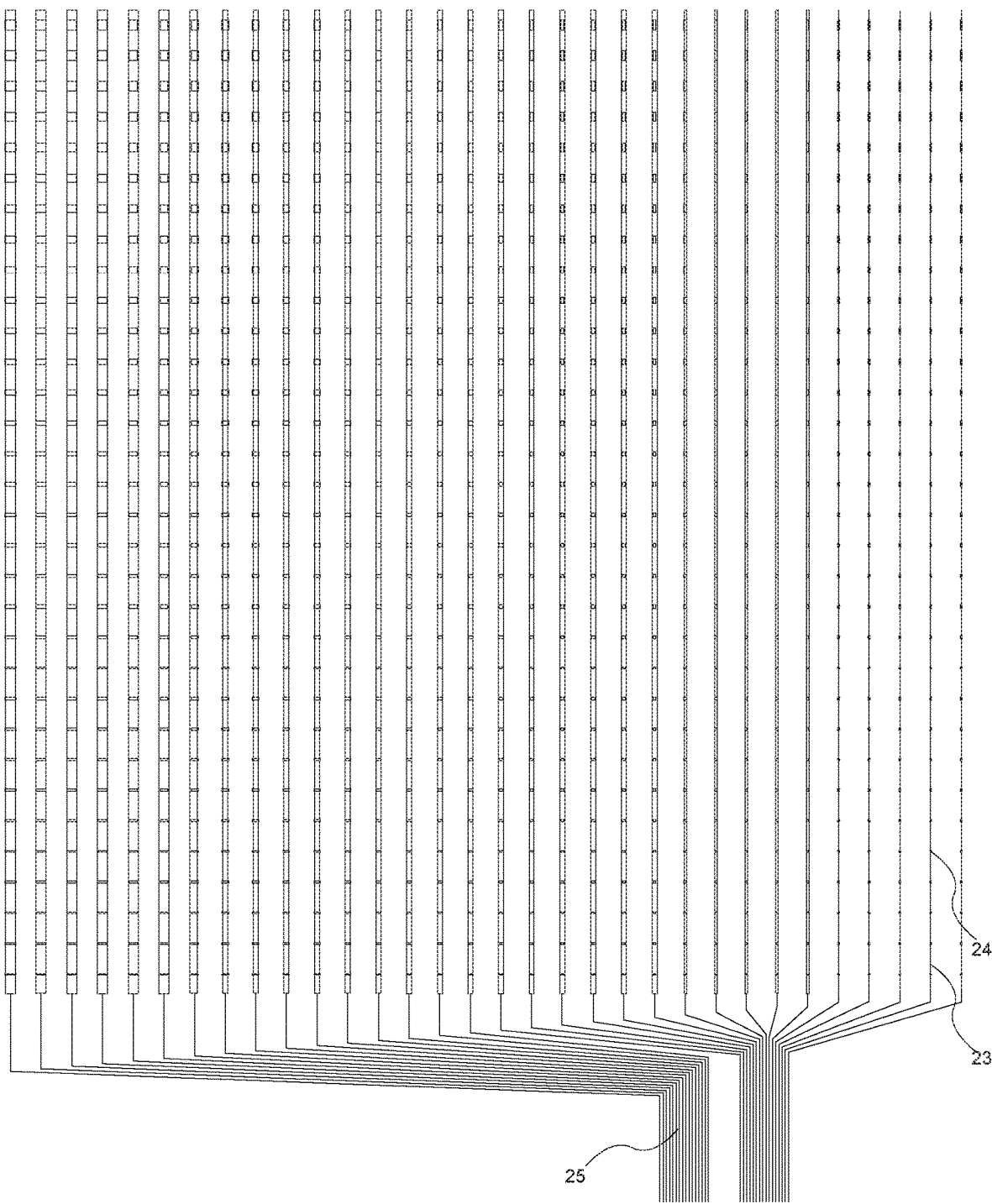
Figure 9B:
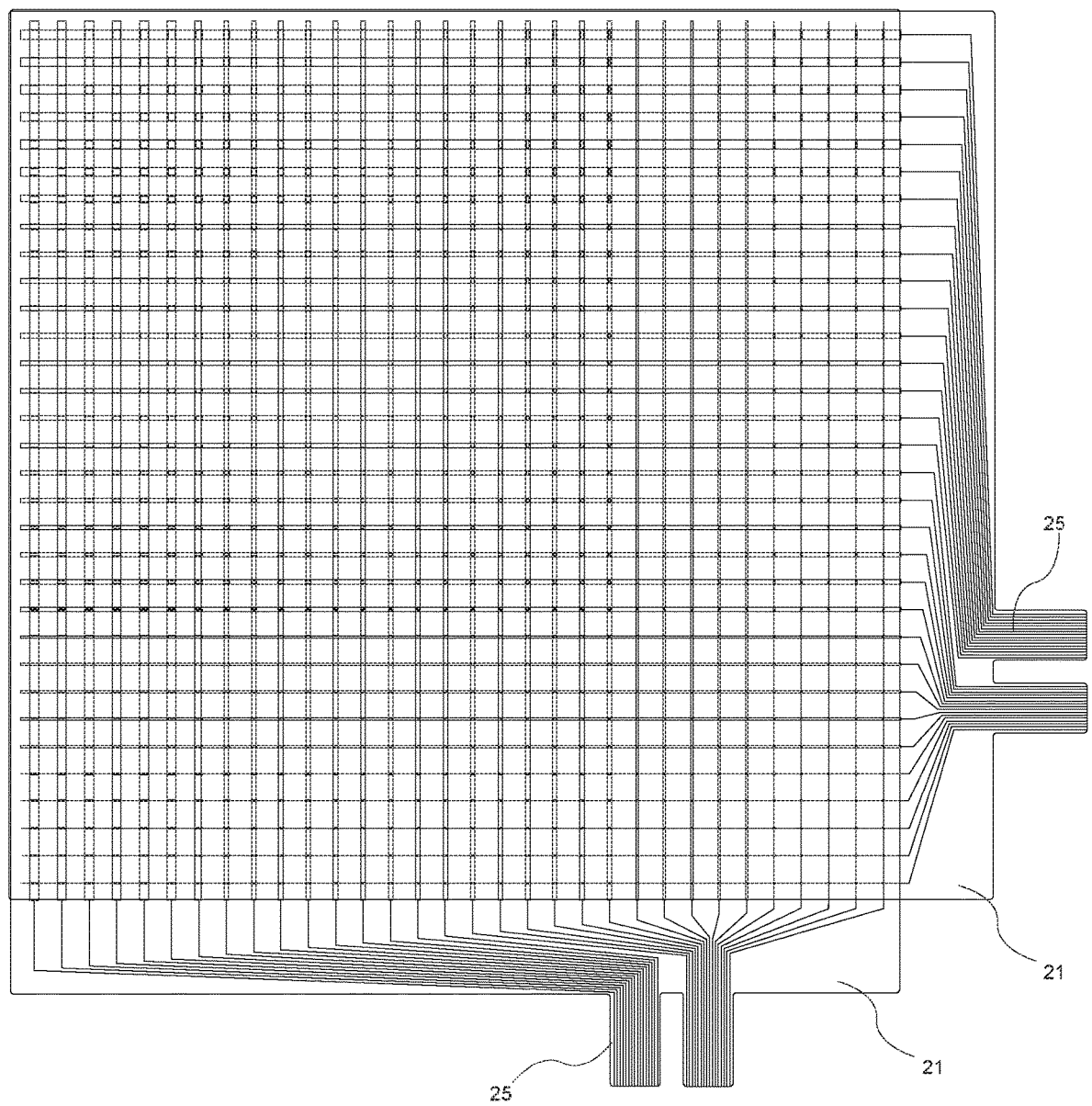

In order to test the optimal conductor line 23 width, the technique here includes a testing procedure, a Test Active sensing array 20 is manufactured where a Test Sensor Surface 21 is printed in which the thickness of the conducting lines 23 is varied between rows (and therefore, on the obverse side of the sensor, of columns) as in FIG. 9A. This testing version of the active sensing array 20, a shown in FIG. 9B, allows for selecting the optimal choice of line width for any given application in final manufactured tiles. FIG. 9B shows the line Conductive Trace Lines 23 (with top and bottom Sensor Surfaces 21 juxtaposed).

Figure 8:
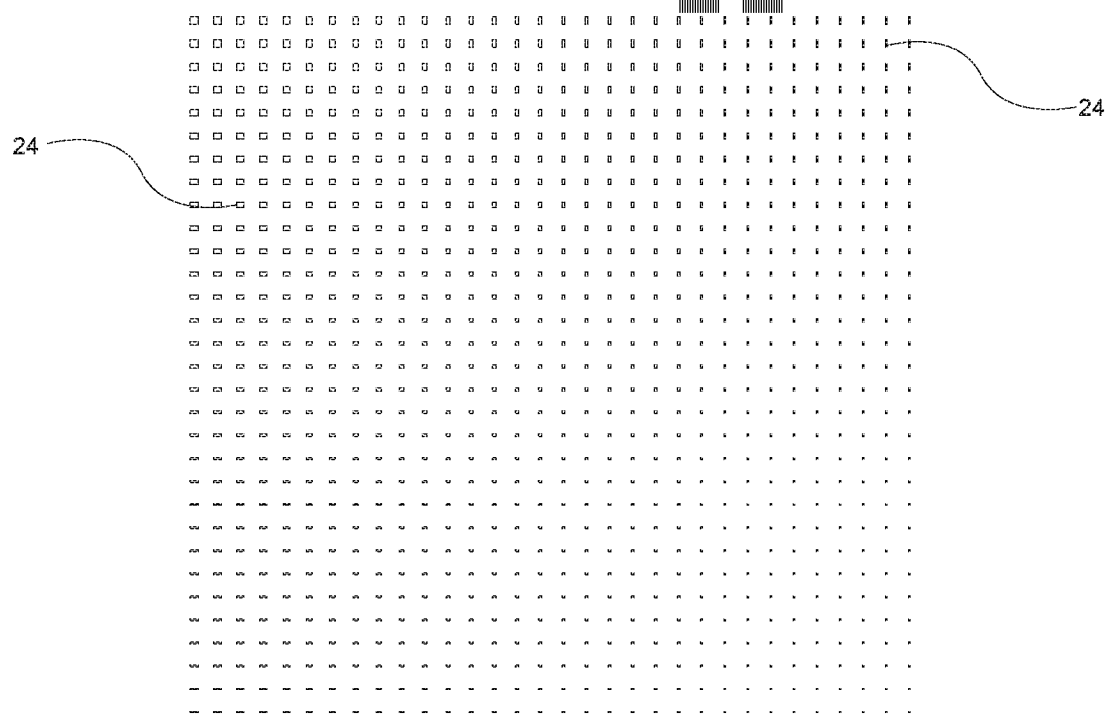

FIG. 8 shows the test pattern of the resistive ink 24 pattern printed on Sensor Surface Sheet 21, for the testing embodiment of an active sensing array 20 with graduated conducting trace line widths, used to test the optimal conducting trace line 23 width, as seen in FIG. 9A. FIG. 9B shows a superposition of the Sensor Sheets 21, in their final operational positions of the conducting lines 23 for the top surface 21 of the active sensing array 20 and the conducting lines 23 for the bottom surface 21 of the test active sensing array 20, for a single tile.

How the top and the bottom ink pattern can be the same, merely rotated 90 degrees and flipped over:

In one embodiment of the present invention for the Trace Lines 23, in which the Active Sensing Array 20 area is square, the top half and bottom Sensor Sheet 21 of the Active Sensing Array 20 for the title 2 are exactly the same. The bottom Sensor Sheet 21 is rotated 90° and then flipped over, with respect to the Sensor Sheet 21. When this is done, the junctions and printed FSR 24 line up with each other exactly as seen in FIG. 2.

Electronic components printed and/or assembled directly onto the sensor array:

Rather than requiring a separate Printed Circuit Board (PCB), all electronics can, in one embodiment, be printed and/or assembled directly onto the active sensing array 20, thereby greatly reducing the cost and complexity of manufacture.

Force Sensitive Resistors (FSR):

Force-sensing resistors consist of a semi-conductive material which changes resistance following the application of force to the surface. FSR generally consists of electrically conductive and non-conductive particles causing the material to be semi-conductive. FSR is normally supplied as a sheet or as ink which can be applied using a screen printing process. FSR is low cost and durable.

Firmware

For each group of tiles, there are three types of firmware: a slave and a master and host communication. The slave firmware is placed on the micro-controller for each sensor tile and is used to gather pressure information for that sensor. The master firmware is installed on at least one micro-controller and manages the communication between the group of tiles and the host communication firmware transmits the pressure data to the computer.

Slave Firmware

The slave firmware uses digital and analog I/O pins on the micro-controller to scan the sensor for pressure information. When connected, the sets of row and column wires are either assigned to be output or input wires. Output wires can provide a positive voltage or be set to ground. Input wires can either be set to ground or read a voltage from a wire. At the start of each frame, one output wire is set to a positive voltage, while the rest of the output wires are set to ground. The input wires are also set to ground, except for one wire which scans the voltage coming from the intersection of the output and input wires. The firmware then scans the next input wire, while setting the others to ground. After all input wires have been scanned, the next output wire is set to a positive voltage, while the first is set to ground, and the input wires are scanned again. This is repeated for all the voltage wires, until every intersection has been scanned.

In one embodiment, 32 column wires are attached to digital I/O pins and 32 row wires are attached to additional digital I/O pins that can read different voltage levels. Using slave firmware algorithm gives a 32 by 32 array of sensing element data with 4096 levels of pressure at each intersection.

Master Firmware

The master firmware handles the flow of information from the individual tiles to other master tiles or to the computer. To get the pressure frame information from each tile, a communication protocol is established between the master and slave microchips. The protocol topology varies depending on the size, shape and desired behavior of the tile grouping. In the communication protocol, data can either be polled by or streamed to the master micro-controller. In a polling system, the master requests frames from individual tiles, managing the flow of data to the master tile. In a streaming system, the sensors attempt to stream its data to the master until the data has been received. The data passed to the master controller can represent the entire frame of data or can be compressed. In one case, run-length encoding reduces the size of the frame by removing repeated zeros. Another form of compression involves sending only the differences between two frames. By sending only the difference between frames, static objects on the sensor having no change in pressure signature do not require the sending of any continuous data to the master about those regions.

In one implementation, an $I^2C$ hub protocol is established between multiple tiles. Information is sent from each of the slave micro-controllers on a slave Tile 11 to a master micro-controller on Master Tile 7. In FIG. 37, a schematic for an $I^2C$ hub is shown which uses a Serial Data Line (SDA) 96, which transmits the data between the slaves and the master, and a Serial Clock (SCL) 97, which keeps time, and the power or Vdd 98.

In another implementation, the tiles can use an RS-485 communication protocol and be linked together in a daisy-chain multipoint setup. FIG. 38 shows a rectangle grid of slave tiles 11 is connected in a daisy-chained S-pattern to a Terminal Master Tile 7. The Master Tile 7, acting as the Host Communicator Tile 12, connects with an external computer 3 over USB 9.

The accumulated pressure data is then passed through an addition communication protocol to the requesting device. In one implementation, a UART point-to-point communication is established between the micro-controller and the computer using a serial USB cable. Pressure data is sent from the micro-controller to software drivers located on a host computer.

Figure 39:
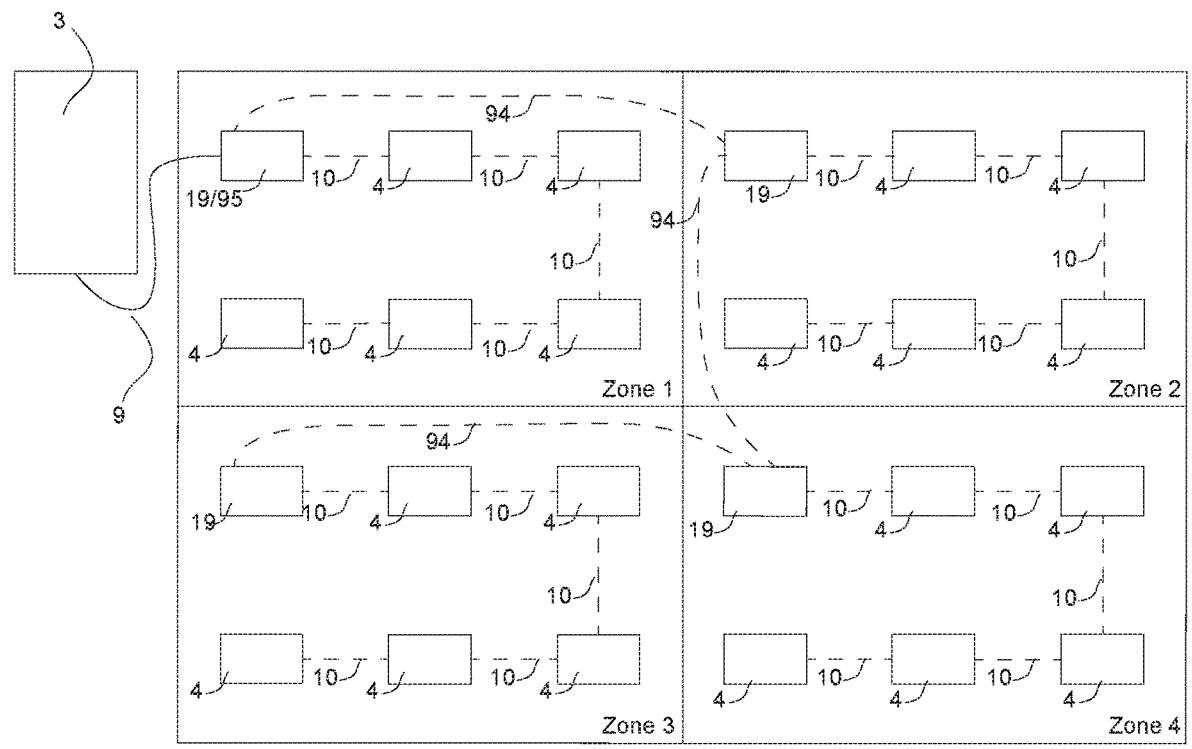

In other embodiments, as seen in FIG. 39, there can be more than one master tile 7 in the grid. For larger areas and/or longer distances, groups of tiles can be reduced into zones, splitting up the data responsibilities to multiple masters 7. The data from these multiple zones can be collected through multiple communication protocols to the computer or a tree structure could be used so data is sent to a up the tree's masters until the data reaches the desired location. In other embodiments, a multi-master protocol can be used to allow slaves 11 to divide the data sent between multiple masters in the same bus, reducing the load on a single master 7 to collect the data. These masters can be but are not necessarily the Host Communicator Tile 12 that transmits data to the computer.

Stepping through the entire process from the perspective of the respective parts of one embodiment:

LIST OF HARDWARE COMPONENTS

Host computer 3
USB Connector 9
Printed Circuit Board 8
Microcontroller 5
Semi-Rigid Touch Layer 31
Active Sensing Array 20
Physical Substrate Support Surface 32
Inter-Tile Communication Cable 10
Neighbor Query/Sense Wires 13
Inter-Tile Physical Link Connector 71
Apparatus Housing/Frame 14

A computer 3 is connected to a grid of tiles 7 & 11 with a USB Connector 9 to a Host Communication Tile 12 in a grid of Tiles as seen in FIG. 36.

An Inter-Tile Physical Link Connector 71 physically connects the tiles to each other, as seen in FIGS. 41, 42A, and 42B.

The Inter-Tile Physical Link connection 71 should be sized to maintain the same distance between the adjacent tile's sensing elements and the standard (in Tile) sensing element spacing.

Figure 45:
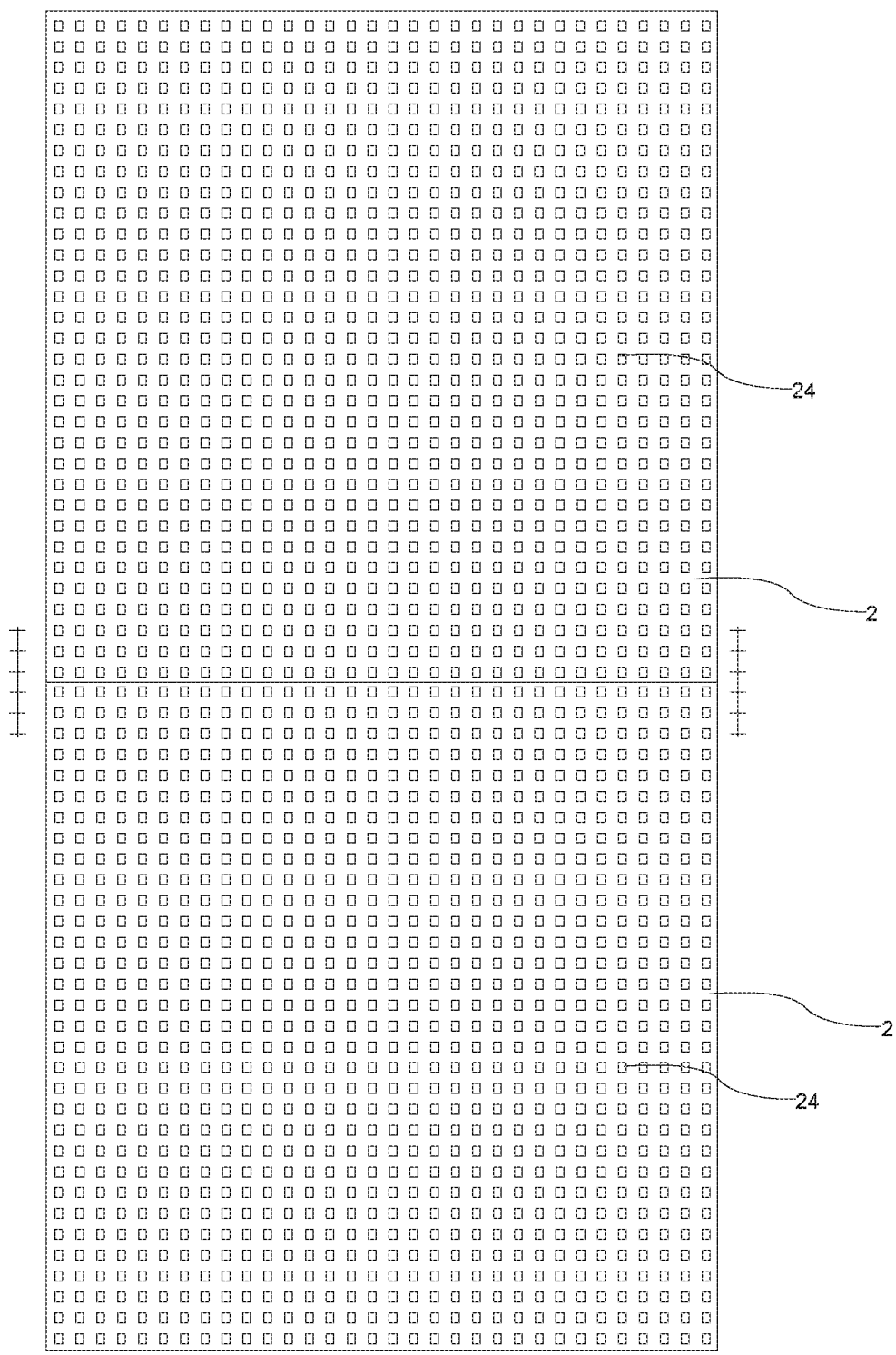
FIG. 45 shows adjacent tiles preserving inter-sensing element distance.

FIG. 45 shows two adjacent tiles preserving inter-sensing element 26 distance is preserved across tiles 2.

An Inter-Tile Communication Cables 10 connects tiles, in one implementation, in a daisy chain manner as seen in FIG. 38.

FIG. 38 shows a Chain of Slave Tiles 2 to the Master 7/Host Communication Tile 12, and then via USB 9 to Computer 3.

Figure 43:
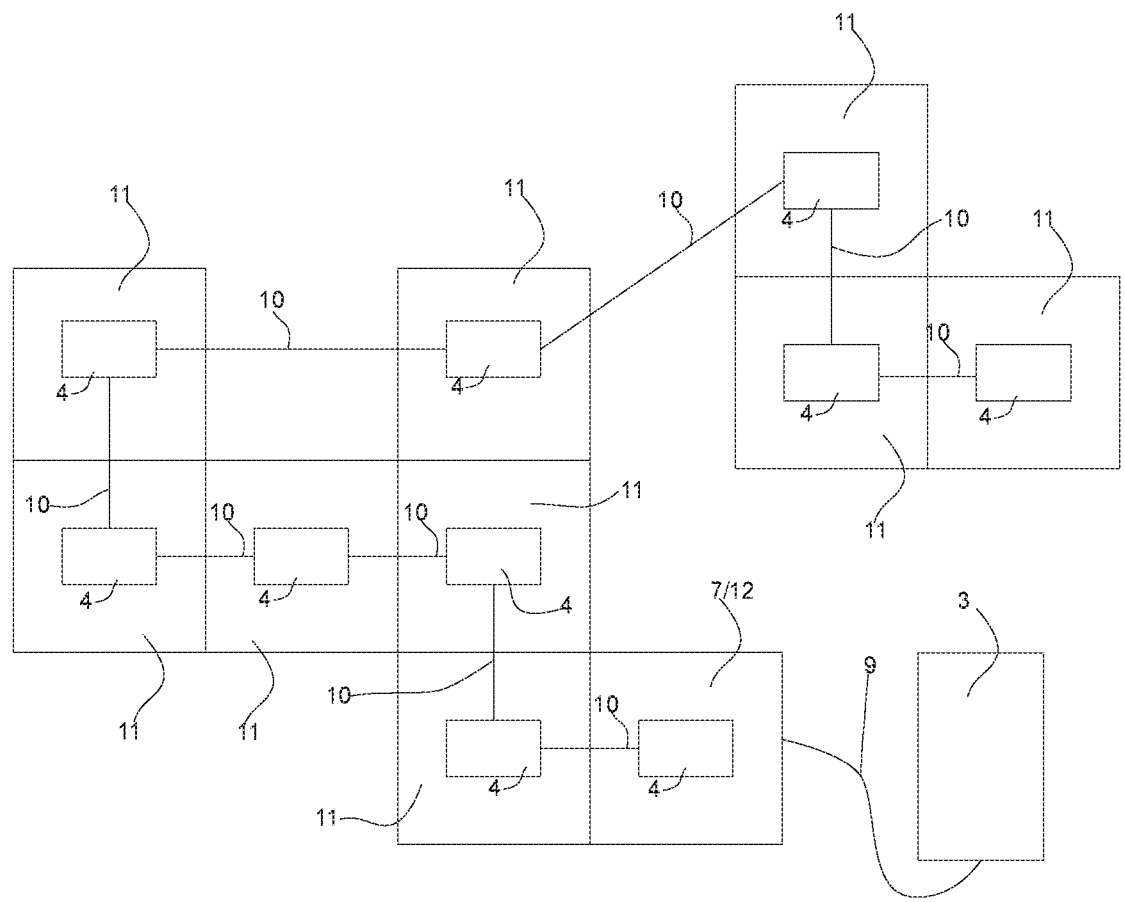
FIG. 43 shows a disconnected grid of tiles.

The tiles do not need to be in any particular geometric configuration. In fact, the surface they form can be non-contiguous. FIG. 43 shows a daisy chain connection between an arrangement of non-contiguous tiles 2. The tiles 2 are connected by a daisy chain of inter tile connections 10. One of the tiles acts as master 7 and host connectivity tile 12 and has a connection 9 to the host computer 3.

A Query/Sense wire (QSW) 84-87 also is connected between adjacent tiles.

The North QSW 84 will be connected to the South QSW 85 of the tile above it (if it exists).
The South QSW 85 will be connected to the North QSW 84 of the tile below it (if it exists).
The East QSW 86 will be connected to the West QSW 87 of the tile to its left (if it exists).
The West QSW 87 will be connected to the East QSW 86 of the tile to its right (if it exists).

FIG. 40 shows a Sample Grid of Tiles with N/S/E/W neighbor query/sense connection.

In One embodiment as seen in FIG. 119, each Tile 2 consists of:
A Support Layer 32
A Printed Circuit Board (PCB) with a microprocessor 4
  The Printed Circuit board 4 may be mounted on the bottom of the Support Layer 32.
  An Inter-Tile Communication Cable 10 is attached to the Printed circuit board 4 for connection to an adjacent tile 2.
  Four Query/Sense Connection Wires 84-87 are attached to the Printed Circuit Board 4.
  The Host Communication Tile Printed Circuit Board 95 for a Host Communication Tile 12 will also have a USB connection wire 9 for connecting with the Host Computer 3. In the case of a single tile embodiment, that single tile's printed circuit board 4 can also provide the functionality of the Host Communication Tile.
An Active Sensing Array 20 consisting of an N×M grid of sensing elements and control wires 23.
  The active sensing array 20 is placed above the Support Layer 32.
  The active sensing array 20 is wrapped around the edge of the Support Layer 32.
  The active sensing array 20 is plugged into the tile PCB 4 using the connector Tails 25 on the Active sensing array 20.
  Protrusions 30 are affixed on the outer face of the active sensing array 20 at the corresponding sensing element 26 locations as in an active sensing array with attached protrusions 55 embodiment is shown in FIG. 119.
A Semi-Rigid Touch Layer 31
  The Semi-Rigid Touch Layer 31 is placed on top of the active sensing array 20.

In one embodiment, the Active Surface Array 20, as seen in FIGS. 1-6, for an N×M grid of sensing elements consisting of:
One layer with conductor lines 23 for n rows
One layer with conductor line 23 for M columns
Force Sensitive Resistor (FSR) material 24 at the row/column intersections
Connector Tail 25 with N and M wires corresponding to rows and columns conductor lines respectively. The connector tails are separated into banks of 16.

In FIG. 119 shows Connector Tails 25 separated into banks of 16.

Figure 46:
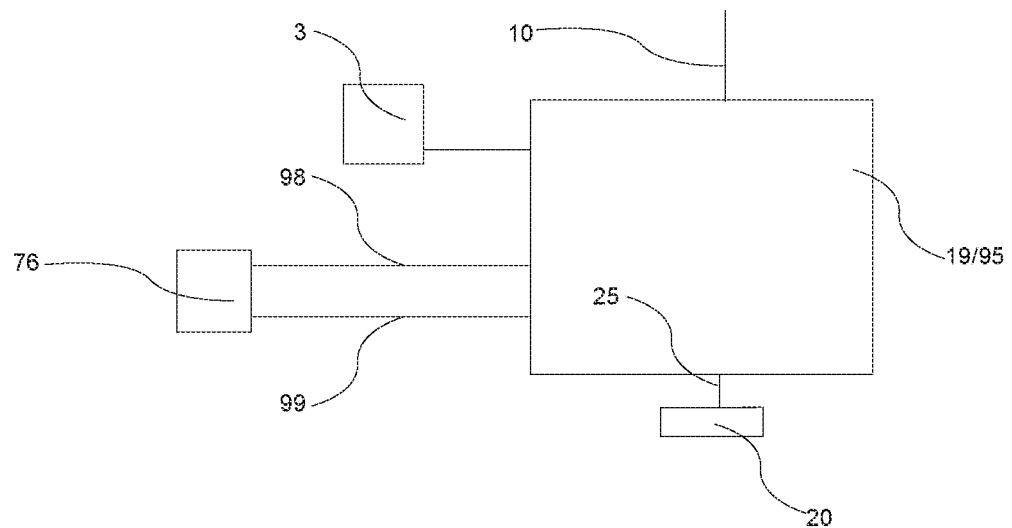
FIG. 46 shows a block diagram of the electronics for a tile functioning as both the Host communication Tile and as a Master Tile.

FIG. 46 is a block diagram of the electronics for a tile functioning as both the Host communication Tile 12 and as a Master Tile 7. The host computer 3 is connected host communication tile 12 via a standard protocol such as USB where the data is transferred back and forth vie the Rx 78 and Tx 79 line. Power can be supplied, via the USB cable, from the computer 3, through a voltage regulator 76 as required by the microcontroller 5. The active sensing array 20 is connected to the Printed Circuit Board 4 by plugging the connector tails 25 of the active sensor array 20 into the tail connector clip 16 on the printed circuit board 4. The Master Tile 7 communicates with slave tiles 11 via a communication protocol such as I²C connected by inter-tile communication cables 10. Power, or Vdd 98, is supplied to all slave devices from either the Master Tile 7 or via an external power supply 17 as needed. Adding a common ground to all active electronics, Vss 99, completes the circuit.

Figure 47:
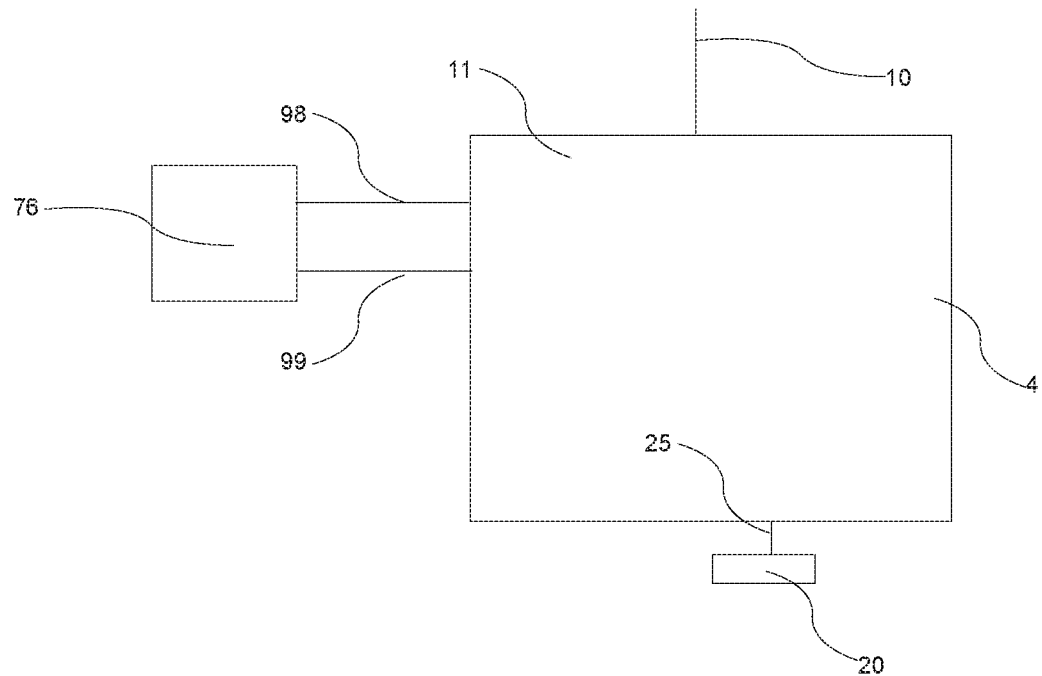
FIG. 47 shows a block diagram for a slave tile.

FIG. 47 shows a block diagram for a slave tile. The Microcontroller 5 is on the same power (Vdd 98)/ground (Vss 99) circuit as the other tiles, including the master tile 7. The active sensing array 20 is connected to the PCB 4 by plugging the active sensing array 20's connector tails 25 into the connector tail clip 16 on the printed circuit board 4. A slave tile 11 communicates with other tiles via a communication protocol such as I²C connected by inner-tile communication cables 10.

Tile Housing/Frame

The entire Tile 2 assembly may be housed in frame made of plastic or other materials.

The width of any housing frame perimeter must be thin enough to maintain inter-sensing element distances across tiles, as seen in FIG. 45.

Stepping through one embodiment of capturing and transmitting Pressure Image Data across multiple tiles and to a Host Computer, to create a full time-varying multi-tile Pressure Image.

Each Tile contains (along with supporting electronics as per the description above):
- A programmable microcontroller 5
- Microcode to sensor data collection and communication (described as follows)
- An Active Sensing Array with N columns and M Rows 20
- Inter Tile Communication wiring 10 to support a Master/Slave bus, such as I²C, as shown in FIG. 38

The Host Communication Tile 12 (such as T-0 in FIG. 38) contains:
- A USB Connection 9 to the Host Computer 3
- Note: It is standard that commercial microprocessors provide inter circuit communication protocols such as I²C capabilities.
  - For example PIC24HJ256GP610 microcontroller from Microchip provides I²C support
- I²C is an industry standard Master/Slave Bus Protocol
- I²C provides protocols for dynamically assigning unique IDs to slaves on the Bus
- Note: It is standard that commercial microprocessors provide USB capabilities
  - For example, PIC24HJ256GP610 microcontroller from MicroChip provides USB support
- Note: It is standard that commercial microprocessors can simultaneously support both I²C and USB communications
  - For example PIC24HJ256GP610 microcontroller from MicroChip has this capability
- As per the above, the methodology will assume that
- The Host Communication Tile 12 will contain Host Communication Tile Firmware
- In the example shown in FIG. 38, Tile T-0 is acting as the Host Communication Tile 12 and as a Master Tile 7 for the grid
- All Other tiles will be considered slave tiles 111
- Slave tiles 11 will contain the slave tile Firmware
- Slave tiles 11 will have obtained unique IDs as per I²C standard protocol Firmware on the microcontroller for tiles perform several distinct tasks
1. Local Tile Sensor Grid Pressure Imaging Capturing
2. Getting the Data from Slaves 11 to the Master Tile 7 and/or Host Communication Tile 12
3. Communicating Local Tile Sensor Grid Pressure Image to Host Computer 3
4. Communicating Tile topology and/or adjacency data to the Host Computer 3 for the reconstruction of the multi-Tile Pressure Image on the Host Computer 3
5. Initial Dynamic Discovery of neighboring tile topology adjacency data
   - Note this step would not be necessary if pre-assigned IDs were applied to the tiles along with manual storing of tile topology.

In a single tile apparatus embodiment, that single tile can also acts as the Host Communication Tile 12. In a single Zone apparatus embodiment, namely an apparatus containing grid of tiles with a single Master Tile 7 and as seen in FIG. 38, that single Master Tile 7 can also act as the Host Communication Tile 12. In a multi-zone apparatus embodiment, namely an apparatus containing grid of tiles with multiple Master Tile 7 in communication with each other and as seen in FIG. 39, one of these master tiles 7 can also act as the Host Communication Tile 12.

In some embodiments, the circuitry and microcode for the Master tile functionality may be on a separate printed circuit board that may or may not physically be connected to the Master Tile 7. Similarly, in each case, in some embodiments, the circuitry and microcode for the Host Communication Tile functionality may be on a separate printed circuit board that may or may not physically be connected to the Host Communication Tile 7.

Each connecting cable that goes between two tiles such as the Inter Tile Communication Cable 10 or the Master-master multi-zone connector cable 94 is concurrently an 'inbound cable' for one of the tiles and 'outbound cable' for the other. Relative to a specific tile though, an 'inbound cable' is one from the tile in the chain from which sensing data packets flow towards the host computer in the visa-versa for an 'inbound cable'. For example relative to FIG. 38, the cable between T-1 and T-2 is an Inbound cable for T-2 and an outbound cable for T-1.

Figure 44:
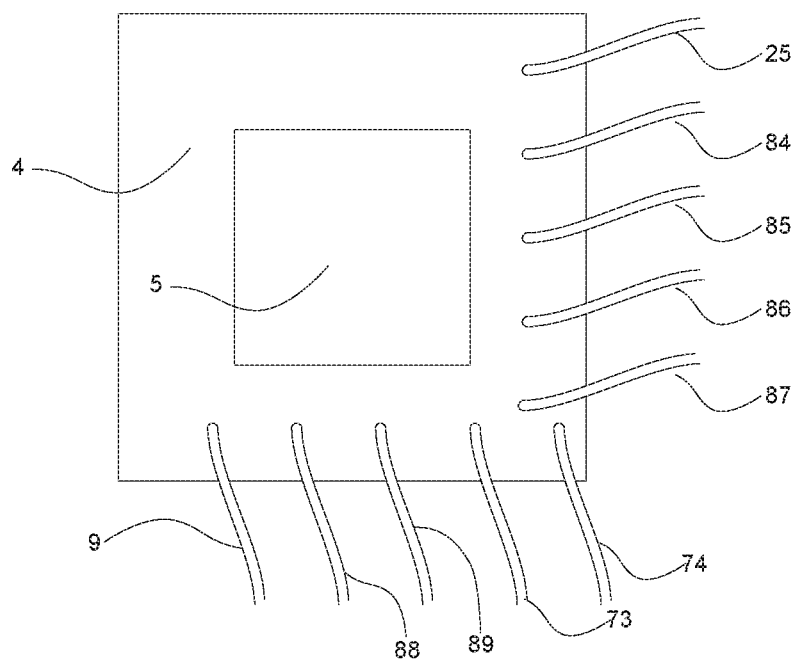
FIG. 44 shows cables/wires to/from Microprocessor.

FIG. 44 shows the cables/wires to/from a respective tile printed circuit board 4 for one embodiment of tiles such that:
- All tiles have Query Sensing Wires 84-87;
- All Tiles have Connector Tails 25 going into their Connector Tail Clip 16
- Master Tile 7 and Non-Terminal slave tiles 11 for a zone have Outbound Inter-Tile Communication Cables 89
- Slave Tiles 11 have Inbound Inter-Tile Communication Cables 88
- Host Communication Tile 12 will have a USB Cable (in one embodiment)
- In a multi-zone apparatus, Host Communication Tile 12 and non-terminal Master tiles 7 for a zone have Outbound Master-master multi-zone communication cable 74
- In a multi-zone apparatus, Non Host communication Master Tiles 7 for a zone have Inbound Master-master multi-zone communication cable 73

(1) Local Tile Sensor Grid Pressure Image Capturing (Both Master and Slave)

The Image Capturing Microcode will maintain N×M numeric Pressure Image Buffer of measured sensing element values corresponding to a Frame of pressure data for that tile. The values in this Buffer are measured in the following manner.
- The (i,j) element of the Pressure Image Buffer will correspond to the pressure value for a row and column intersection.
- As per method described in the text above, the (i,j) element of the Image Buffer Array may be measured by
  - Setting all output wires to ground, except for the i-th output wire
  - Set the i-th output wire to Positive
  - Set all input wires to to ground, except for the i-th input wire
  - The firmware wills can the j-th input wire reading it as a digital value
  - This value will be stored in the (i,j) element of the pressure image buffer
- By looping through all N and M wires a complete N×M Pressure Image Buffer data is measured (2) Getting the Data from Slaves Tiles 11 to the Master 7

The Microcode on the Master Tile 7 will poll each slave tile 11 for Pressure Image Data
- The reported data packet from each slave will contain the title ID and the Pressure Image Buffer Data
- For simplicity, assume the Pressure Image Buffer Data is a full copy of the Tile's Image Buffer
  - Alternatively it could be run length encoded Alternatively it could provide delta (only changes from the previously reported buffer)

Either, both or other techniques can be applied to improve performance on the data transfer subsystem The Microcode on the Slave Tiles 11 will receive a poll request and respond by sending the packet of data as per the above description, namely Tile ID+Pressure Image Buffer data (3) Communicating Local Tile Sensor Grid Pressure Image from the Master Tile 7 to Host Computer 3, described for embodiment where the Master Tile 7 is also acting as the Host Communication Tile 12.

Expanding upon (2) above, the Master Host Communication Tile 7 will

For Each Slave Tile 11

Poll Each Slave Tile 11 for Pressure Image Data over the $I^2C$ Bus

Receive the Slave Tile's 11 Pressure Image Data over the $I^2C$ Bus

Send the Slave Tile's 11 Pressure Image Data to the Host Computer 3 over USB Send its own Pressure Image Data (if connected to a tile) to the Host Computer 3 over USB By repeating the above step continuously, Streaming, Time-Varying Pressure Image Data for the aggregate of tiles 2 will be received by the host computer 3.

(4) Reconstruction a multi-Tile Pressure Image on the Host Computer

In one embodiment an A×B row/column grid of Pressure Tiles 2, each containing N×M row/column grid of sensing elements 26 in their respective Active Sensing Arrays 20, produces an effective Pressure Surface of (A*N) rows and (B*M) columns grid of addressable Pressure data of a reconstructable pressure image.

A Tile Topology Data Table on the host computer can be maintained with the position of the Tile relative to the overall Grid of Tile Topology In one embodiment this can be manually stored on the Host Computer In another embodiment it can be dynamically constructed from a Tile Adjacency Table Sample Tile Topology and Tile adjacency tables corresponding to the apparatus configuration seen in FIG. 38 appear earlier in this document As Pressure Image Buffer Data for each tile with a provided Tile ID is received The Tile Row r, and Tile Column c, values may be looked up in Tile Topology Table The Tile Pressure Image Data can be mapped to the Coherent (N×A)×(M×B) overall pressure image by mapping the tile's sensing element data for (i,j) to (r*N+i, c*M+j)

(5) Initial Dynamic Discovery neighboring tile topology

During an initialization phase, the relative positions of all of the tiles could be obtained by the following series of data exchanges (over the $I^2C$ Bus unless otherwise stated).

The Microcode on the Master Tile 7 performs as follows:

For Each Slave Tile 11 and for the master tile 7

For each of North, South, East, West

Send a data packet requesting that the tile turn on the corresponding Query/Sensing wire (North 84, South 85, East 86, or West 87) for that direction for the query Tile ID Packet Contents: Query Tile ID and the direction wire to turn on Receive the Query/Sense response packet from the appropriate Tile 'Packet Contents: Detected', direction (North/South/East/West), Detected Tile ID, Query TileID (from detecting Tile)

Packet Contents; 'Nothing Connected', direction, Query TileID

Send the response packet to the 3 Computer over USB

The Microcode on the Slave designated to receive the 'activate wire' request to turn on the Query/Sensing Wire if that tile detects that no tile is connected in the designated direction (possibly due to an end resistor)

Send a 'Nothing Connected' response packet to the Master

Packet Contents; 'Nothing Connected', direction, Query TileID

Otherwise, turn 'on' the designated directional Query Sensing Wire (North 84, South 85, East 86, or West 87)

The Microcode on the Slave that detects the 'on' Query Wire State from its corresponding Query State Wire (North 84, South 85, East 86, or west 87)

Send a 'Detected' and its Tile ID data packet to the Master

'Packet Contents: Detected', direction (North/South/East/West), Detected Tile ID, Query TileID (from detecting Tile)

Note that the detecting wire direction is the opposite direction as the detected tile direction, namely: detecting on North Wire 84 indicates tile to the South; South Wire 85 indicates tile to the North; East Wire 86 indicates tile to the West; and West 87 Wire indicates tile to the East.

In the embodiment of an N×M Rectangular grid of tiles, a 'Tile Topology Table' can be constructed from the 'Tile Adjacency Table' as follows:

Create a set of M ordered column lists of tile IDs corresponding to North/South Connectivity by for each of the M Tile IDs that has 'none' as its northern neighbor Search for the Tile ID that has this for its southern neighbor Iterate until a Tile ID with 'none' as its southern neighbor is obtained Order the set of M ordered Column lists left to right as follows:

Search the set of Column Lists' first element for the one with 'none' in the WEST direction. This is the leftmost column (i.e. column 0)

Search for the Column List whose first Element is EAST of the one just found

Iterate until at the column list who's first Element has no EAST neighbor

One can now populate the Adjacency table by getting the respective row/column numbers of the tile IDs The column numbers are from the ordered column list position The row numbers are the position in the respective column list A Description of the Actual Prototype that was Built A description as an example of the prototype built: (a) The actual materials used for each layer, (b) the dimensions, (c) the size of each tile, (d) how many tiles were used, (e) the product number and company which made a given component.

Basically all details about the prototype. It can be in any form, such as a table or list, whatever is easiest to provide the information into the application.

(a) The Actual Materials Used for Each Layer

The individual sensing materials used for each sensing tile consists of a 5 mil thick plastic substrate, printed silver electrodes (placed at ⅜" spacing) and small rectangles of FSR materials in the vicinity of the grid intersections.

(b) The Dimensions

The active sensing area of each sensing tile is 12"×12"

(c) The Size of Each Tile

Each tile is 12"×12" with ⅜" spacing between wires.

(d) The Product Number and Company which Made a Given Component:

COMPONENT TABLE

| Name | Component | Value | Manuf | Manuf Part No | Distrib | Distrib Part No | Qty |
|------|-----------|-------|-------|---------------|---------|-----------------|-----|
| C1-C10 | .1 uf capacitor | .1 uF | | c0603c104k5ractu | Mouser | 80-c0603c10455r | 10 |
| C11 | 10 uf capacitor | 10 uF | | C0805C106Z8VACTU | Mouser | 80-C0805C106Z8V | 1 |
| CONN8 | Molex 1 mm 16 pin bot ziff connector | n/a | Molex | 52271-1679 | Mouser | 538-52271-1679 | 1 |
| CONN9 | Molex 1 mm 16 pin bot ziff connector | n/a | Molex | 52271-1679 | Mouser | 538-52271-1679 | 1 |
| CONN10 | Molex 1 mm 16 pin top ziff connector | n/a | Molex | 52207-1685 | Mouser | 538-52207-1685 | 1 |
| CONN11 | Molex 1 mm 16 pin top ziff connector | n/a | Molex | 52207-1685 | Mouser | 538-52207-1685 | 1 |
| LB | LED BLUE | n/a | Avago Technologies | HSMN-C170 | Mouser | 630-HSMN-C170 | 1 |
| LG | LED GREEN | n/a | Avago Technologies | HSMM-C170 | Mouser | 630-HSMM-C170 | 1 |
| LR | LED RED | n/a | Avago Technologies | HSMC-C170 | Mouser | 630-HSMC-C170 | 1 |
| R1 | R | 100 Ohms | | CRCW0603100RFKEA | Mouser | 71-CRCW0603-100-E3 | 1 |
| R2 | R | 4.7K Ohms | | CRCW06034K70FKEA | Mouser | 71-CRCW0603-4.7k-e3 | 1 |
| RLB | R SMT 3.3K | 3.3K Ohms | Vishay | CRCW06033K30JNEA | Mouser | 71-CRCW0603J-3.3K-E3 | 1 |
| RLG | R SMT 3.3K | 3.3K Ohms | Vishay | CRCW06033K30JNEA | Mouser | 71-CRCW0603J-3.3K-E3 | 1 |
| RLR | R SMT 3.3K | 3.3K Ohms | Vishay | CRCW06033K30JNEA | Mouser | 71-CRCW0603J-3.3K-E3 | 1 |
| U1 | PIC24HJ256GP610 | n/a | Microchip | PIC24HJ256GP610-1/PF | Mouser | 579-24HJ256GP610-P/PF | 1 |
| U2 | REG1117A | 3.3v | Fairchild | REG1117A-ND | DigiKey | REG1117A-ND | 1 |
| USB Transceiver | USB-RS422 | n/a | FTD1, ltd. | TTL-232R-3.3V-WE | Mouser | 895-TTL-232R-5V-WE | 1 |
| Sensor | Sensing Layers | n/a | Parlex | VIP294 | Parlex | VIP294 | 2 |
| | | | | | | Total Number of parts: | 27 |

(e) Pressure Sensitivity

To test the pressure sensitivity of the prototype, a 5 g base that rests four points was placed with one of the points on top of a wire intersection. 5 g and 100 g weights were placed on the base to create weights from 5 g to 300 g. The intersection received a quarter of this weight, so the weight range varied from 1.25 g to 75 g at the intersection. Values were only registered by the computer for weights about 2.5 g. The values from the computer scaled linearly from 46.87 to 1320.71.

| Weight at Intersection | Value on Visualizer |
|------------------------|---------------------|
| 0 g | 0 |
| 2.5 g | 46.87 |
| 5 g | 101.65 |
| 7.5 g | 167.97 |
| 10 g | 218.75 |
| 12.5 g | 265.62 |
| 25 g | 468.75 |
| 50 g | 871.34 |
| 75 g | 1320.71 |

Outline

List of all components
  Integrated Protrusion and Base Layer 42
  Active Sensing Array 20
  Semi-Rigid Touch Layer 33
  USB Cable 9 and USB Transceiver 80
  Computer 3
  Master Tile 7

Operation: Outside point of view

One or more objects are placed into contact with the Pressure Sensing Apparatus 1. The pressure Sensing Apparatus 1 sends to the computer a two-dimensional array of pressures corresponding to the space-varying pressure of the objects upon the surface.

User touches the pressure Sensing Apparatus 1 at multiple locations, and the device indicates both location and pressure at each location.

Figure 19:
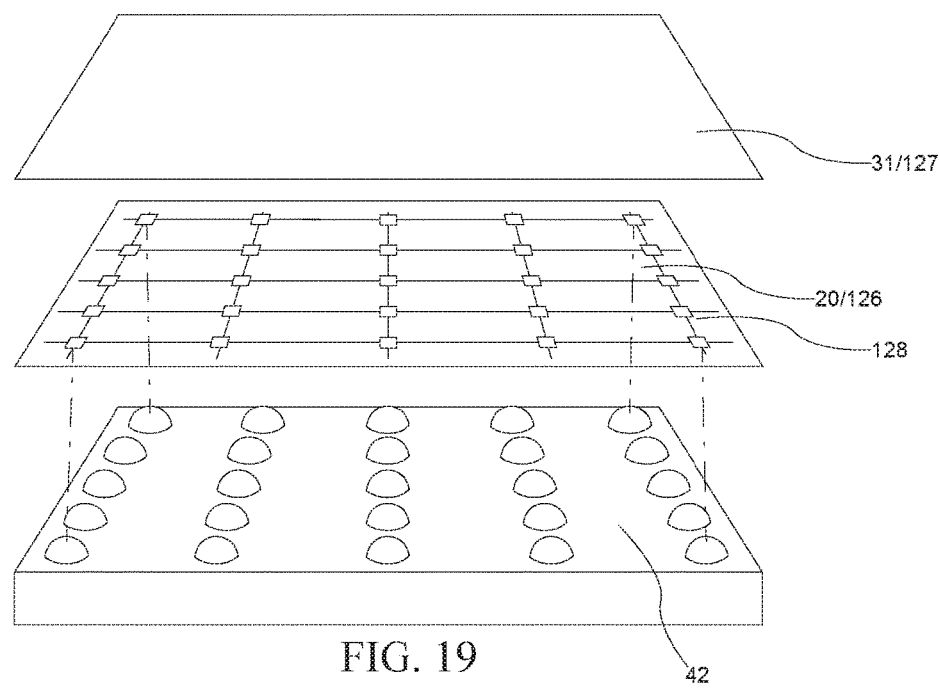

The Embodiment that follows is similar to the Semi-Rigid Touch Layer with Protrusions 33 and the Active Sensing Array with attached protrusions 55 embodiments described above in all aspects other than how force is transmitted to the sensing elements 26 on the Active Sensing Array 20. In the Integrated Protrusion and Base Layer 42 assembly, this is accomplished by an assembly where the Active Sensing Array 20 sits between a Semi-Rigid Touch Layer 31 and an Integrated Protrusion and Base Layer 42 as seen in FIG. 19. All approaches result in imposition of force 34 values being measured at each sensing element 26 on the Active Sensing Array 20. As a result, the description of Interpolation, scanning of data from the sensing elements 26 by the Microcontroller 5, networking slave tiles 11 and master tiles 7, and all other techniques beyond the measuring of the sensing element 26 pressure are all arc achieved in a similar manner.

The Integrated Protrusion and Base Layer 42 embodiment is potentially easier and less expensive to manufacture and assembly than the Semi-Rigid Touch Layer with Protrusions 33. In this embodiment, the Semi-Rigid Touch Layer 31 can be independent of any individual pressure tile 2 and may seamlessly span an arbitrary number of pressure tiles 2. This makes assembly and alignment of the Pressure Sensing Apparatus 1 significantly easier. Having a seamless Semi-Rigid Touch Layer 31 along adjacent pressure tiles 2 naturally results in identical and seamless distribution of force to sensing elements 26 regardless of whether the sensing elements 26 are on the same or adjacent pressure tiles 2.

Additionally, an embodiment of the Integrated Protrusion and Base 42 Layer may includes housing for the Printed Circuit Board 4 and grooves for Tile Connection Cables such as the Inter-Tile communication Connection Cables 10 and multi-zone cable 94, thus reducing the number of parts in the Pressure Tile 2 assembly.

The Pressure Sensing Apparatus 1 can incorporate a mechanical force redistribution mechanism that property distributes pressure so that the sensed pressure is well distributed to the sensing elements in the tile.

The Semi-Rigid Touch Layer with Protrusions 30 can be replaced by a component that is mechanically integral to the supporting base of the pressure tile 2 itself. This makes manufacture easier, is less expensive and more robust, and that makes it easier to avoid misalignment between sensing elements 26 and protrusions 30.

In order to create a Pressure Sensing Apparatus 1 of multiple pressure tiles 2 that creates a seamless and continuous interpolating touch response, the only mechanical component that needs to be shared between the plurality of pressure tiles 2 is a featureless sheet of material, such as plastic, the position of which does not need to be precisely registered with the positions of the sensors in the grid of sensor tiles.

Step by step description of internal working:

Internal operation begins when fingers or other objects impose downward force 34 upon the Semi-Rigid Touch Layer 31.

This force is then transmitted, and properly redistributed, from the semi-rigid touch layer 31 through the sensing elements 26 in the active sensing array 20. The force impinging on each sensing element 26 is then imparted onto the corresponding protrusion 30 in the Integrated Protrusion and Base Layer 42. This creates a concentration of force on the portion of the Active Sensing Array 20 where each sensing element 26 is in contact with a corresponding protrusion 30, thereby creating a force that compresses together the two areas of FSR material 24 in mutual contact at the regions of the Active Sensing Array 20 that comprises the sensing elements 26 (where one FSR region on the outer conducting line of the Active Sensing Array 20 is in contact with a corresponding region of FSR material 24 on the conductive Trace Lines 23 of the Active Sensing Array 20).

The compression creates an increase of electrical conductance between those two areas of FSR material 24 in mutual contact. As the sensor's micro-controller 5 scans through the Active Sensing Array's 20 matrix of sensing elements 26, each change in conductance is measured as a change in voltage, which the micro-controller detects via an Analog to Digital Converter (ADC) 83 that the microcontroller 5 then encodes as a digital signal. The microcontroller 5 then sends this digital signal through a USB Cable 9 to a host computer 3.

Unlike the Semi Rigid Touch Layer with Protrusions 33 technique where the inner face of the protrusions 30 are in contact with the outer surface of the Active Sensing Array 20 as seen in FIG. 15, this technique with the Integrated Protrusion and Base Layer 42 has the outer face of the protrusions 30 in contact with the inner surface of the Active Sensing Array 20, as seen in FIG. 121. This mechanical arrangement allows a concentration of force at the sensing elements 26 of the Active Sensing Array 20, thereby enabling spatial interpolation between adjoining sensing elements 26 without the requirement of protrusions 30 above the Active Sensing Array 20.

One microcontroller 5 can be associated with each pressure tile 2.

General Purpose of Each Layer

FIG. 19 shows an exploded view of a Pressure Tile 2 with the following components: Integrated Protrusion and Base Layer 42, 2 Active Sensing Array 20, semi-rigid Touch layer 31. The Conductive Trace Line 23 intersections on the Active Sensing Array 20 are the locations of the FSR material 24 sensing elements 26. When the layers are placed into contact, each intersection in the Active Sensing Array 20 is aligned with the center of a corresponding protrusion 30 in the Integrated Protrusion and Base Layer 42.

Figure 20:
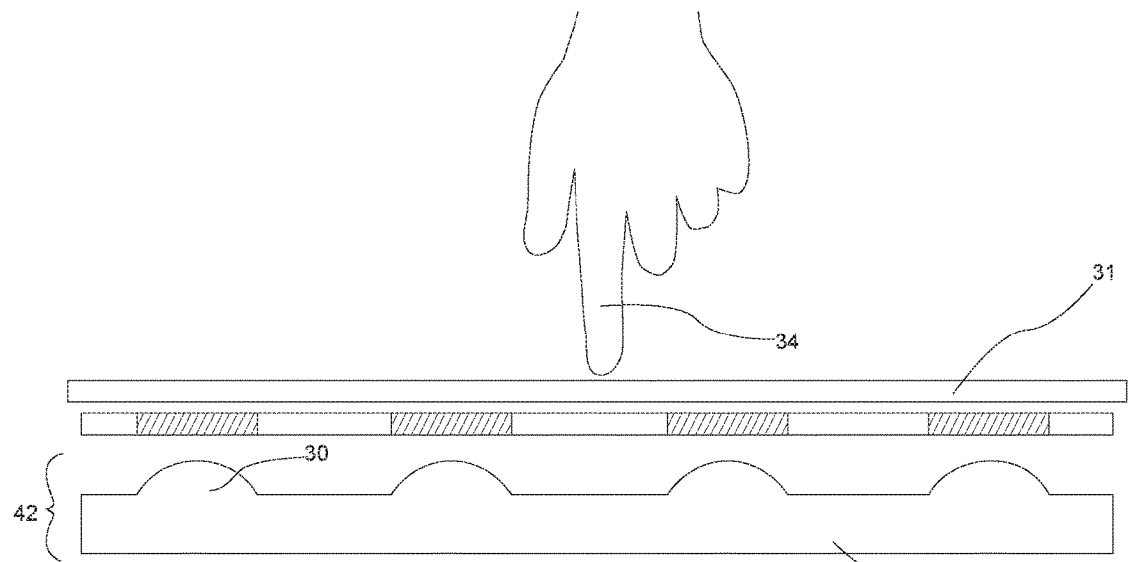

FIG. 20 shows a Profile view of a Pressure Tile 2 with: the Semi-Rigid Touch Layer 31 which is in contact with the Active Sensing Array 20 2; and the Active Sensing Array 20 which is in contact with protrusions 30 of the Integrated Protrusion and Base Layer 42. The protrusions 30 on the Integrated Protrusion and Base layer 42 are aligned with the sensing element 26 regions on the Active Sensing Array 20.

Active Sensing Array 20: The Active Sensing Array 20, shown in FIG. 1, consists of two sensor surface sheets 21 facing each other, where one sensor surface sheet 21 is rotation 90° with respect to the other sensor surface sheet 21, as seen in FIG. 2. FIG. 4 shows the layers of a Sensor Surface Sheet 21 that is complete in FIG. 3. Upon each of the two sensor surface sheets 21 is printed conductive trace lines 23. Small amounts of force sensitive resistive (FSR) material 24 is printed at intervals such that when the two substrates are placed into mutual contact, with the FSR material 24 sides facing each other, the FSR material 24 printed on each sensor surface sheet 21 is placed in the vicinity of the intersections of the grid of conductive trace lines 23. The grid intersection points of overlapping FSR material 24 comprise a sensing element 26 where pressure may be measured.

The Integrated Protrusion and Base Layer 42 consisting of a grid of protrusions 30 spaced such that when the Active Sensing Array 20 is affixed over this layer, one of these protrusions 30 sits directly under a sensing element 26 of the Active Sensing array 20 at the junctions of a multitude of row and column electrodes where the FSR material 24 layers are sandwiched so that pressure may be measured at each intersection point.

The Semi-Rigid Touch Layer 31 is placed in contact with one or more Active Sensing Arrays 20, each of which is resting in contact with the protrusions 30 in its respective Integrated Protrusion and Base layer 42. Pressure applied to the Semi-Rigid Touch Layer 31 will focus the force to the sensing elements 26 directly above protrusions 30 on the Integrated Protrusion and Base Layer 42. In one implementation, the Semi-Rigid Touch Layer 31 is implemented as a sheet of vinyl that can be in the range of 0.5 mm to 1.0 mm in thickness. In another implementation of a single tile configuration the Non-Conductive Surface Substrate 22 of the Active Sensing Array 20 may act as its own Semi-Rigid Touch Layer 31. In other implementations the Semi-Rigid touch Layer 31 may be made of glass, metal or any other material whose thickness can be chosen so that the Semi-Rigid Touch Layer's 31 rigidity falls within a useful range of rigidity.

Figure 21:
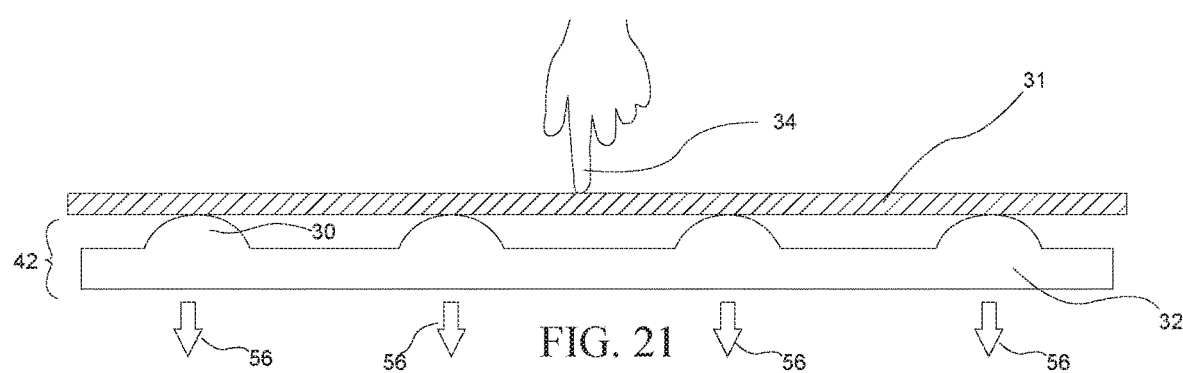
Figure 23:
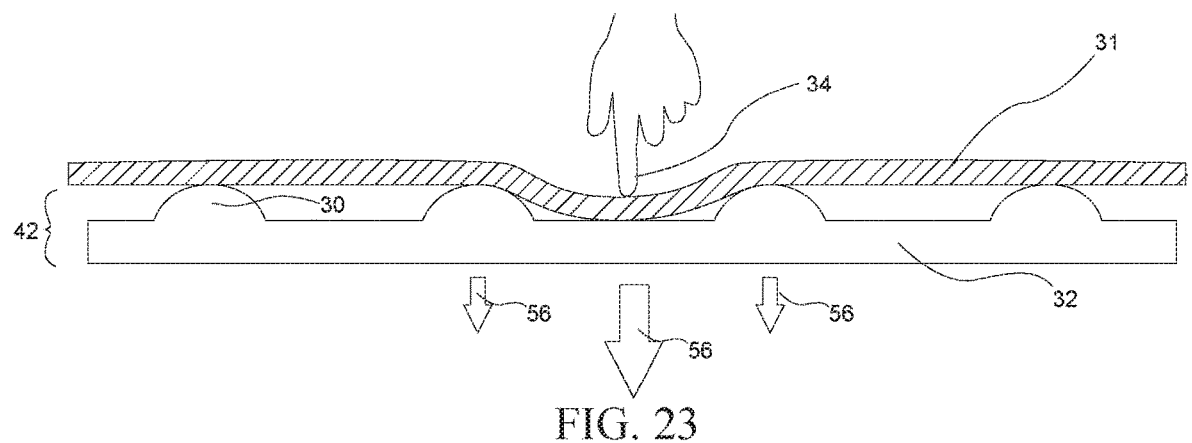

FIGS. 21, 22 and 23 are three cases in which the Semi-Rigid Touch Layer 31 is, respectively: FIG. 21 Too rigid; FIG. 22 Within the useful range of rigidity; FIG. 23 Insufficiently rigid. In each case, the hand shows Imposition of force 34, and the arrows shown imparted force transmitted to the base 56 to different parts of the base 32 of the pressure tile 2.

The Semi-Rigid Touch Layer 31 having a "useful range of rigidity" can be defined via the following constraints of maximal rigidity and minimal rigidity, respectively: The Semi-Rigid Touch Layer 31 would be too rigid if an externally applied force within a 1 mm diameter circular region of the outer face of the Semi-Rigid Touch Layer 31, lying within a rectangular region bounded by four nearest protrusions 30 of the Integrated Protrusion and Base Layer 42 at the rectangle's corners, were to result in pressure being applied to protrusions 30 of the integrated protrusion and Base Layer 42 other than those four nearest protrusions 30, as shown in FIG. 21. For example, a 1 cm thick plate of glass would be too rigid to serve as the Semi Rigid Touch Layer 31. 2 The Semi-Rigid Touch Layer 31 is in the useful range of rigidity if the imposition of force 34 causes force 34 causes force to be imparted to those nearest protrusions 30 but not to other protrusions 30 of the Integrated Protrusion and Base Layer 42, nor to the underlying surface of the Support Layer 32 between the protrusions 30 as shown in FIG. 22; The Semi-Rigid Touch Layer 31 would be insufficiently rigid if the same imposition of force 34 were to cause the Semi-Rigid Touch Layer 31 to deform to sufficient extent that the Semi-Rigid Touch Layer 31 would physically come into contact with the region of the Integrated Protrusion and Base Layer 42 between those four protrusions 30, thereby dissipating force onto inactive regions of the Active Sensing Layer 20 as shown in FIG. 23. For example, a 0.5 mm thick sheet of rubber would be insufficiently rigid to serve as the Semi-Rigid Touch Layer 31.

In one implementation the Semi-Rigid Touch Layer 31 consists of a 1.0 mm thick sheet of vinyl which as a Young's Modulus of elasticity of approximately 0.33 GPa's or 49000 psi would fall into the valid range of rigidity for the prototype implementation with ⅜" spacing of protrusions that are 1 mm in height. Other materials would suffice, but as the Young's Modulus increases, the thickness of the material should correspondingly decrease so as to localize the bending or elasticity of the material to a region of no more than 2×2 square sensing elements 30.

The total size and shape of the Semi-Rigid Touch Layer 31 can be made so as to match the total size and shape of the networked grid of pressure tiles 2 in the apparatus 1.

An Integrated Protrusion and Base layer 42 contains a grid of upward facing protrusions 30 spaced such that when the Active Sensing Array 20 is placed on the outside face of this layer, each of these protrusions 30 is aligned with active sensing area 27 of one of the sensing elements 26 of the Active Sensing Array 20, as seen in FIG. 20.

A Semi Rigid Touch Layer 31 is placed in contact on the outside face of the Active Sensing Array 20. Imposition of force 34 applied from above to this Touch Layer will be focused by the geometric arrangement of sensing elements 26 that are in contact with corresponding protrusions of the Integrated Protrusion and Base Layer 42 so that all applied pressure 34 imparted to the Semi-Rigid Touch Layer 31 becomes concentrated in the region where the sensing elements 26 of the Active Sensing Array 20 are in contract with corresponding protrusions 30 of the Integrated Protrusion and Base Layer 42, as seen in FIG. 20.

Figure 24:
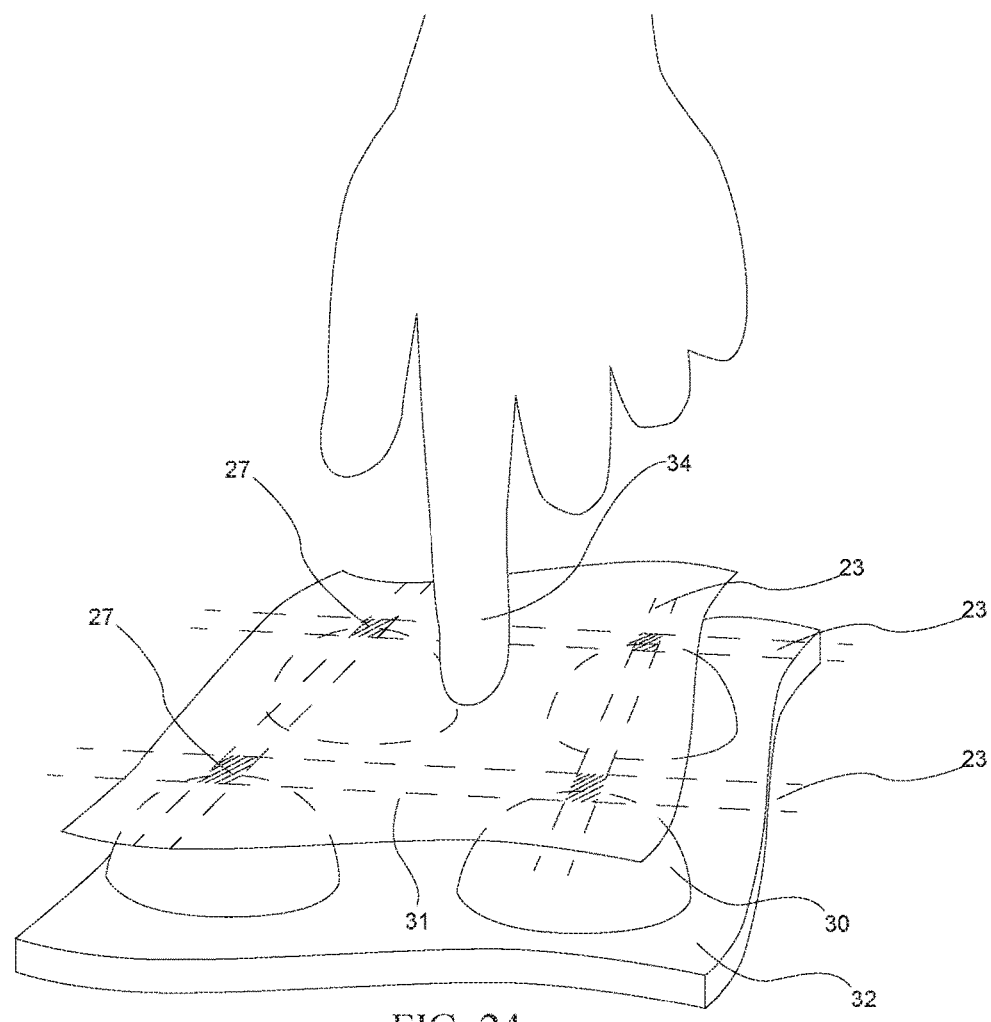

This configuration of components forms a mechanism whereby a continuous change in position of a touch on the outer face of the Semi-Rigid Touch Layer 31 results in a corresponding continuous change in the relative force applied to the active areas 27 of those sensing elements 26 that are nearest to that touch, as shown in FIG. 24. Those relative forces, when sent to the host computer 3 as part of the data image, permit the host computer 3 to accurately reconstruct the centroid position of the touch through arithmetic interpolation.

FIG. 24 shows a three dimensional view of interpolation: The imposition of force 34 impinging upon the Semi-Rigid Touch Layer 31 at a given location will be focused on the 2×2 nearest protrusions 30 of the Integrated Protrusion and Base Layer 42. Therefore in the Active Sensing Array 20 layer all of the imposition of force 34 will be concentrated on the 2×2 active sensing areas 27 of the sensing elements that are in direct mechanical contact with these four protrusions 30.

Functional Layers

The three components of, respectively, the Semi-Rigid Touch Layer 31, the Active Sensing Array 20, and the Integrated Protrusion and Base Layer 42, can be seen as consisting of five functional layers, for the purposes of describing the internal mechanism of operation at a single sensing element as seen in FIG. 121.

These functional layers are, respectively:

(1) the Semi-Rigid Touch Layer 31;

(2) the Active Sensing Array 20 consisting of: outer Non-conductive surface substrate 22, outer Conductive trace lines 23 (not shown in this FIG. 121); inner and outer FSR material 24 layers; inner Conductive trace lines 23 (not shown in this FIG. 121); and inner Non-conductive surface substrate 22; and (3) the Integrated Protrusion and Base Layer 42 containing protrusions 30.

The semi-rigid Touch Layer 31 redistributes the applied forced 34 such that all force 34 is distributed only to the sensing elements 26 in the Active Sensing Array 20. The focusing is accomplished at the contact points at the protrusion 30 on the Integrated Protrusion and Base Layer 42 and the active sensing area 27 corresponding to a sensing element 26 on the active sensing array 20, as seen in FIG. 20.

In one embodiment, the outer non conductive surface substrate 22 of the sensor surface 21 of the Active Sensing Array 20, which can be made of thin acetate which can, in one implementation, be 5 mils in thickness, together with the conductive trace lines 23 which are printed on the inner face of the non-conductive surface substrate 22. FSR material 24 is printed over the conducting lines of the inner face of the outer surface sheet 21 of the Active Sensing Array 20 and the conducting lines of the outer face of the inner sensor surface sheet 21 of the Active Sensing Array 20. In operation, these two FSR material 24 components are in contact with each other, but are not mechanically affixed to each other. The inner non conductive surface substrate 22 of the inner sensor surface sheet 21 of the Active Sensing Array 20, which can be made of thin acetate which can, is, in one implementation, 5 mils in thickness, together with the conductive trace lines 23 which is printed on the outer face of their non-conductive surface substrate 22.

The Integrated Protrusion and Base Layer 42 contain the protrusions 30. Its purpose as the base of the pressure tile 2 is to provide the protrusions 30 so that the force applied to the Semi-Rigid Touch Layer 31 only to the active area of the corresponding sensing element 27 on the Active Sensing Array 20.

Interpolation involving a plurality of pressure tiles 2

With a networked tile assembly 18 of adjacent pressure tiles 2, the Semi-Rigid Touch Layer 31 can consist of a single uninterrupted sheet of semi-rigid material (such as thin semi-rigid plastic), which covers all of the pressure tiles 2 in the grid of pressure tiles 2. This has the advantage that the mechanical interpolation process of neighboring sensing elements 30 in the Active Sensing Array 20 Layer of different adjoining pressure tiles 2 is identical with the mechanical interpolation process of neighboring sensing elements 30 within each individual pressure tile 2. The effect from the user's perspective is an interpolating touch response that is exactly equivalent to the interpolating touch response of a single extremely large pressure tile 2.

Note that in this arrangement, there is no need for exact registration between the Semi-Rigid Touch Layer 31 and the individual pressure tiles 2, since the Semi-Rigid Touch Layer 31 itself can be a featureless and uniform sheet of material.

The nearby protrusions 30 and corresponding sensing elements 26 do not need to be on the same pressure tile 2, but rather can be on adjacent, mechanically separate, tiles, as in FIG. 122.

In one implementation, as seen in FIG. 122, the semi-rigid Touch Layer 31 spans the totality of pressure tiles 2. Pressure applied in a region between two pressure tiles 2 transmit force to the nearby supporting protrusions 30 on two adjacent but mechanically distinct pressure tiles, and thence to sensing elements 30 of the Active Sensing Array 20 within two distinct pressure tiles.

When pressure tiles are adjacent, such as a in a Network Tile Assembly 18, the Semi-Ridged Touch Layer 31 will span the totality of the surface, overlapping all the spaces between the underlying pressure tiles 2. As long as adjacent pressure tiles 2 are properly registered so that the distance between protrusions 30 on each pressure tile 2 is maintained across adjacent pressure tiles 2, then the interpolating force distribution across adjacent sensor tiles will be identical to that within a single pressure tile 2. In one embodiment, pressure tile 2 registration can be accomplished by having alignment brackets on each individual sensor tile as seen in FIGS. 41, 41A, 42B.

Figure 25:
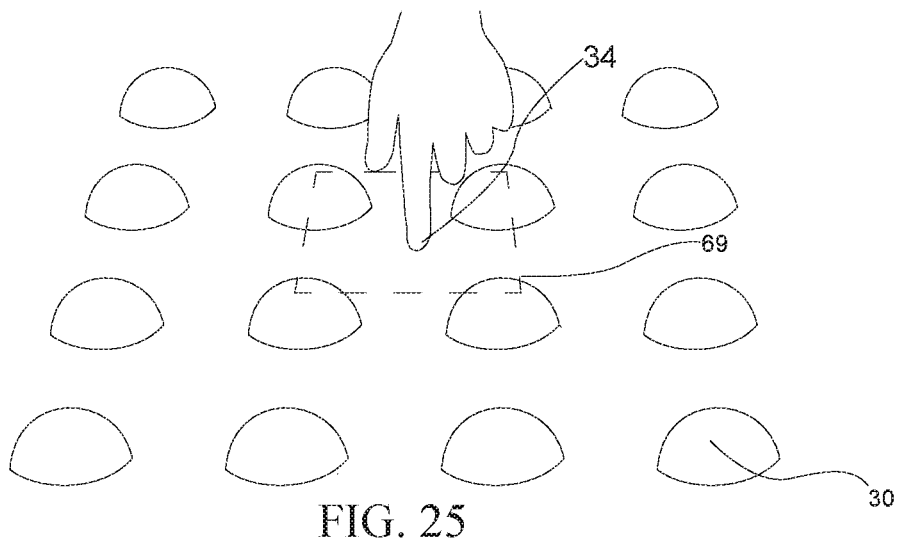

Three Cases of Interpolation:

1) FIG. 25 shows a region 69 where force would be distributed to four protrusions 30 on the same pressure tile 2.

Figure 26:
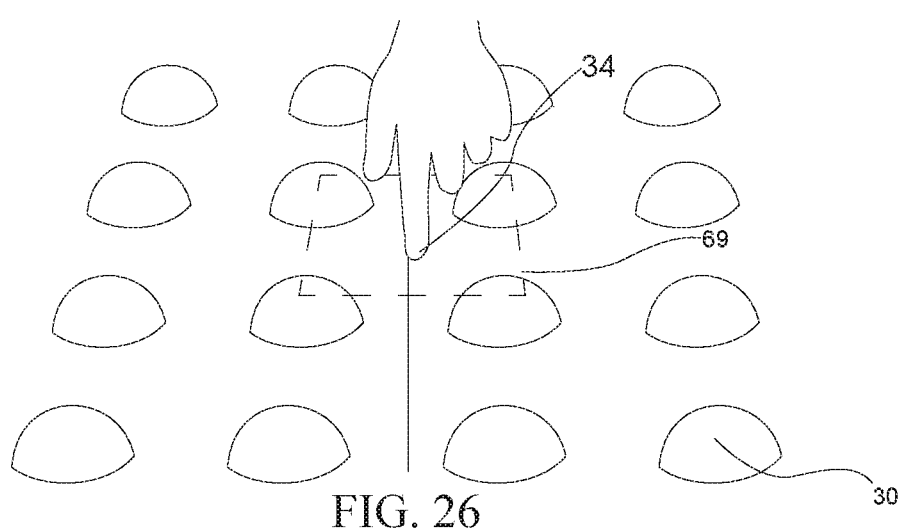

2) FIG. 26 shows a region 69 where force would be distributed to two protrusions 30 on each of two adjacent pressure tiles 2. Pressure applied in a region on the edge where two pressure tiles 2 meet transmits force to the nearby supporting protrusions 30 on the two adjacent but mechanically distinct pressure tiles 2 and thence to pressure senses of the sensing elements of two pressure tiles 2. The uninterrupted Semi-Rigid Touch Layer 31 spans the two pressure tiles 2. Pressure applied along the edge of the adjacent pressure tile 2 will distribute the force to the four sensing elements 26 (two on each respective pressure tile 2) in the same manner as if those sensing elements 26 had been on the same tile. The interpolation methods can then treat the pressure values across adjacent pressure tiles 2 as if it were a coherent larger 'image'.

Figure 27:
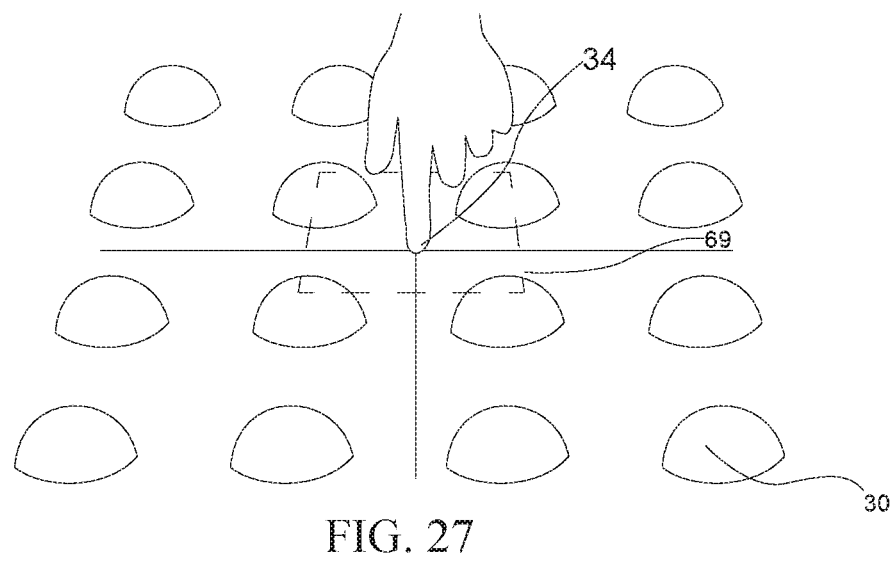

3) FIG. 27 shows a region 69 where force would be distributed to one protrusion 30 on each of four adjacent pressure tiles 2. Pressure applied in a region at the corner 125 where four pressure tiles 2 meet transmit force to the nearby supporting protrusions 30 on the four adjacent but mechanically distinct pressure tiles 2 and thence to pressure sensitive sensing elements 30 where conductive trace lines 23 intersect on the sensing elements 20 of four distinct pressure tiles 2, as seen in FIG. 27. The uninterrupted Semi-Rigid Touch Layer 31 spans the four pressure tiles 2. Pressure applied at the corner 125 of these adjacent pressure tiles 2 will distribute the applied force to those four sensing elements 26 (one on each respective sensor tile) in the same manner as if the sensing elements 26 had been on the same pressure tile 2. The interpolation methods can then treat the pressure values across adjacent pressure tiles 2 as if it were part of a single coherent larger 'image' of pressure.

The term 'image of pressure' is sued here to denote a two dimensional array of pressure values. The image generated by the current invention is antialiased, as per the commonly accepted definition of the term 'antialiased', in that pressure imparted in any area-variant pattern to the outside surface of the Semi-Rigid Touch Layer 31 is converted by the plurality of pressure tiles into a band-limited representation of the original area-variant pressure pattern that is faithful to the original pattern for all spatial frequencies lower than a upper bounding frequency that is determined by the grid resolution of each tile's Active Sensing Array 20.

The Integrated Protrusion and Base layer 42 can be a single mechanical component, which can be made of plastic, glass, wood, metal, or any other semi-rigid material. This component can be manufactured by a variety of standard methods, including injection molding, stamping, and cold casting.

In an alternate embodiment, a rapid prototype for the Integrated Protrusion and Base Layer 42 may be manufactured via SLA methods. In one method of manufacture, a mold, which can consist of silicone rubber, may be made from this prototype. Resin may be poured into the mold. When the resin hardens, the mold is removed, and the resin forms a functional Integrated Protrusion and Base Layer 42.

Advantages of protrusions 30 being underneath: Integrating the protrusions 30 with the pressure tile 2 into a single mechanical part makes it easier to register the positions of multiple pressure tiles 2. Registering the positions across pressure tiles 2 is important in effecting an interpolation scheme that behaves the same across a plurality of pressure tiles 2 as it does within a single pressure tile 2. By making the support layer 32 that contains the protrusions 30 an integral part of the sensor tile, registering protrusions 30 across sensor tiles is accomplished by just mechanically attaching each pressure tile 2 to its neighbors.

In one implementation, the Integrated Protrusion and Base Layer 42 would be made of injection molded plastic or cast resin from a silicone rubber mold, and would consist of a 12"×12" rectangular base with a grid of 32×32 upward facing protrusions 30 with spacing between the centers of the protrusions of ⅜" (corresponding to the inter-sensing element spacing of Active Sensing Array 20) and the height of the protrusions would be 2 mm.

In one implementation of the Integrated Protrusion and Base Layer 42, as seen in FIG. 33 and FIG. 34, the base would be molded with a cavity on its inner face, to house the pressure tile's 2 Printed Circuit Board 4, as shown in FIG. 33 and FIG. 34. Channels would also be molded into the Integrated Protrusion and Base Layer 42 to support Tile Connection Cables 17.

In another implementation, the Integrated Protrusion and Base Layer 42 face opposite the protrusions 30 may be flat. This flat side may be mounted onto a separate support layer 32 such as ¼" thick sheet of acrylic with a cavity cut on inner face to house the sensor tile's Printed Circuit Board 4. Channels would also be cut into the Base Layer 32 to support Tile Connection Cables 10. In this implementation, the shape of the Integrated Protrusion and Base Layer 42 part would have a flat bottom as in FIG. 32, but laying upon a base layer 32 with the cavity in it.

If the pressure tile's 2 Printed Circuit Board 4 is located underneath the device, then the Active Sensing Array 20 must be wrapped around the Integrated Protrusion and Base Layer 42. When the Active Sensing Array 20 is wrapped too tightly around the Integrated Protrusion and Base Layer 42, then unwanted force will be applied to protrusions 30, and therefore to sensing elements 26, near the edge of the Integrated Protrusion and Base Layer 42. If the Active Sensing Array 20 is wrapped too loosely, then it can bow up and cause a loss of sensitivity at those sensing elements 26. In order to prevent these situations, adhesive 40 can be placed on both the protrusion 30 side and the Semi Rigid Touch Layer 31 side of the Active Sensing Array 20.

In one implementation of the Integrated Protrusion and Base Layer 42, which was made using standard rapid prototyping techniques, the protrusions 30 are made of ABS plastic and are each 2 mm in height and 4 mm wide at their base, with spacing between adjacent protrusion centers of ⅜".

The height, shape and curvature at the peak of the protrusions 30 may vary based upon the application of the pressure tile 2. The shape of the protrusion 30 may affect the spread of force onto the active area of the sensing element 27 and durability of the apparatus.

Figure 28:
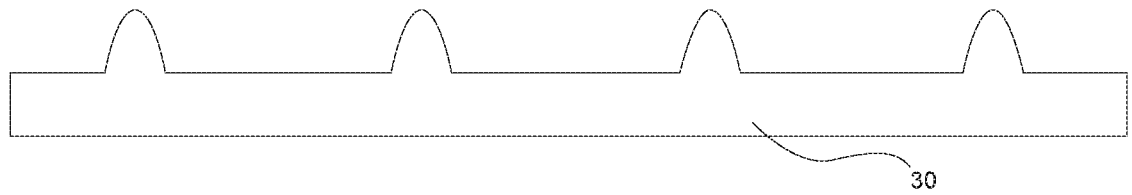

In one implementation, as seen in FIG. 28 showing tall/narrow protrusions, each protrusion 30 may be longer than it is wide, with a rounded tip, such as a paraboloid shape with a diameter at its base of 4 mm and a height of 4 mm. This configuration focuses the force into a small area of the sensing element 26 with which the protrusion 30 is in contact, thereby giving the greatest sensitivity. Such a configuration is preferred for creating a pressure tile 2 that is sensitive to very light pressures, but is less preferred for sharp or heavy touches because high pressures may result in damage to the Active Sensing Array 20.

Figure 29:
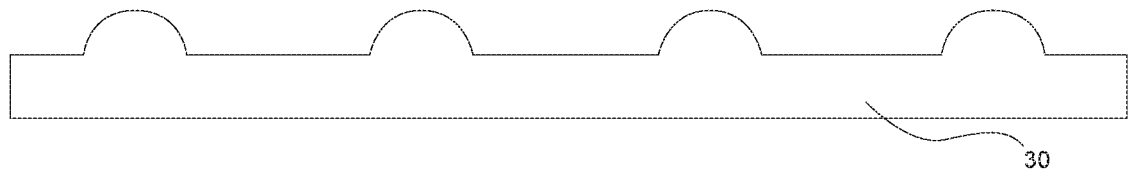

In another implementation, as seen in FIG. 29, the protrusions 30 may be hemispherical such as with a diameter at the base of 4 mm and a height of 2 mm. This shape has the benefit of providing greater mechanical strength, while also keeping the curve at the top of the protrusion 30 gradual thereby reducing the danger of mechanical damage to the Active Sensing Array 20 during very high pressure loads.

Figure 30:
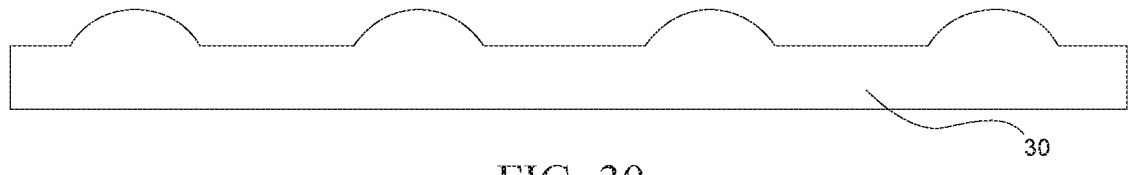

In another implementation, as seen in FIG. 30, the protrusions 30 may have a paraboloid or sinusoidal shape that is much wider, such as a paraboloid with a diameter at its base of 4 mm and a height of 1 mm. This retains most of the advantages of a hemisphere shape while providing the benefit of being easier to fabricate using less expensive casting methods than a hemispherical protrusion since a paraboloid or similar shape does not have a vertically intersecting wall at its base.

Figure 31:
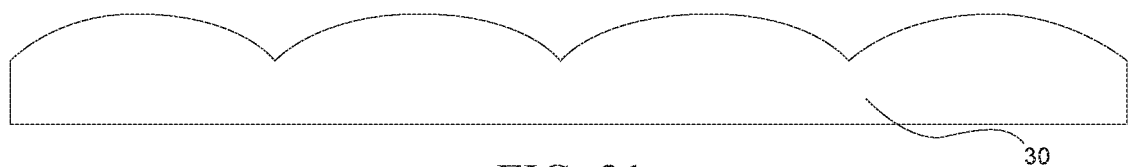

In another implementation, as seen in FIG. 31, the protrusions 30 may be very wide, with a paraboloid or sinusoidal shape, such as a paraboloid with a diameter at its base of 8 mm and a height of 2 mm. This configuration results in a very gradual curve at the top of the protrusion 30, thereby minimizing the chance of damage to the sensor array when sharp or heavy pressure is applied.

Single Tile Assembly 48

In one single tile assembly 48 embodiment, a single pressure tile 2 may be directly connected to a computer and does not require a master printed circuit board 19, though a distinct or integrated Host communication Printed Circuit 38 is needed. Such an embodiment is assembled, as seen in FIG. 32 and FIG. 33, with the flexible Active Sensing Array 20 wrapped around the edge of the tile, and plugged into the Tile Printed Circuit Board 4 which is affixed to the underside of the Integrated Protrusion and Base Layer 42. The Semi-Rigid Touch Layer 31 sits on top of the Active Sensing Array 20. In the single tile embodiment the Microcontroller 5 on the Tile Printed Circuit Board 4 can perform both the scanning and Host Communication, such as USB via a USB cable 9 with the computer 3, as seen in FIG. 35.

Networked Tile Assembly 18 of a Plurality of Pressure Tiles 2:

In one multiple tile embodiment, slave tiles 12 may be daisy chained to a master tile 7 or master printed circuit board 19 which may have integrated or separate Host communication circuitry 95 which is connected to a computer 3. Such an embodiment is assembled seen in FIG. 50 with series of slave tiles 12 connected to a Master Printed Circuit Board 19, allowing for a master/slave bus protocol for getting pressure data from the series of slave tiles. The Semi-Rigid Touch Layer 31 spans the slave tiles 11, on top of their respective individual Active Sensing Arrays 20. The Microcontroller 5 on the Master Printed Circuit Board 19 gathers data from the slave tiles 11 and transmit that data to the Host Communication Circuitry 95 which transmit the data via a USB transceiver 30 via the USB cable 9 with the computer 3.

Pressure Sensitivity

To test the pressure sensitivity of two prototypes a 5 g base which rests on four points was placed on top of the semi-rigid touch layer 31 with each point above a sensing element 26. 5 g weights were placed on the base to create weights from 5 g to 100 g. Each sensing element 26 received a quarter of this weight, so the mass varied from 1.25 g to 25 g at each sense.

Test 1:
Touch Layer—0.5 mm Vinyl
Sensor—108 kOhm resistive ink sensor.
Protrusion Layer—4 mm Diameter Hemispheres

| Weight At Intersection | Average Value on Visualizer |
|---|---|
| 5 g | 0 |
| 10 g | 7.5 |
| 15 g | 14.5 |
| 20 g | 23 |
| 25 g | 32 |

In this implementation, masses below 10 g are not registered by the pressure tile 2. After 10 g, the average value registered by the pressure tile 2 scaled linearly with pressure.

Test 2:
Touch Layer—1 mm Vinyl
Sensor—108 kOhm resistive ink sensor.
Protrusion layer—2 mm diameter truncated cones

| Weight At Intersection | Average Value on Visualizer |
|---|---|
| 5 g | 0 |
| 10 g | 0 |
| 15 g | 2 |
| 20 g | 17.5 |
| 25 g | 25 |

This test used a thicker semi-rigid touch layer 31, which makes the top layer more ridged but decreases the sensitivity. As a result, values were not registered until 15 g.

In this extension on the ideas of the above sensors encompassing an improved technique for concentrating force to the appropriate sensing elements 26 on an Active Sensing Array 20. In this embodiment, the touch surface lies over plates 35 spanning the sensing elements 26 such that the plate corners are aligned with the protrusions 30. This eliminates the range of rigidity requirements of the Semi-Rigid Touch Layer 31 in the above embodiment, instead utilizing a Flexible Touch Layer 38 as this touch layer lays flat on the plates 35 which in turn focus the force onto the appropriate sensing elements 26. As a result the Flexible Touch Layer 38 can be thin and flexible for example 1/10th the thickness and rigidity as with the prior invention (e.g. a 5 mil sheet of PET film). Such a thin/flexible touch layer on top of plates eliminates the undesired spread along the touch layer of applied force beyond the sensing elements in the immediate proximity of that applied force.

Additionally, because the Flexible Touch Layer 38 lies flat on the plates 35, rather than on the protrusions 30, this embodiment allows the user to interact with the device without feeling protrusions/bumps 30 through the touch layer. Also because the Touch layer lies on a plateau of plates 35, rather than bridging protrusions 30 as in the prior invention, the Flexible Touch layer 38 can be more tightly adhered to the plates 35, reducing compression issues that otherwise arise. This results in a lower initial detectable touch threshold, improving detection of light touches.

This technique provides a more efficient mechanism for transmitting force from the touch layer to the sensing elements than the prior invention because all dissipation of force is done on the microscopic level rather than the macroscopic level. The above embodiments required some rigidity (described as in a 'Useful Range of Rigidity') on the touch layer since the touch layer was used to spread force to the sensing elements via a macroscopic deformation of the touch layer. In this invention there is no macroscopic movement or deformation, only microscopic deformations due to: deformation of the plate; compression of the protrusions; or and/or hinging where the plates meet each other and/or the protrusions. This results in reduced loss of pressure signal due to deformation; a higher percentage of force goes to local sensing element rather than being transmitted to further neighboring sensing elements.

The step by step description of the user experience is the same as described above for this embodiment.

List of All Components
A list of all hardware components.
List of all components
    A collection of sensor tiles 2, where
        A sensor tile consists of:
            Flexible Touch Layer 38
            Adhesive Layer(s) 40
            Technique: Integrated Plate and Protrusion Matrix Component
            Integrated Plate and Protrusion Layer 36
            Base Layer 47
            Technique: Distinct Plate and Protrusion Matrix Component
            Plate Layer 53
            Integrated Protrusion and Base Layer 42
            ALL OTHER COMPONENTS ARE AS DESCRIBED ABOVE
ALL OTHER COMPONENTS ARE AS DESCRIBED ABOVE General Purpose of Each Layer: Integrate Plate and Protrusion Layer Embodiment FIG. 52 shows an exploded view of a Tile for the Integrated Plate and Protrusion Matrix Component embodiment: Flexible Touch Layer 38, Integrated Plate and Protrusion Layer (IPPL) 36, sensing elements, Base Layer 47. When the layers are placed into contact, each protrusion in the IPPL 36 is aligned to be in contact with the active area of the sensing element 27 on the outside surface of the Active Sensing Array 20. An Adhesive Layer 40 may also be used between the Flexible Touch Layer 38 and the IPPL 36 so these layers are mechanically connected. Similarly, an Adhesive Layer 30 may also be used between the IPPL 36 and the Active Sensing Array 20. Similarly, an Adhesive Layer 40 may also be used between the sensing elements and the Base Layer 47.

This Integrated Plate and Protrusion Matrix Component embodiment of the invention pertains to a pressure sensor which utilizes a different mechanism for focusing force to the sensing elements in the active Sensing Array 20 than described earlier in this document. In this embodiment as seen in exploded view and FIG. 52 in side view in FIG. 53, the Flexible Touch Layer 38 which is in contact with the Integrated Plate and Protrusion Layer 36 which is in contact with the Active Sensing Array 20: which is in contact with the Base Layer 47. Each protrusion 30 in the IPPL 36 is aligned to contact the corresponding active area of a sensing element 27 on outside surface of the Active Sensing Array 20, as seen in FIG. 52 and FIG. 53.

The Distinct Plate Matrix and Protrusion Matrix Layers embodiment of this invention pertains to another technique shown in exploded view in FIG. 54 and in side view in FIG. 55 in which there is a Flexible Touch Layer 38, Plate Matrix Layer 53 Active Sensing Array 20, Integrated Plate and Protrusion Layer 42. When the layers are placed into contact, each protrusion 30 in the Protrusion Layer 53 is aligned to contact the corresponding active area of a sensing element 27 on inner surface of the Active Sensing Array 20. Additionally, the corners of each plate 35 in the Plate Matrix Layer 53 are aligned with the corresponding protrusions 30 from the Protrusion Layer 53 on the outer surface of the active sensing array 20, where any protrusion may have up to four adjacent plate corners above it.

An Adhesive Layer 40 may also be used between the Flexible Touch Layer 38 and the Plate Matrix Layer 53 so these layers are mechanically connected. Similarly, an Adhesive Layer 40 may also be used between the Plate Matrix Layer 53 and the Active Sensing Array 20. Similarly, an Adhesive Layer 40 may also be used between the Active Sensing Array 20 and the Integrated Plate and Protrusion Layer 42.

In an alternate embodiment, seen in FIG. 56, the protrusions are affixed to the active areas of sensing elements 27 on the outer surface of the Active Sensing Array 20. In this embodiment, the protrusions 30 and the Active Sensing Array 20 together form a single component of the device, the Active Sensing Array with attached Protrusions Layer 55. In operation, as seen in the exploded view in FIG. 57 the Flexible Touch Layer 38 rests atop the Plate Matrix Layer 53 which rests atop the Active Sensing Array with attached Protrusions Layer 55, which rests atop a base layer 47. When an external force is applied to the Flexible Touch Layer 38, that force is then imparted to the Plates Matrix Layer 53, which redistributes the force that that it becomes concentrated at the corners of the plates 35, from which it is then imparted to the Protrusions 30, thereby compressing each active sensor 26 between the affixed Protrusion 30 and the base layer 47 upon which the Active Sensing Array 20 lies atop.

Glossary of Terms and Description of Components for this Embodiment

Active Sensing Array (ASA): Described Above

Sensing element 26: is at the location between the two Surface Sheets 21 of the Active Sensing Array 20 where Conductive Trace Lines 23 cross, and at which two areas of FSR 24 are sandwiched together and that pressure may be electrically measured, as seen in FIG. 10 and FIG. 11. The sensing element 26 is the area where there is an overlap of the FSR on those two layers at a junction of intersecting Trace Lines 23 as seen in FIGS. 9 and 10.

In Contact with a Sensing element: The Active Area of a Sensing element 27 is the area on either side of the Active Sensing Array 20 corresponding to the overlap of the FSR material for that sensing element as seen in FIGS. 10 and 11. In particular, a protrusion 30 is said to be in contact with a sensing element 26 if the surface of the protrusion in contact with the Active Sensing Array 20 lies completely upon or inside of the Active Area 27 of that sensing element. A protrusion 30 is properly aligned with the sensing element 26 if it is in contact with the sensing element (as just defined).

Plate 35: a rectangular piece of plastic, metal, wood, glass, or other such material that has a Valid Amount of a Plate Rigidity (relative to the protrusion heights, both defined below). The plate 35 is of a size and shape such that when it is positioned, the corners are aligned inside of the four adjacent sensing elements 26 on the Active Sensing Array 20. Plates 35 are arranged in a Plate Matrix 39 which may be a constituent of an Integrated Plate and Protrusion Layer (IPPL) 36 or part of a Plate Matrix Layer 53. FIG. 59 and shows a plate 35 properly aligned upon the Active Sensing Array 20. FIG. 60 shows the top view of Rigid Plate 35 properly aligned and inside of corresponding sensing elements 26 on the Active Sensing Array 20.

Plate matrix 39: A plurality of Rigid Plates 35 spatially aligned such that there is a gap between the Rigid Plates 35 and that the center of the gap between the corners is aligned to correspond with a sensing element 26 on an Active Sensing Array 20. A Plate Matrix 39 may be a constituent of an Integrated Plate and Protrusion Layer (IPPL) 36 or of a Plate Matrix Layer 53. FIG. 61A shows the top view and FIG. 61B the side view of a Plate Matrix 39. FIG. 63 shows the proper alignment of the plate matrix 39 superimposed above the Active Sensing Array 20.

Protrusion 30: a rigid bump of plastic, wood, glass, or other such material that is positioned above or below a sensing element 26 on the Active Sensing Array 20 of that sensing element and whose purpose is to focus force onto the active area 27 of that single sensing element 26. The side of the protrusion facing the Active Sensing Array 20 must be a shape whose contact with the Active Area of its corresponding sensing element would lie exactly upon or inside of the Active Area of that Sensing element 27. Protrusions are arranged in a Protrusion Matrix 43 which may be a constituent of an Integrated Plate and Protrusion Layer (IPPL) 36 or part of an Integrated Plate and Protrusion Layer 42.

FIG. 64 shows the top view of a protrusion 30 properly aligned upon the corresponding sensing element 26 on the Active Sensing array 20.

Figure 65:
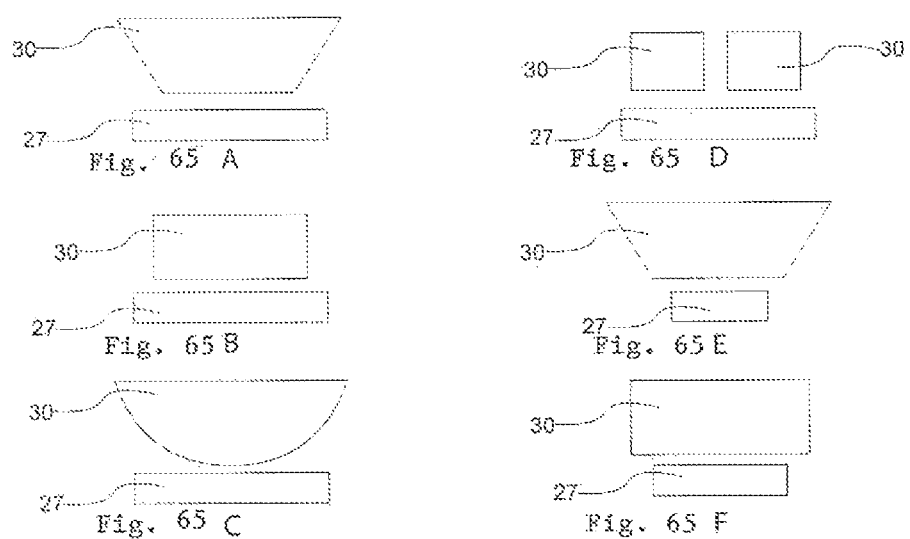

FIGS. 65A-65F shows the side view of six examples of contact between protrusions 30 and active area of sensing element 27. In FIGS. 65A, 65B, 65C, and 65D, examples are shown of protrusions 30 whose contact with the active area of its corresponding sensing element 27 lies exactly upon or inside of that active area 27. In FIGS. 65E and 65F, the protrusions 30 have contact that extend beyond the active area 27 of the corresponding sensing elements 26 and thus are not appropriate protrusion configurations for this invention. In the case in FIG. 65D, the protrusion 30 above that sensing element has discontinuous aspects such that each of these aspects might be attached to different plates that meet at that sensing element 26.

Protrusion Matrix 43: A plurality of Protrusions 30 spatially aligned to correspond with the sensing elements 26 on an Active Sensing Array 20. A Protrusion matrix 43 may be a constituent of an Integrated Plate and Protrusion Layer (IPPL) 36 or of an Integrated Protrusion and Base Layer 42. FIG. 62A shows the top view and FIG. 62B shows the side view of a Protrusion Matrix 43.

FIGS. 61A, 61B, 62A and 62B are drawn a juxtaposed as a Plate Matrix 39 and a Protrusion Matrix 43 respectively would be aligned with each other.

FIG. 66A shows the Bottom View. FIG. 66B shows the Side View, and FIG. 66C, shows the Top View Top of the superposition of a properly aligned Plate Matrix 39 and Protrusion Matrix 43.

FIG. 67 shows a Cut out view of the superposition of a properly aligned Plate Matrix 53 and Protrusion Matrix 43.

Outer and Inner Directions/Side/Face: A sensor may be placed on a table, wall, ceiling or moving object. As a result, referring to top/bottom or up/down is ambiguous. For clarity, use 'Outer' to designate the side/direction/face upon which the force is being applied and 'Inner' to designate the opposite side/direction (towards the base of the apparatus). For example in the FIG. 68A showing the device as it would be oriented on a flat surface and 68B showing the device as it would be oriented on a wall, the imposed force 34 is applied to the outer face of the Flexible Touch Layer 38. Similarly, the inner face of the protrusions in the IPPL 36 rest on the outer face of the Active Sensing Array 20 such that the inner face of the protrusions 30 are aligned with the sensing elements 26 on the Active Sensing Array 20. The inner face of the Active Sensing Array rests upon the outer face of the base layer 47. In FIGS. 68A and 6B the Outer Direction 28 and Inner Direction 29 are designated with arrows. In any cases of ambiguity, the canonical orientation is with the sensor placed on a flat surface parallel to the floor, such as on a table top with the force coming from above, as in FIG. 68A.

Integrated Plate and Protrusion layer (IPPL) 36: A part containing both a Plate Matrix 53 and a Protrusion Matrix 43, such that the protrusions are physically connected to adjacent plates on the inner surface. The protrusions 30 extend beyond the inner surface and are spatially aligned to correspond with the sensing elements 26 on an Active Sensing Array 20. This part may be made of plastic, metal, wood, glass, or other material that is rigid or semi-rigid.

Methods for fabrication of this are described below. FIG. 69 shows an embodiment of an Integrated Plate and Protrusion Layer 36.

In various embodiments, the Integrated Plate and Protrusion Layer 36 may have some of the shapes depicted in FIGS. 70-73. In all of these embodiments, there are slits between the plates, but the shapes of the protrusions 30 vary; the width of the slit may vary as seen comparing FIG. 70 and FIG. 73; the protrusion may continue through the junction to be flush with the plate as seen comparing FIG. 70 and FIG. 71; or may be tapered/trapezoidal towards the inner face of the protrusion as seen comparing FIG. 70 and FIG. 72. FIG. 74 shows a top view corresponding to the FIG. 70 or FIG. 72 embodiment with slits. FIG. 75 shows a top view corresponding to the FIG. 71 embodiment with protrusions continuing to be flush with the plates. FIG. 76 shows a top view corresponding to FIG. 73 embodiment which has a wider slit than the embodiments shown in FIG. 70 and FIG. 74. In each of the embodiments shown in FIGS. 74-76, the slit along the edges of the plates, but not at the protrusions, go completely through the material.

Corner Protrusion 54: In one embodiment, the protrusion 30 over a sensing element 26 on the Active Sensing Array 20 may be contain several discontinuous aspects with each discontinuous aspect attached at the corner of one of the several plates 35 meeting at that sensing element 26 and over that sensing element 26. A Corner Protrusion 54 is defined as one of these discontinuous aspects. With Rectangular plates meeting at a sensing element, up to four Corner Protrusions 54 may impart force, acting collectively as the protrusion 30, upon that sensing element 26 as seen in FIGS. 77A-77C, 79, and 80.

FIGS. 77A-77C shows examples of one, two and three corner protrusions 54, respectively, lying above the active area 27 of a marked sensing element 26. In each of these examples, the set of corner protrusions 54 together would be considered the 'protrusion' 30 above that sensing element 26.

In another embodiment of the IPPL 36, such as the one described below using compression molding, protrusions 30 may each consist of a set of corner protrusions 54. In this embodiment, the outer surface of the IPPL would be flat, designated as a Flat Top Integrated Plate and Protrusion Layer 41, allowing, in the case of a single tile sensor, the Flat top IPPL 41 to also function as the Flexible Touch Layer 38.

FIG. 78 shows the Side view of Flat Top IPPL 41 embodiment with plates 35 having Corner Protrusions 54 and the outer surface being flat. Protrusions 30 where corners of plates meet will consist of set s of Corner Protrusions 54 from different plates 35. In this embodiment the surface is flat with a thin amount of additional material connecting the separate plates, as seen in the in FIG. 78 and in outer view in FIG. 79 and in inner view in FIG. 80. Unlike the embodiments seen in FIGS. 70-76, the slits do not continue through between the plates, but instead form grooves from the inner face as seen in FIGS. 78-80. In such an embodiment, the thickness of such connecting material (between the outer face and the inner edge of the groove) must respect the requirements for a flexible touch layer 38. For example, for a 1 mm thick plate of ABS plastic, and 0.1 mm for the connecting material.

In embodiments of a Flat Top Integrated Plate and Protrusion Layer 41, either a shared coherent protrusion or a set of corner protrusions may be used (as shown in FIGS. 78-80, corresponding to each sensing element).

Plate Matrix Layer 53: A part containing a plurality of Rigid Plates 35 such that the plates are connected either with a thin flexible top or bottom material or with material in the grooves between the rigid plates. Unlike the IPPL 36, the protrusions 30 are not part of this component. This part may be made of plastic, metal, wood, glass, or other such material containing methods for fabrication of this are described below. FIG. 81 shows a Flat Top Plate Matrix Layer 116 embodiment of a Plate Matrix Layer 53 with thin flexible top material whose construction similar to the Flat Top IPPL 41 but without the protrusions that would be found in the Flat Top IPPL.

Integrated Protrusion and Base Layer 42: A part containing a Protrusion Matrix 43 and a supporting base 47, such that the protrusions are physically connected to base 47 on the inner surface, as seen in FIG. 82. This part may be made of plastic, metal, wood, glass, or other such material that is rigid or semi-rigid. Methods for fabrication of this are described below. In earlier embodiments described in this patent, such as the one shown and described from FIG. 19, are examples containing an Integrated Protrusion and Base Layer.

Three cases are shown in which the plate is, respectively: Sufficiently rigid shown in FIG. 83; sufficiently semi-rigid shown in FIG. 84; and insufficiently rigid allowing force to be transmitted to the base rather than the protrusions shown in FIG. 85. In each case, the externally imposed force 34 upon the plate 35 is transmitted to different locations on the base layer 47 as the depicted transmitted force 56. FIG. 83 and FIG. 84 represent "Valid Amount of Plate Rigidity relative to the Protrusion Heights", with the transmitted force 56 being focused exclusively through the protrusions 30 to the base layer 47. In FIG. 85, the plate 35 does not have a Valid Amount of Plate Rigidity relative to the Protrusion Heights because it deforms such that some force 56 is imparted on the underlying base surface in a region not through a protrusion 30. Comparing FIG. 83 and FIG. 21 shows an advantage of the embodiment involving plates 35. Unlike the embodiment shown in FIG. 21 with a Semi-Rigid touch layer 31, the plate 35 can be rigid force is not transmitted to protrusions that it is directly above.

Valid Amount of Plate Rigidity relative to the Protrusion Heights. A plate has a "Valid Amount of Plate Rigidity relative to the Protrusion Heights" if an externally applied force of the outer face a plate were to result in pressure being applied exclusively to the corresponding protrusions at its corners, in particular no force is imparted to the surface between the protrusions: The Plate 35 would not have a Valid Amount of Plate Rigidity if the same externally applied force were to cause the Plate 35 to deform to sufficient extent that the Plate 35 would physically come into contact with the region of the Base Layer between those four protrusions 30, thereby dissipating force onto inactive regions of the Active Sensing Array 20. This unacceptable case can be seen in FIG. 85 where the plate 35 deforms in the middle in an arc the full height of the protrusion 30 allowing the plate to touch the base. For example, in the case where the protrusions are spaced at 12 mm, a 0.5 mm thick rectangular piece of rubber would not have a valid amount of plate rigidity to serve a Plate. The distance of the deformation of the plate materials can be described by $E(bend)=L^3F/(4wh^3d)$, where L is the length, w and h are the width and height, F is the applies force and d is the deflection to the load on the surface.

Flexible Touch Layer 38: This is the outer most layer that is exposed to the user for direct contact/touch. It is comprised of a thin flexible sheet of material (e.g., rubber, Teflon, or low density polyethylene.) It must be sufficiently flexible (i.e., having a Young's modulus and thickness such that the stiffness is an order of magnitude less than that of the plates—the stiffness of most materials is determined largely by the product of the materials Young's Modulus [constant to the material] and the cube of the material's thickness as in the equation below, such that force applied to the surface is primarily transmitted to the plates below the force. In one embodiment, it could be made of 0.005" polyester film.

The stiffness of a material may be computed as per: $D=Eh^3/(12*(1-v^2))$, where E=Young's Modulus; h=material thickness; D=stiffness; v=Poisson's Constant of the material.

The total size and shape of the flexible touch layer 38 can be made so as to match the total size and shape of the networked grid of sensor tiles.

Base Layer 47: This inner most layer is a flat featureless sheet lying below the rest of the assembly. In an embodiment where the apparatus 1 will lie flat against a flat solid surface, such as a 3" thick flat glass table, the base layer does not necessarily need to provide rigid support as this will be provided by, for example, the table. In an embodiment of an apparatus 1 that would not lay flat on a surface, or on a surface that is not solid, such as a mattress, it would need to be rigid, such as a ¼" thick acrylic sheet.

Adhesive Layer 40: An adhesive layer may be used to affix the respectively abutting functional layers. In one embodiment, the adhesive layer could be a double sided adhesive film sheet, such as Graphix Double Tack Mounting Film. In other embodiments a spray adhesive may act as the Adhesive layer used to bond these layers.

Step by step description of internal working:

FIG. 86 shows a cross section of Force Distribution: Flexible Touch Layer 38, Integrated Plate and Protrusion Layer 36, Active Sensing Array 20, Base layer 47, Externally applied touch force 34. The IPPL 36 contains Plates 35 and Protrusions 30. The Protrusions 30 are aligned with the sensing elements 26 on the Active Sensing Array 20.

Internal operation begins when fingers or other objects impose downward force 34 upon outer surface of the Flexible Touch Layer 38, as seen in FIG. 86.

This force is then transmitted through the Flexible Touch Layer 38 to the Plate 35 underneath the force 34 in the Integrated Plate and Protrusion Layer 36.

The respective downward force 34 on each plate 35 of the IPPL 36 is redistributed to the protrusions 30 in the IPPL 36 that are under the plate's 35 respective four corners. The protrusion at any corner of a Plate 35 is shared by up to three other adjacent plates 35. In the case where force is concurrently applied to adjacent plates 35, the combined force from those adjacent plates 35 are concentrated onto respective shared protrusions 30 and measured at the sensing element 26 that this shared protrusion 30 is in contact with.

Each protrusion 30 at the four corners of a rigid plate 35 is aligned above a respective sensing element 26 on the Active Sensing Array 20, concentrating the force applied to each rigid plate 35 to the active area on the sensing elements 27 at the plate's corresponding four corners.

This creates a concentration of force that is transmitted to the portion of the Active Sensing Array 20 where each protrusion 30 is in contact with a corresponding sensing element 26, thereby creating a force that compresses together the two areas of FSR material 24 in mutual contact at the regions of the Active Sensing Array 20 that comprise the sensing elements 26 (where one FSR 24 region on the outer conducting line of 23 the Active Sensing Array 20 is in contact with a corresponding region of FSR material 24 on the inner conducting line 23 of the Active Sensing Array 20 as seen in FIGS. 10 and 11).

As described earlier, this compression creates an increase of electrical conductance between those two areas of FSR material in mutual contact. As the sensor's microcontroller scans through the Active Sensing Array's array of sensing elements, each of those changes in conductance is measured as a change in voltage, which the micro-controller detects via an A/D converter that the micro-controller then encodes as a digital signal. The micro-controller then sends this digital signal through the USB to the host computer.

This configuration of components forms a mechanism for even force redistribution from the Plates to the sensing elements on the Active Sensing Array whereby a continuous change in position of a touch on the outer face of the Flexible Touch Layer results in a corresponding continuous change in the relative force applied to those sensing elements that are nearest to that touch. Those relative forces, when sent to the host computer as part of the data image, permit the host computer to accurately reconstruct the centroid position of the touch through arithmetic interpolation.

FIG. 87 shows a schematic view of interpolation: All externally applied downward force 34 impinging upon the Flexible Touch Layer 38 is transmitted to the plate 35 in the IPPL 36 abutting that force. The force 34 on that plate 35 will be focused on the 2×2 nearest protrusions 30 on the IPPL 36. Therefore in the Active Sensing Array layer 20 all of the force will be concentrated on the 2×2 corresponding active areas 27 for the where there is direct mechanical contact with these four protrusions 30 and thus mechanically distributed to the respective sensing elements 26.

The difference between this process using plates 35 and a flexible touch layer 38 and the similar process that was described without plates but with a semi-rigid touch layer 31 is that by allowing for a thinner Touch Surface 38 and distinct plates 35 under that touch surface, the local forces on the Flexible Touch Layer 38 are nearly exclusively conveyed to the plates 35 under that force and then transmitted through the corresponding protrusions 30 onto the appropriate sensing elements 26. Additionally in this Active Sensing Array 20 is affixed onto a flat surface and thus cannot deform as might occur in the method without plates.

The electronic measurement and processing of the force upon the Active Sensing Array is identical to that in the method without plates.

FIG. 52 shows an exploded view of the Layers and Assembly in the prototype single tile embodiment using an Integrated Plate and Protrusion Layer (IPPL) with Flexible Touch Layer 38; Integrated Plate and Protrusion Layer 36; Active Sensing Array, 20; Base Layer 47. When the layers are placed into contact, each protrusion 30 in the IPPL 36 is aligned to be in contact its corresponding active sensing area 27 on the outside surface of the Active Sensing Array 20. An Adhesive Layer 40 was used between each of the above layers in this prototype embodiment.

Flexible Touch Layer 38: 5 mil Polyester Film

Integrated Plate and Protrusion Layer 36: 31×31 grid of plates with 32×32 grid of protrusions. A Custom SLA (Stereolithography) rapid prototyped part manufactured with Somos 11122 (Clear PC Like) created with a supplied CAD file with the IPPL 36 Geometry using standard SLA manufacturing.

FIG. 88 shows the plate and protrusion dimensions used in the prototype embodiment of the Integrated Plate and Protrusion Layer 36 in a cross section view. The plates 35 and protrusions 30 are square, so these dimensions are the same for both the width and length (not drawn to scale).

Note: In a single tile assembly there are (N−1)×(M−1) plates for an N×M grid of protrusions for an N×M Active Sensing Array because there is no need for a spanning plate between abutting tiles. For example in FIG. 52, a 4×4 grid of plates are supported by a 5×5 grid of protrusions and used with an Active Sensing Array with a 5×5 grid of sensing elements.

Active Sensing Array 20: Custom printed sensor, as per description in the other earlier described embodiments, with a 32×32 grid of sensing elements spaced at 3/8". Each sensing element has a 4×4 mm overlapping FSR area. 100 kOhm FSR Ink was used in the ASA.

Base Layer 47: CPVC Sheet, 1/32" Thick. Note that this embodiment was one in which it was expected that the apparatus would be placed on a solid table top for use as in the embodiment of the Base layer where the apparatus 1 will lie flat against a flat solid surface.

Adhesive Layer 40: Graphix Double Tack Mounting Film. Three adhesive layers 40 are used in this assembly.

In this prototype assembly, a) One side of an adhesive layer 40 is affixed to the inner surface of the Semi-Rigid Touch Layer 38.

b) The opposite side of that adhesive layer 40 is affixed to the outer surface of the IPPL 36.

c) One side of a second adhesive layer 40 is affixed to the outer surface of the Active sensing array 20.

d) The opposite side of that adhesive layer 40 is affixed to the inner surface of the IPPL 36 such that the protrusions 30 on the IPPL 36 are aligned with the corresponding sensing elements 26 on the Active Sensing Array 20.

e) One side of a third adhesive layer 40 is affixed to the inner surface of the Active Sensing Array 20.

f) The opposite side of that adhesive layer 40 is affixed to the outer surface of the Base Layer 47.

Pressure Data for this IPPL Prototype Assembly

In the following tests, calibrated weights were placed above a wire intersection. A small rubber cylinder that weighed 5 g was used to concentrate the force at the intersection.

IPPL Sensor

| Weight (g) | Value From Sensing element (*) |
|---|---|
| 20 | 30 |
| 40 | 95 |
| 60 | 150 |
| 80 | 200 |
| 100 | 260 |
| 120 | 320 |
| 140 | 340 |
| 160 | 380 |
| 180 | 410 |
| 200 | 425 |
| 250 | 480 |

(*) In the prototype embodiment here, these are the values measured from the A/D circuitry of the PIC24 chip and based on voltages. The values are measured as 12-bit non-negative values.

Methods to Manufacture the Integrated Plate and Protrusion Layer

In one embodiment, a metal mold can be created for the IPPL using industry standard techniques for making molds for plastic parts. The IPPL parts can be manufactured via injection molding out of ABS plastic using standard injection mold and molding techniques.

Another way to manufacture a IPPL is to perform selective photo-etching on both sides of a sandwich that has been formed by affixing two thin metal plates, such as 0.005" thick brass, to both sides of a plastic sheet, such as 0.003" thick Mylar or kaptan, that has been coated with adhesive on both sides. One of the metal plates will form the plates layer, and the other will form the protrusions layer. In both cases, the parts of the metal plate that should not be etched away are covered with a pattern of photo-resist (such as a pattern of toner transferred from a laser printer). Equivalently, the plates can be formed from a standard photo-polymer such as DuPont Cyrel or BASF Nyloflex, which is first selectively cured by being exposed to a pattern of UV light, which in the standard process is in the range of 365 nm after which the unexposed portion is washed away.

Templates for the photo-resistive ink patterns of the two plates can be seen in the FIGS. 89A and 89B. FIG. 89A shows a photo-resistive ink pattern of the plates' side. FIG. 89B shows a photo-resistive ink pattern of the protrusions. In the embodiment where the plates are photo-polymer, the negative of these patterns is used.

Another method for creating an integrated plate and protrusion layer 36 part is to photoetch the surfaces of two thick flat metal plates, such as steel plates, so that they form negative relief patterns. A plastic that is soft when hot yet hard when cool is then placed between these two metal plates, preferably in the presence of a vacuum. The plates are heated and pressure is applied to force them together, thereby creating a relief pattern in the plastic, whereby the soft plastic is deformed away from the groove areas to fill the protrusion areas.

The photo-etching is done so as to create smooth slopes in the plate relief pattern, thereby facilitating the subsequent process of pressing the relief pattern into the plastic.

The arrangement of the two metal plates is shown in cross section in the FIG. 90A below. The top compression plate 57 which creates the grooves in the plastic that define the plate shapes. The bottom compression plate 58 which creates the protrusions in the plastic. FIG. 90B shows the resulting groove locations 59, and the resulting protrusion locations 60.

Another method of manufacture of the IPPL 36 is to create a single surface that has a relief structure of both plate shapes as well as protrusions on only one side, by splitting each protrusion to allow for continuous grooves between adjacent squares, as shown in profile view in the FIG. 91A.

Placing the relief structure which combines the rigid squares and the protrusions into a part that has a relief structure on only the bottom side covers the advantage that the top of this part will feel smooth to a user's touch. Specifically, this embodiment creates an Integrated Plate and Protrusion layer 36 that also includes a Flexible Touch Layer 38 as in the Flat Top Integrated Plate and Protrusion 41 embodiment part as seen/described in FIGS. 78-80.

One method of manufacturing this relief structure is via compression molding of thermosetting plastic. In a variant of this process, the plastic to be compression molded is placed in contact with a thin (e.g. 0.003 inch thick) sheet of a flexible plastic such as mylar or kaptan. After the compression and curing process of the connected part, the groove areas will essentially consist only of the flexible plastic 61, with the rigid plastic being located in the plates 35 and protrusions 30, as seen in FIG. 91B. This will create the desired mechanical properties of rigid plates 35 and rigid protrusions 30, with flexible hinging between adjoining plates along with an integrated Flexible Touch Layer 38, as in a Flat Top IPPL 41.

FIG. 54 shows an exploded view of the Layers and Assembly in the prototype single tile prototype embodiment using a distinct Plate matrix Layer 53 and an Integrated Protrusion and Base Layer 42 with: Flexible Touch Layer 38, Plate Matrix Layer 53, Active Sensing Array 20, Integrated Protrusion and Base 42.

The grid line intersections on the Active Sensing Array are the locations of the FSR sensing elements. When the layers are placed into contact, each protrusion 30 in the Protrusion layer 42 is aligned to contact the corresponding active sensing area 27 on the inside surface of the Active Sensing Array 20. Additionally, the corners of each plate in the Plate Matrix Layer are aligned to be above the outer active sensing area 27 on the outside surface of the active sensing array 20 opposite their corresponding protrusions. An Adhesive Layer was be used between each of the above layers in this prototype.

Flexible Touch Layer 38: 5 mil Polyester Film

Plate Matrix Layer 53: 31×31 grid of plates. 1/32" Acrylic sheet, custom laser cut to the final shape using two passes. The first pass etching the grooves, but not cutting all the way through, at the corner junctions. A second pass cutting slits completely through the acrylic to resulting in the part designated in top view FIG. 58A and cross section view FIG. 58B. The dimensions used in the prototype are shown in FIG. 58A and FIG. 58B (not to scale) which has square plates, so these dimensions are the same for both the width and length.

Active Sensing Array 20: Custom Sensor as per description in above embodiments with a 32×32 grid of sensing elements spaced at 3/8". Each sensing element has a 4×4 mm overlapping FSR area. 100 kOhm FSR Ink was used in the ASA.

Integrated Protrusion and Base Layer 42: 32×32 grid of protrusions, 3/8" spacing, 4 mm diameter hemispherical protrusions. Custom SLA Rapid Protoyped part made with Somos 11122 (Clear PC Like).

Adhesive Layer(s) 40: Graphix Double Tack Mounting Film. This has protective paper on either side of an adhesive plastic sheet.

In this prototype assembly, a) One side of an adhesive layer 40 is affixed to the inner surface of the Plate Matrix Layer 53, leaving the protective covering on the opposite side intact.

b) The side of second adhesive layer 40 is affixed to the inner surface of the Plate Matrix Layer 53, leaving the protective covering on the opposite side intact.

c) Gently bend the Plate Matrix Layer 53 until all the connecting material in the notched grooves at each plate junctions have broke. This leaves a flexible sandwich with the Plate Matrix Layer 53 in between two adhesive layers and with each plate no longer rigidly attached to any other plate.

d) The Active Sensing Array 20 is affixed to the adhesive layer 40 (already in plate) on inner side of the Plate Matrix Layer 53 using the opposite side of the adhesive layer 40 from step (b). The sensing elements 27 from the Active Sensing Array 20 need to be aligned with the plate junctions on the Plate Matrix Layer 53.

e) One side of third adhesive layer 40 is affixed to the inner surface of the Active Sensing Array 20.

f) The Integrated Protrusion and Base Layer 42 is affixed to the adhesive layer 40 (already in place) on inner side of the Active Sensing Array 20 using the opposite side of the adhesive layer 40 from step (e). The sensing elements 27 from the Active Sensing Array 20 need to be aligned with the protrusions 30 on the Protrusion Layer 42.

g) The Flexible Touch Layer 38 is affixed to the adhesive layer 40 on outer side of the Plate Matrix Layer 53, using the opposite side of the adhesive layer 40 from step (a).

Pressure Data for this Prototype Assembly

In the following tests, calibrated weights were placed above a wire intersection. A small rubber cylinder that weighed 5 g was used to concentrate the force at the intersection.

Prototype using distinct Plate Matrix Layer 53 and Integrated Protrusion and Base Layer 42

| Weight (g) | Value from Sensing element (*) |
|---|---|
| 20 | 0 |
| 40 | 120 |
| 60 | 230 |
| 80 | 320 |
| 100 | 420 |
| 120 | 500 |
| 140 | 540 |
| 160 | 570 |
| 180 | 605 |
| 200 | 620 |
| 250 | 650 |

(*) In the prototype embodiment here, these are the values measured from the A/D circuitry of the PIC24 chip and based on voltages. The values are measured as 12-bit non-negative values.

Methods to Manufacture the Plate Matrix Layer

One embodiment of the Plate Matrix Layer involves laser cutting as described above.

Other embodiments are analogous to the technique described for the Integrated Plate and Protrusion layer 36 described above but without steps/facets that create the protrusions.

Methods to Manufacture the Integrated Protrusion and Base layer 42

In one embodiment, a metal mold can be created for the Protrusion Layer using industry standard techniques for making molds for plastic parts. The Protrusion Layer parts can be manufactured via injection molding out of ABS plastic using standard injection mold and molding techniques.

Assembly of Sensor with a Thin Base Layer and Co-Planar PCB

FIG. 92 shows an embodiment of a single Stand Alone Tile: Flexible Touch Layer 38; IPPL 36; Base Layer 32; Active Sensing Array 20; Printed Circuit Board 4.

The embodiment shown in FIG. 92 shows the Active Sensing Array 20 laying flat upon the Base Layer 32, with its Connector Tails 25 connected to a co-planar Printed Circuit Board 4. The base layer 47 in this corresponds to one described earlier where the apparatus 1 will lie flat against a flat solid surface. An advantage of the embodiment is that the entire sensor is thin. For example in the above embodiment, the entire sensor is under 3 mm.

Assembly Involving a Plurality of Tiles

In one embodiment using the Integrated Plate and Protrusion Layer (IPPL) technique, individual tile sensors that are part of grid of sensors are nearly identical to the single tiles described earlier, but may have an extra row and/or extra column of bridging plates 37. In particular, as seen in exploded view in FIG. 93, an individual tile with an N×M Active Sensing Array 20 and corresponding N×M matrix of protrusions 30 in the IPPL 36 may have an extra row and column of bridge plates 37 in the IPPL 36 resulting in N×M matrix of plates 35. This is unlike the single tile assembly described earlier where the IPPL 36 for such an N×M Active Sensing Array 20, where there were an (N−1)×(M−1) matrix of Plates 35. Note that there are no protrusions 30 on the additional corners of these extra bridging plates 37. The Flexible Touch Layer 38 will be a single continuous sheet spanning all tiles in the Grid of tiles.

An example embodiment of an Internal Tile used in a Plurality of tiles that is based upon an Active Sensing array 20 with a 4×4 matrix of sensing elements 26 is seen in exploded view FIG. 93, top view FIG. 94, and side view 95. In this example, the IPPL 36 consisting of a 4×4 matrix of Protrusions 30. There is a sub-matrix of 3×3 plates 35 with protrusions at each corner and an additional, an additional row and column of bridging Plates 37 (providing seven additional plates) that have only some corners resting on protrusions. These bridging plates 37, as described later will span across to share protrusions 30 on neighboring tiles. As seen in FIG. 93 the layers include the Flexible Touch Layer 38, IPPL 36, Active Sensing Array 20 and Base layer 47. The IPPL 36 is aligned such that its 4×4 matrix of protrusions is in contact with the corresponding 4×4 matrix of sensing elements 26 on the active sensing area. An Adhesive Layer 40 may also be used between each of the above layers. In this view, the additional row and column of bridging plates 37 is seen extending beyond the base layer 47, the IPPL 36, and the active sensing array 20 on two edges.

FIG. 96A and FIG. 96B shows the manner in which adjacent tiles 2 are aligned positioned such that the bridging plate rests on the corresponding protrusion on its adjacent tile. FIG. 96A shows two tiles being aligned. FIG. 96B shows the two tiles properly positioned.

In this embodiment, adjacent Tiles 2 are positioned such that the bridging plates 37 span the protrusions 30 of one tile 2 to the protrusions 30 of another tile 2. This results in an identical mechanical distribution of force to the appropriate sensing elements as for plates spanning protrusions within a tile.

In one implementation of the Base layer 47, the base can be molded with a cavity on its bottom that could house the sensor tile's Printed Circuit Board 4, as shown in side view in FIG. 97A and from the bottom in FIG. 97B. Channels would also be molded into the base to support inter-tile cabling.

In FIG. 97B, this embodiment is seen with the Base layer 47 has a cut-out region 62 on its underside into which the Printed Circuit Board 4 securely fits. The Active Sensing Array 20 wraps around two adjacent edges of the Base Layer 32 to electrically connect via the connector tails 23 on the Active Sensing Array 20 to the PCB 4. The IPPL 36 shows the bridging plate (not to scale). The Flexible Touch Layer 38 spans multiple tiles. FIG. 97A shows a side view. FIG. 97B shows a perspective view as seen from underneath.

In the embodiment with the sensor tile's 2 Printed Circuit Board 4 is located underneath the device, then the Active Sensing Array 20 must be wrapped around the Base layer 20 as seen in FIGS. 98A and 98B.

FIGS. 98A and 98B shows the side view of Adjacent Tiles being aligned and positioned. FIG. 98A shows the tile being properly aligned. FIG. 98B shows the two tiles properly positioned. The Bridging Plate 37 spans protrusions 30 on different tiles 2. The respective Base Layers 47 extend only slightly beyond the last edge protrusion 30. This allows for a gap between the Base Layers 47 that allows the Active Sensing Array 20 to wrap around.

In this embodiment, a rectangular grid of N×M tiles, such that the bridging plates span the protrusions of one tile to the protrusions of another tile results in an identical mechanical distribution of force to the appropriate sensing elements as with plates spanning protrusions on the same tile.

In one embodiment, an apparatus 1 with a grid of tiles 2 can be composed of identical interior tiles 63 and perimeter tiles (north tiles 64, east tiles 65, northeast corner tile 66). FIG. 94 and FIG. 96 show an Interior Tile that has bridging plates on its north and east edge. FIG. 99 shows the schematic of tiles being properly aligned. FIG. 100 shows the tiles in their proper positions with the bridging plates 37 resting upon protrusions 30 on adjacent tiles 2. FIG. 101 shows the tiles in their proper positions with the Bridge Plates 37 drawn transparently, exposing the Bridging plates 37 on the edge of a tile 2 spanning across pairs of protrusions 30 on two different tiles 2 and in the case of the corner Bridging Plate 37, spanning protrusions 30 on four different tiles 2.

Interpolation Along Bridge Plates Spanning Tiles

In this embodiment, Bridge Plates 37 span across pairs of protrusions 30 on different tiles or in the case of a corner Bridging Plate 37 spanning four protrusions 30 on four tiles. As there is no mechanical difference in the arrangement of a Bridge Plate 37 on protrusions across multiple tiles 2 and for a Plate 35 that spans four protrusions 30 on a single tile 2 regarding to the transmission of force to the respective sensing elements 26, the method of mechanical interpolation is identical for Bridge or non-Bridge Plates.

Note that in this arrangement, there is no need for exact registration between the Flexible Touch Layer 38 spanning the plurality of tiles and the individual sensor tiles, since the Flexible Touch Layer 38 itself can be a featureless and uniform sheet of material.

An Embodiment of Apparatus with an N×M Grid of Tiles with Symmetric Perimeter

In one embodiment there may be different types of tiles along the North and East and Northeast Corner of the grid of tiles as seen in FIG. 102. FIG. 103 shows the North Tiles 64 contain an eastern column of Bridge Plates 37; the East Tiles 65 contain a northern row of Bridge Plates 37; the NE Corner Tile 66 does not contain any bridge rows or Bridge Columns; the Interior tiles 63 contain both a northern bridge row and an eastern bridge column of Bridge Plates 35. In this embodiment for a Grid of N rows by M columns of tiles, there would be (N−1)×(M−1) Interior tiles 63, N North Tiles 64, M East Tiles 65 and one NE Tile 66 as seen in FIG. 102.

FIGS. 103-104 show an example with a 3×3 Grid of Tiles with their respective Interior 63, North 64, East 65, and NE 66 Corner Tiles in their appropriate position. FIG. 103 shows a schematic of these tiles being properly aligned with bridging plates being aligned with the corresponding protrusions on the adjacent tiles. FIG. 104 shows the tiles in their proper position.

In other embodiments, all tiles in a grid can be identical. One such embodiment would have an IPPL 36 with Corner Protrusions 54, as seen in FIGS. 77-80. In this case, the bridging plates would have corner protrusions 54 and these corner protrusions 54 would rest upon the active sensing area 27 of the corresponding sensing element 26 of adjacent tiles 2.

Interpolation Involving a Plurality of Sensor Tiles

This is the same as described above.

With a networked grid of adjacent sensor tiles 2, the Flexible Touch Layer 38 can consist of a single uninterrupted thin sheet material (such as 5 mil polyester), which covers all of the sensor tiles 2 in the grid of sensor tiles. This has the advantage that the mechanical interpolation process of neighboring sensing elements in the Active Sensing Layer of different adjoining sensor tiles is identical with the mechanical interpolation process of neighboring sensing elements within each individual sensor tile. The effect from the user's perspective is an interpolating touch response that is exactly equivalent to the interpolating touch response of a single extremely large sensor tile, as described and seen above FIG. 104. Similarly, the host computer 3, once it as reconstructed the image from the Tile Topology Table, can treat the image from a grid of tiles as if it came from a single large sensor.

Note that in this arrangement, there is no need for exact registration between the Flexible Touch Layer and the individual sensors tiles, since the Flexible Touch Layer itself can be a featureless and uniform sheet of material.

Non Planar Sensors

In other embodiments, the sensing apparatus 1 may be made to fit upon a developable surface, namely one which can be flattened onto a plane without distortion such as a section of a cylinder as seen in FIG. 105 or cone as seen in FIG. 106. Specifically developable surfaces have zero Gaussian curvature.

In one such embodiment, a sensor may be made in the form of a section of a cylinder as seen in FIGS. 107-111.

FIG. 107 shows an embodiment for an assembly for a 'Section of Cylinder' Curved Sensor shown from an inside view of the layers. In FIG. 108, it is shown from an outside view. In FIG. 107 and FIG. 108 the layers are: Flexible Touch Layer 38, Active Sensing Array 20, IPPL 3 and Base layer.

In this embodiment, both the Flexible Touch Layer 38 and Active Sensing Array 20 are flexible and can be manufactured similarly to the earlier embodiments. The IPPL 36 may be manufactured via an injection molding as described earlier such that the inner curvature along the plane of the inner faces of the protrusions has the same curvature as the outer surface of the Base Layer 32 which in turn would have its inner curvature matching the outer curvature of the cylinder. Corrections to this curvature may be made to account for the thickness of the Active Sensing Array 20, but as the Active Sensing Array 20 is thin and the IPPL 36 somewhat flexible, this correction is not required. FIGS. 109-111 show respective views of the IPPL along the height of the cylinder; from the outside; and from the inside, respectively.

In this embodiment, the Base Layer 32 must be sufficiently rigid such that the force imparted on the Flexible Touch Layer is not absorbed by deformation. In one Embodiment, the Base Layer can be made of ABS plastic with the same inner curvature as the outer curvature of a solid metal cylinder. As seen in the FIG. 112, such a tile 2 would have an inner curvature the same as that of the metal cylinder 67 that it is abutted against.

Non-Rectangular Plates

Sensors may be constructed with non-rectangular plates. For example, in one embodiment, a hexagonal plate matrix 39 as seen in FIG. 113 and corresponding hexagonal protrusion matrix 43 as seen in FIG. 114 may be used.

A Hexagonal IPPL 36 using the same manufacturing techniques as with the rectangular IPPL may be used to create such a part as seen in FIG. 115.

In such an embodiment, an Active Sensing Array 20 with corresponding conductor line 23 spacing so that intersections match the protrusion 30 locations of the Hexagonal IPPL 36 may be made, as seen in FIG. 116.

FIG. 117 shows the Hexagonal IPPL seen positioned upon the corresponding Active Sensing Array 20.

In this embodiment, only intersections of grid wires that align with protrusions from the protrusion Matrix have sensing elements that are used in the mechanical interpolation.

In this embodiment, bi-linear interpolation may be applied to the six corners of the plate sensing element values.

Let the six sensors around any hexagonal plate be labeled, in clockwise order, A,B,C,D,E,F as in FIG. 118.

One can measure proportional distances between opposite pairs of edges by the ratios: (A+B)/(A+B+D+E), (B+C)/(B+C+E+F), and (C+D)/(C+D+F+A), thereby defining three lines, each parallel to its associated pair of edges (one line parallel to AB and to DE, a second line parallel to BC and EF, and a third line parallel to CD and FA). These three lines intersect to form a small triangle in the interior of the hexagon. The centroid of this triangle can be taken as a useful approximation to the center of pressure applied to the plate.

Fusion

Gesture sensing via a real-time range imaging camera 100 has the following desirable properties: (1) ability to track gestures and (2) ability to maintain consistent identity over time of each finger of each hand or each part of each foot of each user or each part of each foot of each user. Yet range imaging cameras 100 cannot provide high quality detected touch 111 and pressure information, while typically operating at relatively low frame rates.

A pressure imaging apparatus 1 provides low cost, very high frame rate (greater than 100 frames per second), large area pressure imaging. The described touch-range fusion apparatus technology 104 can, in one embodiment, combine this pressure imaging apparatus 1 with a newly available generation of low cost real-time range imaging cameras 100 to simultaneously enable the advantages of both.

Specifically, a range imaging camera 100 tracks every detected touch 111 gesture by a user/hand/finger/foot/toe/pen/object, each having a unique persistent identifier, while using the pressure imaging apparatus 1 or other touch device 101 to determine positional centroid, pressure (in the case of pressure imaging apparatus 1) and timing of each detected touch 111 with extremely high geometric fidelity and high temporal sampling rate.

Hardware

A Touch-Range Fusion Apparatus 104 can consist of a touch device 101, such as pressure imaging apparatus 1, and one or more range imaging cameras 100 devices. Pressure Imaging Apparatuses 1 are made of modular rectangular pressure tiles 2 that can be seamlessly adjoined to provide continuous pressure imaging across pressure tiles 2. A Pressure Imaging Apparatus 1 can be made in a variety of sizes. Three embodiments include a small device with a 12.5"×17" form factor, a medium device with a 25"×34" form factor, and a large device with a 50"×68" form factor.

These three form factors describe the most commonly found finger and pen input non-mobile devices. The small form factor is well suited for a single user, with sufficient space to use both hands concurrently. The small form factor can be seen in such devices as the Wacom Intuous 4 Extra Large and is comparable in size to an average desktop display [8]. The medium form factor can be more easily used by multiple participants and is the size of many interactive tabletop surfaces. For example, the Microsoft Surface and Diamond Touch are approximately the same size and dimensions as the medium form factor example [9,10]. The large form factor is primarily seen in collaborative interactions between many users at whiteboards as well as for floor sensors that can track the time-varying pressure across a surface induced by users' feet movements. SMART Electronics produces interactive whiteboards with comparable sizes [11].

One embodiment of a range imaging camera 100 contains a IR Range Camera 106 and, optionally, an RGB camera 103. Tracking of object features is done primarily from range data. The RGB camera 103 can be used for assisting in identifying objects in the 3D space, while also providing useful visual feedback to users of the device.

FIG. 122, FIG. 132 and FIG. 133 show three different possible placements for range imaging cameras 100 for desks/tables/walls, and FIG. 128 shows a possible placement appropriate for floors.

In one implementation, one or more range imaging cameras 100 are placed in key areas around an pressure imaging apparatus 1 to achieve the most efficient and cost-effective means of accurately identifying fingers, feet, pens and objects in 3D space. The location and number of cameras are chosen so as to limit occlusion issues, and to maximize pixel/depth resolution as needed for accurately identifying features.

Identifying Fingertips, Palms, Parts of Feet, Pens and Objects in 3D Space

Using the range imaging camera 100 data, fingertips, palms of hands, parts of feet, pens and objects are identified using image analysis process algorithms such as [1], [2], [3], [4], [5], [15], [16], [22], [23] or using any other image analysis process which is standard in the art. To begin, feature extraction is performed on the data from the range imaging cameras 100. This can be done, possibly in conjunction with supplementary information from the RGB cameras 103, in order to extract information about shape, including lines, edges, ridges, corners, blobs and points. 3D shape recognition provides high confidence information to the feature recognition. This information is passed to machine learning algorithms, trained on various stimuli to identify hand skeleton features, finger tips, foot shape, pens and objects. Once the object has been identified, the location in 3D space of the object features is tagged. The identity and xyz position of each feature is used to determine whether a given object or feature is in contact with or off the pad when tracking blobs on the pressure imaging apparatus 1 or other touch devices 101.

Because the Touch-Range Fusion Apparatus 104 can have more than one range imaging camera 100, this analysis software composites the identified features from all angles in order to give a complete list of objects within the scene to the software that will perform the fusion calculation that maps identified 3D objects to detected touches 111 upon the surface.

An added benefit to identifying finger tips, pens and objects is that palms, wrists and unwanted items can be rejected when tracking objects on the touch device 101. If an application, for instance, requires only pen input, then all other identified objects can be rejected.

Mapping Fingertips, Feet, Pens and Objects to Tactonic Device 101 Contacts

In one case, when an object touches a Pressure Imaging Apparatus 1, an anti-aliased image of pressure is given. This pressure image is used to find the centroid 107 of a fingertip, pen or object. Each centroid 107 can be tracked continuously across the entire Pressure Imaging Apparatus 1. This accurate centroid 107 data is used, along with the identity of objects derived from Range Imaging Camera 100 data, described above, to give each centroid 107 an identity that can persists even when that finger or object loses contact with the surface. Alternatively to a pressure imaging apparatus, a touch device 101 can be used that tracks the centroid 107 of each detected touch 111 upon the surface, although possibly without tracking pressure.

The identity of each centroid 107 is obtained by searching through the list of identified objects and features identified in the by the Range imaging camera 100 data, as described above. If the object/feature is located near the touch device 101 plane and above the location of the centroid 107 in the X-Y position, then the centroid's 107 identity can be obtained.

Contacts made to the touch device 101 are identified and tracked continuously as objects and hands and feet move around the device. This contact data can be used for more robust tracking of persistent identity. In particular, if the identified contact becomes obscured from the range imaging cameras 100 because of occlusion, then the contact will retain its identity as long as the object remains in contact with the touch device 101. If initial contact is made in a region that is obscured from the range imaging camera 100, then contact identity can be made when the object/feature reveals itself to the range imaging camera 100.

Support for Simultaneous Multi-User Collaboration

Distinguishing between individual users 109 becomes important in larger form factors when multiple participants are using a space concurrently. Each individual user 109 is identified by looking at the entrance position of the arm, the angle of the arm, and continuous tracking of individual users 109 as their arms and hands move around the visible area. Similarly each individual user 109 is identified by continually tracking the position and orientation of each participant's body, legs and feet as they walk around upon a touch device 101 floor surface. As each foot or hand and stylus moves across the touch device 101, its individual user 109 identification is maintained.

For example, FIG. 123 shows a Left Hand 118 and Candidate Right Hand-A 119 which is within the individual user maximum reach 108, so the two hands may belong to the same individual user 109. Candidate Right Hand-B 120 is beyond the individual user maximum reach 108 of the Left Hand 11, so Left Hand 118 and Candidate Right Hand-B 119 must belong to different individual users 109.

Applications Enabled by the Invention

In addition to new unique gestures available by fusing range imaging 100 and touch device 101, existing gestures for range imaging cameras 100 and touch device 101 are also supported. Application support software maps gestures performed on the device to actions and keystrokes on the computer. Along with the control panel, applications and plug-ins that this technology supports includes musical instrument emulation, simulated surgery, simulated painting/sculpting, athletic games and activities not just upon body movement but also on shifts in weight and balance, and other applications that require a combination of isotonic and isometric control can be implemented to attain the full capability.

Uses for the Invention:

Interactive Whiteboards: According to Futuresource Consulting, Ltd. market report for this sector, 900K Interactive Whiteboards were sold in 2010, up from 750K in 2009, mostly in the Education sector. A typical Interactive Whiteboard consists of a short throw projector displaying onto a large touch device 101 (for example to 6'×4'). The current models for these large format touch device 101 utilize a set of optical cameras along the perimeter to track user detected touches 111 and gestures. While that approach can provide limited multi-touch and multi-user support, it cannot identify the user, hand or finger of detected touches 111. Additionally, actions may be occluded by the presence of multiple hands in the camera path. Beyond the significantly greater gesture vocabulary achievable from robust hand action tracking and the added dimension of pressure, the sensor fusion approach also addresses the educational need for robust at-board multi-student interaction and collaboration.

Personal Desktop Peripheral: A personal desktop peripheral represents a generic Computer Human Interface (CHI) technology which, like the mouse or keyboard, is application blind. While many types of applications could be created to take advantage of robust gesture vocabulary, a pregnant initial application market for this desktop peripheral would be a game controller. Computer games focus on providing vivid graphical experiences with compelling game play. Computer gamers are both comfortable and fluent with user input devices that manipulate iconic representation of their character and controls while looking at the video display (and not at the input device). The Microsoft Kinect, introduced in November 2010, sold 10M units in its first 60 days, yet it does not provide the level of controlled precision or responsiveness required for many games, such as first person shooter games. Kinect provides relatively coarse positional accuracy and low camera frame rate. For instance, the Kinect has a frame rate (30 fps) that is a quarter as responsive as keystroke input scanning (125 Hz). The touch-range fusion apparatus 104 would provide a broad canvas for game control with extremely accurate control and response for surface interaction as users touch and press upon surfaces with their hands and feet.

List of Components

Range Imaging Camera (RIC) 100: produces a 2D image showing the distance to points in a scene from a specific point, which is implicitly a point in 3D. There are many types of Range Imaging Cameras 100 commercially available using well established techniques such as: Stereo triangulation, Sheet of light triangulation, Structured light, Time-of-flight, Interferometry, and Coded Aperture. In one embodiment a Microsoft Kinect peripheral can be used as the Range Imaging Camera 100. The Kinect contains a PrimeSense Range Imaging Camera 100. There are open source APIs available to utilize this camera in the Kinect, such as OpenCV, as well as Microsoft Kinect API. While the Kinect also has an RGB Camera 103 which can be used in conjunction with this invention. In the Kinect Embodiment, there is a standard USB cable 9. FIG. 124 shows a range imaging camera 100 with an IR camera 106, a RGB Camera 103 and a USB Cable 9.

Touch Device (TD) 101: A touch device 101 that is able to detect and track detected touches 111 on a surface. There are many well established techniques for touch devices 101 as well as a multitude of commercial devices, such as the Apple Magic Mouse. The Magic Mouse embodiment includes a standard USB cable 9. Similarly there are ubiquitous smart phones and tablets, such as the Apple iPhone or iPad that contain Touch Devices 101. Embodiments of touch devices 101 include those using: Resistive, Projective Capacitive, Optical, and Frustrated Total Internal Reflection (FTIR) methods of operation.

FIG. 125 shows a Touch Device 101, such as the Apple Magic Mouse, with a (1) Touch Device 101 and (2) USB Cable 9.

Pressure Imaging Apparatus 1: is a Touch Device 100 that also provides pressure data at surface contact along with positional detected touch 111 data. An embodiment of a Pressure Imaging Apparatus 1 includes a standard USB cable 9. Other embodiments of Touch Devices 101 that provide some degree of pressure data (although with less accuracy of pressure sensing than a pressure imaging apparatus 1) include FTIR.

FIG. 126 shows Pressure Imaging Apparatus 1 with a USB cable 9.

Computer 3: A computer 3 or other device with a microprocessor with a means for receiving data from one or more touch device 101 and one or more Range Imaging Camera 100. An embodiment of a computer 3 is a Microsoft Windows based Computer.

Step by Step Description of User Experience:

FIG. 127 shows a Table Top Embodiment with a Touch Device 101. Range Imaging Camera 100 Physical Objects 102 such as User'S Left 118 and Right 121 Hand.

FIG. 128 shows a Floor Embodiment with a Touch Device 101, a Range Imaging Camera 100, Physical Objects 102 such as Individual Users 109.

From the user's perspective, operation is as follows:

In one time step, one or more users' hands or other physical objects 102 are within the field of view of the Range Imaging Camera 100. A continuous image from the Range Imaging camera 100 is transmitted to the computer 3. Concurrently any user may impose a finger, hand palm, toe, foot, knee, other body part, or other physical object onto the top of the touch device 101. A continuous image of this imposed touch is transmitted by a touch device 101 to a host computer 3.

On the computer 3 the Range Image of spatially carrying depth is stored in a region of computer memory. From there computer software on the computer 3 can be used to store the image in secondary storage such as a disk file, to display the image as a visual image on a computer display, to perform analysis such as construction of a hand object model 105, hand tracking, body model, body tracking, foot shape model, foot tracking, region finding, shape analysis or any other image analysis process which is standard in the art [1-5], or for any other purpose for which an image can be used.

In an embodiment with a pressure imaging apparatus 1, on the computer 3 the image of spatially varying pressure is stored in a region of computer memory. From there computer software on the host computer can be used to store the image in secondary storage such as a disk file, to display the image as a visual image on a computer display, to perform analysis such as hand shape recognition, finger tracking, footstep shape recognition, footstep tracking, region finding, shape analysis or any other image analysis process which is standard in the art, or for any other purpose for which an image can be used.

On the next time step, the above process is repeated, and so on for each successive time step.

Outside Operational Point of View

FIG. 129 shows an embodiment of a Touch Device 101, Range Imaging Camera 100, USB Cable 9 from Touch Device 101 to a Computer 3, a USB Cable 9 from a Range Imaging Camera 100 to Computer 9, and Computer 3.

One or more Touch Devices 101 and one or more Range Imaging Cameras 100 are connected to a Computer 3.

Each Touch Device 101 has one or more of the Range Imaging Cameras 100 aimed at its surface.

Each Range Imaging Camera 100 is calibrated/registered with the Touch Device(s) 101 that it is aimed at. This is done using well established software techniques such as algorithms described in [17], [18], [19], [20], [21], or any other image analysis process which is standard in the art. A direct result of this calibration/registration in a well defined mapping of points on the 2D Touch Devices 101 to points in the 3D coordinate system of the Range Imaging Camera 100.

Internal Operation Point of View

Using image analysis processes on the Range Imaging Camera 100 data, such as [1], [2], [3], [4], [5], [15], [16], [22], [23] or using any other image analysis process, which is standard in the art, objects in the scene may be identified, mapped to know model types, and tracked in 3D space.

Continuous time varying 3D Articulated Models of each hand, full body, or other object with a known geometry, such as a pen, are constructed from the Range Imaging Camera 100 data using image analysis process such as [1], [2], [3], [4], [5], [15], [16], [22], [23] or using any other image analysis process which is standard in the art.

Continuous time varying detected touch 111 tracking of finger, palms, or other objects in contact with the Touch Device 101 are constructed from the surface data from the Touch Device 101 using detected touch 111 tracking process such as [7] or [22] or using any other touch tracking process which is standard in the art.

Step by Step Detailed Algorithm How to Combine the 2d and 3d Info Together

A plurality of identifiable object models; such as hand, body, pen, ball, cylinder, hammer, or any other object appropriate for an application utilizing this invention; are stored as available data of known types. This data includes any data necessary for identifying the object type as well as a geometric skeletal model including a set of Articulation Joints 112 for this object type and a set of Trackable Contact points 110 for that model. For example in a hand object model 105, articulation joints 112 would include the wrist and individual finger joints 112 while the contact points would include the finger tips. For purposes here, the model types are identified as $T_1$. For example, $T_1$ may designate the model type for hand, $T_2$ may designate the model type for pen, etc. This object identification, mapping and tracking in 3D space can be accomplished utilizing an image analysis process such as [1], [2], [3], [4], [5], [15], [16], [22], [23] or using any other image analysis process which is standard in the art.

FIG. 130A shows the resulting hand edge 122 of a hand detected using Range Imaging Camera 100 Data from a User's Hand 115 image and after applying standard art edge detection algorithms; FIG. 130B shows the hand edge 122 overlayed with the resulting feature skeleton of the hand Object Model 105 derived by applying standard art algorithms; and FIG. 130C showing the skeleton of the derived articulated hand Object Model 105 showing the Trackable Contact Points 110 in the Model, such as finger tips and Articulated Joints 112 in the Model, such as wrist, finger joints, etc.

As each object is first detected and identified as a known Model Type $T_i$, it will be assigned a unique element identifier, $E_j$ which is added to a list of known Elements in the Scene. Thereupon the system will continuously time track the 3D coordinates of each join in $J_{jn}$ (n indicating the $n^{th}$ Joint 112 number in $T_i$), as well as the contact points 110, $C_{jm}$ (m indicating the $m^{th}$ contact point 110 number in $T_i$), of the element $E_j$. Tracking of the Joints 112 and Contact Points 110 corresponding to the element's model is maintained even when some of the joints 112 or contact points 110 become occluded (either occluded by itself as when fingers become occluded in a clenched fist, or by another objects in the scene). A contact point 110 will be considered occluded if that contact point is not visible by the Range Imaging Camera 100 at a specific moment in time.

FIG. 130D shows an example of articulated model for a hand Element $E_j$ with labeled joints $J_{jn}$ and contact points, $C_{jm}$ Specifically the computing system will maintain a list of Elements, $E_j$ in the scene with the following data:

Model Type, $T_1$

At any point in time:

A set of 3D positions, one for each joint 112 $J_{jn}$ in Global Coordinates (*)

A set of 3D positions, one for each contact point 110 $C_{jm}$

A set of occlusion Boolean values, one for each contact point 110 $C_{jm}$ indicating whether that contact point 110 is currently visible from the range imaging camera 100.

(*)—As described in a separate section all Positions can be mapped to a global coordinate system for the scene.

Concurrently, for each touch device 101 there will be a continuous time varying set of detected touches 111 on the touch device 101 of objects in contact with the Touch Device 101 are tracked using a touch tracking process such as [7] or [22] or using any touch tracking process which is standard in the art.

As each detected touch 111 is first detected and identified it will be assigned a unique touch identifier, $P_j$ which is added to a list of known Touches for that device. As is standard practice in the art[22], if a touch, $P_j$, leaves the surface and a new touch is detected within a designated time threshold and distance threshold, that touch will be given the same id, $P_j$ as in the case of a finger tap on standard devices such as the Apple iPad. A touch that has left the surface and does not reappear on the surface within that threshold of time and distance is considered 'no longer active'.

FIG. 134 shows a Touch Device 101 with a set of Contact Points $P_k$.

Specifically the computer 3 will maintain a list of Touches, $P_k$ for each device with the following data:

At any point in time:

The 2D position of the touch mapped to 3D Global Coordinates(*)

In the case of a Pressure Imaging Apparatus 1, the pressure value of the touch.

(*)—As described in a separate section all Detected Touch 111 Positions can be mapped to a global coordinate system for the scene.

For each contact point 110 object model type as $T_i$ a contact radius may be specified as data. For example, the contact radius corresponding to a finger tip would be approximately ¼", corresponding to the distance from the position in the model of the finger tip (inside the finger) to the surface of the object itself (corresponding to a point on the pad of the finger). This contact radius may be scaled to the side of the actual Element as appropriate for the application of the invention. For example a child's hand is much smaller than a large adult man's hand so the contact radius for the child's finger might be approximately ⅛". In one embodiment, a sealing factor might be computed relative to the distance of two designated adjoining joints 112.

A Detected Touch 111 $P_k$ is no longer active when the detected touch 111 has left the surface and has not come in contact again within time and distance thresholds described earlier (such as a tap motion). In one embodiment, the time and distance thresholds may match the associated contact point 110. For example a foot tap have a larger time threshold than a finger tap.

Below is the algorithm for associating Detected Touches 111 with Contact points 110 and for associating Contact Points 110 with Touches:

For each time step t
  Obtain the new state of the object elements $\{E_j\}$ in the scene at time t, derived from the Range Imaging Cameras 100 data.
    For each new element $E_j$ first introduced to the scene in this time step
      For each Contact Points 110 $C_{jm}$ of that element
        Set the Detected Touch 111 associated with that Contact Point 110 to 'none'
  Obtain the new state of the Detected Touches 111 $\{P_k\}$ at time t from the Touch System
    For each new Detected Touch 111 $P_k$ first introduced in this time step
      Set the Contact Point 110 associated with that Detected Touch 111 to 'none'
    For each Detected Touch 111 $P_k$ that has become no longer active in this time step
      If there is a Contact Point 110 $C_{jm}$ associated with this Detected Touch 111
        Set the Detected Touch 111 associated with $C_{jm}$ to 'none'
        Remove this Detected Touch 111 $P_k$ from the set of Detected Touches 111
    For each Detected Touch 111 $P_k$ that does not have a contact point 110 $C_{jm}$ associated with it
      For each Contact Point 110 $C_{jm}$ that does not have a detected touch 111 associated AND the Contact Point 110 is not currently occluded
        compute the Euclidian Distance d between respective positions in Global Coordinates of the Contact Point 110 $C_{jm}$ and the Detected Touch 111 $P_k$
        if d is less than the contact radius for that Contact Point 110, $C_{jm}$
          Associate $C_{jm}$ with $P_k$
          Associate $P_k$ with $C_{jm}$
  Display the data $\{E_j\}$, $\{C_{jm}\}$, $\{J_{jn}\}$, and $\{P_k\}$ along with the computed associations (*)
  Provide this data $\{E_j\}$, $\{C_{jm}\}$, $\{J_{jn}\}$, and $\{P_j\}$ along with the computed associations (*)(**)
On this next step, the above process is repeated, and so on for each successive time step.

Note:

(*) For Contact Points 110 $C_{jm}$ that have associated Detect Touches $P_k$, positional information from the Detected Touch $P_k$ will always be more accurate than the positional information from the Contact Point $C_{jm}$ (from the Range Imaging Camera 100 data analysis). Specifically, while the position of an occluded Contact Point 110 is either inaccurate or unavailable, an accurate position for any occluded Contact Point 110 Cjm is available via the position of the associated detected Touch 111 $P_k$.

(**) The data $\{E_j\}$, $\{C_{jm}\}$, $\{J_{jn}\}$, and $\{P_j\}$ along with the computed associations may be provided to higher level systems for further analysis such as gesture synthesis or gesture analysis that would extract higher level gestures such as in [27] which in turn could be made available for use in an application FIG. 135 shows a Block Diagram showing the Range Imaging Camera 101 and Touch Device 102 connected to the Computer 3. Using the above algorithm, the element data $\{Ej\}$ is stored in the Computer Memory for Element Data 123 and the Detected Touch Data is stored in the Computer Memory for Detected Touch Data 124.

Combine Multiple Range Imaging Cameras and Touch Devices

The ability to combine, over a large multiple user 109 surface, high quality semantic data about hand gesture and hand/finger identification as well as foot gesture and foot/toe identification with numerically high quality information about the position, exact time and, in the case of a Pressure Imaging Apparatus 1 pressure of each detected touch 111 upon a surface, and to make this data available in an API, will enable new kinds of interactive human/computer interface applications that were heretofore unattainable.

The broader impact/commercial potential of this invention follows from the combination, over a large multiple user 109 surface, of high quality semantic data about hand gestures, foot gestures and object manipulation with high resolution fine detail from surface data, enabling new kinds of interactive human/computer interface applications heretofore unattainable, in scenarios where collaborators gather and/or walk around in the presence of tables and projection walls to do high quality collaborative work using natural and expressive hand, foot and object-manipulation gestures. This Touch-Range Fusion Apparatus 104 approach is superior to approaches using range imaging cameras 100 or touch device 101 alone, because it allows both isometric and isotonic gestures along with both full hand/finger segmentation and high quality touch/pressure sensing. As both range imaging cameras 100 and touch devices 101 become low priced commodities, costs become sufficiently low that this type of touch-range fusion apparatus 104 can be broadly deployed in homes, offices, schools or other places, to enable people to gather and walk around in the presence of tables and projection walls to do high quality collaborative work. This will have strong implications for education, teleconferencing, computer-supported collaborative work and educational games, as well as interactive simulation for scientific visualization, defense, security and emergency preparedness.

Separately, a novel computer human interaction technology, here called a Touch-Range Fusion Apparatus 104, is described that enables robust gestures and high quality/precise hand/finger input as well as foot/toe input along with disambiguation of multiple individual users 109, user hands 115, individual fingers, individual feet and toes, pens and objects over a surface area. Data from range imaging cameras 100 is used to track movements of hands and feet and to maintain consistent hand/finger and foot/toe identity over time, and this information is combined with a surface touch device 101 to determine accurate positional surface information with a high frame rate. This results in a Touch-Range Fusion Apparatus 104 enablement along with a software abstraction that reliably combines data from one or more Range Imaging Cameras 100 with data from a Pressure Sensing Apparatus 1 or any other type of touch device 101 capable of detecting the location of one or a plurality of detected touches 111 upon a surface, to create a high quality representation of hand and finger action as well as foot and toe action for one or more users or for any other object above and upon a large area surface. This technology enables an inexpensive commercial device using only commodity range imaging cameras 100 and touch devices 101, and where the pressure imaging apparatus 1 or other type of touch device 101 can occur at a data rate that is substantially faster than the frame rate of commodity range imaging cameras 100, such as one hundred to two hundred frames per second, along with a software abstraction that enables robust hand and foot action/gesture and individual hand/finger/foot/toe/object identification and disambiguation.

When used in combination, range imaging cameras 100 and high-frame-rate pressure imaging touch devices 101 suffer none of the deficiencies of each technology alone. In particular, combined data from range imaging camera(s) 100 and a touch device 101 allows a software layer to determine whether fingertips or pens are touching the surface, to continuously track identified fingertips and pens that are touching the pressure imaging apparatus 1 or touch device 101, and to maintain the identity of touching fingertips and pens even when the target becomes obscured from the camera. In addition, collaboration between multiple simultaneous users can be supported, in the described invention allows a software layer to differentiate multiple individuals that are simultaneously using the same workspace, and to maintain owner ID on user hands 115/styli as users' hands cross over each other or, in the presence of multiple pairs of feet, upon a floor or other surface underfoot.

Using standard art 3D Transformation Matrix techniques, a common global coordinate system can be established for multiple Range Imaging Cameras 100 and Touch Devices 101. When one or more touch devices 101 are used, a calibration process must be completed in order to obtain the transformation matrix between the range imaging camera 100 and the surface of the touch device 101. In one implementation, calibration cubes 113 are placed at the four corners of one touch device 101. Using these corner coordinates, a transformation matrix is determined between the points and the range imaging camera 100. Together, these four points create a surface plane for the touch device 101. This process must be completed for each touch device 101 in the camera's view. If multiple range imaging camera 100 are used, then a transformation matrix is determined for each touch device 101 and range imaging camera 100 pair, which proscribes the coordinate transformation between that touch device 101 and that range imaging camera 100. In one implementation, this process is repeated for each touch device 101 that is being monitored. If multiple range imaging cameras 100 are associated with a touch device 101, then a global transformation matrix can be determined between the range imaging cameras 100, using the touch device 101 as a common reference coordinate system. Having multiple range imaging cameras 100 having overlapping views allows for the position of each subsequent range imaging camera 100 to be determined during calibration. If a global matrix is desired for a range imaging camera 100 that views no touch device 101 with another range imaging camera 100, then that matrix must be associated with the range imaging camera 100 or the touch device 101.

FIG. 131 shows cubes placed at the four corners of a touch device.

Gestures enabled by fusing touch devices 101 and range imaging cameras 100.

Gestures enabled by touch devices 101 and range imaging cameras 100 rely on the identification capabilities of the range imaging cameras 100 being paired with the accuracy of the touch devices 101.

Single Touch:

Any gesture made possible by the touch device 101 with a single touch can be expanded to have a specific action based on the detected touch 111. For instance, if fingers of the hand are being used, then each finger can have a separate action state attached. This means that if one hand is used, five separate actions can be performed, one for each finger, without needed to rely on a menu to switch between the actions. Additionally, single touch objects, such as pens can be distinguished from fingers to provide alternate interactions or to prevent accidental input.

In one implementation, input from the touch-range fused apparatus 104 can be used to emulate a mouse by mapping mouse movement to the movement of the index finger on the touch device 101, left click to the thumb taps and right click to middle finger taps. This example illustrates the utility of the sensor fusion technique. Without the range imaging camera 100, finger-touch identification would be lost and without the touch imaging, accuracy and high frame rate would be lost.

Multi-Touch:

When the scope of interaction is expanded to multiple detected touches 111, precision chording is possible. Using a touch device 101 without a range imaging camera 100 limits the possible action states to the number of inputs. For instance, if fingers of a single hand are used on a touch device 101, then only five action states are available (one to five touches). When fused with a range imaging camera 100 to identify touches, chording is possible. Chording is the process of using specific detected touches 111 simultaneously to perform a gesture. For example, using the thumb index finger simultaneously could perform a separate gesture than the thumb and middle finger simultaneously. Identifying detected touches 111 means that $(2^n)-1$ action state combinations are possible for n number of detected touches 111. For instance, the combination of possible action states for fingers of a single hand goes from 5 to 31 when a range imaging cameras 100 are added.

In one implementation, the right hand holds a pen that provides position input to a painting program by touching the touch device 101. As the user draws, the left hand can use specific chording combinations to switch between 31 set actions states for the pen.

Palms/Hands/Feet/Objects:

Fusing a range imaging camera 100 and a touch device 101 can also be used to reject unwanted input and add action states to non-standard touch inputs like hands, feet and objects.

When using a touch device 101 by itself, unintended input can occur. For instance, a palm can be placed on a touch device 101 and can be confused for a detected touch 111. When fused with a range imaging camera 100, the skeleton of the hand is determined which allows the touch to be identified as a palm and the input can be rejected. The same idea can be applied to other objects that should be rejected from providing input. For instance, a coffee cup placed on the touch device 101 could be rejected.

Hands, feet and objects can also provide alternate forms of interaction that rely on what a touch device 101 would consider multiple touches. For example, touching with different parts of the palm could be mapped to different action states. Without the range imaging camera 100, the region of the palm that was touching could not be determined.

Multiple Individual Users 109:

By itself, a touch device 101 cannot distinguish individual users 109 that are touching the same device. When paired with range imaging cameras 100, then the individual users 109 can be determined and touches can be assigned to the correct individual user 109. This allows for simultaneous interaction from multiple individual users 109 or for collaborative interactions.

For example, the touch-range fusion apparatus 104 can disambiguate between the scenarios of a plurality of simultaneous detected touches 111 from different fingers of one hand, a plurality of simultaneous detected touches 111 from fingers belonging to different hands of the same user, a plurality of simultaneous detected touches 111 from fingers belonging to the hands of two different individual users 109.

Similarly, the touch-range fusion apparatus 104 can be used to distinguish between the scenarios of simultaneous detected touch 111 upon a sensing floor by two feet of one user, and simultaneous detected touch 111 upon the sensing floor by the feet of two different individual users 109.

Alternate Embodiments of Camera and Touch Device Configurations

In one Embodiment that would be appropriate for tabletop hand gesture tracking would consist of a Range Imaging camera 100 aimed at a narrow angle, such as a 3° onto a 12"×18" with the camera recessed 6" away from the touch device 101.

FIG. 132 shows an Embodiment of the invention with Touch Device 101 and Range Imaging Camera 100.

In another Embodiment the Range Imaging camera 100 can be placed on a supporting stand and aimed down at the Touch Device 101 at a modest angle, such as a 30°. This configuration could be appropriate for tabletop hand gesture tracking onto a 12"×18" touch device. It could also be appropriate for a game controller with a 5'×6' touch Pressure Imaging Apparatus 1.

FIG. 122 shows an sensor of the invention with Touch Device 101, Range Imaging Camera 100, supporting stand 114 allowing the range imaging camera 100 to face the touch device 100 at a sharper angle.

In another embodiment that would be appropriate for hand gesture tracking would consist of a Range Imaging cameras 100 cab be aimed at a narrow angle, such as a 2° onto a 16"×25" Touch Device 101, as seen in FIG. 133.

Utilities

The following are some utilities for the touch-range fusion apparatus 104.

Electronic Whiteboard:

Out sensor fusion can be a component of an electronic whiteboard, which consists of a flat touch device 101, one or more range imaging cameras 100, a computer 3 and a display projector that projects the computer video images on the surface. The touch-range fusion apparatus 104 serves as the input for the electronic whiteboard. Input can come from a pen or finger, which is identified by the range imaging camera 100, and draws a line on the electronic touch device 101. The computer uses contact point data from the touch device 101 and maps them to pixels on the projected display image, such as the pixels where the pen's path is being traced. Individual fingers of the user can be placed onto the surface to change the color of the pen with a separate hand gesture.

Collaborate Surface:

A collaborative surface that uses the touch-range fusion apparatus 104 consist of a touch device 101, one or more range imaging cameras 100, a computer 3 and a projector. In one implementation, multiple individual users 109 gather around the touch device 101 and touch images that are displayed on the surface. Using the location, arm distances and relative arm angles, individuals can be distinguished from each other. When a user makes contact with the touch imaging surface, photos can be selected if the touch lies within the displayed photo. Dragging a finger along the surface moves the photo. The location of the user that is holding the photo, which is calculated when determine the distinctive users 109, is used to rotate the selected image so that the image is placed right-side-up for the user.

Computer Peripheral:

A computer peripheral would consist of a touch-range fusion apparatus 104 and some communication protocol that passes information to and from a computer 3. It is possible with this peripheral to emulate a mouse. Using the identification of finger tips, the thumb can be mapped to mouse movement, the index finger can be used as a left mouse click and the middle finger can be used to right click.

Game Controller:

A game controller that uses a touch-range fusion apparatus 104 is made up of the touch-range fusion apparatus 104 and a communication protocol to a gaming console. Interaction can come from hands, feet, bodies, or objects. In one instance, multiple individual users 109 dance on a 6 foot by 6 foot touch device 101 as a display from the gaming console shows dance moves to complete. Each user's foot can be determined by using the range imaging camera 100 data. Correct steps are rewarded by an increase in score on the game.

The present invention pertains to a sensor. The sensor comprises a grid of bars that are in contact from their bottom at bar crossings with a set of outer protrusions that are in contact from above with a plurality of intersections, each having a sensing element, of a grid of wires disposed on a base, and a top surface layer that is disposed atop the grid of bars, so that force imparted from above onto the top surface layer is transmitted to the grid of bars and thence to the protrusions, and thence to the intersections of the grid of wires which are thereby compressed between the base and protrusions; and that the protrusions above whereby focus the imparted force directly onto the intersections. The sensor comprises a computer in communication with the grid of wires which causes prompting signals to be sent to the grid of wires and reconstructs a continuous position of force on the surface from interpolation based on data signals received from the grid of wires.

Each sensing element may include FSR. When force is imparted to the surface layer, each protrusion may be aligned to be in contract with a corresponding sensing element. The sensor may include adhesive disposed between the surface layer and the grid of bars, and between the protrusions and the grid of wires, and between the grid of wires and the base. Each protrusion may be a rigid bump of plastic, metal, wood or glass and focuses force onto the corresponding sensing element, each protrusion having a shape whose contact with the corresponding sensing element lies exactly upon or inside of the corresponding sensing element.

The present invention pertains to a sensor. The sensor comprises a grid of bars that are in contact from their top at bar crossings with a set of outer protrusions and are in contact from their bottom at bar crossings with a set of inner protrusions that are in contact from above with a plurality of intersections, each having a sensing element, of a grid of wires disposed on a base, and a top surface layer that is disposed atop the outer protrusions, so that force imparted from above onto the top surface layer is transmitted to the outer protrusions and thence to the grid of bars and thence to the inner intersections, and thence to the intersections of the grid of wires which are thereby compressed between the base and inner protrusions; and that the inner protrusions above thereby focus the imparted force directly onto the intersections. The sensor comprises a computer in communication with the grid of wires which causes prompting signals to be sent to the grid of wires and reconstructs a continuous position of force on the surface from interpolation based on data signals received from the grid of wires.

Each sensing element may include FSR. When force is imparted to the surface layer, each protrusion may be aligned to be in contract with a corresponding sensing element. The sensor may include adhesive disposed between the surface layer and the grid of bars, and between the protrusions and the grid of wires, and between the grid of wires and the base.

Each protrusion may be a rigid bump of plastic, metal, wood or glass and focuses force onto the corresponding sensing element, each protrusion having a shape whose contact with the corresponding sensing element lies exactly upon or inside of the corresponding sensing element.

The present invention pertains to a method for sensing. The method comprises the steps of imparting force from above onto a top surface layer that is transmitted to a set of grid of bars and thence to a set of protrusions, and thence to a plurality intersections of a grid of wires which are thereby compressed between the base and protrusions, where the set of grid of bars are in contact from their bottom at their bar crossings with the set of protrusions that are in contact from above with the plurality of intersections of the grid of wires disposed on the base; and that the protrusions above thereby focus the imparted force directly onto the intersections. There is the step of causing prompting signals by a computer in communication with the grid of wires to be sent to the grid of wires. There is the step of reconstructing with the computer a continuous position of force on the surface from interpolation based on data signals received from the grid of wires.

The present invention pertains to an apparatus for sensing. The apparatus comprises a computer. The apparatus comprises one or more individual sensing tiles in communication with the computer that form a sensor surface that detects force applied to the surface and provides a signal corresponding to the force to the computer which produces from the signal a time varying continuous image of force applied to the surface, where the surface is contiguous, and detected force can be sensed in a manner that is geometrically continuous and seamless on a surface, wherein each tile includes a grid of bars that are in contact from their bottom at the bar crossings with a set of protrusions that are in contact from above with a plurality of intersections of a grid of wires disposed on a base, and a top surface that is disposed atop the set of plates, so that force imparted from the above onto the top surface layer is transmitted to the plates and thence to the protrusions, and thence to the intersections of the grid of wires which are thereby compressed between the base and protrusions; and that the protrusions above thereby focus the imparted force directly onto the intersections.

In this extension on the ideas of the above embodiments encompassing an improved technique for concentrating force to the appropriate sensing elements 26 on an Active Sensing Array 20. In this embodiment, the touch surface lies over mesh layer with protrusions 129 that consists of a grid of mesh bars 130 with protrusions 30 located at the intersection of these mesh bars 130. This mesh layer with protrusion 120 component can be seen in FIG. 136 and also in an exploded assembly utilizing this part in FIG. 137. As with the other embodiments, the protrusions 30 are aligned with the sensing elements 26. This embodiment provides advantages over the embodiment where the protrusions 30 are integrated onto the inner surface of the Semi-Rigid Touch Layer 31, FIG. 15, such as reducing the volume of material between the protrusions and thus reducing mechanical coupling caused by material in the touch layer 31 and between protrusions 30. This embodiment provides advantages over the embodiment where the protrusions 30 are integrated into the base layer 47, FIG. 20, such as allowing for more flexible touch 31 because the mesh bars 130 provide support to the semi-rigid touch layer 31 allowing for less rigid touch layers than in that technique and thus more sensitivity. This embodiment provides advantages over either of the embodiments involving a plate and protrusion layer seen in FIGS. 52 and 54 since the mesh layer and protrusion 129 is an easier part to manufacture, for example with standard injection molding this part requires a simpler mold. Additionally this technique reduces the volume of material between the protrusions, thus reducing mechanical coupling between the protrusions caused by the outer layers of the assembly, such as that in the plates and/or the touch layer. Additionally this technique affords greater flexibility in tuning the touch layer 31 to the needs of a specific application for the sensor, balancing requirements such as: pressure sensitivity; durability; aesthetic concerns from the user feeling the protrusions when touching the sensor.

The step by step description of the user experience is the same as described above for this embodiment.

List of All Components
A list of all hardware components
List of all components
    A collection of sensor tiles 2, where
        A sensor tile consists of:
            Semi Rigid Touch Layer 31
            Adhesive Layer(s) 40
            Technique: Mesh with Single Protrusion Component
            Mesh and Protrusion Layer 129
            Base Layer 47
            Technique: Mesh with Double Protrusion Component
            Mesh and Double Protrusion Layer 131
            Base Layer 47
            ALL OTHER COMPONENTS ARE AS DESCRIBED ABOVE
    ALL OTHER COMPONENTS ARE AS DESCRIBED ABOVE General Purpose of Each Layer: Mesh and Single Protrusion Embodiment FIG. 137 shows an exploded view and FIG. 138 a side view of a Tile for the Mesh and Single Protrusion Embodiment: Semi-Rigid Touch Layer 31, Mesh and Protrusion Layer (MPL) 129, Active Sensing Array 20, Base Layer 47. When the layers are placed into contact, each protrusion in the MPL 129 is aligned to be in contact with the active area of the sensing element 27 on the outside surface of the Active Sensing Array 20. An Adhesive Layer 40 may also be used between the Semi-Rigid Touch Layer 31 and the MPL 129 so these layers are mechanically connected. Similarly, an Adhesive Layer 40 may also be used between the MPL 129 and the Active Sensing Array 20. Similarly, an Adhesive Layer 40 may also be used between the Active Sensing Array 20 and the Base Layer 47.

FIG. 140 shows an exploded view and FIG. 141 a side view of a Tile for the Mesh and Double Protrusion Embodiment: Semi-Rigid Touch Layer 31, Mesh and Double Protrusion Layer (MDPL) 131, Active Sensing Array 20, Base Layer 47. When the layers are placed into contact, each protrusion in the MDPL 131 is aligned to be in contact with the active area of the sensing element 27 on the outside surface of the Active Sensing Array 20. An Adhesive Layer 40 may also be used between the Semi-Rigid Touch Layer 31 and the MDPL 131 so those layers are mechanically connected. Similarly, an Adhesive Layer 40 may also be used between the MDPL 131 and the Active Sensing Array 20. Similarly, an Adhesive Layer 40 may also be used between the Active Sensing Array 20 and the Base Layer 47.

Glossary of Terms and Description of Components for this Embodiment

Mesh Bar 130: a connecting bar of plastic, metal, wood, glass, or other such material whose primary purpose is to be part of a grid of Mesh bars 132 that holds protrusions in proper alignment with their corresponding sensing elements 26. The Mesh bar presents some mechanical coupling between adjacent protrusions. By keeping the volume or equivalently cross sectional area of the mesh bars small, this mechanical coupling is reduced or negligible.

Grid of Mesh Bars 132: A plurality of Mesh Bars 130 spatially aligned a second plurality of Mesh bars orthogonally such that they form a grid as seen in top and side view in FIGS. 142A and 142B. The Mesh Bars 130 are aligned such that their intersections aligned to correspond with a sensing element 26 on an Active Sensing Array 20.

Mesh and Protrusion Layer (MPL) 129: A part containing both grid of mesh bars 132 and Protrusion Matrix 43, such that the protrusions are physically connected at the intersection of the mesh bars 130 on the inner surface. The protrusions 30 extend beyond the inner surface and are spatially aligned to correspond with the sensing elements 26 on an Active Sensing Array 20. This part may be made of plastic, metal, wood, glass, or other such material that is rigid or semi-rigid. Methods for fabrication of this are described below. FIG. 136 shows an embodiment of a MPL 129.

Mesh Bar Segment 133: This is the segment of a mesh bar that spans two adjacent intersections of Mesh Bars 130 in the grid of mesh bars 132, or equivalently spanning two adjacent protrusions in the Mesh and Protrusion Layer 129.

FIG. 143A shows the Bottom View. FIG. 143B shows the Side View, and FIG. 143C, shows the Top View of the properly aligned grid of mesh bars 132 and Protrusion Matrix 43 of an MPL 129.

In the Mesh with Single Protrusion Component Embodiment, the Semi-Rigid Touch layer 31 and the MPL 129 are mechanically connected to support the imposed Force 34, for example between four adjacent protrusions. Three cases are shown in which the semi-rigid touch layer 31 together with the MPL 129 are respectively: rigid shown in FIG. 145A; sufficiently semi-rigid shown in FIG. 145B; and insufficiently rigid allowing force to be transmitted to the base rather than the protrusions shown in FIG. 145C where the touch layer 31 deforms enough to touch the base layer 47. In each case, the externally imposed force 34 upon the touch layer 31 is transmitted to different locations on the base layer 47 as the depicted transmitted force 56. FIG. 145A and FIG. 145B represent "Valid Amount of Touch and Mesh Layer Rigidity relative to the Protrusion Heights", with the transmitted force 56 being focused exclusively through the protrusions 30 to the base layer 47. In FIG. 145C, there is not a Valid Amount of Rigidity relative to the Protrusion Heights because it deforms such that some force 56 is imparted on the underlying base surface in a region not through a protrusion 30.

Mesh and Protrusion Layer with Bezel (MPLB) 134: This is an alternate embodiment of an MPL 129 that could be used in a single tile assembly. In addition to the functional mesh bars 130, this embodiment includes a surrounding support Bezel Frame 136 whose height is spans the protrusion 30 and mesh bars 130. This is seen in FIG. 149A and in side view FIG. 149B. The Bezel Frame 136 provides a supporting edge for the Touch Layer behind the perimeter active sensing areas.

Mesh and Double Protrusion Layer (MDPL) 131: A coherent part containing both grid of mesh bar 132 and both an inner and outer Protrusion Matrix 43, such that the inner Protrusion Matrix 43 has inner protrusions 137 that are physically connected at the intersection of the mesh bar 130 on the inner surface. The outer Protrusion Matrix 43 has outer protrusions 138 that are physically connected at the intersection of the mesh bar 130 on the outer surface. The inner protrusions 137 from the inner protrusion matrix 43 are protrusions 30 and extend beyond the inner surface and are spatially aligned to correspond with the sensing elements 26 on an Active Sensing Array 20. The outer protrusions 138 and inner protrusions 137 do not need to be symmetric in terms of size and shape. While the inner protrusions 137 must adhere to the restrictions of size and contact described in the above embodiments, the outer protrusions do not. The outer protrusions' function are to support to the Touch Layer 31 above the mesh bar 130 thus reducing potential mechanical coupling between the Touch Layer 31 and the Mesh bars 130 in the MDPL 131. This is in contrast to the Mesh with Single Protrusion embodiment where the Touch Layer 31 rests directly upon the Mesh bars 130 of the MPL 129. This MPDL 131 may be made of plastic, metal, wood, glass, or other such material that is rigid or semi-rigid. Methods for fabrication of this are described below. FIG. 139 shows an embodiment of an MDPL 131.

FIG. 144A shows the Bottom View. FIG. 144B shows the Side View, and FIG. 144C, shows the Top View of the properly aligned grid of mesh bar 132 and Inner protrusions 137 Protrusion Matrices 43 and outer protrusions 138 protrusion matrix 43 of an MDPL 131

In the Mesh with Double Protrusion Component Embodiment, the Semi-Rigid Touch layer 31 and the MDPL 131 are mechanically connected to support the imposed Force 34, for example between four adjacent protrusions. Three cases are shown in which the semi-rigid touch layer 31 together with the MDPL 131 are respectively: rigid shown in FIG. 146A; sufficiently semi-rigid shown in FIG. 146B; insufficiently rigid allowing force to be transmitted to the base rather than the protrusions shown in FIG. 146C where the touch layer 31 deforms enough to touch the base layer 47. In each case, the externally imposed force 34 upon the touch layer 31 is transmitted to different locations on the base layer 47 as the depicted transmitted force 56. FIG. 146A and FIG. 146B represent "Valid Amount of Touch and Mesh Layer Rigidity relative to the Protrusion Heights," with the transmitted force 56 being focused exclusively through the protrusions 30 to the base layer 47. In FIG. 146C, there is not a Valid Amount of Rigidity relative to the Protrusion Heights because it deforms such that some force 56 is imparted on the underlying base surface in a region not through a protrusion 30.

Figure 150B:
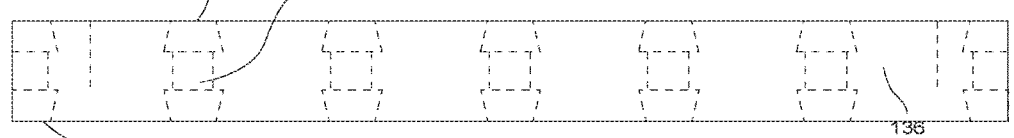

Mesh and Double Protrusion Layer with Bezel (MDPLB) 135: This is an alternate embodiment of an MDPL 131 that could be used in a single tile assembly. In addition to the functional mesh bar 130, this embodiment includes a surrounding support Bezel Frame 136 whose height is spans the inner protrusion 30, mesh bar 130 and outer protrusion 30. This is seen in FIG. 150A and inside view FIG. 150B. The Bezel Frame 136 provides a supporting edge for the Touch Layer beyond the perimeter active sensing areas.

Valid Amount of Touch and Mesh Layer Rigidity relative to the Protrusion Heights: There is a "Valid Amount of Rigidity relative to the Protrusion heights" if an externally applied force of the Touch Layer were to result in pressure being applied exclusively to the corresponding protrusions, in particular no force is imparted to the surface between the protrusions; There would not have a Valid Amount of Rigidity if the same externally applied force were to cause the Touch layer or the Mesh Layer to deform to sufficient extent that either the touch layer 31 or any part of the Mesh of Grid Bars 132 would physically come into contact with the region of the Base Layer between those four protrusions 30, thereby dissipating force onto inactive regions of the Active Sensing Array 20. This unacceptable case can be seen Mesh and Single Protrusion Embodiment in FIG. 145C where Touch Layer 31 deforms in the middle in an arc the full height of the protrusion 30 allowing the Touch Layer 31 to touch the base 47. For example, in the case where the protrusions are spaced at 12 mm, a touch layer consisting of a 0.5 mm thick sheet of rubber would not have a valid amount of rigidity to span the protrusions without touching the base under a 200 g force. Similarly with the Mesh with Double Protrusion Component embodiment, the Touch Layer 31 could deform to touch the base with a sufficient force imposed in the midpoint between four adjacent protrusions, FIG. 146C. Additionally there is an invalid amount of rigidity with a force imposed upon the touch layer 31 in the area between two adjacent protrusions 30 and along a Mesh Bar 130 resulting in the touch layer resting on the mesh bar 130 such that further force may cause the mesh bar to deform and touch the base layer 47. The distance of the deformation of the materials can be described by E(bend)= $L^3F/(4wh^3d)$, where L is the length, w and h are the width and height, F is the applies force and d is the deflection to the load on the surface.

Step by Step Description of Internal Working with Mesh and Single Protrusion Layer:

FIG. 147A shows a cross section of Force Distribution: Semi Rigid Touch Layer 31, Mesh Protrusion Layer 129, Active Sensing Array 20, Base layer 47, externally applied touch force 34. The MPL 129 contains Protrusions 30. The Protrusions 30 are aligned with the sensing elements 26 on the Active Sensing Array 20.

Internal operation begins when fingers or other objects impose downward force 34 upon outer surface of the Semi-Rigid Touch Layer 31, as seen in FIG. 147.

This force is then transmitted through the Semi-Rigid Touch Layer 31 to one or more mesh bar segments 133 beneath the force 34 in the MPL 129.

The respective downward force 34 on each mesh bar segment 133 of the MPL 129 is redistributed to the two protrusions 30 in the MPL 129 that are adjacent to the transmitted force on the mesh bar segment 133. Each protrusion 30 may be in contact with to four mesh bar segments 133. In the case where force is concurrently applied to multiple mesh bar segments 133 at a protrusion 30, the combined force from those mesh bar segments 133 are concentrated onto the respective shared protrusion 30 and measured at the sensing element 26 that this shared protrusion 30 is in contact with.

Each protrusion 30 is aligned above a respective sensing element 26 on the Active Sensing array 20, concentrating the force applied 34 to the active area of the sensing elements 27.

This creates a concentration of force that is transmitted to the portion of the Active Sensing Array 20 where each protrusion 30 is in contact with a corresponding sensing element 26, thereby creating a force that compresses together the two areas of FSR material 24 in mutual contact at the regions of the Active Sensing Array 20 that comprise the sensing elements 26 (where one FSR 24 region on the outer conducting line of 23 the Active Sensing Array 20 is in contact with a corresponding region of FSR material 24 on the inner conducting line 23 of the Active Sensing Array 20 as seen in FIGS. 10 and 11).

As described earlier, this compression creates an increase of electrical conductance between those two areas of FSR material in mutual contact. As the sensor's microcontroller scans through the Active Sensing Array's array of sensing elements, each of those changes in conductance is measured as a change in voltage, which the micro-controller detects via an A/D converter that the micro-controller then encodes as a digital signal. The micro-controller then sends this digital signal through the USB to the host computer.

This configuration of components forms a mechanism for even force redistribution from the touch layer 31 to the MPL 129 and thus to the sensing elements on the Active Sensing Array whereby a continuous change in position of a touch on the outer face of the Touch Layer 31 results in a corresponding continuous change in the relative force applied to those sensing elements that are nearest to that touch. Those relative forces, when sent to the host computer as part of the data image, permit the host computer to accurately reconstruct the centroid position of the touch through arithmetic interpolation.

The electronic measurement and processing of the force upon the Active Sensing Array is identical to the embodiments earlier described.

Step by Step Description of Internal Working with Mesh and Double Protrusion Layer:

FIG. 147B shows a cross section of Force Distribution: Semi Rigid Touch Layer 31, Mesh and Double Protrusion Layer 131, Active Sensing Array 20, Base layer 47, externally applied touch force 34. The MDPL 131 contains inner Protrusions 137 and outer protrusions 138. The inner protrusions 137 are aligned with the sensing elements 26 on the Active Sensing Array 20. The semi-rigid touch layer 31 rests upon the outer protrusions 138, but does not require any special registration.

Internal operation begins when fingers or other objects impose downward force 34 upon outer surface of the Semi-Rigid Touch Layer 31, as seen in FIG. 147.

This force is then transmitted through the Semi-Rigid Touch Layer 31 to one or more of the outer protrusions 138 beneath the force 34 in the MPL 129

The respective downward force 34 on each outer protrusion 138 of the MDPL 131 is transmitted to the inner protrusion 137 directly below it and measured at the sensing element 26 that this inner protrusion 137 is in contact with.

The further internal working steps are identical to the internal working with Mesh and Single Protrusion Layer described above.

Prototype Assembly

FIG. 151 shows an exploded view of the Layers and Assembly in the prototype single tile embodiment using Mesh with Single Protrusion Layer: Semi-Rigid Touch Layer 31, MPLB 134; Active Sensing Array 20, Base Layer 47. When the layers are placed into contact, each protrusion 30 in the MPLB 134 is aligned to be in contact its corresponding active sensing area 27 on the outside surface of the Active Sensing Array 20. An Adhesive Layer 40 was used between each of the above layers in this prototype embodiment. The Bezel Frame 136 provides support for the perimeter Mesh Bar Segments 133.

Semi-Rigid Touch Layer 31: 5 mil Glass

Mesh with Protrusions Layer with Bezel 134: 32×32 grid of mesh bars 132 with 32×32 grid of protrusions. A custom SLA (Stereolithography) Rapid Prototyped part manufactured with Somos 11122 (Clear PC Like) created with a supplied CAD file with the MPL 131 Geometry using standard SLA manufacturing. The sensing element 26, and corresponding mesh bar 131 spacing, was 6.5 mm with a cross section of 1 mm wide by 0.6 mm tall. The protrusions 30 were 1 mm tall, 1.25 mm×12.5 mm on side adjacent to the mesh bars 130 and 1 mm×1 mm on the side facing the sensing elements 26.

Active Sensing Array 20: Custom printed sensor as per description in the other earlier described embodiments, with a 32×32 grid of sensing elements spaced at 6.5 mm. Each sensing element has a 4×4 mm overlapping FSR area. 100 kOhm FSR Ink was used in the ASA.

Base Layer 47: Acrylic Sheet, ⅛" Thick. Note that this embodiment was one in which it was expected that the apparatus would be placed on a solid table top for use as in the embodiment of the Base layer where the apparatus 1 will lie flat against a flat solid surface.

Adhesive Layer 40: Graphix Double Tack Mounting Film. Three adhesive layers 40 are used in this assembly.

In this prototype assembly, a) One side of an adhesive layer 40 is affixed to the inner surface of the Semi-Rigid Touch Layer 31.

b) The opposite side of that adhesive layer 40 is affixed to the outer surface of the MPLB 134.

c) One side of a second adhesive layer 40 is affixed to the outer surface of the Active sensing array 20.

d) The opposite side of that adhesive layer 40 is affixed to the inner surface of the MPL 129 such that the protrusions 30 on the MPLB 134 are aligned with the corresponding sensing elements 26 on the Active Sensing Array 20.

c) One side of a third adhesive layer 40 is affixed to the inner surface of the Active Sensing Array 20.

f) The opposite side of that adhesive layer 40 is affixed to the outer surface of the Base Layer 47.

Pressure Data for this Mesh with Single Protrusion Prototype Assembly

In the following tests, calibrated weights were placed above a wire intersection. A small rubber cylinder that weighed 5 g was used to concentrate the force at the intersection.

MPL Sensor

| Weight (g) | Value From Sensing element (*) |
| --- | --- |
| 5 | 50 |
| 7.5 | 500 |
| 10 | 1000 |
| 15 | 2000 |
| 20 | 2550 |
| 25 | 2800 |

(*) In the prototype embodiment here, these are the values measured from the A/D circuitry of the PIC24 chip and based on voltages. The values are measured as 12-bit non-negative values.

Methods to Manufacture the Mesh with Protrusion layer

In one embodiment, a metal mold can be created for the MPL 129 using industry standard techniques for making molds for plastic parts. The MPL 129 parts can be manufactured via injection molding out of ABS plastic using standard injection mold and molding techniques.

The same techniques can be used for manufacture of a MPLB 134.

FIG. 152 shows an exploded view of the Layers and Assembly in the prototype single tile prototype embodiment using a Mesh with Double Protrusion Layer: Semi-Rigid Touch Layer 31, MDPLB 135, Active Sensing Array 20, Base Layer 47. When the layers are placed into contact, each inner protrusion 137 in the MDPLB 135 is aligned to be in contact its corresponding active sensing area 27 on the outside surface of the Active Sensing Array 20. An Adhesive Layer 40 was used between each of the above layers in this prototype embodiment. The Bezel Frame 136 provides support for the perimeter Mesh Bar Segments 133.

Semi-Rigid Touch Layer 31: 5 mil Glass

Mesh with Double Protrusions Layer with Bezel 135: 32×32 grid of mesh bars 132 with 32×32 grid of inner protrusions 137 and a 32×32 grid of outer protrusions 138. A custom SLA (Stereolithography) Rapid Prototyped part manufactured with Somos 11122 (Clear PC Like) created with a supplied CAD file with the MDPLB 135 Geometry using standard SLA manufacturing. The sensing element 26, and corresponding mesh bar 130 spacing, was 6.5 mm with a cross section of 1 mm wide by 0.6 mm tall. The inner protrusions 137/30 were 1 mm tall, 1.25 mm×12.5 mm on side adjacent to the mesh bars 130 and 1 mm×1 mm on the side facing the sensing elements 26. The outer protrusions 138 were 1 mm tall, 1.25 mm×1.25 mm on side adjacent to the Bars and 1 mm×1 mm on the side facing the touch layer 31.

Active Sensing Array 20: Custom Sensor as per description in above embodiments with a 32×32 grid of sensing elements spaced at 6.5 mm. Each sensing element has a 4×4 mm overlapping FSR area. 100 kOhm FSR Ink was used in the ASA.

Adhesive Layer(s) 40: Graphix Double Tack Mounting Film. This has protective paper on either side of an adhesive plastic sheet.

In this prototype assembly, a) One side of an adhesive layer 40 is affixed to the inner surface of the Semi-Rigid Touch Layer 31.

b) The opposite side of that adhesive layer 40 is affixed to the outer surface of the MDPLB 135.

c) One side of a second adhesive layer 40 is affixed to the outer surface of the Active sensing array 20.

d) The opposite side of that adhesive layer 40 is affixed to the inner surface of the MDPLB 135 such that the protrusions 30 on the MDPLB 135 are aligned with the corresponding sensing elements 26 on the Active Sensing Array 20.

e) One side of a third adhesive layer 40 is affixed to the inner surface of the Active Sensing Array 20.

f) The opposite side of that adhesive layer 40 is affixed to the outer surface of the Base Layer 47.

Pressure Data for this Mesh with Double Protrusion Prototype Assembly

In the following tests, calibrated weights were placed above a wire intersection. A small rubber cylinder that weighed 5 g was used to concentrate the force at the intersection.

| Weight (g) | Value from Sensing element (*) |
| --- | --- |
| 5 | 150 |
| 7.5 | 975 |
| 10 | 1400 |
| 15 | 2000 |
| 20 | 2400 |
| 25 | 2700 |

(*) In the prototype embodiment here, these are the values measured from the A/D circuitry of the PIC24 chip and based on voltages. The values are measured as 12-bit non-negative values.

Methods to Manufacture the Mesh and Double Protrusion Layer 131

In one embodiment, a metal mold can be created for the MDPL 131 using industry standard techniques for making molds for plastic parts. The MDPL 131 parts can be manufactured via injection molding out of ABS plastic using standard injection mold and molding techniques.

The same techniques can be used for the manufacture of a MDPLB 135

Assembly of Sensor with a Thin Base Layer and Co-Planar PCB

FIG. 148A shows an embodiment of a single Stand Alone Tile in the Mesh and Single Protrusion Embodiment: Semi-Rigid Touch Layer 31; MPL 129, Base Layer 47; Active Sensing Array 20; Printed Circuit Board 4.

FIG. 148B shows an embodiment of a single Stand Alone Tile in the Mesh and Double Protrusion Embodiment: Semi-Rigid Touch Layer 31; MDPL 131, Base Layer 47; Active Sensing Array 20; Printed Circuit Board 4

The embodiment shown in FIGS. 148A and 148B shows the Active Sensing Array 20 laying flat upon the Base Layer 47, with its Connector Tails 25 connected to a co-planar Printed Circuit Board 4. The base layer 47 in this corresponds to one described earlier where the apparatus 1 will lie flat against a flat solid surface. An advantage of this embodiment is that the entire sensor is thin. For example in the above embodiment, the entire sensor is under 3 mm.

Assembly Involving a Plurality of Tiles: Single Protrusion Technique

In one embodiment using the Mesh and Single Protrusion technique, individual tile sensors that are part of grid of sensors are nearly identical to the single tiles described earlier, but the mesh bar segments 133 on the MPL 129 extend half the protrusion spacing on the perimeter, FIG. 154. An MPL 129 without a bezel would be used in this embodiment. The exploded view of assembly of the tile is seen FIG. 137.

FIG. 153 shows the side view of two adjacent tiles. Note that the perimeter mesh bar segments 133 from the respective tile spans half the distance between the corresponding adjacent perimeter protrusions 30. These pairs of half mesh bars on the perimeter presents some mechanical dampening, similarly to the mechanical coupling where the mesh bars span internal protrusions. By keeping the volume or equivalently cross sectional area of the mesh bars small, this mechanical dampening is reduced or negligible.

In one implementation of the Base Layer 47, the base can be molded with a cavity on its bottom that could house the sensor tile's Printed Circuit Board 4, as shown in side view in FIG. 155A and from the bottom in FIG. 155B. Channels would also be molded into the base to support inter-tile cabling.

In FIG. 155B, this embodiment is seen with the Base Layer 47 has a cut-out region 62 on its underside into which the Printed Circuit Board 4 securely fits. The Active Sensing Array 20 wraps around two adjacent edges of the Base Layer 47 to electrically connect via the connector tails 23 on the Active Sensing Array 20 to the PCB 4.

FIGS. 156A and 156B shows the side view of Adjacent Tiles being aligned and positioned. FIG. 156A shows the tile being properly aligned. FIG. 156B shows the two tiles properly positioned. The respective Base Layers 47 extends only slightly beyond the last edge protrusion 30. This allows for a gap between the Base Layers 47 that allows the Active Sensing Array 20 to wrap around.

FIG. 156C shows an embodiment where the Semi-Rigid Touch Layer 31 spans the plurality of tiles.

Interpolation Across Spanning Tiles

As mentioned above, the mechanical dampening caused by the half mesh bars segments 133 on the perimeter spanning adjacent tiles is similar to the mechanical coupling for internal mesh bar segments. If needed, in one embodiment this can be compensated for algorithmically with a sine wave correction in the interpolation with an appropriate damping constant.

Note that in this arrangement, there is no need for exact registration between the Semi-Rigid Touch Layer 31 spanning the plurality of tiles and the individual sensor tiles, since the Semi-Rigid Touch Layer 31 itself can be a featureless and uniform sheet of material.

Assembly Involving a Plurality of Tiles: Double Protrusion Technique

In one embodiment using the Mesh and Double Protrusion technique, individual tile sensors that are part of grid of sensors are nearly identical to the single tiles described earlier, but the mesh bar segments 133 on the MDPL 131 extend half the protrusion spacing on the perimeter, FIG. 154. An MDPL 131 without a bezel would be used in this embodiment. The exploded view of assembly of the tile is seen FIG. 140.

FIG. 157 shows the side view of two adjacent tiles. Note that the perimeter mesh bar segments 133 from the respective tiles spans half the distance between the corresponding adjacent perimeter protrusions 30. An advantage of this embodiment over the Mesh with Single Protrusion technique is that there is negligible to no mechanical coupling between protrusions on the internal mesh bar segments 133. As a result there is similarly negligible to no mechanical dampening between tiles.

In one implementation of the Base Layer 47, the base can be molded with a cavity on its bottom that could house the sensor tile's Printed Circuit Board 4, as shown in side view in FIG. 158A and from the bottom in FIG. 158B. Channels would also be molded into the base to support inter-tile cabling.

In FIG. 158B, this embodiment is seen with the Base Layer 47 has a cut-out region 62 on its underside into which the Printed Circuit Board 4 securely fits. The Active Sensing Array 20 wraps around two adjacent edges of the Base Layer 47 to electrically connect via the connector tails 23 on the Active Sensing Array 20 to the PCB 4.

FIGS. 159A and 159B shows the side view of adjacent tiles being aligned and positioned. FIG. 159A shows the tile being properly aligned. FIG. 159B shows the two tiles properly positioned. The respective Base Layers 47 extends only slightly beyond the last edge protrusion 30. This allows for a gap between the Base Layers 47 that allows the active sensing Array 20 to wrap around.

FIG. 159C shows an embodiment where the Semi-Rigid Touch Layer 31 spans the plurality of tiles.

Interpolation Across Spanning Tiles

As mentioned above, there is no or negligible coupling between adjacent protrusions either internal or across tiles. As a result, there are no special interpolation issues for sensing areas on the perimeter of tiles.

Note that in this arrangement, there is no need for exact registration between the semi-rigid touch layer 31 spanning the plurality of tiles and the individual sensor tiles, since the semi-rigid touch layer 31 itself can be a featureless and uniform sheet of material.

All other aspects of the plurality of tile implementation are identical to that using a Mesh and Single Protrusion technique.

REFERENCES, ALL OF WHICH ARE INCORPORATED BY REFERENCE HEREIN

[1] V. Savov. Kinect Finally Fulfills Its Minority Report Density. Engadget. 2010.

[2] A. Wu and M. Shah and N. Lobo. A Virtual 3D Blackboard: 3D Finger Tracking using a Single Camera, 2000, 536-543.

[3] S. Malik, Real-Time Hand Tracking and Finger Tracking for Interaction. 2003.
[4] C. Jennings. Robust Finger Tracking with Multiple Camera. In Proc. of the International Workshop on Recognition, Analysis and Tracking of Faces and Gestures in Real-Time Systems, 1999, 152-160.
[5] http://youtu.be/jer1Ms5dUJg Kinect Finger Tracking Video
[6] http://touchco.com/Touchco
[7] S. Jobs. 2008. Touch screen device, method, and graphical user interface for determining commands by applying heuristics. U.S. Patent Application No. 20080122796.
[8] http://www.wacom.com/en/Products/Intuos.aspx Wacom Intuos 4
[9] http://www.microsoft.com/surface/en/us/default.aspx Microsoft Surface
[10] http://www.merl.com/projects/DiamondTouch/Diamond Touch
[11] http://smarttech.com/SMART Technologies
[12] J. Y. Han. Low-cost multi-touch sensing through frustrated total internal reflection. Proceedings of the 18th Annual ACM Symposium on User Interface Software and Technology, pages 115-118, 2005.
[13] I. Rosenberg and K. Perlin. The unmousepad: an interpolating multi-touch force-sensing input pad. In SIGGRAPH '09: ACM SIGGRAPH 2009 papers, pages 1-9, New York, N.Y., USA, 2009. ACM.
[14] http://www.futuresource-consulting.com/Future Consulting
[15] Ming-Ching Chang and Benjamin B. Kimia, Regularizing 3D Medial Axis Using Medial Scaffold Transforms, Computer Vision and Pattern Recognition, 2008. CVPR 2008. IEEE Conference.
[16] Xia H. and Tucker P. G. (2009), Distance solutions for medial axis transform, Proceedings of 18th International Meshing Roundtable, Salt Lake City, Utah, Oct. 25-28, 2009, pp. 247-260.
[17] http://www.umiacs.umd.edu/~ramani/cmsc828d/lecture9.pdf, Ramani Duraiswami, Lecture Notes on Camera Calibration, cmsc828d.
[18] Multiple View Geometry in Computer Vision, R. Hartley and A. Zisserman, Cambridge University Press, 2000, pp. 138-183.
[19] Three-Dimensional Computer Vision: A Geometric Approach, O. Faugeras, MIS Press, 1996, pp. 33-68.
[20] A Versatile Camera Calibration Technique for 3D Machine Vision", R. Y. Tsai, IEEE J. Robotics intersection Automation, RA-3, No. 4, Aug. 1987, pp. 323-344.
[21] Jean-Yves Bouguet, Camera Calibration Toolbox for Matlab, http://www.vision.caltech.edu/bouquetj/calib_doc.
[22] Wayne Carl Westerman, John G. Elias, Maintaining activity after contact liftoff or touchdown, U.S. Pat. No. 7,782,307.
[23] Arther R. Pope, Model-Based Object Recognition—A Survey of Recent Research, Technical Report 94-04 January 1994.
[24] Farshid Arman, Model-based object recognition in dense-range images—a review, Journal ACM Computing Surveys (CSUR) Surveys Volume 25 Issue 1, March 1993.
[25] G. Qian, J. Zhang, and A. Kidane, "People Identification using Gait via Floor pressure Analysis", IEEE Sensors Journal, Vol. 10, No. 9, pp. 1447-1460, September 2010, doi: 10.1109/JSEN. 2010.2045158.
[26] Augsten, T., Kaefer, K., Meusel, R., Fetzer, C., Kamitz, D., Stoff., T., Becker, T., Holz, C. and Baudisch, P. Multitoe: High-Precision Interaction with Back-Projected Floors Based on High-Resolution Multi-Touch Input. Proceedings of UIST 2010, New York, N.Y., Oct. 3-6, 2010, pp. 209-218.
[27] Cullen Jennings, Robust Finger Tracking with Multiple Cameras, Proceedings of the International Workshop on Recognition, Analysis, and Tracking of Faces and Gestures in Real-Time Systems, 1999.
[28] Jacob O. Wobbrock, Meredith Ringel Morris, Andrew D. Wilson, User-Defined Gestures for Surface Computing, Proceeding CHI '09 proceedings of the 27th international conference on Human factors in computing systems.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A sensor comprising:
a grid of bars that are in contact from their bottom at bar crossings with a set of protrusions that are in contact from above with a plurality of intersections, each having a sensing element, of a grid of wires disposed on a base, and a top surface layer that is disposed atop the grid of bars, so that force imparted from above onto the top surface layer is transmitted to the grid of bars and thence to the protrusions, and thence to the intersections of the grid of wires which are thereby compressed between the base and protrusions; and that the protrusions above thereby focus the imparted force directly onto the intersections, including adhesive disposed between the top surface layer and the grid of bars, and between the protrusions and the grid of wires, and between the grid of wires and the base and the top surface layer has a valid amount of rigidity relative to a height of the protrusions where a distance of a deformation of the top surface layer is described by $E(\text{bend})=L^3F/(4wh^3d)$, where L is length, w and h are width and height, respectively, F is an applied force and d is the deflection to a load on the top surface layer, so the distance of deformation of the top surface layer is less than the height of the protrusions and the top surface layer never touches the base causing force to be imparted onto the base; and
a computer in communication with the grid of wires which causes prompting signals to be sent to the grid of wires and reconstructs a continuous position of force on the surface from interpolation based on data signals received from the grid of wires.

2. The sensor of claim 1 wherein each sensing element includes force sensitive resistive material (FSR).

3. The sensor of claim 2 wherein when force is imparted to the surface layer, each protrusion is aligned to be in contact with a corresponding sensing element.

4. The sensor of claim 3 wherein each protrusion is a rigid bump of plastic, metal, wood or glass and focuses force onto the corresponding sensing element, each protrusion having a shape whose contact with the corresponding sensing element lies exactly upon or inside of the corresponding sensing element.

5. A method for sensing comprising the steps of:
imparting force from above onto a top surface layer that is transmitted to a set of grid of bars and thence to a set of protrusions, and thence to a plurality intersections of a grid of wires which are thereby compressed between the base and protrusions, where the set of grid of bars are in contact from their bottom at their bar crossings with the set of protrusions that are in contact from above with the plurality of intersections of the grid of wires disposed on the base; and that the protrusions above thereby focus the imparted force directly onto the intersections, including adhesive disposed between the top surface layer and the grid of bars, and between the protrusions and the grid of wires, and between the grid of wires and the base and the top surface layer has a valid amount of rigidity relative to a height of the protrusions where a distance of a deformation of the top surface layer is described by $E(bend)=L^3F/(4wh^3d)$, where L is length, w and h are width and height, respectively, F is an applied force and d is the deflection to a load on the top surface layer, so the distance of deformation of the top surface layer is less than the height of the protrusions and the top surface layer never touches the base causing force to be imparted onto the base;

causing prompting signals by a computer in communication with the grid of wires to be sent to the grid of wires; and reconstructing with the computer a continuous position of force on the surface from interpolation based on data signals received from the grid of wires.

6. A method of forming a sensor comprising the steps of:

placing a mold made of silicone rubber that contains regularly spaced holes atop an outer side of a surface substrate;

pouring a resin into these holes;

removing the mold when the resin hardens so the resin forms regularly spaced bumps upon a top surface of the surface substrate; and positioning a top surface layer in place relative to the top surface of the surface substrate, where the top surface layer has a valid amount of rigidity relative to a height of the bumps where a distance of a deformation of the surface layer is described by E(bend)=L3F/(4wh3d), where L is length, w and h are width and height, respectively, F is an applied force and d is the deflection to a load on the top surface layer, so the distance of deformation of the top surface layer is less than the height of the bumps so sensing elements are formed at an intersection of a grid of wires that includes using force sensitive resistive material (FSR) to form an active sensing array, where the bumps are positioned at the location of the sensing elements so that force can be imparted from the touch layer through the bumps to the sensing elements.

\* \* \* \* \*